United States Patent
Slaughter et al.

(10) Patent No.: US 7,327,741 B1
(45) Date of Patent: Feb. 5, 2008

(54) DETECTING AND BREAKING CYCLES IN A COMPUTER NETWORK

(75) Inventors: Gregory L. Slaughter, Palo Alto, CA (US); Thomas Saulpaugh, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 1071 days.

(21) Appl. No.: 10/324,872

(22) Filed: Dec. 20, 2002

(51) Int. Cl.
*H04L 12/28* (2006.01)

(52) U.S. Cl. ............ 370/396; 370/255; 370/390; 370/432

(58) Field of Classification Search ........ 370/254, 370/255, 389, 390, 396, 432
See application file for complete search history.

(56) References Cited

U.S. PATENT DOCUMENTS

| | | | |
|---|---|---|---|
| 4,354,229 A | | 10/1982 | Davis et al. |
| 4,864,559 A | * | 9/1989 | Perlman ............ 370/256 |
| 5,111,198 A | * | 5/1992 | Kuszmaul ........ 340/825.52 |
| 5,331,637 A | * | 7/1994 | Francis et al. ........ 370/408 |
| 5,606,669 A | | 2/1997 | Bertin et al. |
| 5,754,939 A | * | 5/1998 | Herz et al. ........... 455/3.04 |
| 5,761,421 A | | 6/1998 | van Hoff et al. |
| 5,764,982 A | | 6/1998 | Madduri |
| 5,790,553 A | | 8/1998 | Deaton, Jr. et al. |
| 5,802,278 A | | 9/1998 | Isfeld et al. |
| 5,831,975 A | * | 11/1998 | Chen et al. ............ 370/256 |
| 5,832,195 A | | 11/1998 | Braun et al. |
| 5,918,017 A | | 6/1999 | Attanasio et al. |
| 5,920,566 A | | 7/1999 | Hendel et al. |
| 5,928,326 A | | 7/1999 | Boudou et al. |
| 6,012,096 A | | 1/2000 | Link et al. |
| 6,016,478 A | | 1/2000 | Zhang et al. |
| 6,049,823 A | | 4/2000 | Hwang |
| 6,058,113 A | * | 5/2000 | Chang ................... 370/390 |
| 6,088,336 A | | 7/2000 | Tosey |
| 6,091,724 A | | 7/2000 | Chandra et al. |
| 6,144,992 A | | 11/2000 | Turpin et al. |
| 6,148,383 A | | 11/2000 | Micka et al. |
| 6,167,432 A | | 12/2000 | Jiang |
| 6,173,374 B1 | | 1/2001 | Heil et al. |
| 6,185,618 B1 | | 2/2001 | Brabson |
| 6,189,079 B1 | | 2/2001 | Micka et al. |

(Continued)

OTHER PUBLICATIONS

A. Rowstron and P. Druschel. "Pastry: Scalable, distributed object location and routing for large-scale peer-to-peer systems." In Proc. *IFIP/ACM Middleware 2001*, Heidelberg, Germany, Nov. 2001.

(Continued)

*Primary Examiner*—Massan Kizou
*Assistant Examiner*—Bo Hui A Zhu
(74) *Attorney, Agent, or Firm*—Meyertons Hood Kivlin Kowert & Goetzel, P.C.; B. Noël Kivlin

(57) ABSTRACT

Various embodiments of a system and method related to a computer network capable of detecting and breaking cycles are disclosed. First routing information usable to send messages to a first address may be created. The first address may be associated with multiple nodes in the network. When sending a message from a first node to the first address according to the first routing information, a cycle may be detected. The first routing information may be changed to break the cycle.

17 Claims, 103 Drawing Sheets

U.S. PATENT DOCUMENTS

| | | |
|---|---|---|
| 6,219,710 B1 | 4/2001 | Gray et al. |
| 6,272,386 B1 | 8/2001 | McLaughlin et al. |
| 6,275,888 B1 | 8/2001 | Porterfield |
| 6,304,980 B1 | 10/2001 | Beardsley et al. |
| 6,314,491 B1 | 11/2001 | Freerksen et al. |
| 6,317,438 B1 | 11/2001 | Trebes, Jr. |
| 6,415,280 B1 | 7/2002 | Farber et al. |
| 6,434,638 B1 | 8/2002 | Deshpande |
| 6,553,031 B1 | 4/2003 | Nakamura et al. |
| 6,584,075 B1 | 6/2003 | Gupta et al. |
| 6,611,872 B1 | 8/2003 | McCanne |
| 6,628,649 B1 * | 9/2003 | Raj et al. .................... 370/360 |
| 6,631,449 B1 | 10/2003 | Borrill |
| 6,636,886 B1 | 10/2003 | Katiyar et al. |
| 6,643,650 B1 | 11/2003 | Slaughter et al. |
| 6,667,957 B1 | 12/2003 | Corson et al. |
| 6,748,381 B1 | 6/2004 | Chao et al. |
| 6,839,769 B2 | 1/2005 | Needham et al. |
| 6,850,987 B1 | 2/2005 | McCanne et al. |
| 6,871,235 B1 | 3/2005 | Cain |
| 2002/0065919 A1 | 5/2002 | Taylor |
| 2002/0103998 A1 | 8/2002 | DeBruine |
| 2002/0114341 A1 | 8/2002 | Sutherland |
| 2002/0143855 A1 | 10/2002 | Traversat et al. |
| 2002/0147771 A1 | 10/2002 | Traversat et al. |
| 2002/0147815 A1 | 10/2002 | Tormasov |
| 2003/0161330 A1 * | 8/2003 | Umeda .................... 370/400 |
| 2004/0122903 A1 | 6/2004 | Saulpaugh et al. |

OTHER PUBLICATIONS

Zhao, et al "Tapestry: An Infrastucture for Fault-tolerant Wide-area Location and Routing" *UCB Tech. Report UCB/CSD-01-1141*. Apr. 2001.

Stoica, et al "Chord: A Scalable Peer-to-peer Lookup Service for Internet Applications," *ACMSIGCOMM 2001*, San Diego, CA, Aug. 2001, pp. 149-160.

Manku, et al, "Symphony: Distributed Hashing in a Small World" Published in USITS, 2003.

Kubiatowicz, et al "OceanStore: An Architecture for Global-scale Persistent Storage" *Proceedings of ACM ASPLOS*, Nov. 2000.

Adya, et al; "FARSITE: Federated, Available, and Reliable Storage for an Incompletely Trusted Environment"; *Proceedings of the 5th OSDI*, Dec. 2002.

Garces-Erice, et al; "Hierarchical Peer-to-Peer Systems," In the Special issue of the *Parallel Processing Letters* (PPL), Dec. 2003, vol. 13, No. 4.

"Large Scale Peer-to-Peer Experiments with Virtual Private Community (VPC) Framework," Iwao, et al., CIA 2002, LNAI 2446, pp. 66-81, 2002.

"BestPeer: A Self-Configurable Peer-to-Peer System," Ng, et al, Department of Computer Science, National University of Singapore, pp. 1-21.

* cited by examiner

DETECTING AND BREAKING CYCLES IN A COMPUTER NETWORK

BACKGROUND OF THE INVENTION

1. Field of the Invention

This invention relates to computer networks and, more particularly to detecting and breaking cycles in a computer network.

2. Description of the Related Art

Distributed computing has become increasingly popular as computer networks have proliferated. A wide variety of network protocols and network routing techniques are in use today. One protocol in widespread use is the Transmission Control Protocol/Internet Protocol (TCP/IP), used for Internet communication. TCP/IP is based on a model that assumes a large number of independent networks are connected together by gateways called routers. The collection of interconnected IP networks is uniformly addressed by an IP-address. The routing used to provide network independent addressing is transparent to client and target software. All a client needs to know to send a message to a target is that target's IP address. TCP enforces an ordered delivery of messages. The concept of a message response with data is not directly supported by TCP, but instead is provided by the application layer.

Another network protocol in widespread use is the User Datagram Protocol (UDP). No reliable connections are established in the UDP protocol, and thus no guarantees of message delivery are made. UDP also does not enforce an ordered delivery of messages. Like the TCP protocol, the concept of a message response is not directly supported by UDP, but instead is provided by the application layer.

One type of networking is referred to as peer-to-peer or P2P networking. Peer-to-peer networking has seen rapid growth. As used herein, a peer-to-peer network is generally used to describe a decentralized network of peer nodes where each node may have similar capabilities and/or responsibilities. Participating peer nodes in a P2P network may communicate directly with each other. Work may be done and information may be shared through interaction between the peers. In addition, in a P2P network, a given peer node may be equally capable of serving as either a client or a server for another peer node.

A peer-to-peer network may be created to fulfill some specific need, or it may be created as a general-purpose network. Some P2P networks are created to deliver one type of service and thus typically run one application. For example, Napster was created to enable users to share music files. Other P2P networks are intended as general purpose networks which may support a large variety of applications. Any of various kinds of distributed applications may execute on a P2P network. Exemplary peer-to-peer applications include file sharing, messaging applications, distributed information storage, distributed processing, etc.

SUMMARY OF THE INVENTION

Various embodiments of a system and method related to a computer network capable of detecting and breaking cycles are disclosed. According to one embodiment of the method, a plurality of nodes may be coupled to each other to form a network. Coupling the plurality of nodes to each other may comprise creating a plurality of links. Each link may comprise a virtual communication channel between two nodes. Each node may have links to only a subset of the other nodes in the network.

First routing information usable to send messages to a first address may be created. The first address may be associated with multiple nodes in the network. For example, each node may publish the first address or announce to other nodes that the first address is associated with the node. In response, first routing information usable to send messages to the nodes with which the address is associated may be created. In various embodiments, the first routing information may comprise information of any kind and may be stored on or distributed across multiple nodes. For example, multiple nodes may each store a portion of the first routing information, where each of the nodes is operable to determine how to route a message addressed to the first address based on the portion of the first routing information stored on the node.

For example, the first routing information stored at a first node may associate a plurality of the first node's links with the first address. Each link may be associated with one or more of the nodes with which the first address is associated. Thus, to send a message addressed to the first address, the first node may send the message along each of the multiple links associated with the first address so that, as each instance of the message is propagated, the instance of the message eventually arrives at one of the nodes with which the first address is associated.

It is possible that sending the first message along each of the multiple links causes a cycle. Each node which receives the message from the first node may propagate the message to one or more nodes according to the first routing information, similarly as described above. In other words, for each of these nodes, the first routing information may associate one or more of the node's links with the first address, such that the message is propagated along each of the associated links. A cycle may be detected if two messages originating from different nodes are propagated to the same node at some point along the respective delivery chains.

If a cycle is detected then, the cycle may be broken. This may involve changing at least a portion of the first routing information so that messages can be sent from the first node to the first address without causing a cycle. For example, for each of one or more nodes, the portion of first routing information stored on the node may be changed to avoid the cycle. In various embodiments, any of various methods may be employed to change the first routing information in order to break the cycle.

Figure 1:
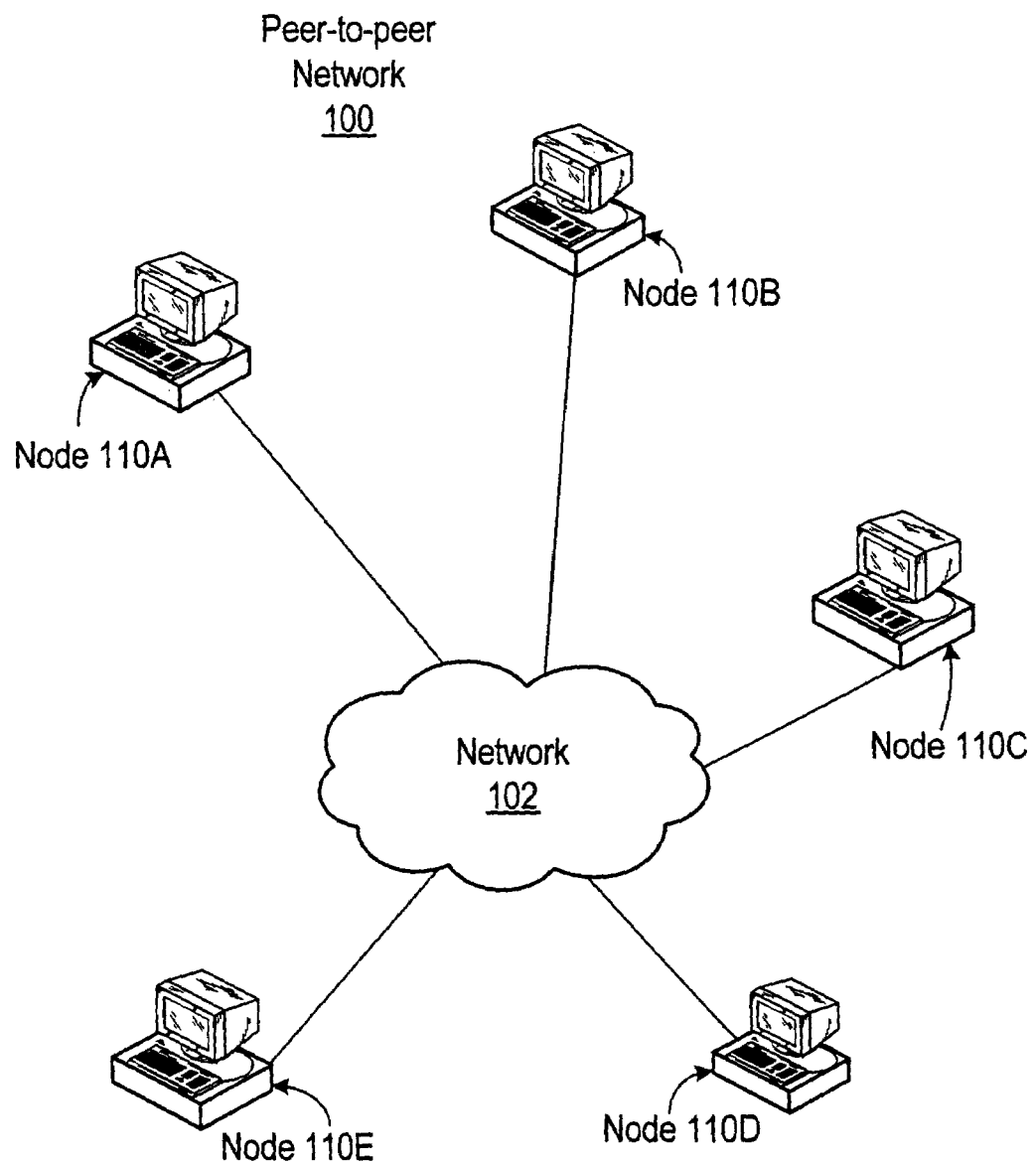
FIG. 1 illustrates a diagram of one embodiment of a peer-to-peer network 100.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates a diagram of one embodiment of a peer-to-peer network 100. The peer-to-peer network 100 includes nodes (e.g., computer systems) 110A-110E, although in various embodiments any number of nodes may be present. It is noted that throughout this disclosure, drawing features identified by the same reference number followed by a letter (e.g., nodes 110A-110E) may be collectively referred to by that reference number alone (e.g., nodes 110) where appropriate.

As shown, nodes 110A-110E may be coupled through a network 102. In various embodiments, the network 102 may include any type of network or combination of networks. For example, the network 102 may include any type or combination of local area network (LAN), a wide area network (WAN), an Intranet, the Internet, etc. Example local area networks include Ethernet networks and Token Ring networks. Also, each node 110 may be coupled to the network 102 using any type of wired or wireless connection mediums. For example, wired mediums may include: a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

The peer-to-peer network 100 may comprise a decentralized network of nodes 110 where each node may have similar capabilities and/or responsibilities. As described below, each node 110 may communicate directly with at least a subset of the other nodes 110. Messages may be propagated through the network 100 in a decentralized manner. For example, in one embodiment each node 110 in the network 100 may effectively act as a message router.

Figure 2:
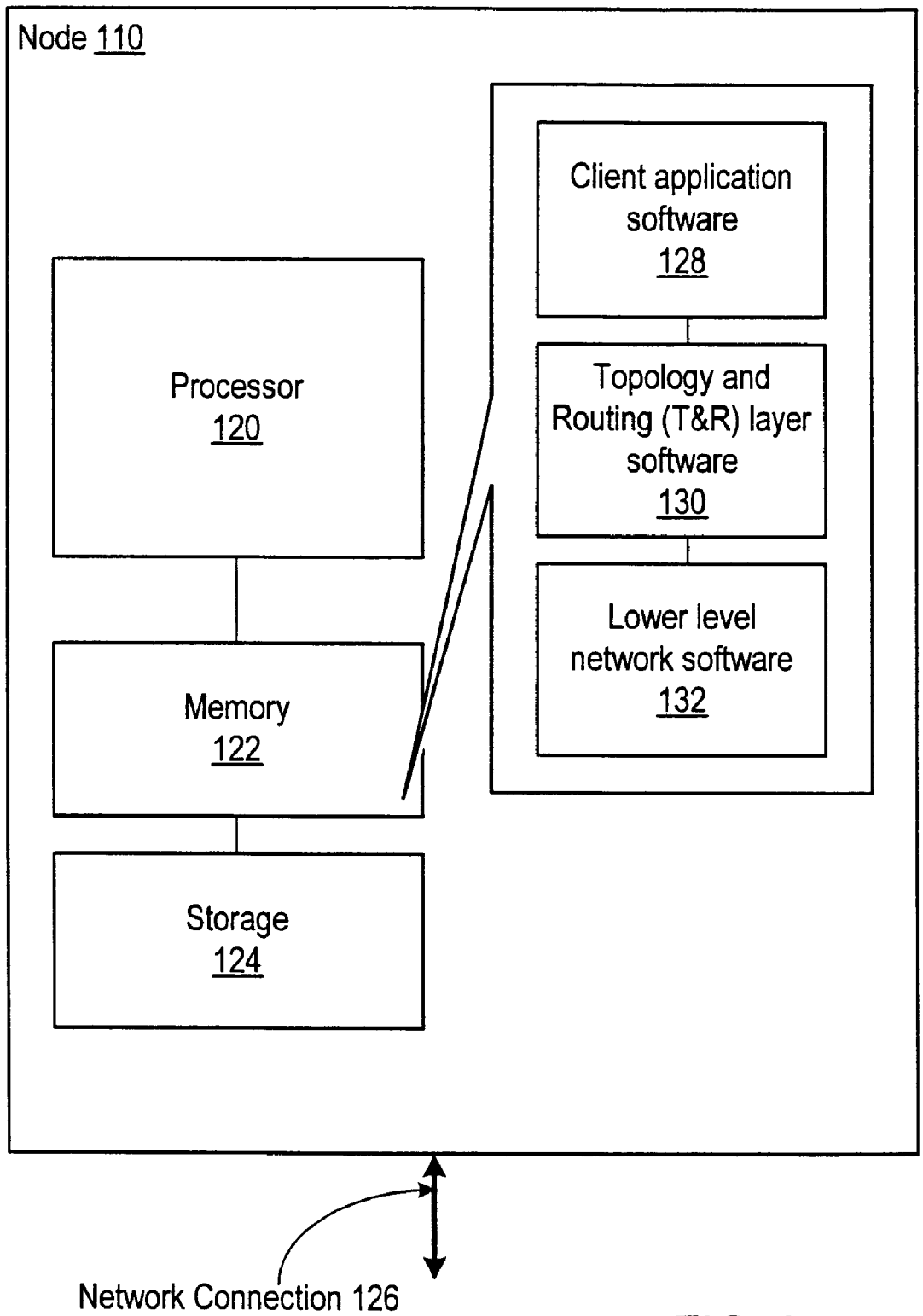
FIG. 2 illustrates one embodiment of a node 110 in the peer-to-peer network 100.

Referring now to FIG. 2, a diagram of one embodiment of a node 110 in the peer-to-peer network 100 is illustrated. Generally speaking node 110 may include any of various hardware and software components. In the illustrated embodiment, node 110 includes a processor 120 coupled to a memory 122, which is in turn coupled to a storage 124. Node 110 may also include a network connection 126 through which the node 110 couples to the network 102.

The processor 120 may be configured to execute instructions and to operate on data stored within memory 122. In one embodiment, processor 120 may operate in conjunction with memory 122 in a paged mode, such that frequently used pages of memory may be paged in and out of memory 122 from storage 124 according to conventional techniques. It is noted that processor 120 is representative of any type of processor. For example, in one embodiment, processor 120 may be compatible with the x86 architecture, while in another embodiment processor 120 may be compatible with the SPARC™ family of processors.

Memory 122 may be configured to store instructions and/or data. In one embodiment, memory 122 may include one or more forms of random access memory (RAM) such as dynamic RAM (DRAM) or synchronous DRAM (SDRAM). However, in other embodiments, memory 122 may include any other type of memory instead or in addition.

Storage 124 may be configured to store instructions and/or data, e.g., may be configured to persistently store instructions and/or data. In one embodiment, storage 124 may include non-volatile memory, such as magnetic media, e.g., one or more hard drives, or optical storage. In one embodiment, storage 124 may include a mass storage device or system. For example, in one embodiment, storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, storage 124 may include tape drives, optical storage devices or RAM disks, for example.

Network connection 126 may include any type of hardware for coupling the node 110 to the network 102, e.g., depending on the type of node 110 and type of network 102. As shown in FIG. 2, memory 122 may store lower level network software 132. The lower level network software 132 may be executable by processor 120 to interact with or control the network connection 126, e.g., to send and receive data via the network connection 126. Memory 122 may also store topology and routing (T&R) layer software 130 which utilizes the lower level network software 132. Memory 122 may also store client application software 128 which utilizes the T&R layer software 130.

The T&R layer software 130 may be executable by processor 120 to create and manage data structures allowing client application software 128 to communicate with other nodes 110 on the peer-to-peer network 100, e.g., to communicate with other client application software 128 executing on other nodes 110. The client application software 128 may utilize the T&R layer software 130 to send messages to other nodes 110. Similarly, the T&R layer software 130 may pass messages received from other nodes 110 to the client application software 128, e.g., messages which originate from client application software 128 executing on other nodes 110. The T&R layer software 130 may also be involved in forwarding messages routed through the local node 110, where the messages originate from another node 110 and are addressed to another node 110 in the network 100. Functions performed by the T&R layer software 130 are described in detail below.

In various embodiments, the peer-to-peer network 100 may be utilized to perform any of various kinds of applications. As one example, client application software 128 may execute to perform distributed data storage such that data is distributed across various nodes 110 in the peer-to-peer network 100. However, in various embodiments any of various kinds of client application software 128 may utilize the T&R layer software 130 to send and receive messages for any desired purpose.

Figure 3:
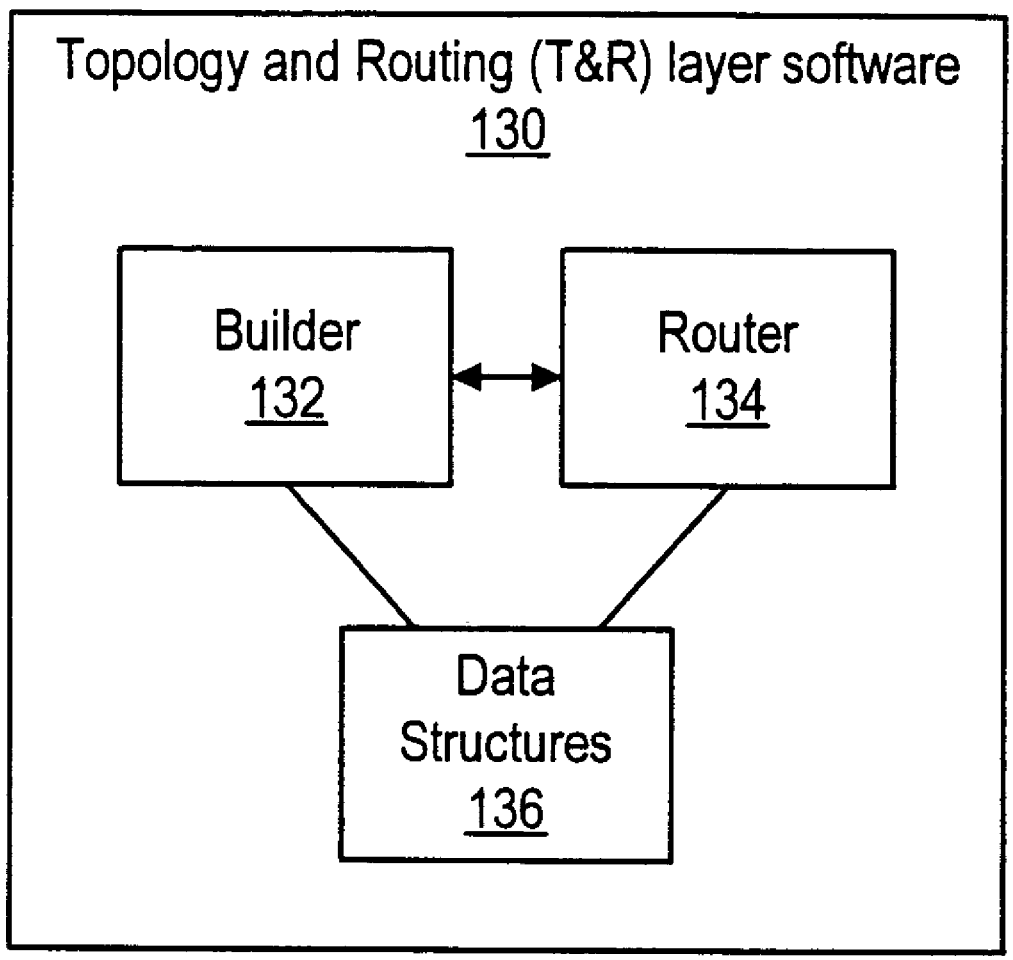
FIG. 3 illustrates one embodiment of the topology and routing (T&R) layer software.

As shown in FIG. 3, in one embodiment the functionality of the T&R layer software 130 may be modularized into builder functionality and router functionality. For example, a builder component or engine 132 may be responsible for creating and managing data structures or routing information 136 representing topology of the peer-to-peer network 100. A router component or message routing engine 134 may utilize the data structures or routing information 136 to send or forward messages to other nodes 110 in the network 100. The builder 132 and router 134 may interface with each other as necessary. For example, as described below, in the event of a network failure which invalidates existing routing information, the router 134 may request the builder 132 to recover or rebuild routing information 136 so that the router 134 can send or forward a message using a different route.

Figure 4:
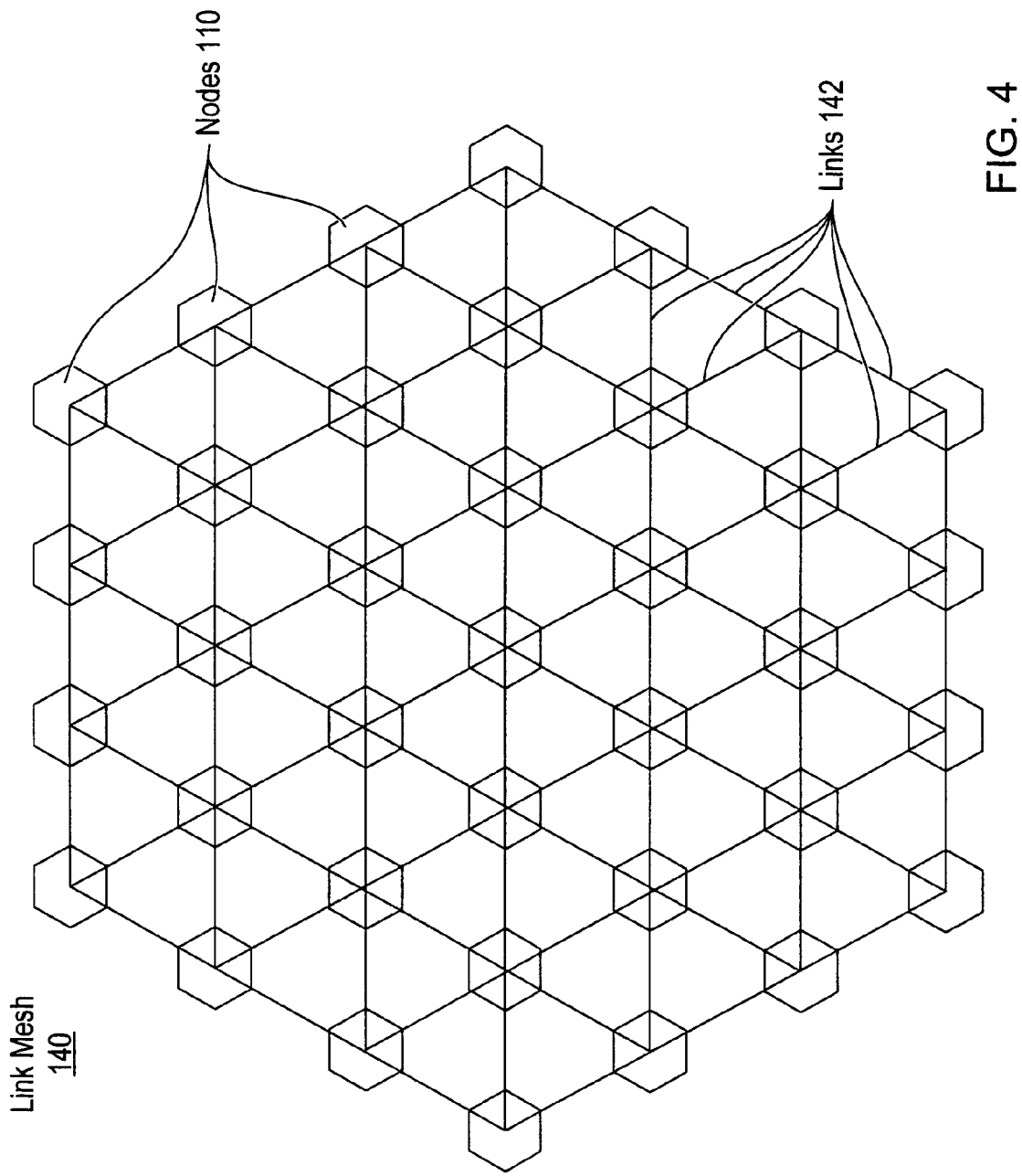
FIG. 4 illustrates an exemplary link mesh 140 for a set of nodes 110.

In one embodiment, as each node 110 joins the peer-to-peer network 100, the node may establish links 142 with at least a subset of other nodes 110 in the network 100. As used herein, a link 142 comprises a virtual communication channel or connection between two nodes 110. The lower level network software 132 may be responsible for performing a node discovery process and creating links with other nodes as a node comes online in the network 110. (The lower level network software 132 may include a link layer which invokes a node discovery layer and then builds virtual node-to-node communication channels or links to the discovered nodes.) The resulting set of connected nodes is referred to herein as a link mesh 140. FIG. 4 illustrates an exemplary link mesh 140 for a set of nodes 110. Each hexagon represents a node 110, and each line represents a link 142 between two nodes 110.

According to one embodiment, the T&R layer software 130 may provide client application software 128 with a tree-based view of the underlying link mesh as a means of exchanging messages between nodes 110. As used herein, a tree may comprise an undirected, acyclic, and connected sub-graph of the underlying link mesh 140. Each vertex in a tree may be a node 110. Each connection between nodes 110 in a tree is referred to herein as an edge. Thus, each tree effectively comprises a subset of the link mesh.

As described below, a portion of the T&R layer software, e.g., builder 132, executing on the nodes 110 may be operable to create tree data structures based on the link mesh 140. Multiple trees may be created based on the link mesh 140. Client application software 128 may utilize the trees to send messages to other nodes 110. For example, client application software 128 executing on a node 110A may invoke router 134 on node 110A through an application programming interface (API). Router 134 may send the client's message to another node 110B. Router 134 executing on node 110B may forward the message to another node 110C, and so on, until the message arrives at its destination node 110X. At each step, the message may be forwarded according to routes based on a tree created by builder 132. For example, a route may specify a series of tree edges. Thus, at each node the message may be sent over one of the tree edges, which may be mapped to one of the node's links, i.e., the virtual communication channel used to actually send the message.

Router 134 executing on destination 110X may notify client application software 128 executing on node 110X of the received message, and client application software 128 may process the message accordingly. As described below, the T&R layer software may also handle one or more responses returned to the sender client application software 128 at node 10A. These responses may include a variable amount of application data.

Using trees as a basis for sending messages between nodes may be advantageous in several ways. As described below, each tree may have one or more nodes that may be addressed by a "role". Each message may be addressed to a particular role on a particular tree. Thus, when the message is sent to the role associated with the tree, only nodes attached to the specified tree receive the message, e.g., as opposed to all nodes on the link mesh or tree receiving the message. The T&R layer may also be able to detect and discard duplicate messages automatically. Also, an ordered delivery of messages may be enforced based on the position of the sender node and receiver node(s) on the tree.

In one embodiment, the concept of a message response may be directly supported by the T&R layer. As described above, the concept of a response including data is not directly supported by protocols such as UDP or TCP, but instead must be provided by the application layer. Thus, application programmers for a client application that utilizes the T&R layer may be relieved from the burden of implementing a separate response protocol. In other words, the concept of a message response including data may be integrated in a sender to receiver back to sender protocol provided by the T&R layer. As described below, in one embodiment each message sent may have a variable number of responses.

To send a message, client application software 128 may create a data structure that contains an application header 152 and application data 150. The client application software may then request the T&R layer software 130 to send the message (including the application header 152 and application data 150) to client application software executing on another node 110. It is noted that both instances of the client application software may utilize a common tree.

Figure 5:
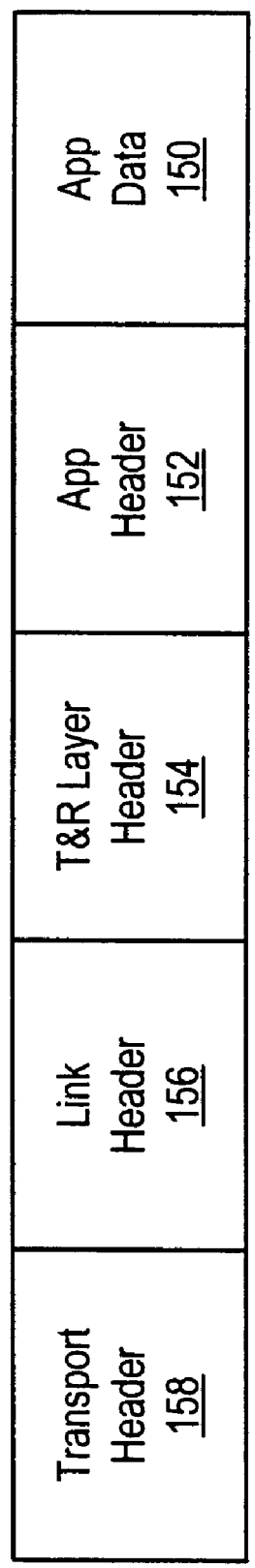
FIG. 5 illustrates a data structure for sending a message.
Figure 6:
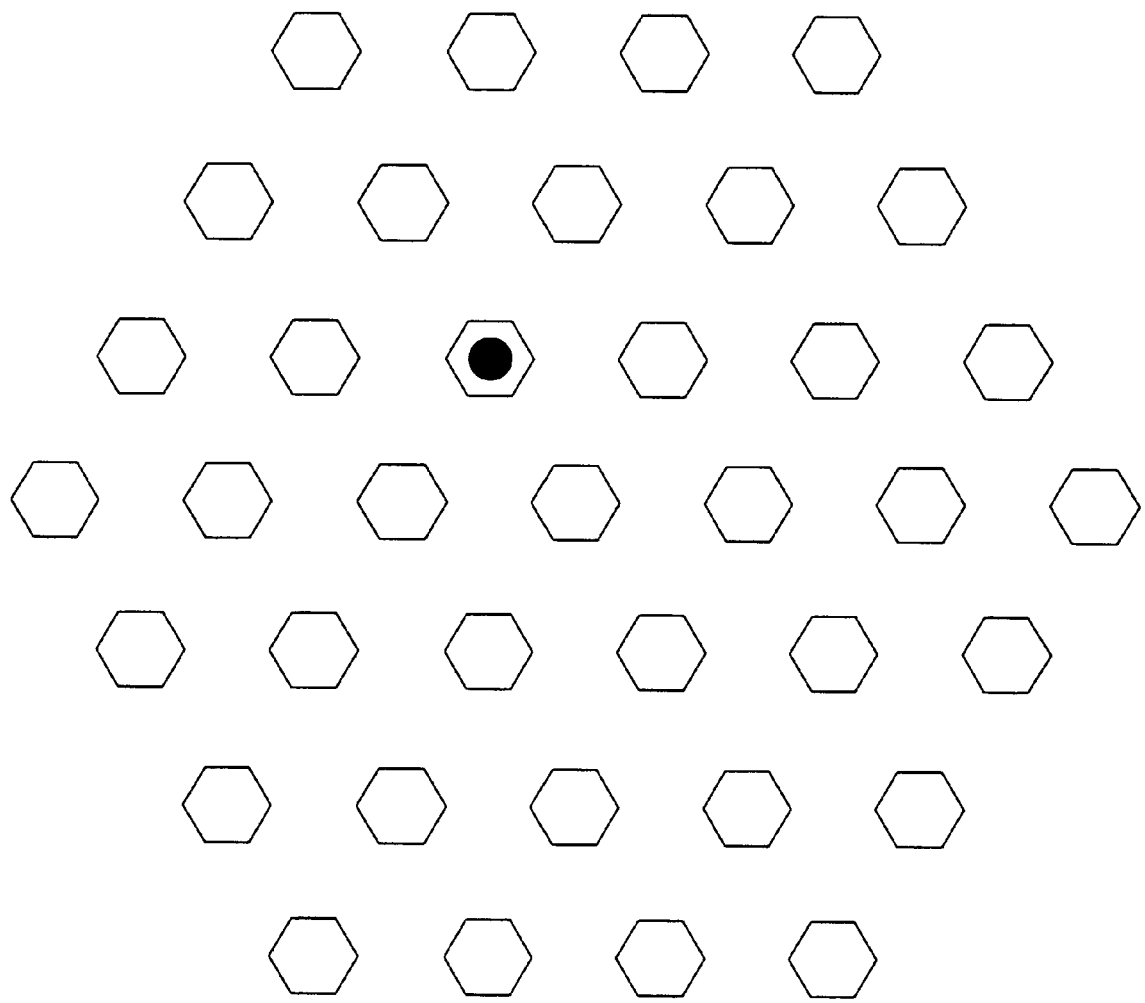
FIGS. 6-11 illustrate a process of publishing a new role.
Figure 7:
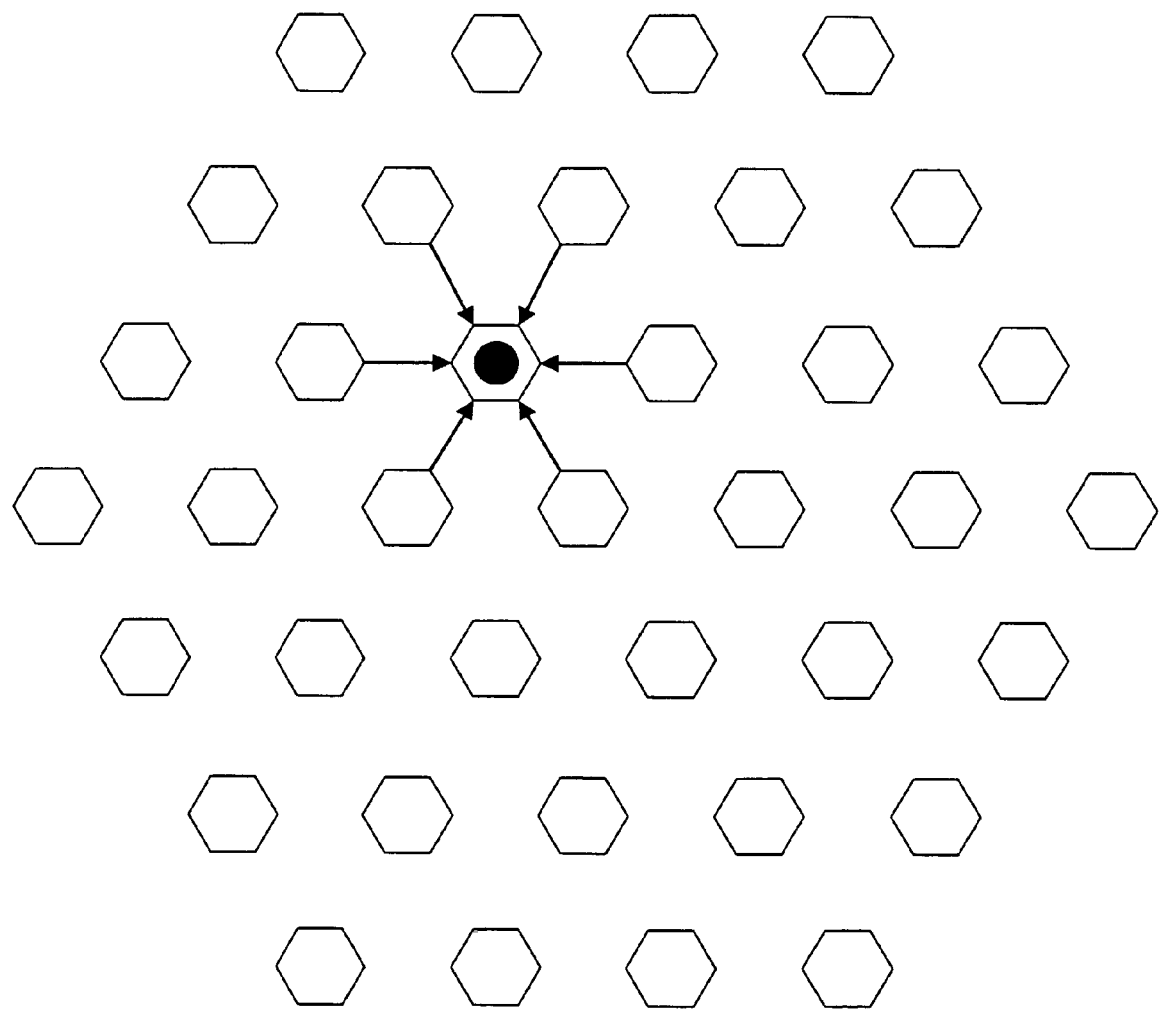
Figure 8:
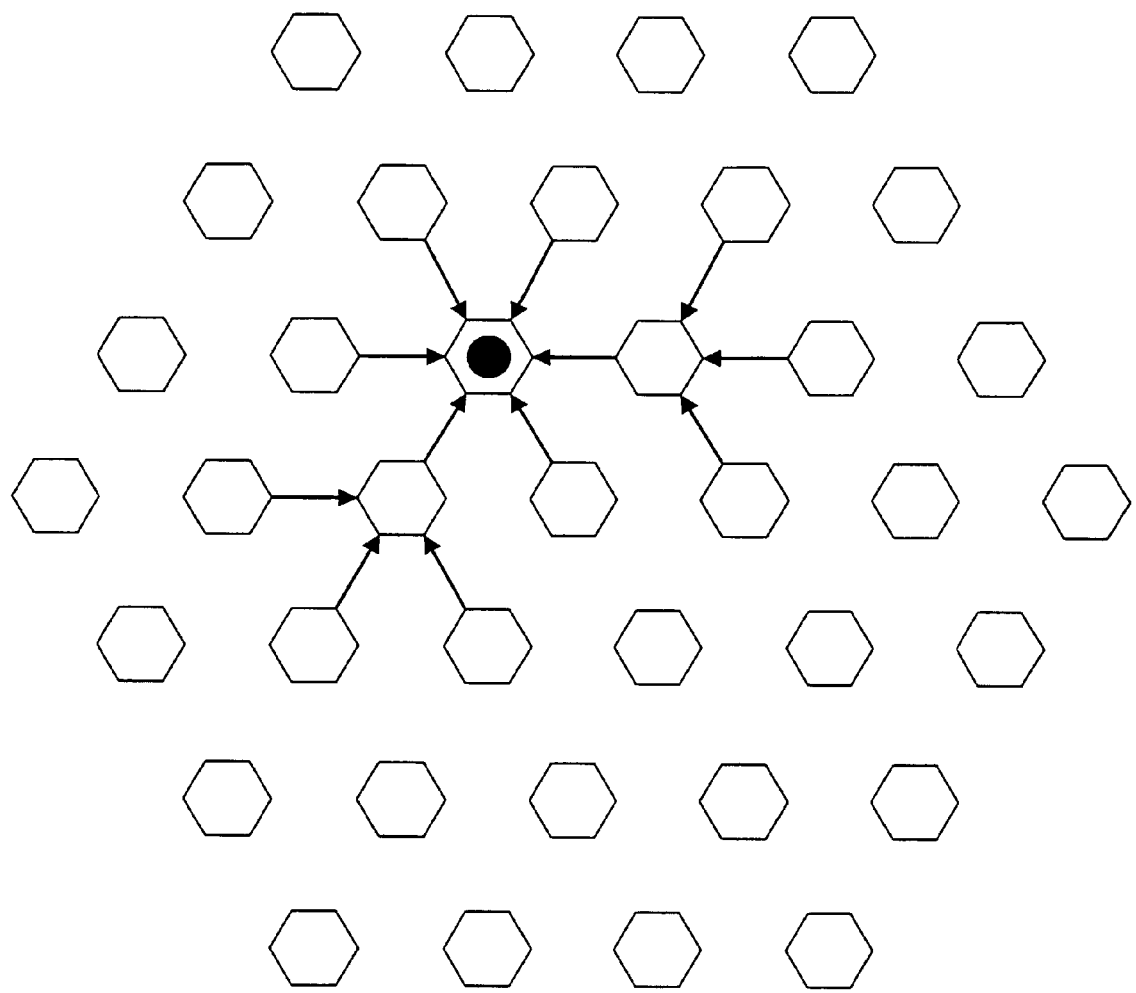
Figure 9:
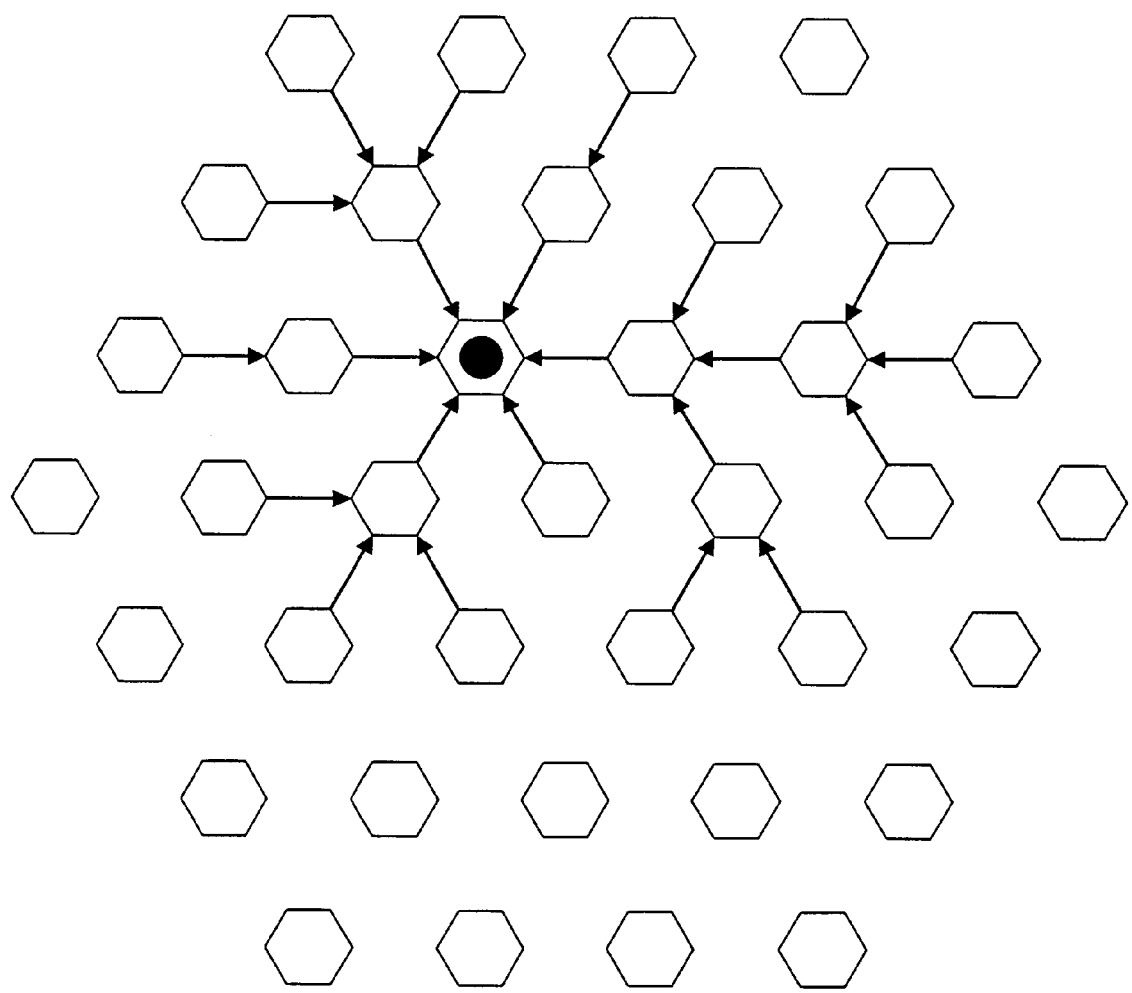
Figure 10:
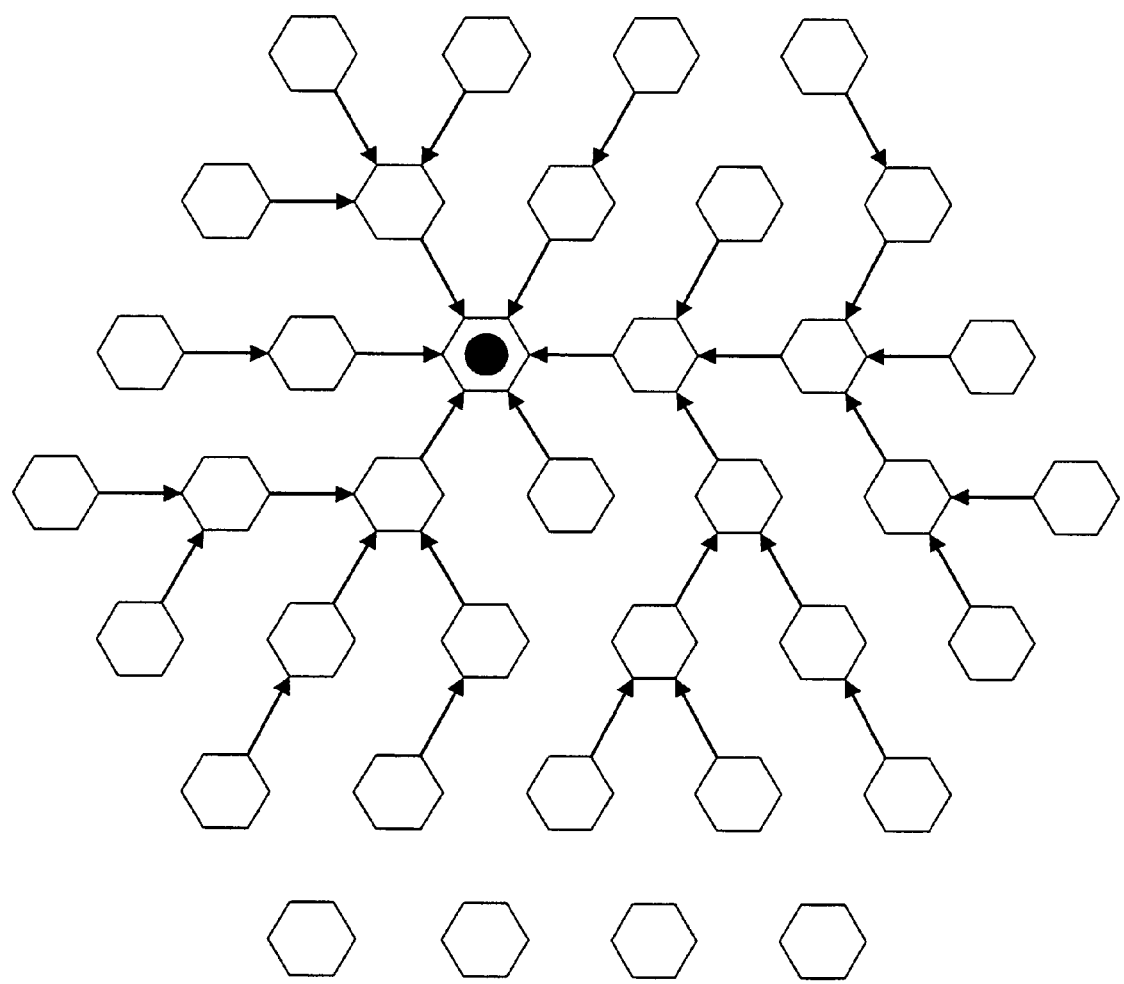
Figure 11:
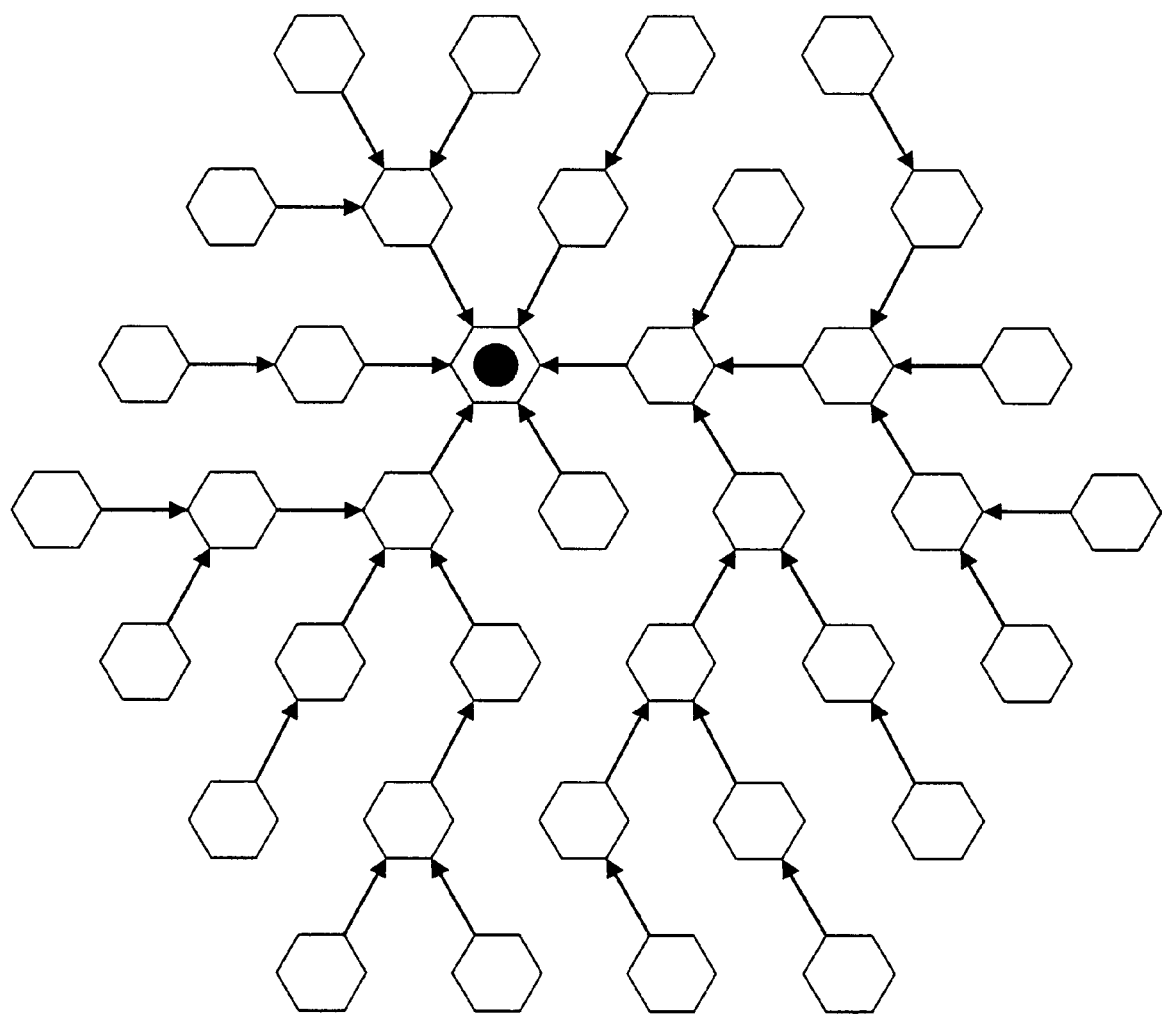
Figure 12:
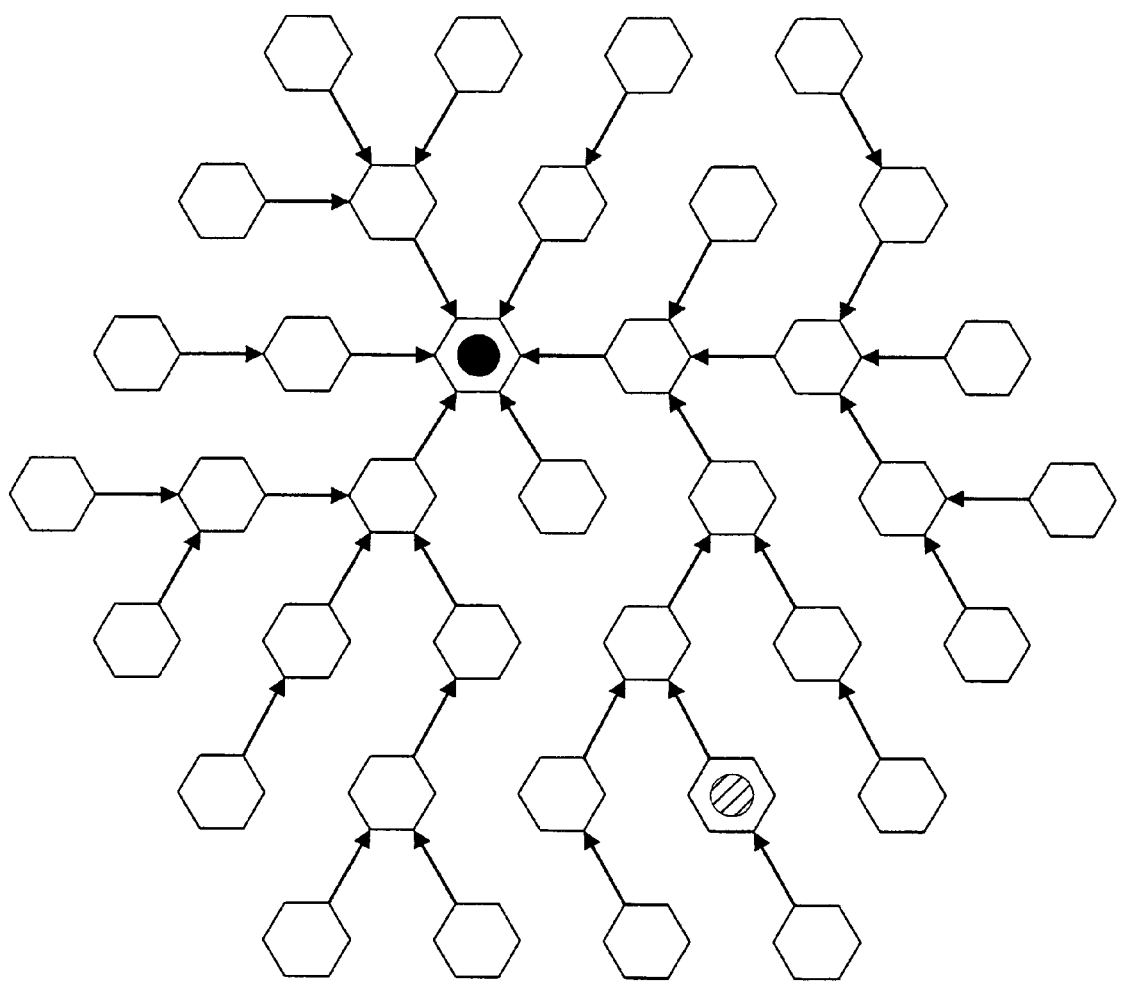
FIGS. 12-20 illustrate a process of publishing a second instance of the role.
Figure 13:
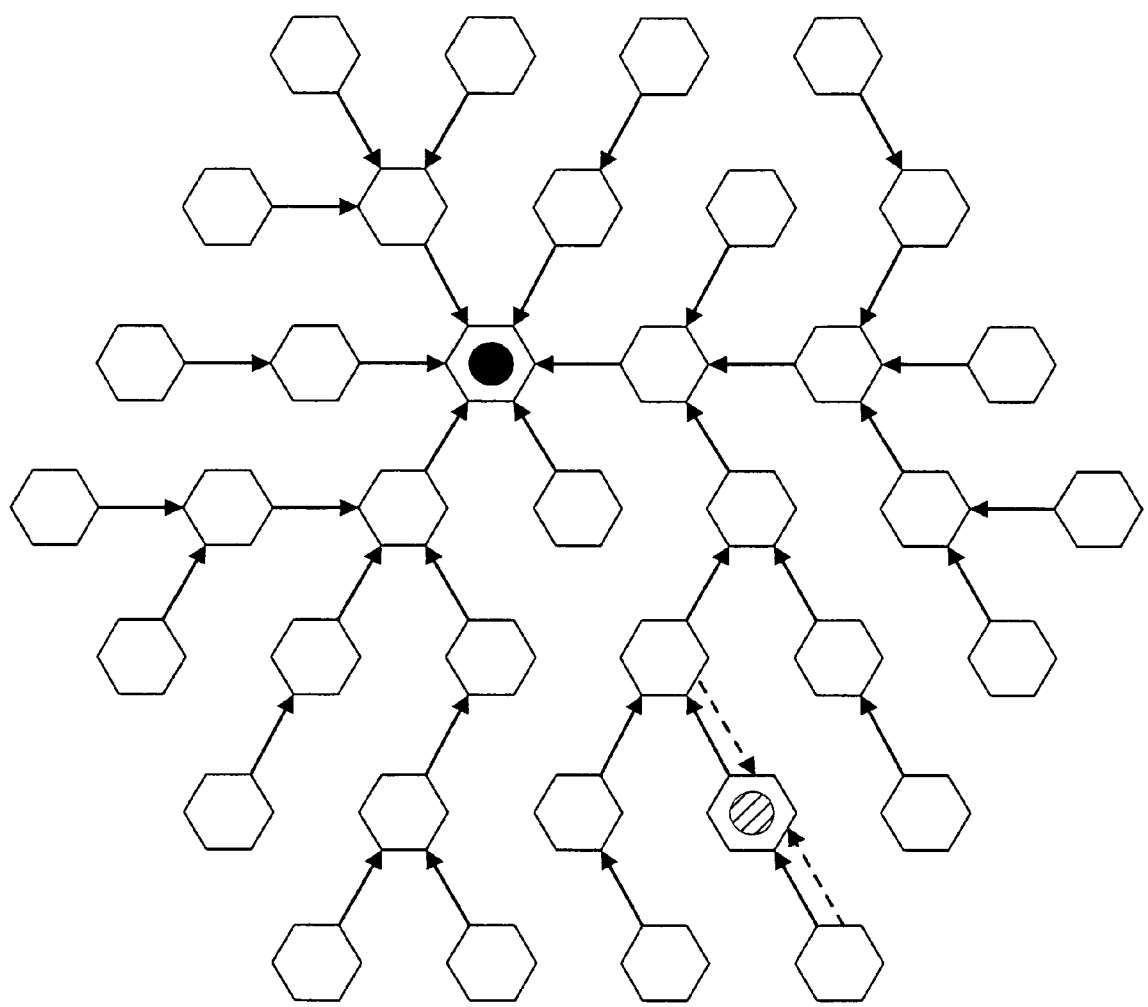
Figure 14:
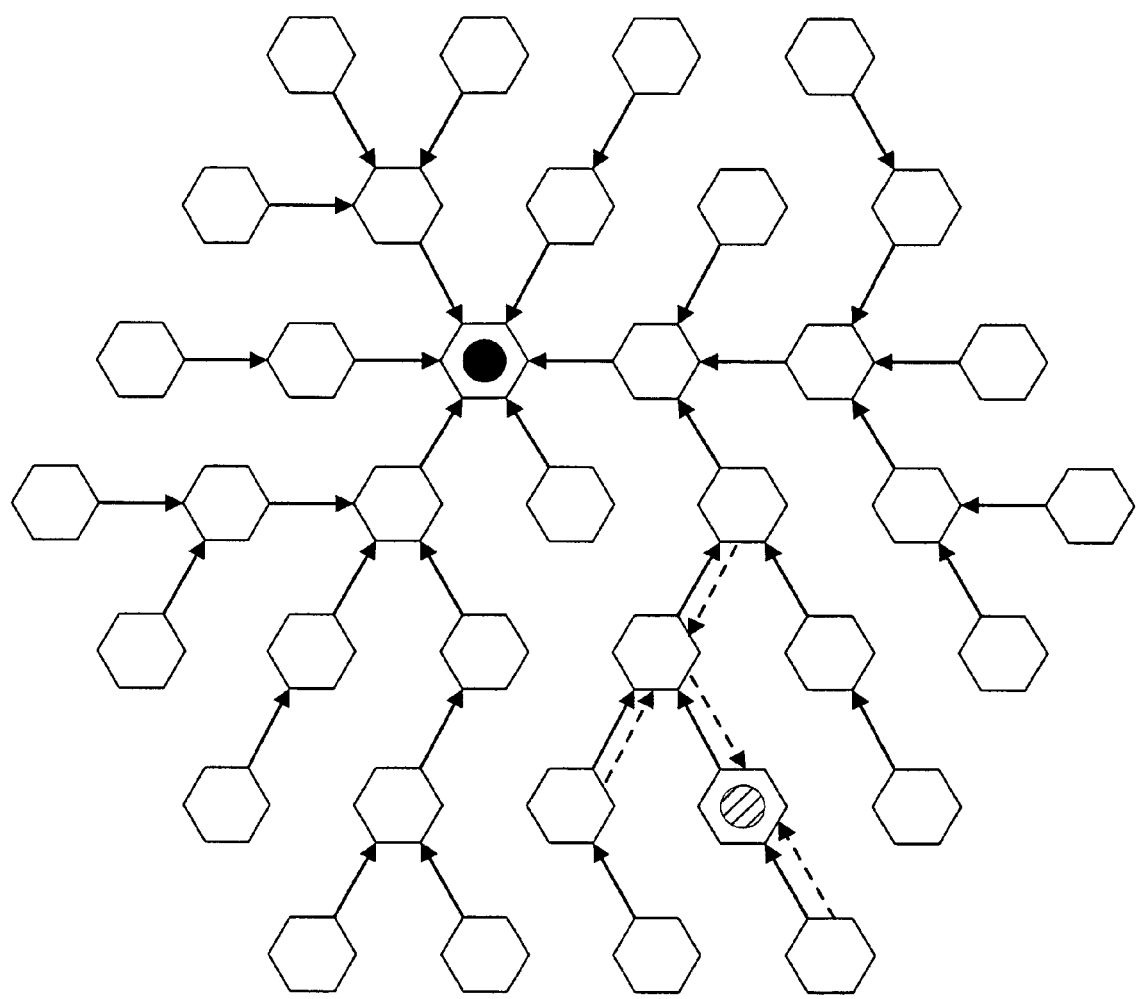
Figure 15:
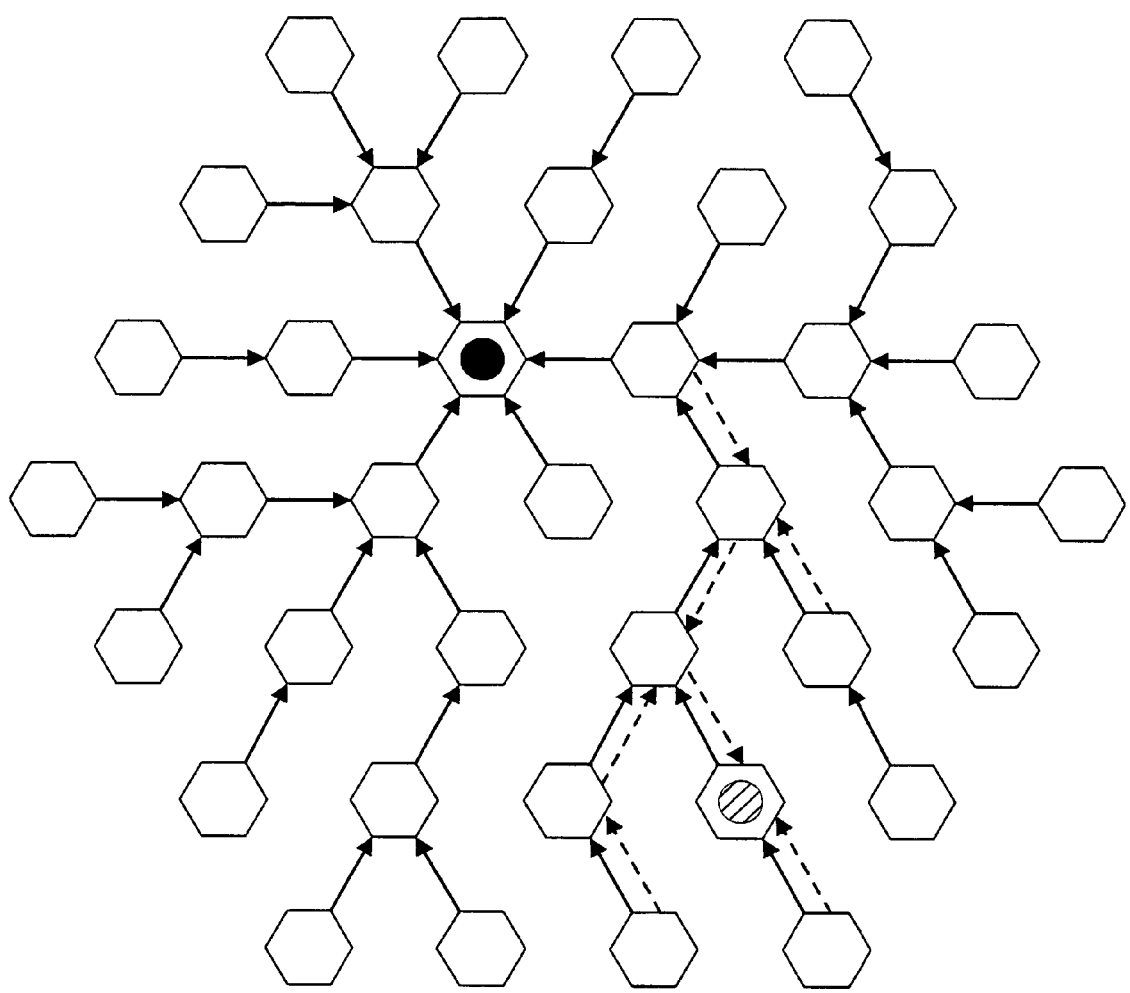
Figure 16:
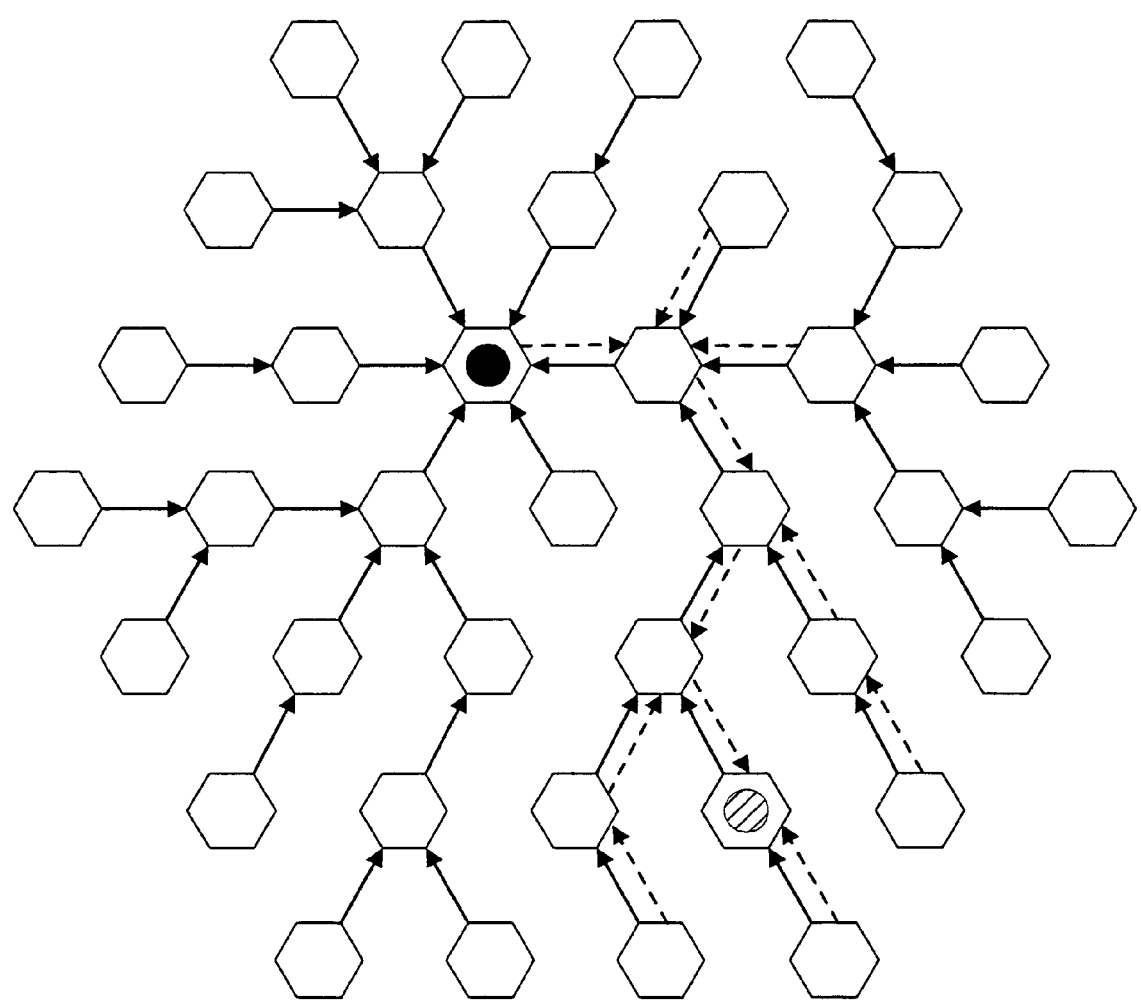
Figure 17:
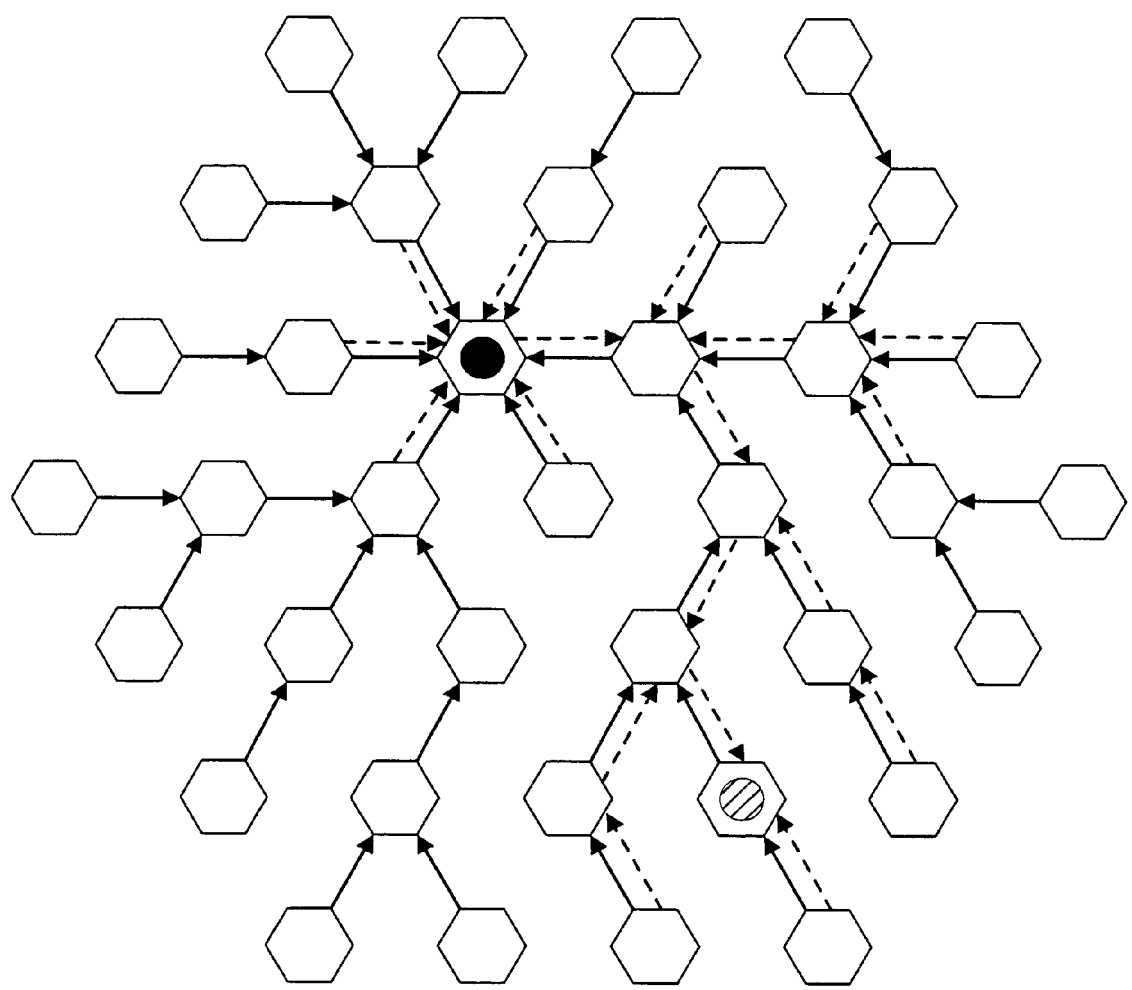
Figure 18:
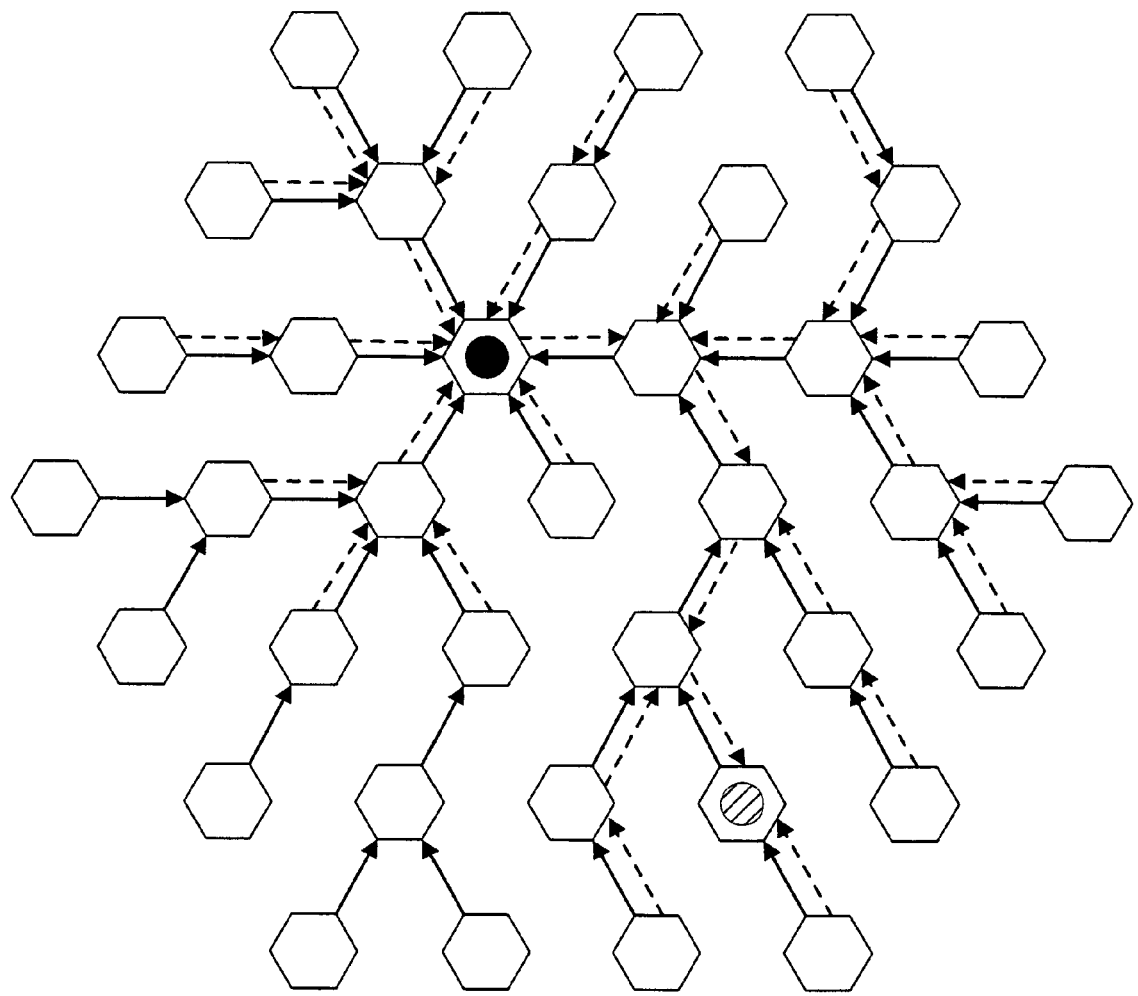
Figure 19:
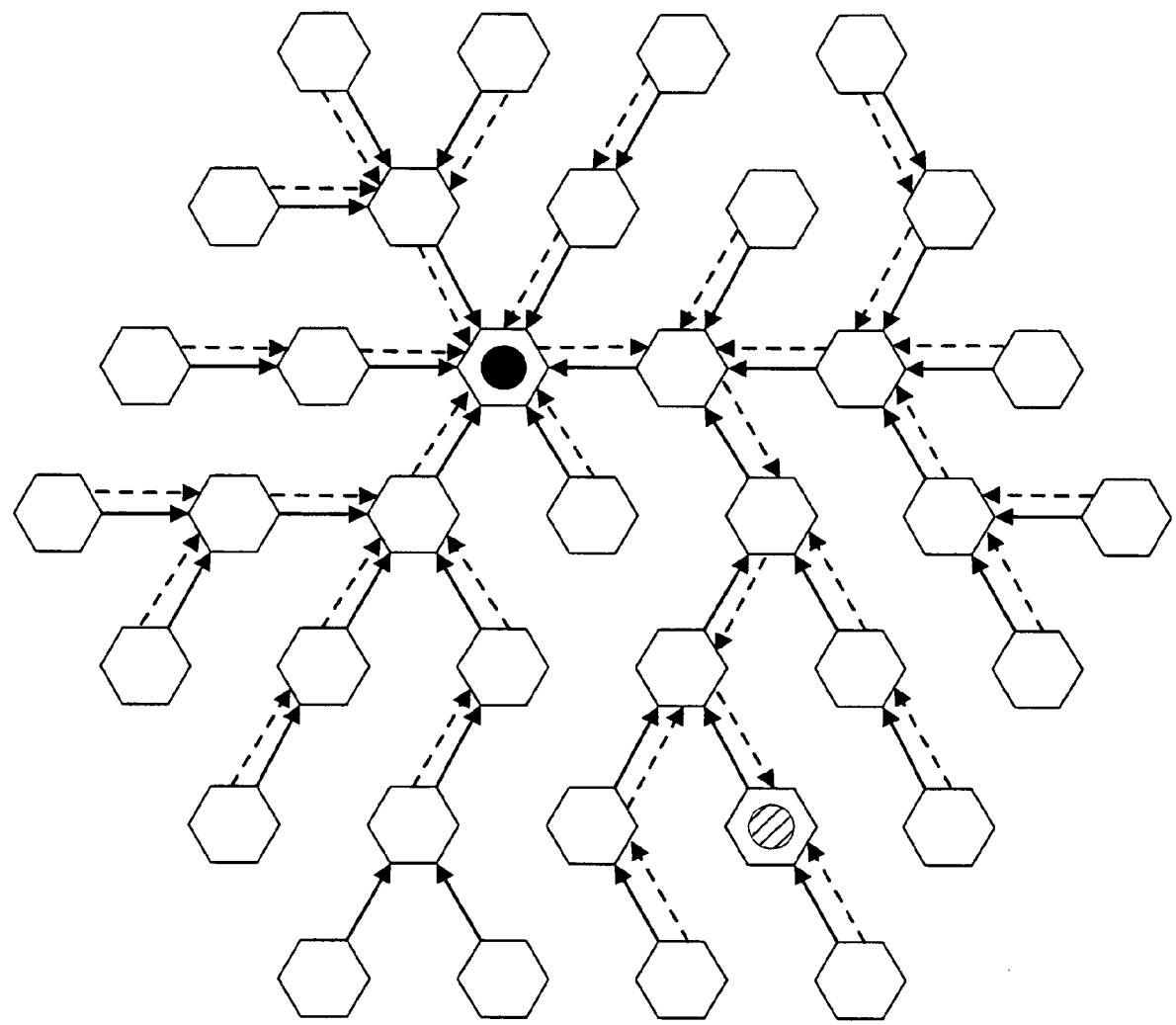
Figure 20:
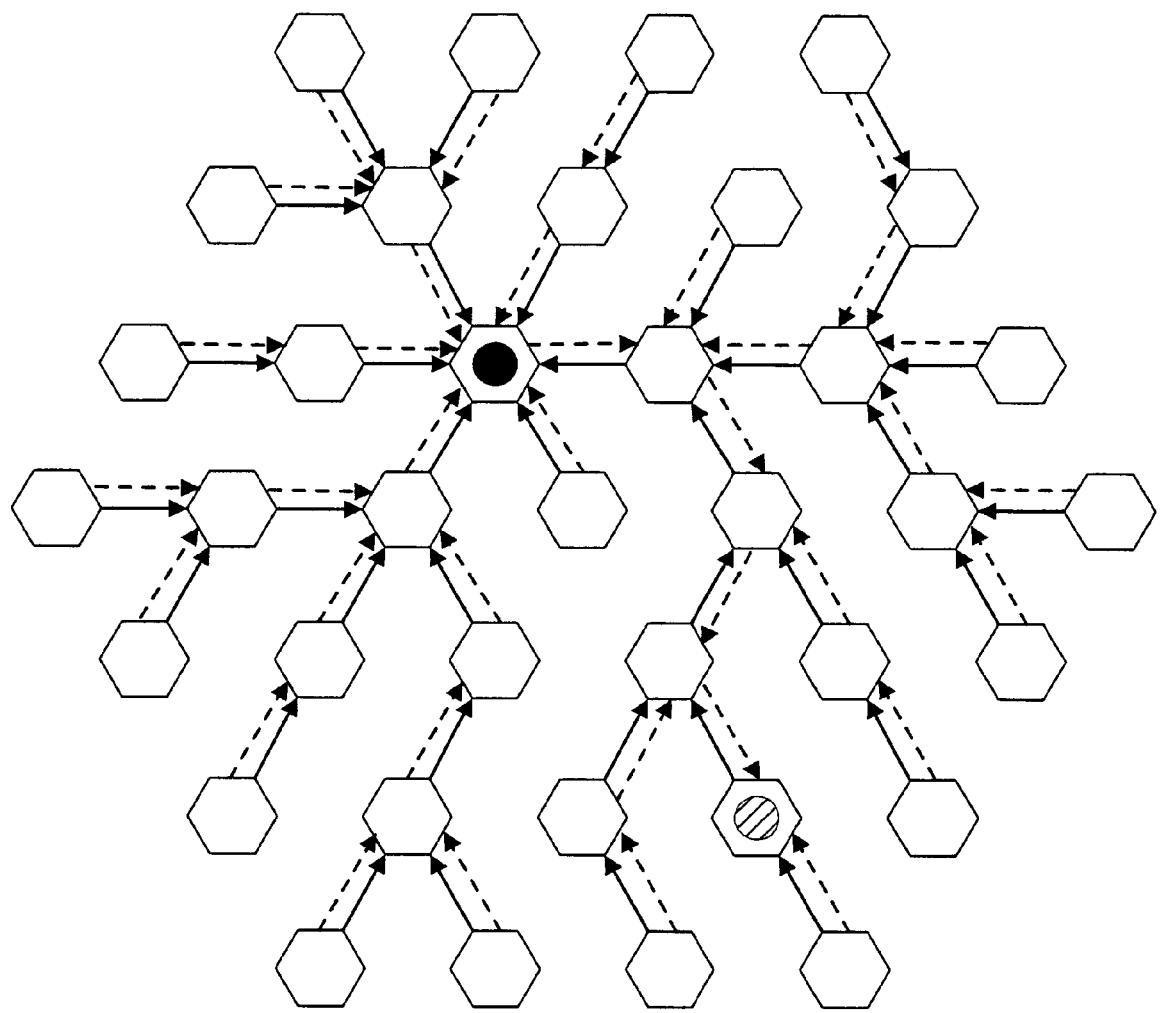
Figure 21:
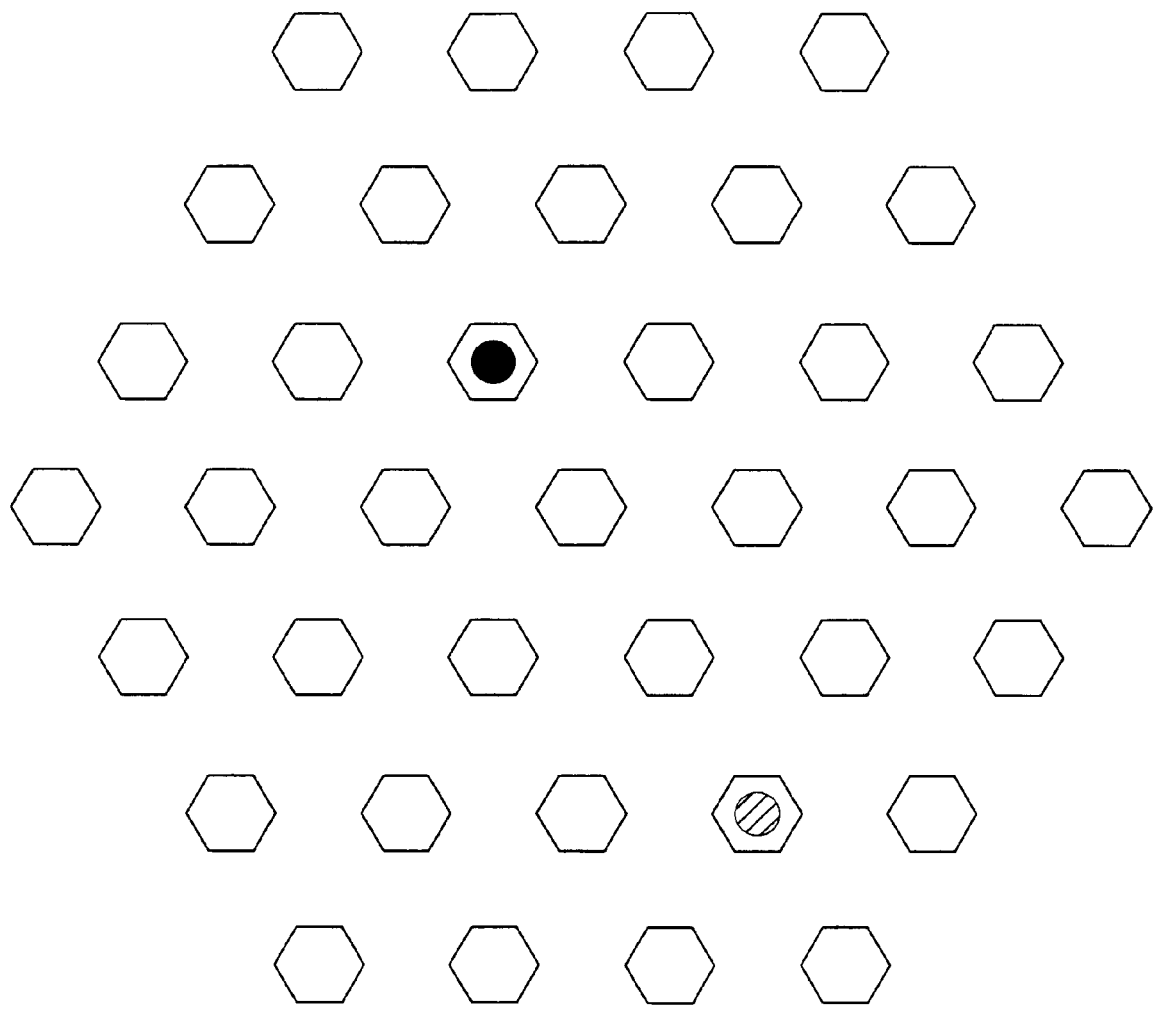
FIGS. 21-27 illustrate a situation on which simultaneous non-exclusive publish operations are performed for two instances of a role.
Figure 22:
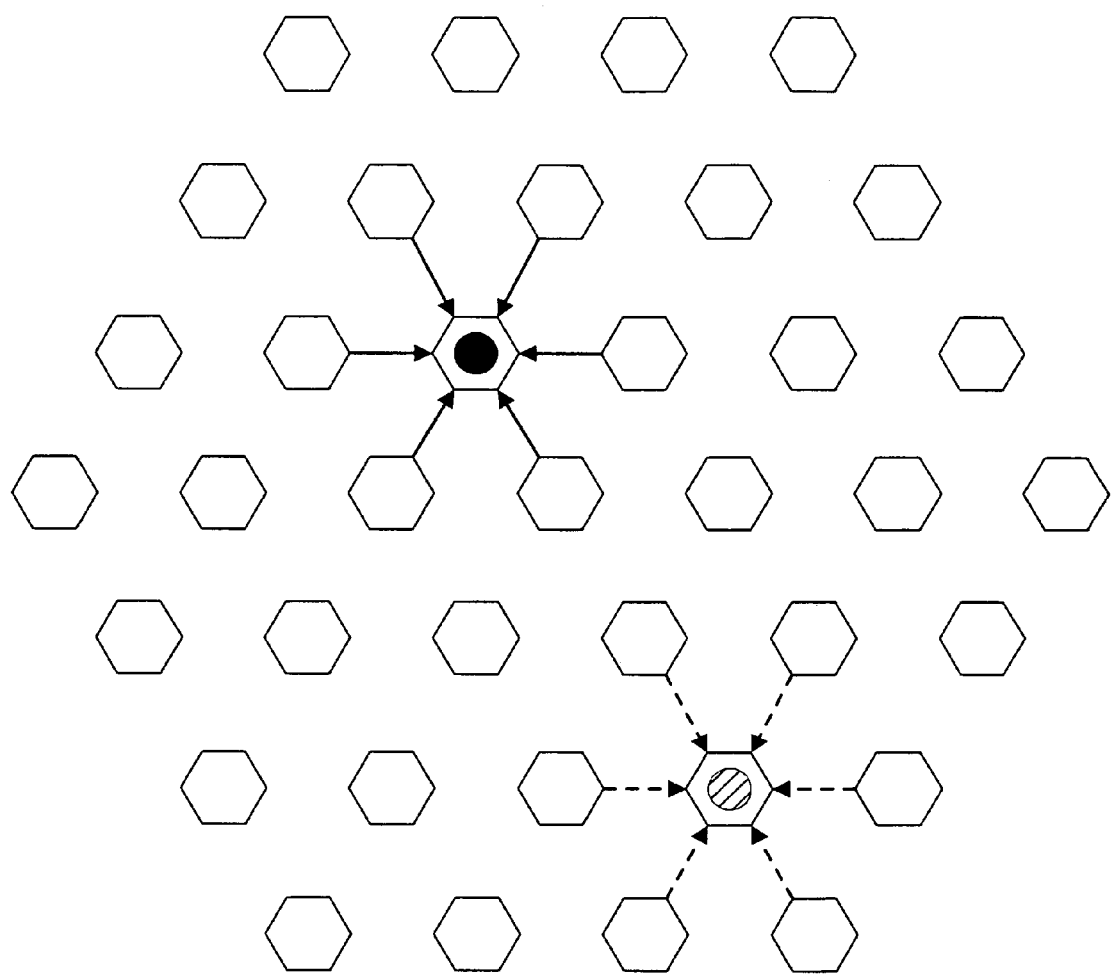
Figure 23:
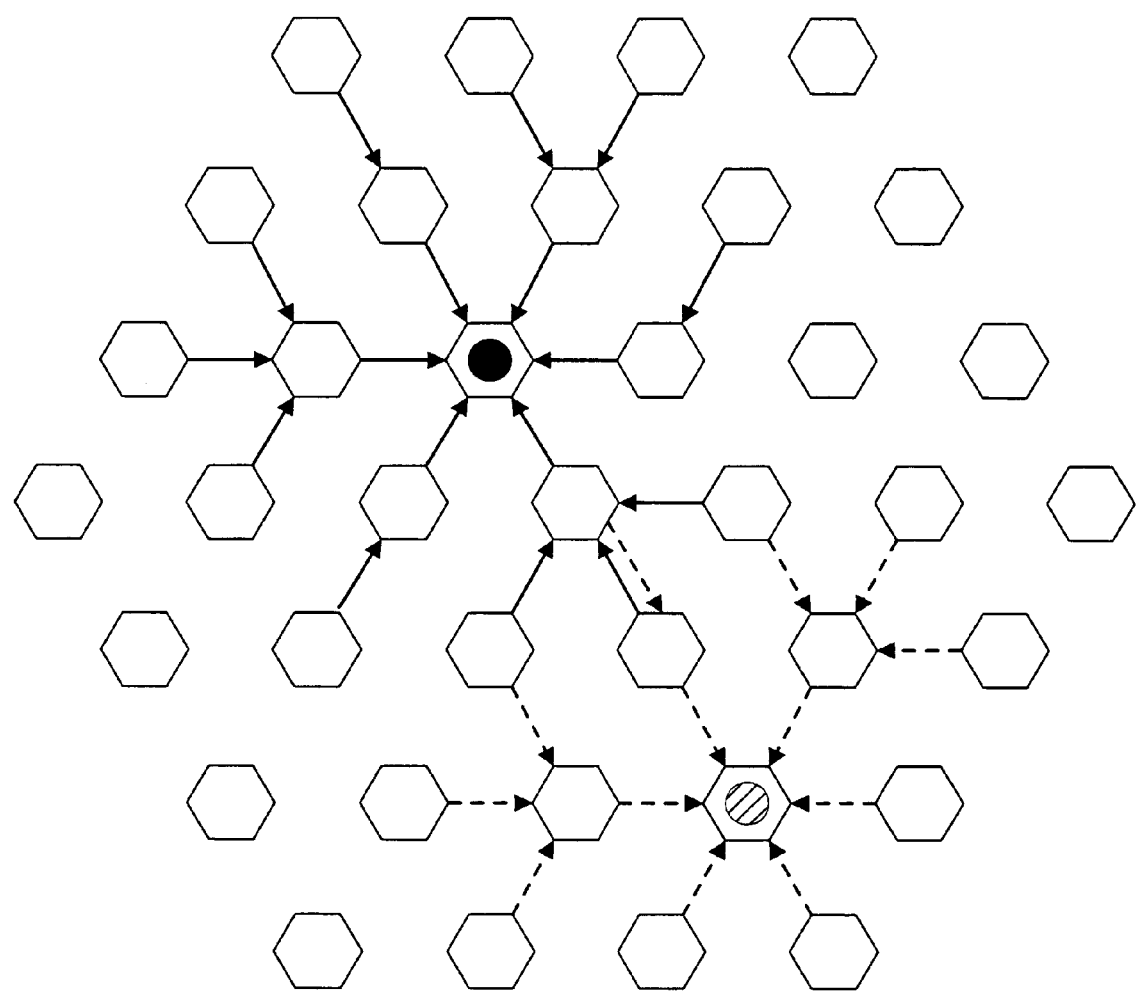
Figure 24:
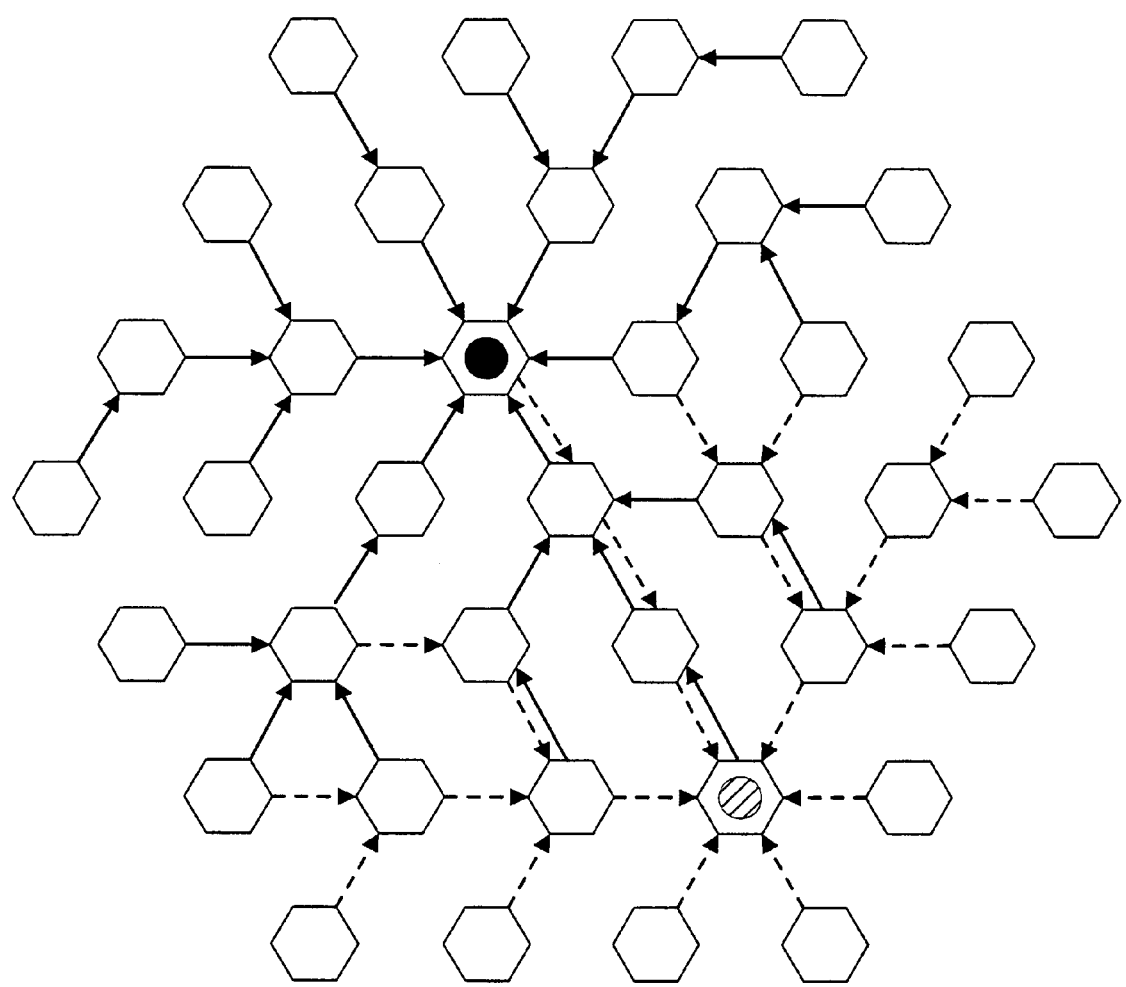
Figure 25:
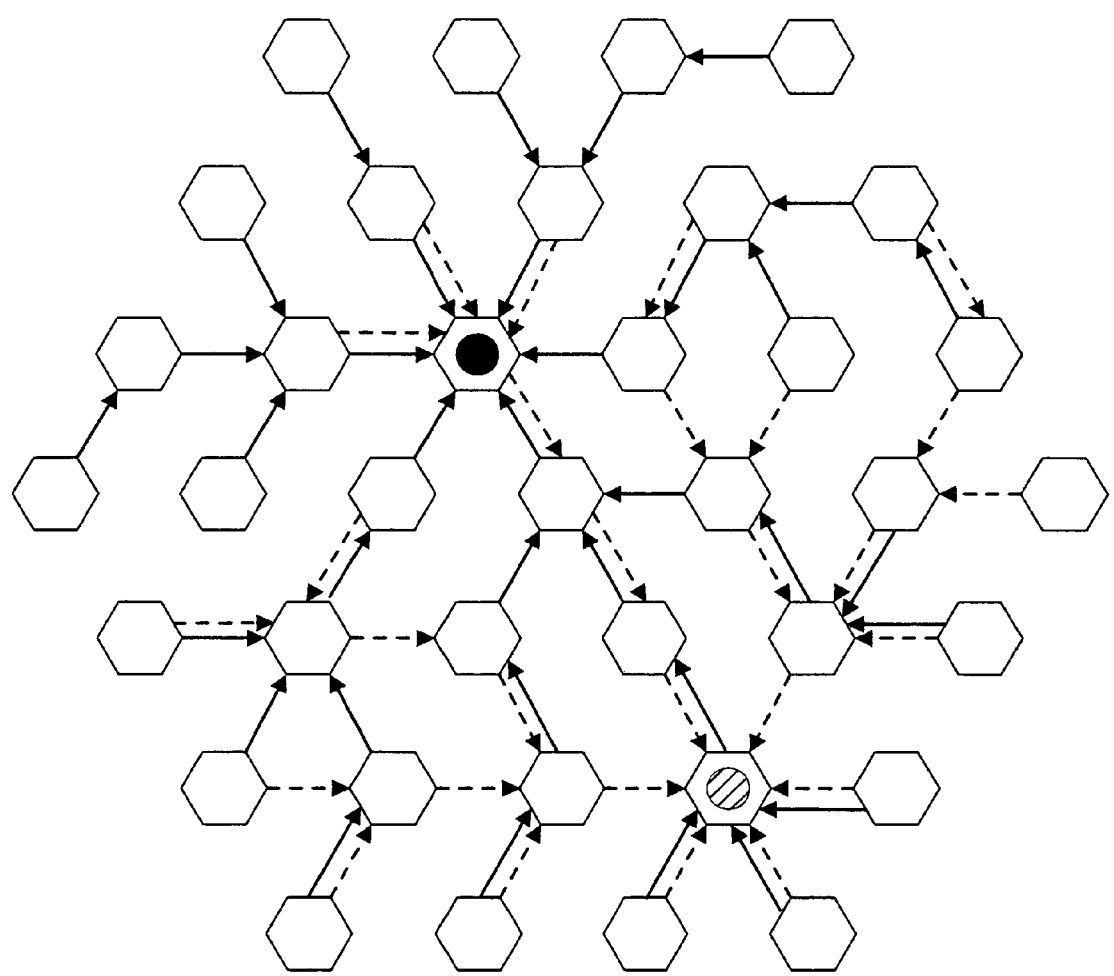
Figure 26:
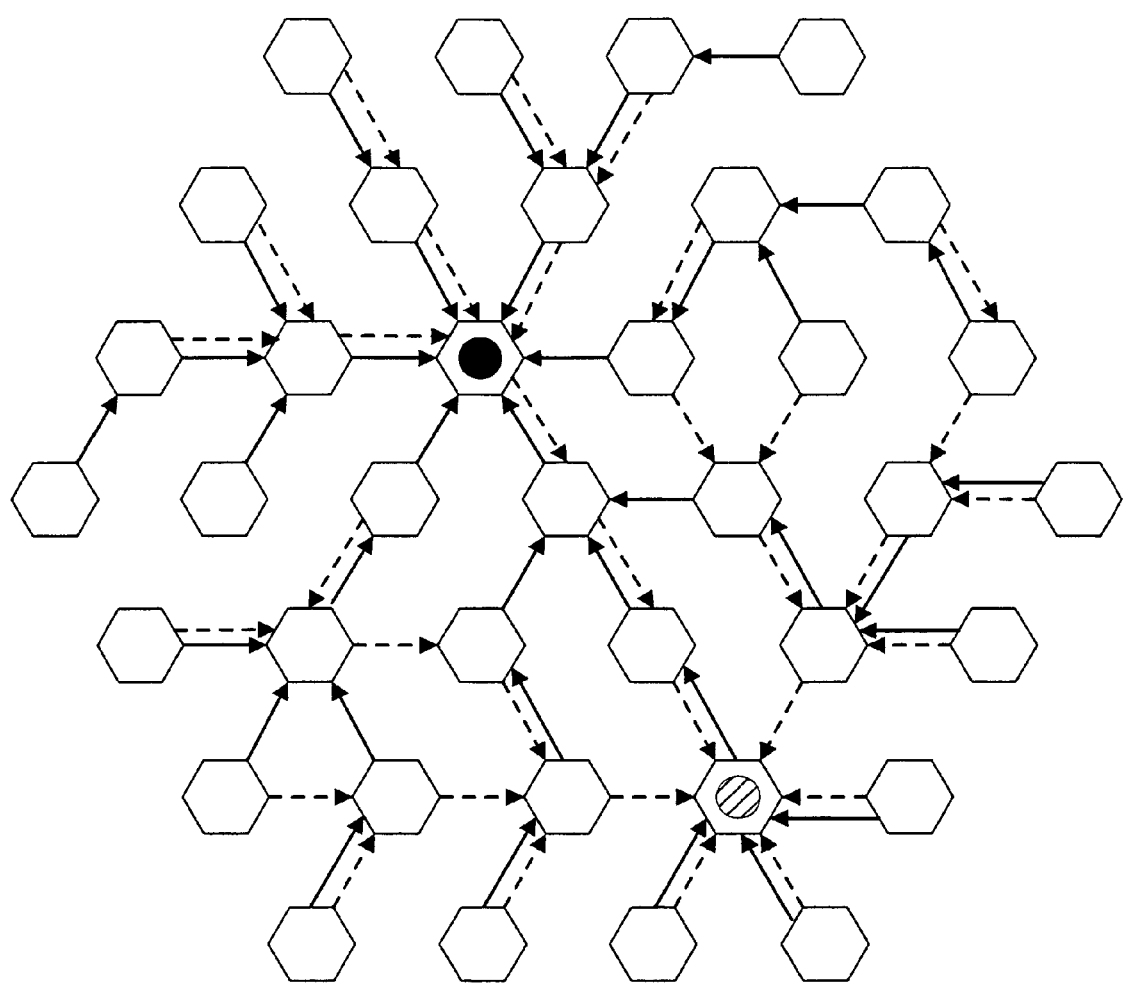
Figure 27:
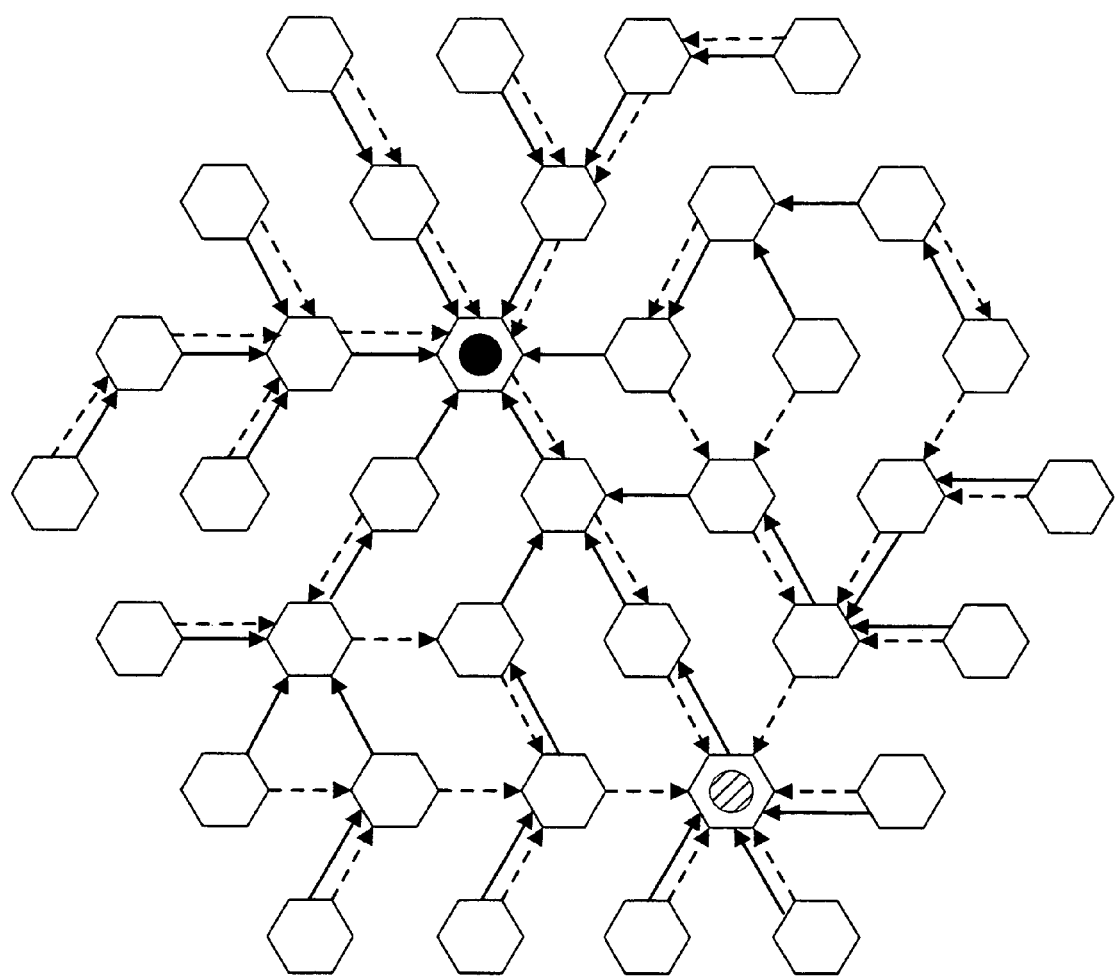
Figure 28:
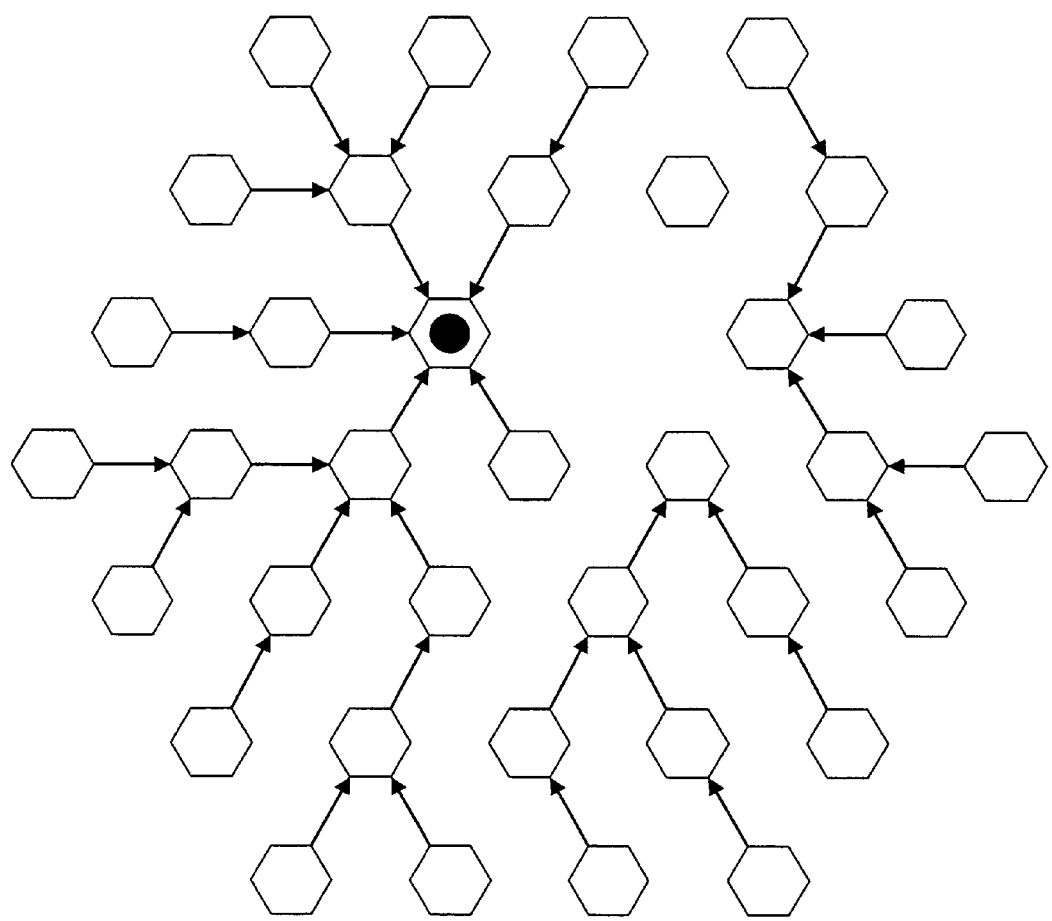
FIGS. 28-37 illustrate a process of publishing a role on a network in which a node has failed.
Figure 29:
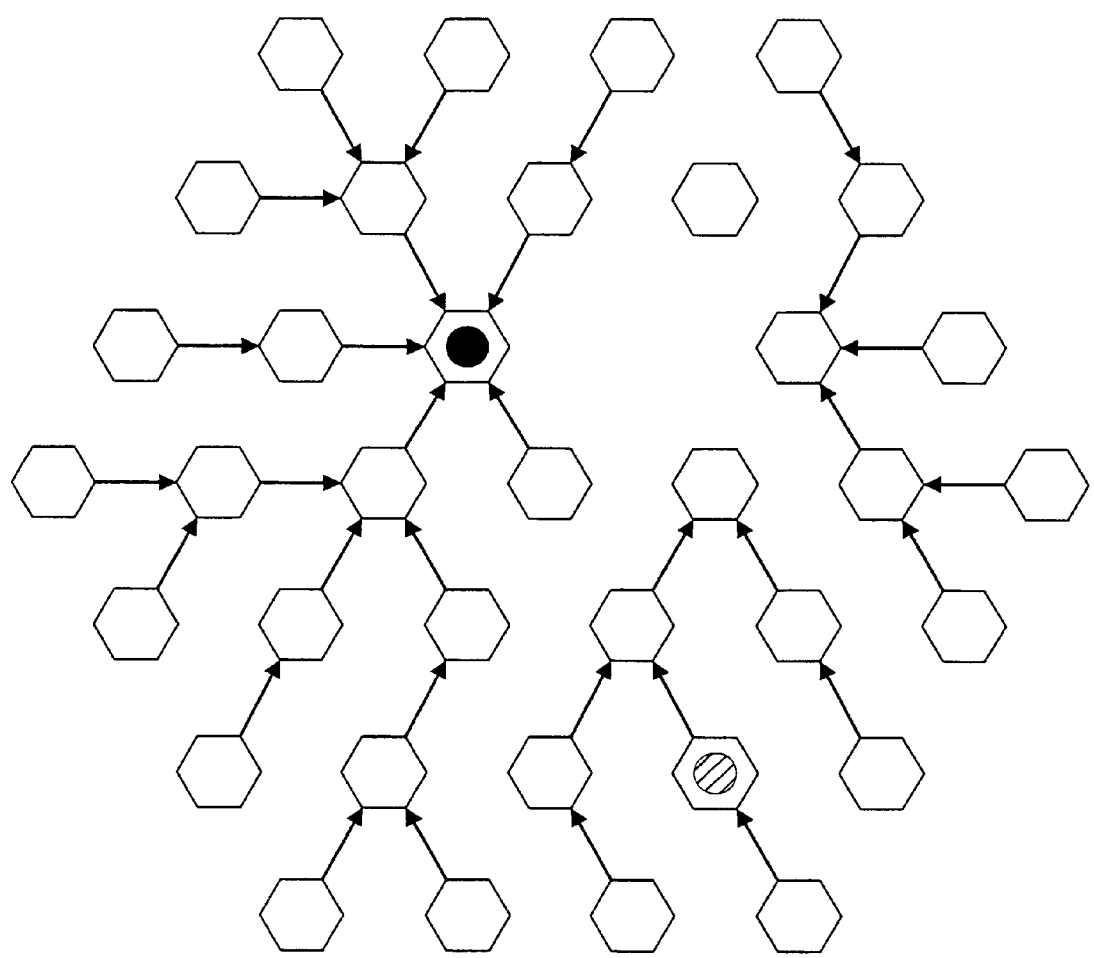
Figure 30:
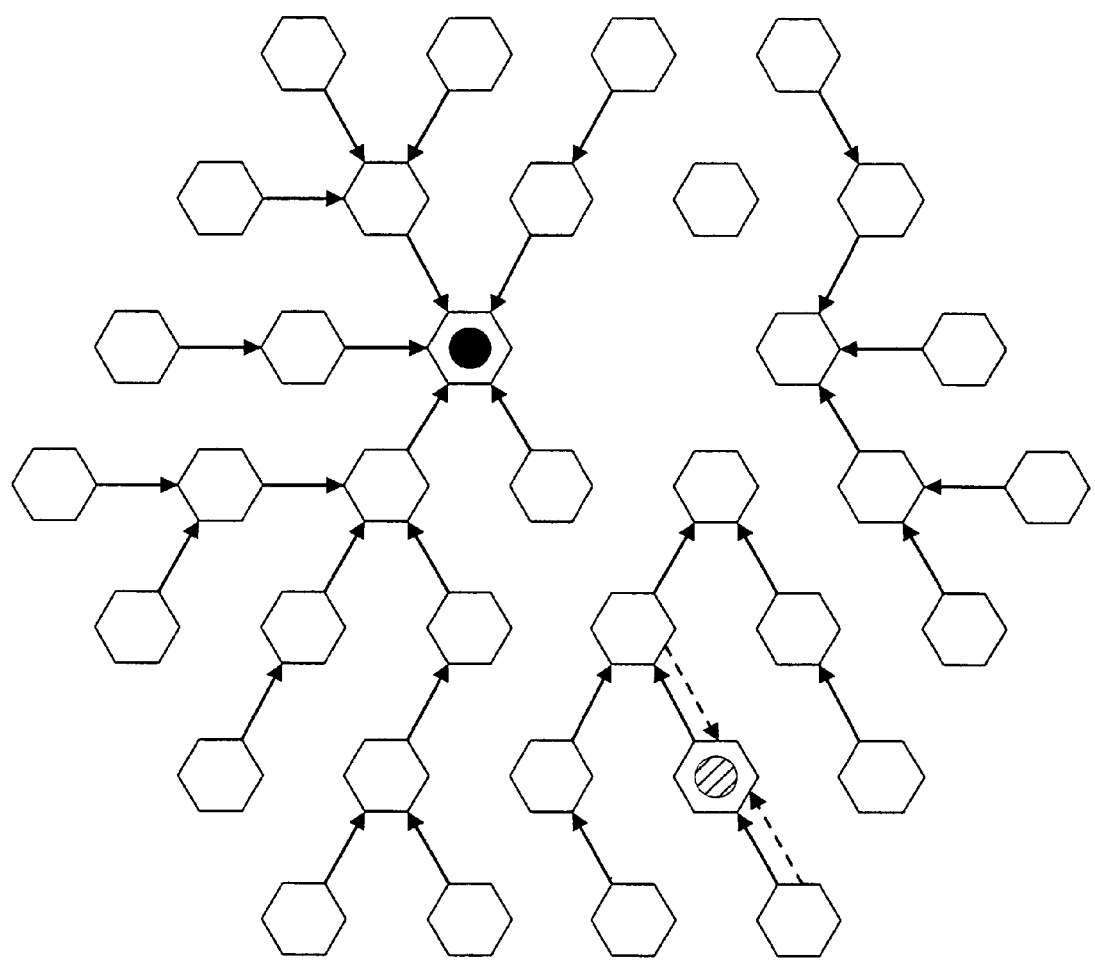
Figure 31:
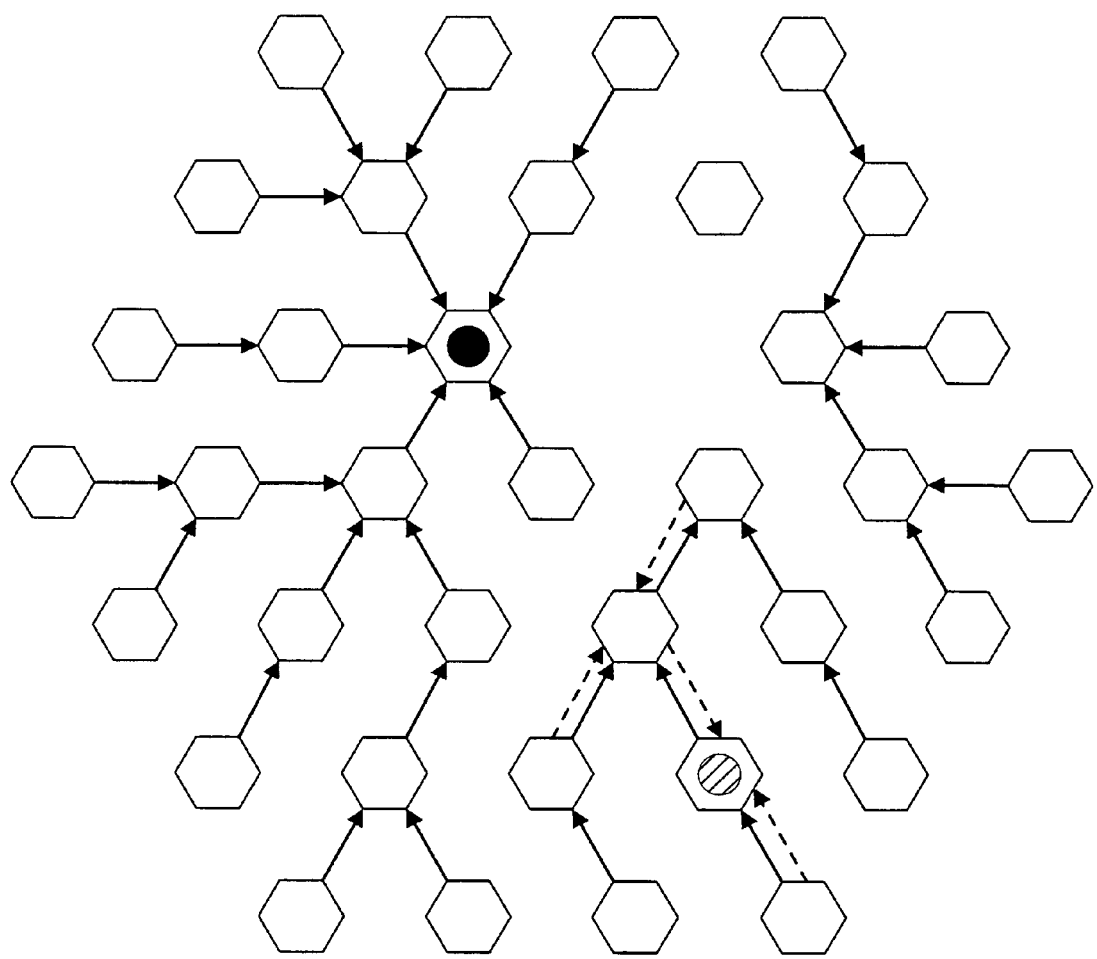
Figure 32:
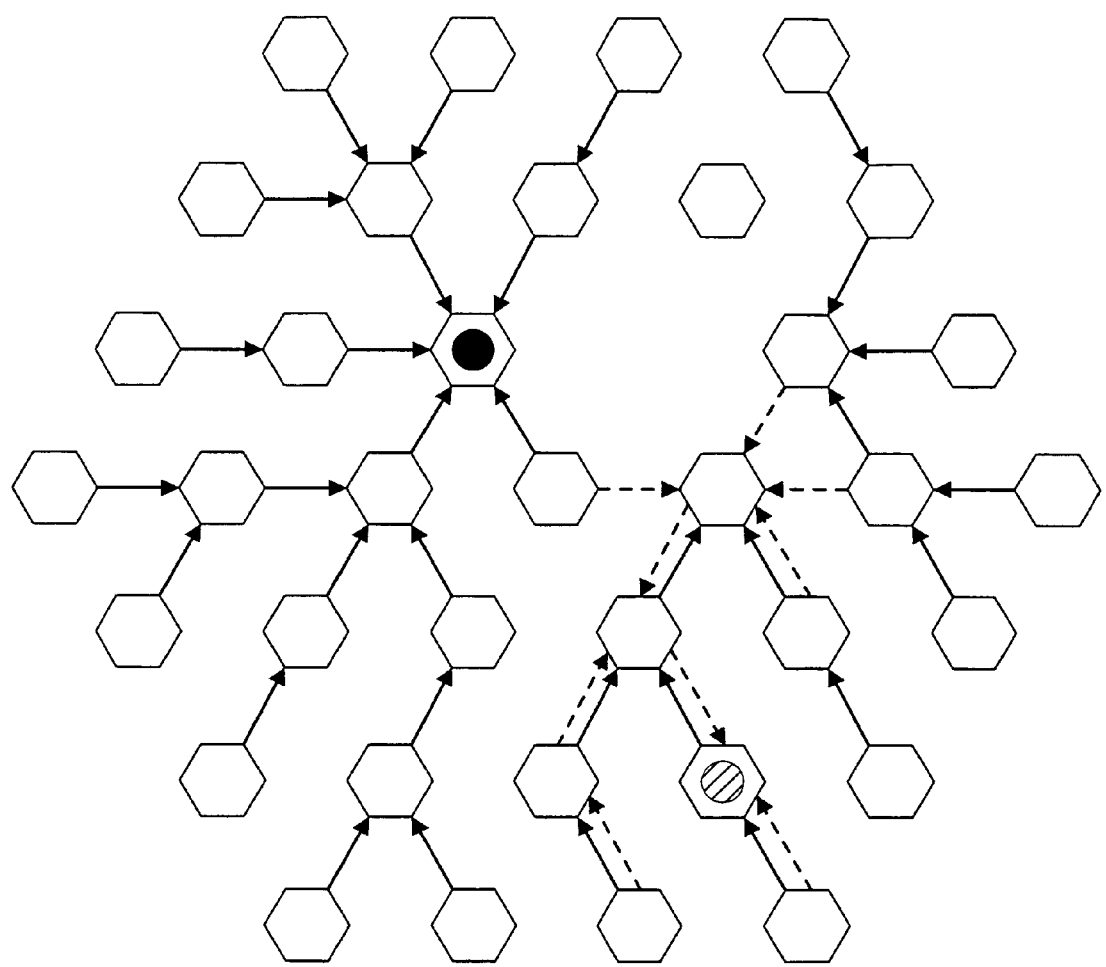
Figure 33:
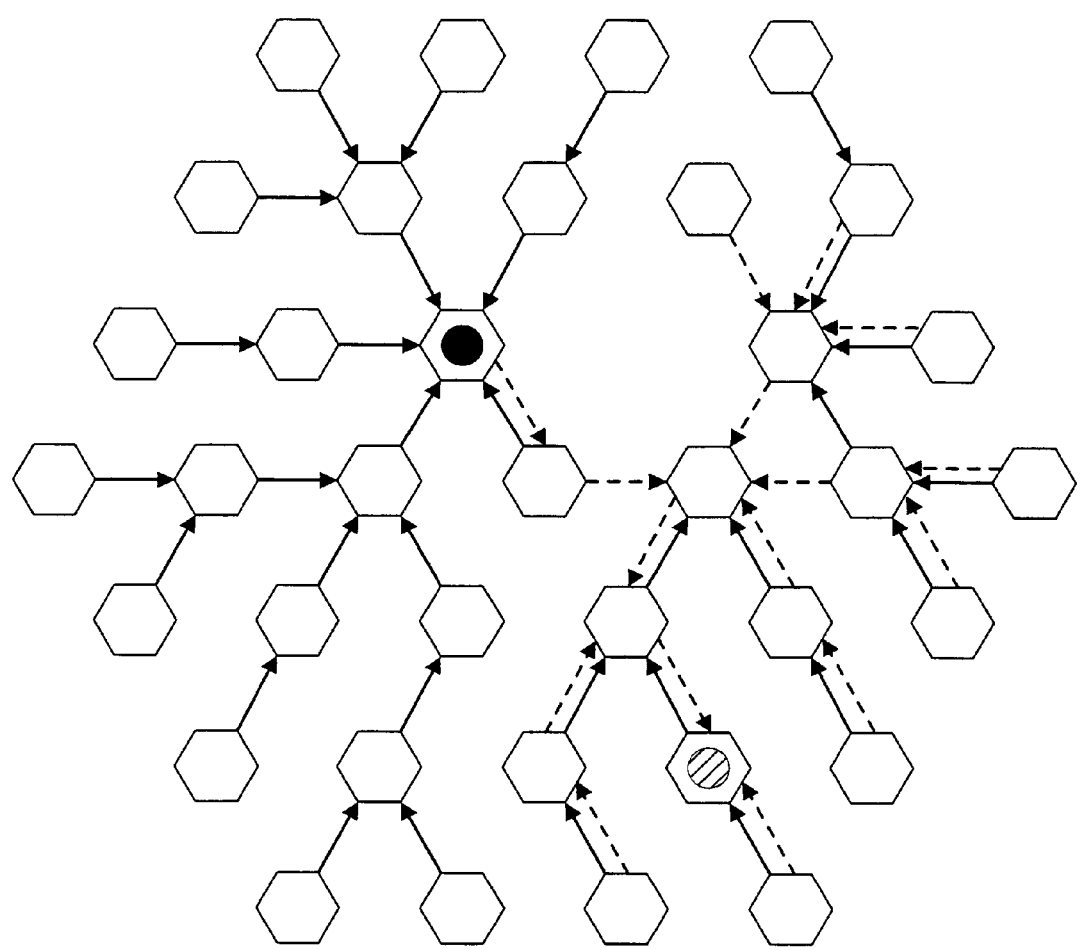
Figure 34:
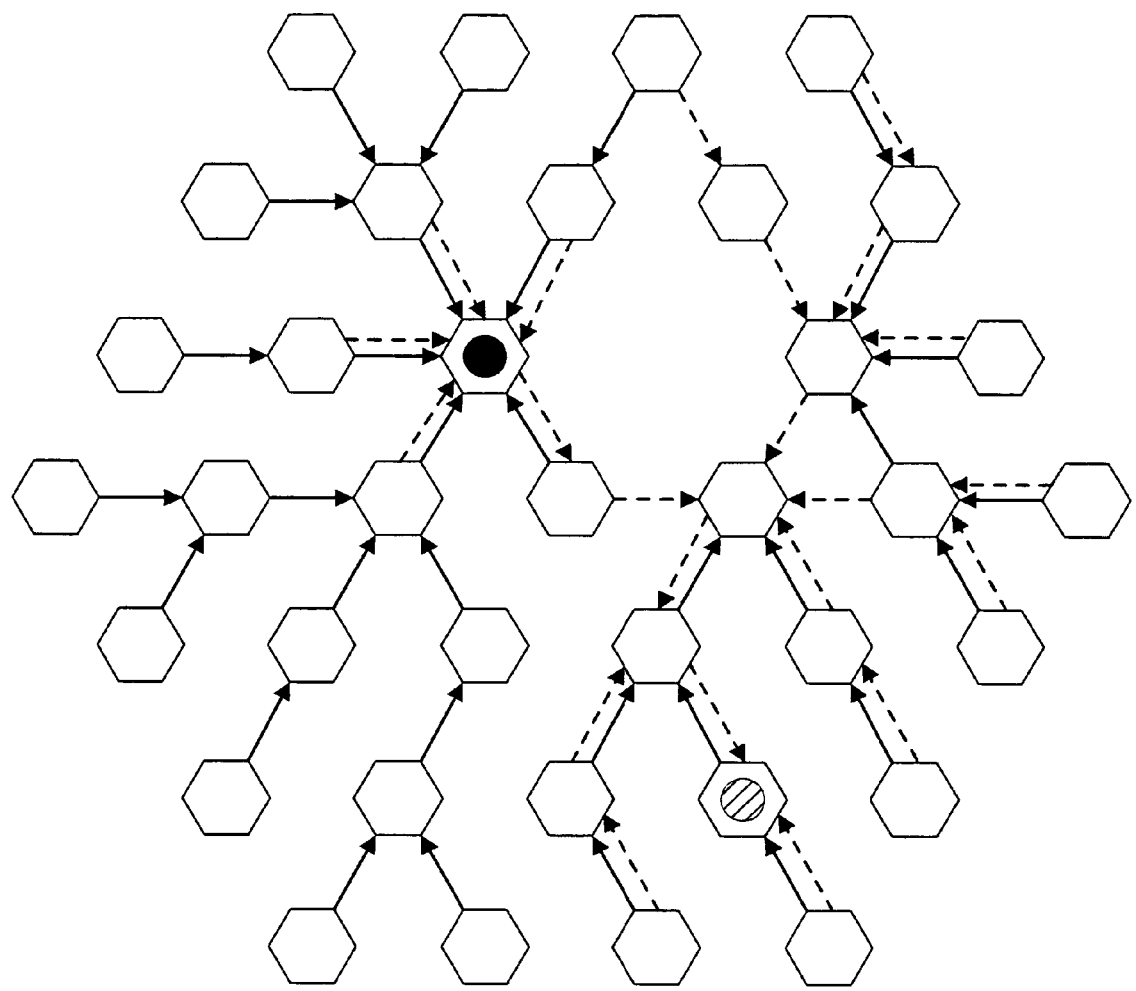
Figure 35:
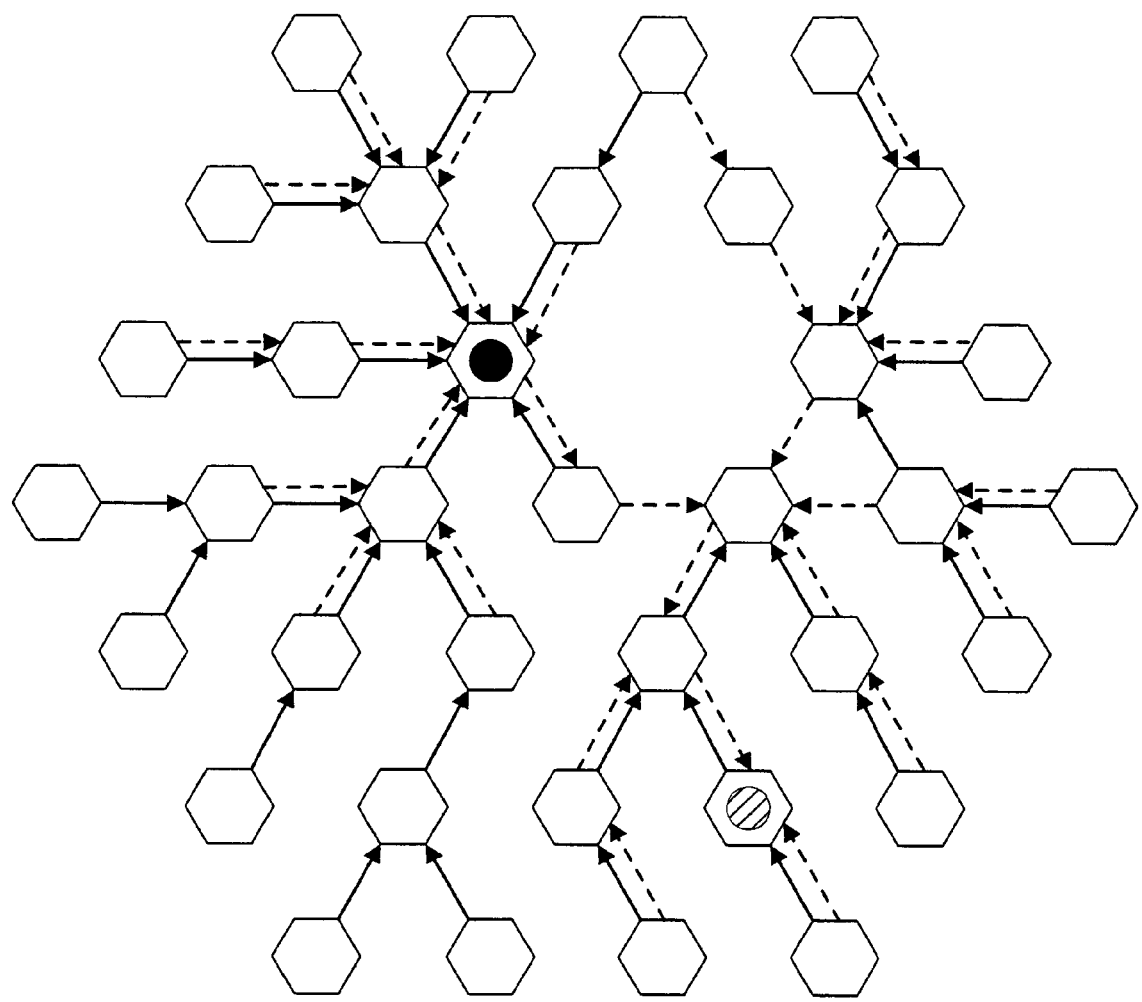
Figure 36:
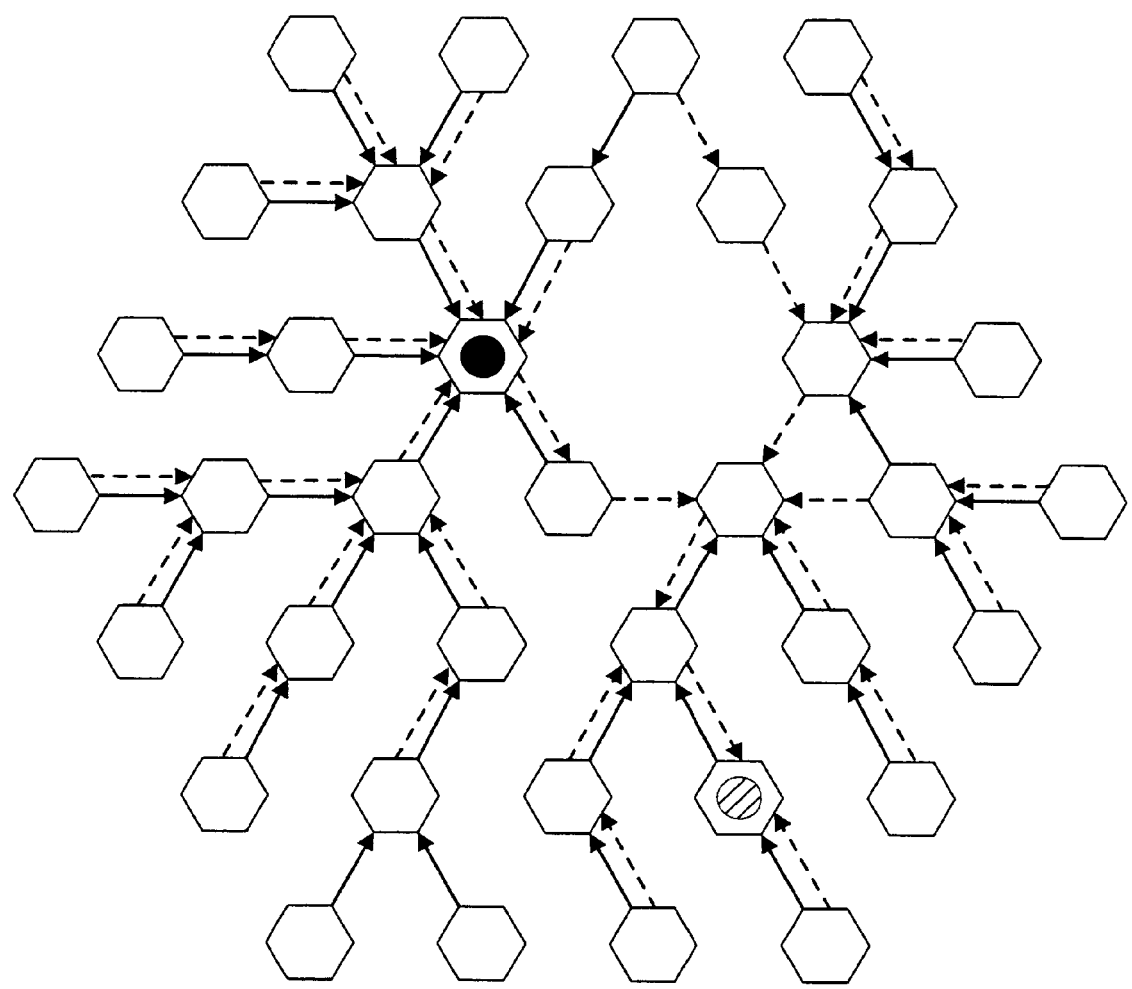
Figure 37:
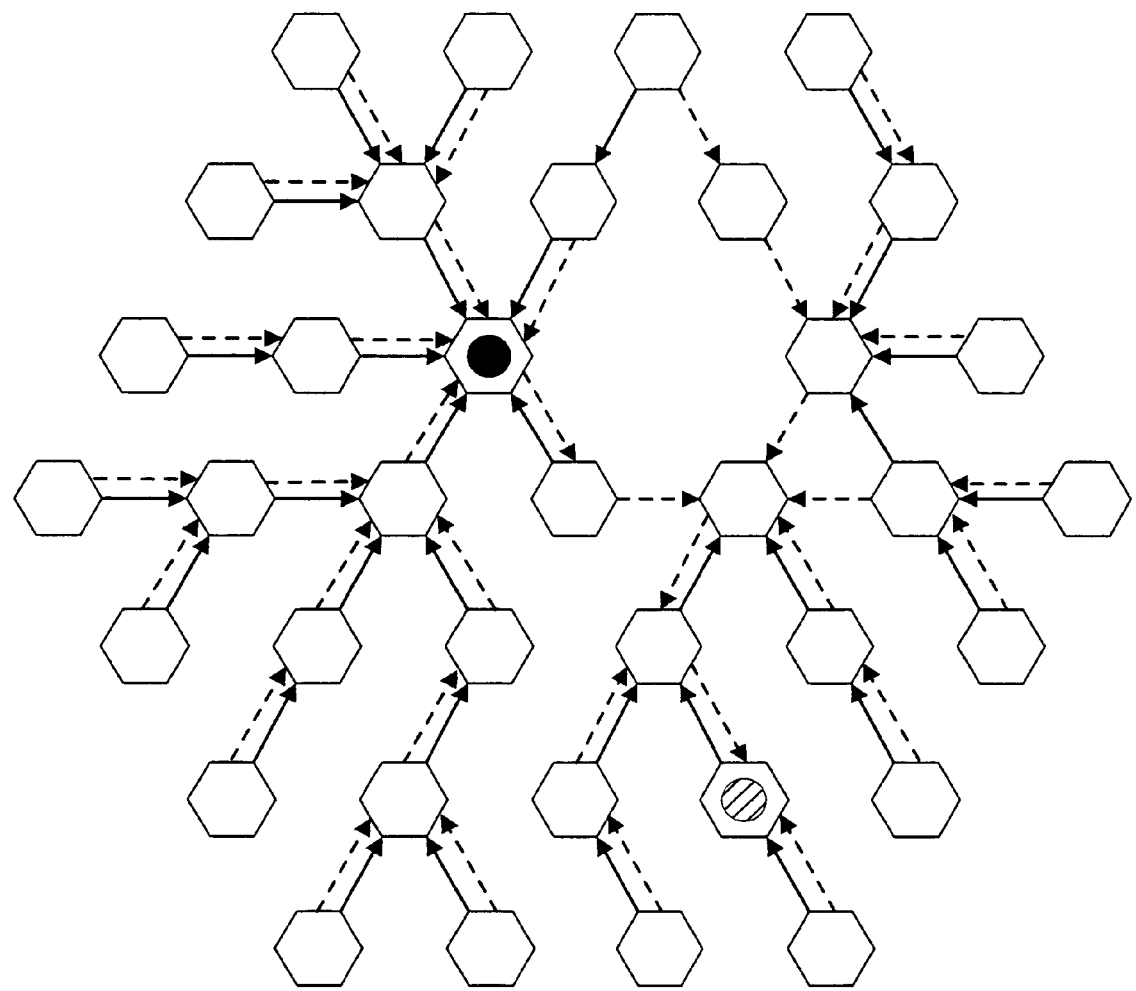

Before invoking the lower level network software 132 to send the message to the destination node 110, the T&R layer software 130 at the sender node 110 may create its own data structure including a T&R layer header 154 and the message received from the client application. Similarly, a link layer and transport layer may build their own data structure including their own respective headers, as shown in FIG. 5. On the receiving end of the message transfer, each protocol layer (e.g., transport, link, and T&R) may un-wrap its own message from its header, until finally the client application software at the destination node receives its message.

Role-Based Addressing

Most message-based protocols require some addressing scheme to name a destination endpoint (such as a node) as the target of a message. IP-based protocols for example, use an IP address to name a node on a network.

According to one embodiment of the T&R layer, message addressing is based on the concept of a "role". As used herein, a role may refer to a location-independent address for a computer network. The T&R layer may include an interface allowing client application software to create a role on one or more nodes on a tree. In one embodiment each role may be identified using a string, e.g., the name of the role. In other embodiments, roles may be identified in other ways, e.g., using integers. Thus, a complete message network address may comprise information identifying a tree and a role on the tree. For example, in one embodiment the tree may be identified using a tree ID, such as a 128-bit Universally Unique ID (UUID), and a role may be identified using a variable length string. (Universally Unique IDs or UUIDs may be allocated based on known art which ensures that the UUIDs are unique. Any node may allocate a UUID without having to communicate with another node, which may be advantageous in terms of efficiency.)

In another embodiment, a message address may also include information identifying a protocol ID. The protocol ID may be associated with a client application that utilizes the T&R layer. Multiple protocols may utilize the same tree. Thus, each message may be sent on a particular tree and, more particularly, to a particular set of nodes on the tree, i.e., the nodes having the specified role. As the message arrives to each node on the specified tree and having the specified role, the protocol ID may be used to determine which protocol on the node or which portion of client application software receives the message. In another embodiment there may not be multiple protocols, or a message may be sent without specifying a particular protocol ID. If no protocol ID is specified, the message may be delivered to all protocols bound to the tree.

Any semantic meaning associated with a role may be done so by the client application and not by the T&R layer. For example, roles such as "owner" or "instrumentation-manager" may appear to the T&R layer as just two different strings that each designate a separate target on a tree for message transfers. The T&R layer may treat client application messages simply as a set of bytes.

Sending messages to roles instead of directly to nodes may have a number of advantages. For example, a given role may be assigned to any tree vertex (node), and the role may move from node to node dynamically. Also, a single role may be assigned to multiple tree nodes. Thus, a message addressed to the role may reach each of the nodes which have the role.

Role-based addressing may also allow distributed software to run in a peer-to-peer manner. Nodes do not need to keep track of global state, such as knowing which other nodes are present on the network or which roles are bound to which nodes. A node may simply accomplish an operation by routing a message to a particular role, without needing to know which particular node or nodes have the role.

A role which is restricted to a single node is referred to herein as an exclusive role. A role which is associated with multiple nodes is referred to herein as a non-exclusive or shared role. (It is noted that a non-exclusive role may be associated with a single node.) Each instance of a role may have an associated role instance ID, such as a 128-bit UUID.

Each node may maintain a list of role instances which are associated with that node for each tree. The node may also maintain routing information that allows messages to be routed from the node to remote roles, i.e., role instances associated with other nodes. For example, the routing information may define one or more edges for the node. Each edge may be mapped to one of the node's links and may be used to route a message to one or more instances of a role. Each link may support many mapped tree edges. Thus, at each node along the message path from a sender node to the target node(s), the node may deliver the message to a local instance of the role (if there is one) and may forward the message to other role instances using the respective edge or edges.

In one embodiment, at each node, the routing information for a given role may include information directly specifying how to route a message to every instance of the role. For example, for each node, the node may have an edge associated with each instance of the role, where each edge points to another node to which or via which the message can be sent to the respective role instance. The role name and the instance ID for the respective instance of the role may be associated with each edge, allowing the edges to be disambiguated for shared roles.

In another embodiment, the routing information at one or more nodes may include information directly specifying how to route a message to only a subset of the role instances. Thus, if there are N instances of the role, a given node may have knowledge of less than N instances of the role. As one example, a first node may have knowledge of only a single instance of the role. For example, the first node may have an edge associated with a particular instance of the role, such that messages addressed to the role are routed to a second node to which the edge points. The second node may in turn have two or more edges, each associated with different role instances, such that messages addresses to the role and received from the first node are forwarded by the second node to multiple nodes, and continuing in this manner until each instance of the role receives the message.

The embodiment in which nodes can have routing information regarding only a subset of the role instances may allow nodes to leverage each other's knowledge. Thus routing data may be localized, i.e., the routing data does not have to be published to every node on the tree. This may increase efficiency of the system.

Client applications may utilize an API to manage roles in various ways. For example, in one embodiment client applications may be able to perform the following tasks related to roles:

add or publish a role (binds an address to a node and tree and publishes the address)

remove a role (unbinds the respective address from the node and tree and un-publishes the address)

re-point a role (adjusts edges to point towards new role owner, i.e., another node)

request a role (sends a message to the current role, requesting to become that role)

grant a role (issues a response to a requesting node indicating that a role request is granted, either with or without the old role owner giving up the role)

Publishing a Role

Client application software may create or publish a role (by requesting the T&R layer to publish the role) in order to publish an address on a tree. The client application software may also remove or un-publish the role to un-publish the address. In one embodiment, creation (publication) and removal (un-publication) of roles may also be initiated by the T&R layer. The process of publishing a role instance may cause a series of edges to be created from a set of potential sender nodes to the target node on which the role instance is published.

In one embodiment, publishing a role instance is accomplished by broadcasting publish messages from the publishing node to other nodes. In one embodiment, the publish message may be broadcast using a particular broadcast scope as described below. At each node that receives the publish message, an edge may be created that maps upon the link over which the publish message was received (or an existing edge may be updated with information to indicate that the edge is also usable to route messages toward the new role instance). The result is a series of edges distributed over a set of nodes, each edge pointing toward the role instance that was published. Un-publishing a role may cause existing edges to the role instance to be removed.

Each node that receives the publish message may forward the publish message to one or more other nodes, e.g., according to the broadcasting scope used. In one embodiment, a node which already has another instance of the role may not continue forwarding the received publish message for the new instance. This may allow the type of routing data localization described above.

The publish message may include a message ID (e.g., a UUID) that uniquely identifies the respective publish operation. This enables the publish message to be distinguished from any other message being sent. Each node that receives the publish message may stop forwarding the publish message if the node has already received the publish message (as identified by its message ID).

As noted above, in one embodiment the publish message may be broadcast using a particular broadcast scope. For example, a "broadcast on all links", a "broadcast on tree", or a "broadcast on role routes" type of broadcast may be performed. The type of broadcast may determine what links are chosen at any given node to continue forwarding the publish request. For the broadcast on all links type, the publish message may be sent on all links from each node that receives the publish message. For the broadcast on tree type, the publish message may be sent on all links that correspond to existing edges of the tree (i.e., edges that were created by previous publish operations). For the broadcast on role routes type, the publish message may be sent on all links that correspond to edges pointing to previously published instances of the role.

In the case of a broadcast on tree operation, if the tree is not "fully built" (described below) at the local node, the publish message is forwarded over all links from that node. (This does not affect how further nodes forward the publish message.) Similarly, in the case of a broadcast on role routes operation, if the role is not fully built (described below), and if the tree is fully built, then the broadcast reverts temporarily to broadcast on tree. If the role is not fully built, and the tree is also not fully built, the broadcast reverts temporarily to broadcast on all links.

In one embodiment, the information that is broadcast for the Publish operation (or an Un-publish operation) may include:

tree ID—a unique ID (DUID) of the tree in which the role instance was added role name—a string name of the role added instance ID—a unique ID (DUID) of the particular role instance added exclusive—a Boolean value indicating whether or not the new role instance should be treated as an exclusive (i.e., the only) instance of the role publish—a Boolean value; if True then perform a Publish operation; if False then perform an Un-publish operation protocol ID—an ID (int) value identifying the application protocol (e.g., client of the T&R layer) that caused the tree to be created FIGS. 6-11 illustrate the process of publishing a new role (indicated by the node with the solid circle). Each solid arrow indicates an edge pointing toward the role. (The edges point in the direction of the links on which the publish messages were received.) FIGS. 12-20 illustrate the process of publishing a second instance of the role at the node indicated with the patterned circle. Each dashed arrow indicates an edge pointing toward the second instance of the role.

FIGS. 21-27 illustrate a situation on which simultaneous non-exclusive publish operations are performed for two instances of a role.

As noted above, a role instance may be designated as exclusive when it is the only instance of the role. Publishing a role instance as an exclusive instance of the role may cause any existing edges to other instances of the same role to be removed or overwritten. In the event that a simultaneous publish of role instances is attempted, where each instance is intended to be exclusive, the instance IDs of the role instances may be used to ensure that only one role instance is actually recognized. For example, the role with the largest (or smallest) instance ID value may win.

An un-publish operation for an exclusive role instance may cause all edges to the role to be removed on all nodes. An un-publish exclusive operation may be performed even when there is no local role instance to remove.

It is possible that one or more nodes in a network may fail. FIGS. 28-37 illustrate the process of publishing a role on a network in which a node has failed.

When nodes or links fail, affected tree edges (i.e., those edges mapped to the broken link or links) become broken and need to be repaired. In one embodiment, trees may be allowed to remain with broken edges in an incomplete state such that not all routes to all roles have been determined at every node. Each tree may be repaired or recovered independently at the time the tree is next needed by a send operation. The recovery operation may result in not finding some roles if a node with a role no longer exists. Therefore, the T&R layer may employ a timeout mechanism to terminate the recovery operation if necessary. Tree recovery is described in detail below.

In one embodiment, it may also be the case that temporary cycles exist in a tree. The T&R layer may be operable to detect cycles and fix them with no loss of messages or message ordering. Detecting and breaking cycles is described in detail below.

As described above, a message addressed to a role or virtual network address may be sent to a set of physical nodes attached to a single tree by utilizing a series of edges. The physical location of the role or virtual network address may advantageously be re-mapped. As noted above, roles may dynamically move from one node to another node. The T&R layer may move or re-assign a role from one node to another node when instructed to do so by the client application software. For example, in one embodiment, the message response mechanism provided by the T&R layer may include an option allowing a message receiver node (the current role owner) to give up the role to a node which sends a request role message. Thus, the role may move from the message receiver to the message sender. The message receiver node may also grant the role to the message sender node without giving up the role, so that the two nodes each have an instance of the role.

When the role is granted without give-up, the sender node may publish a new instance of the role. In one embodiment, moving the role from the message receiver node to the message sender node (i.e., when the receiver node gives up the role) may be accomplished by first un-publishing the role from the receiver node and then publishing the role at the sender node. In a more efficient embodiment however, edges on affected nodes may simply be re-pointed toward the sender node, eliminating the need to un-publish the role and re-publish the role at the new location. In this re-pointing operation, edge updates may be localized to just those nodes along the message path from the sender node (new role holder) to the receiver node (previous role holder).

Routing

As described above, client applications and the T&R layer may view the peer-to-peer network 100 as a set of trees, each with a set of assigned roles. Routing may occur from a sender to a role within the context of a single tree. Each node 110 in the peer-to-peer network 100 may act as a message router.

As described above, messages may be routed by associating a series of edges with a role. At each node along the message path, an edge (or multiple edges) at that node serves to point towards the target node (or nodes) that has the desired role. Some nodes that route messages may also be a message destination. Other nodes may act solely as a router, never assuming a role. Messages may continue to be routed until all role instances have been reached.

Trees and Tree IDs

As noted above, each tree may have an associated ID which identifies the tree. For example, in one embodiment, a tree ID may comprise a unique 128-bit UUID. The tree ID may be valid for all network nodes. In one embodiment, the T&R layer may accept the tree IDs from client application software as a means for naming the trees. In another embodiment, the T&R layer may be responsible for creating the tree IDs.

The T&R layer software may associate edges with each tree ID. As described above, each edge may be mapped onto an underlying link. This mapping may give each edge a direction away from the local node and towards another node. For each edge, one or more roles that are found in the direction of the edge may be associated with the edge.

Routing Table Management

The T&R layer software on each node may maintain routing information. For example, for each particular tree for which the node has routing data, the node may have information specifying roles on the tree to which the node has routes to. For each of these roles, instances of the role may be mapped to edges, as described above.

In one embodiment, the routing information may include routing entries stored in one or more routing tables. In various embodiments, the routing entries may be structured in any of various ways and may comprise information of varying levels of granularity. For example, in one embodiment each routing entry may be associated with a particular role and a particular tree and may specify one or more edges that point toward instances of the role. In another embodiment, each routing entry may be associated with a particular tree and may specify routing data for all the roles associated with the tree.

According to one embodiment, two routing tables may be used to hold routing entries. The first routing table is referred to herein as the primary routing table. The primary routing table may be stored in the memory 122 of the node. The second routing table is referred to herein as the secondary routing table. The secondary routing table may be stored in the storage 124 of the node. In one embodiment, the routing entries in both the primary routing table and the secondary routing table may be the same. In another embodiment, the primary routing table may be used to store the most recently used routing entries, and the secondary routing table may be used to store other routing entries. Routing entries may be swapped in and out of the primary routing table from the secondary routing table as necessary, similar to the manner in which data is swapped in and out of a memory cache. In another embodiment, there may be only one routing table.

In one embodiment, information regarding local role instances for the node may not be maintained in the routing table(s). The information regarding local role instances may be maintained as long as a node is up. If a node fails, information routing information for remote roles may be rebuilt when the node comes back up.

As the number of nodes 110 in the network 100 increases, one or more of the nodes 110 may run out of memory 122 and may also possibly run out of storage 124 so that all edges to all roles throughout the network cannot be maintained on the local node. In one embodiment, this problem may be solved by enabling the T&R layer to remove least recently used routing entries from the routing table as necessary. For example, for a routing table stored in the memory 122, if an out-of-memory situation occurs or is near for the memory 122, or if a routing table reaches a maximum size, then the routing entry that was least recently used may be removed from the routing table, e.g., so that a new routing entry can be added in its place. Similarly, for a routing table stored in the storage 124, if an out-of-storage situation occurs or is near for the storage 124, or if the routing table reaches a maximum size, then the routing entry that was least recently used may be removed from the routing table. This may allow new routing entries to be added to the routing tables as necessary.

If at a later time the node ever needs a routing entry that was replaced in the table, the routing entry may be re-created. For example, if the routing entry corresponded to a first tree and the node needs to forward a message addressed to a role on the first tree, then the first tree may be rebuilt, or information regarding the first tree may be re-acquired.

Fully-Built Roles and Trees

As used herein, a role is said to be fully built on any given node when edges to all instances of the role on all other nodes have been created for that node (or when the node has sufficient edges so that a message addressed to the role eventually reaches all instances of the role when sent in the manner described above). A tree is said to be fully built on any given node if all of the tree's roles are fully built on that node.

It is noted that in some situations a tree may be marked fully built, while a role associated with the tree is marked not fully built. This may occur when a new role is published. The role may be initialized to not fully built, while the tree is initialized to fully built. A tree may be marked as not fully built only if one of its roles has gone from fully built to not fully built. Once each of a tree's not fully built roles has been rebuilt (and marked fully built) the tree may be again marked as fully built.

When a new node joins the link mesh, the node needs to gain access to all the trees. This may be accomplished by using a simple request/response protocol that yields the set of known tree IDs. The new node may then create its own edges to point towards existing roles on the tree. Once this process is accomplished, each tree and each of its roles may be marked as fully-built for the new node.

When a link fails at a node, all roles that have edges over the failed link may be marked as not fully built for the node. As noted above, a recovery operation may be performed when necessary to send or forward a message to one of the roles that previously was pointed to by an edge over the failed link. Once the recovery operation completes and edges have been re-built, each role may be once again marked as fully built for the node, thus also making the affected tree fully built.

Sessions

Because each role may be shared by different nodes, a message sent to a single role may be delivered to many nodes that in turn send one or more responses or replies back to the sending node. In one embodiment, the T&R layer may utilize a session mechanism to support this one-to-many reply model. The session mechanism may facilitate the automatic routing of responses back to the original sending node.

According to one embodiment of the session mechanism, a long-lived state element referred to herein as a "breadcrumb" may exist at each node along the message path. The breadcrumb may point back via a link towards the original message sender. An initial breadcrumb may be created in response to each send operation. The initial breadcrumb may indicate that the original sender is on the current node, e.g., may indicate this via a null link. As the message is forwarded on to other nodes, a new breadcrumb may be created on each receiving node, where the breadcrumb points back over the link by which the message was just received.

As a result, a trail of breadcrumbs may compose a route from the target receiver node back to the original sender node and passing through all the intermediary forwarding nodes. When the receiver node responds to the message, the incoming link specified in the breadcrumb may be used to route the response back to the sender. Similarly, each of the forwarding nodes may use the links specified in their respective breadcrumbs to route the response back to the sender node.

In one embodiment, breadcrumb elements may remain active until a response is marked as "last reply." When all last replies from all receivers of the message have been received over a link, the breadcrumb element at the local node may be deleted, thus preventing any more replies. Thus, the session may be created when the send operation is initiated and ended when all "last reply" responses have been processed. Each response, whether it as a "last reply" response or not, may be propagated to the sender as it is generated and may not be held by nodes along the message delivery chain.

In one embodiment, an alternative means of ending the session using aggregated replies may also or may alternatively be provided. According to the aggregated reply model, all responses may be held at a given node until all "last reply" responses have arrived at the node from target destinations to which the node forwarded the original message. Aggregated replies work by consolidating each individual response into a single response that is matched with the send that was previously issued. As the send operation fans out to more nodes, responses are returned (using the breadcrumb elements). The responses may be consolidated at each forwarding node. Not until the consolidated response is completely built (with all individual responses included) is the single consolidated reply passed back towards the original sender.

If a send has been issued, and then a link fails at a node along the message delivery chain, the T&R layer software at the node where the link failed may automatically generate a response, referred to as a null reply, that indicates the failed link. This null reply may be treated like all other responses, working in both aggregated and non-aggregated sessions. If the sender receives no null replies, the sender knows that it has received all the responses from the various role instances once the last reply comes back. However, if a null reply comes back, the sender knows it has not received all replies, and thus may re-send the message.

Also, if no role instance can be reached then the T&R layer software may return a role not found message to the sender. Thus, the sender may receive either a role not found response or one or more responses with the last one indicated, which in the absence of a null reply indicates that all responses have been received. These features may enable the sender to send messages without utilizing or depending on a timeout mechanism.

In various embodiments, the T&R layer software may determine that no role could be reached using any of various techniques. For example, the router on a given node may experience the role not found condition when it can no longer reach any role instances. When this occurs, a role not found message may be returned to the node that forwarded the message. However, the role not found message may not be forwarded back any further unless that node receives a role no found message from all links over which the node forwarded the message. For example, if node A forwards a message to nodes B and C, and node B returns a role not found message to node A, and node C returns a response other than a role not found message, then the role not found message sent from node B to node A may be ignored. Thus, for a role not found message to get all the way back to the sender, all nodes that received the message must have been unsuccessful in attempting to reach the role.

In one embodiment, the T&R layer software may also or may alternatively support a one-way send model in which responses to a message are not allowed, and thus sessions are not utilized. For example, one-way send operations may be useful for broadcasting information that does not warrant a reply. Breadcrumb elements may not be created when a one-way send operation is performed.

Listeners

Figure 38:
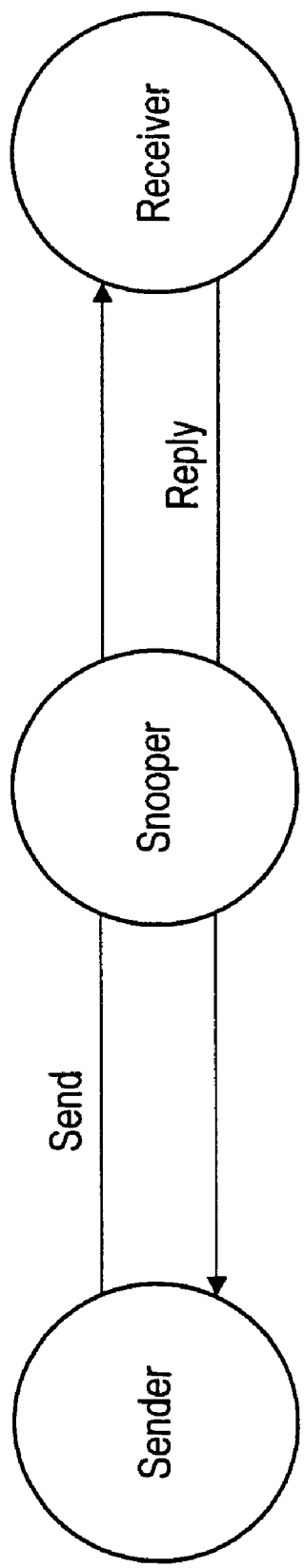
FIG. 38 illustrates client application software that acts as a snooper.

In one embodiment, the T&R layer may support listener ports through which client application software at a given node can listen for messages. A listener port may connect one or more listening clients with one or more trees that are bound to the listener port. Client application software can listen to all messages sent on a tree, even those not addressed to the local node. Client application software that listens to all messages (regardless of role) is referred to herein as a snooper. FIG. 38 illustrates the snooper concept.

Client applications may utilize application listener ports to receive information from the T&R layer. For example, through application listener ports, client applications may be notified of messages received from senders, responses to messages (replies from receivers), and events fired. A listener port is somewhat similar to the concept of a socket. Client software listeners may be added to and removed from a listener port. Also, the listener port may be opened and closed as desired. A listener port may be bound to a tree. Each listener port may implement an interface to accept events generated by the T&R layer, messages, and responses to messages.

Each listening client may supply the T&R layer software with a set of callback methods or functions. These callback methods or functions may be invoked by the T&R layer software when a message or response is delivered over the local node or when a message delivery cannot be accomplished. A listener method may also be called to announce the routing of a tree through a node. At each invocation, the listening method may be passed a parameter specifying either a message being sent or a response being returned. As described below, a listening client may perform any of various actions in response to a message or response.

Message and Response Structure

In various embodiments, a message and a response may be structured or implemented in any of various ways and may include any of various kinds of information. In one embodiment, each message includes the following information:
  Tree ID (128-bit UUID)
  Role Name (Variable length string)
  Protocol ID (integer)
  Control Booleans (Series of True/False flags to augment sending behavior)
  Message Body (Variable length array of bytes)

In one embodiment, each response includes the following information:
  Role Name (Variable length string)
  Role Instance ID (128-bit UUID)
  Role Re-pointing Booleans (Series of True/False flags to control role re-pointing behavior)
  Last Reply Boolean
  Null Response Boolean (returned when links fail and other error conditions occur)

Tree Building

As described above, the T&R layer may perform a tree building process. There are many situations in which a tree building process may be performed. For example, tree building may be performed when:
  adding new nodes to a network
  publishing routes to a new instance of a role
  unpublishing routes to a removed instance of a role
  recovering routes to one or more instances of a role
  repointing a route to a role instance that has moved to another node
  breaking a route that causes a cycle
  removing a stale route to a role instance on a node that has failed In various embodiments, any of various techniques may be utilized to build trees. In one embodiment, trees may be built using local state and messages received from neighboring nodes. In one embodiment, instead of using a tree building algorithm that avoids cycles, cycles may instead be detected and broken. This may be more efficient than avoiding cycles. In one embodiment, trees may not be immediately repaired when a link fails. If there are a large number of trees, it may be too inefficient to repair all the trees. Instead, each tree may be repaired as needed, e.g., when a message send operation requires it.

A tree cache mechanism may be utilized to support more trees than can fit into memory at one time. Each node may maintain its own tree cache, e.g., a primary or secondary routing table such as described above. The tree cache may include a list of known trees. The tree cache may be managed using a "least recently used" replacement policy as described above. In one embodiment, the tree cache may be configured to utilize a "no replacement" policy if desired, so that the size of the tree cache is unbounded. A "tree built" event may be fired to all listeners when a tree is added to a tree cache.

Figure 39:
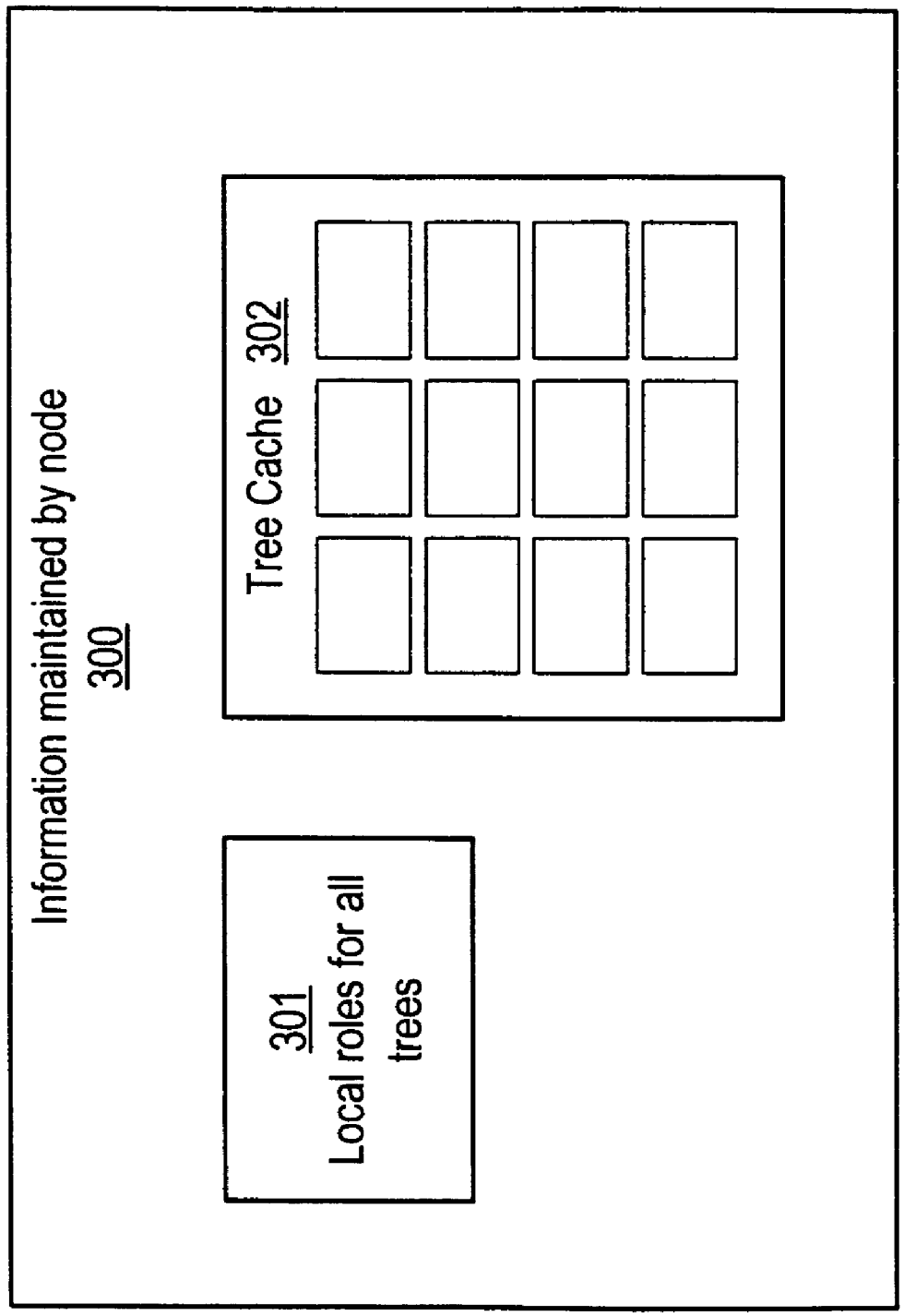
FIG. 39 illustrates information 300 maintained by a node, including information 301 pertaining to local roles for all trees and tree cache information or routing information 302.

As shown in FIG. 39, each node may maintain information 300 related to the T&R layer. The information 300 may include information 301 pertaining to local roles for all trees, i.e., all roles which exist on that particular node. The information 300 may also include tree cache information or routing information 302, as described above. Each of the smaller rectangles illustrated within the tree cache 302 in FIG. 39 may represent a tree.

Figure 40:
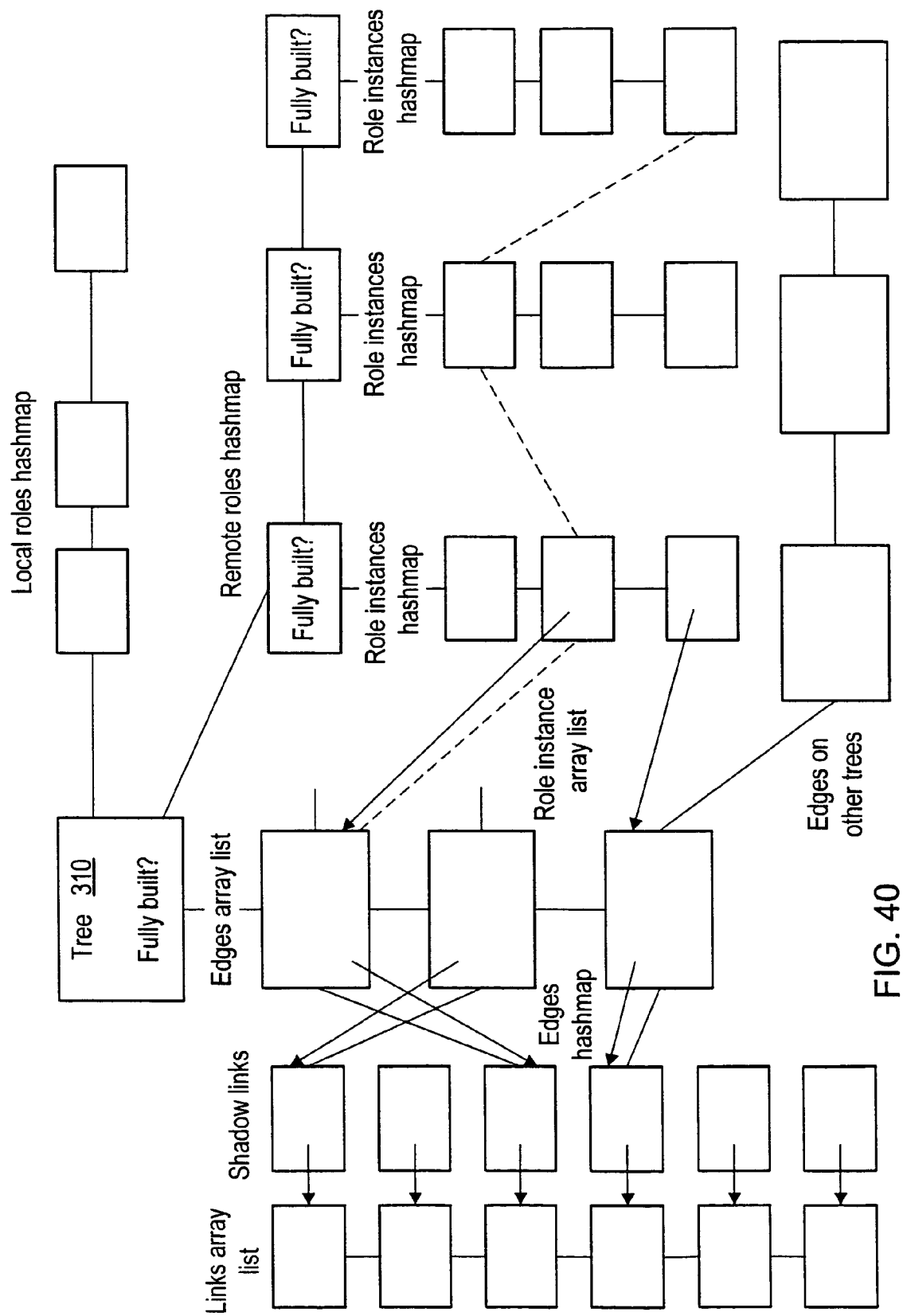
FIG. 40 illustrates tree representation according to one embodiment.

In various embodiments, trees may be represented using any of various types of data structures. FIG. 40 illustrates tree representation according to one embodiment. This tree representation makes it easy to get all links towards all instances of a role. It is also easy to get all links to perform a broadcast operation on a tree. It is also easy to update the tree representation in the event of a link failure (described below). According to the tree representation shown in FIG. 40, local roles may be maintained while the local node is up. Routes to remote role instances, however, can be rebuilt.

As described above, the T&R layer may utilize the concept of "fully built" roles and "fully built" trees. A role is considered fully built for a node if the node has routes to all instance of the role on other nodes, except instances of the role that are currently being published. A tree is considered fully built for a node if all of the tree's roles are fully built.

Figure 41:
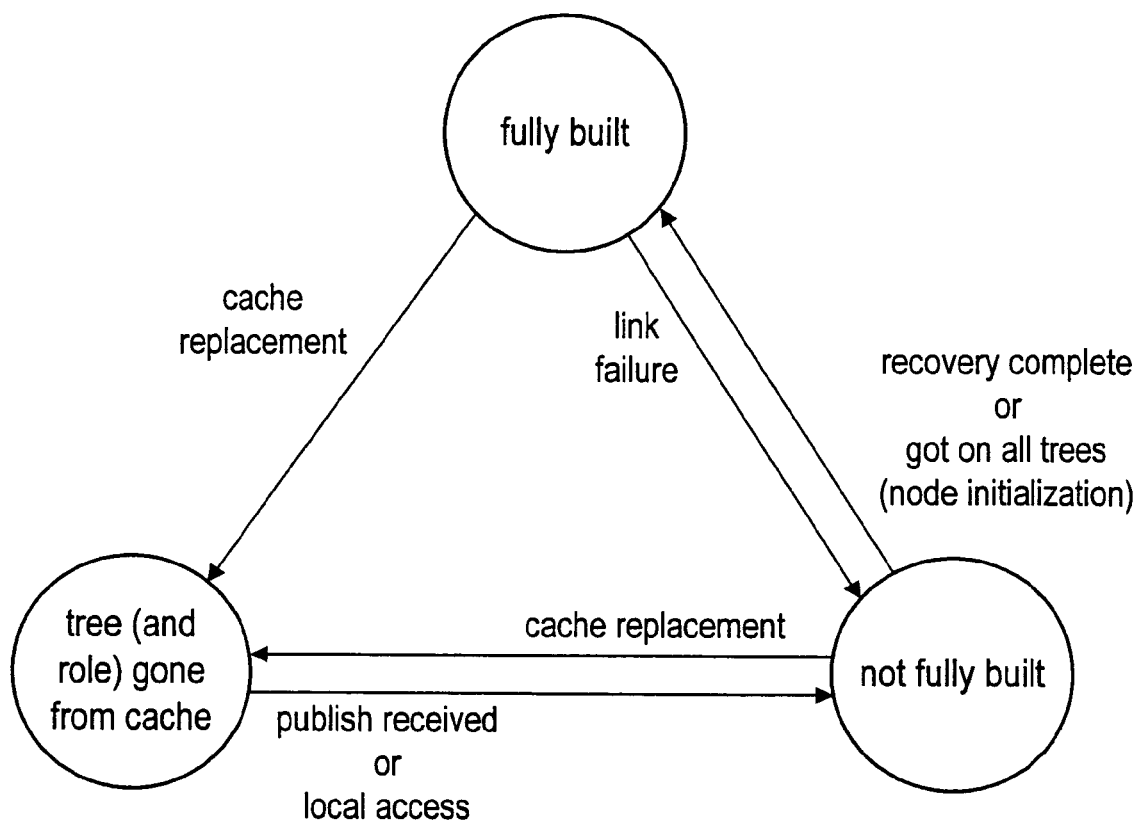
FIG. 41 illustrates a state machine showing state changes relating to a "fully built" status.
Figure 42:
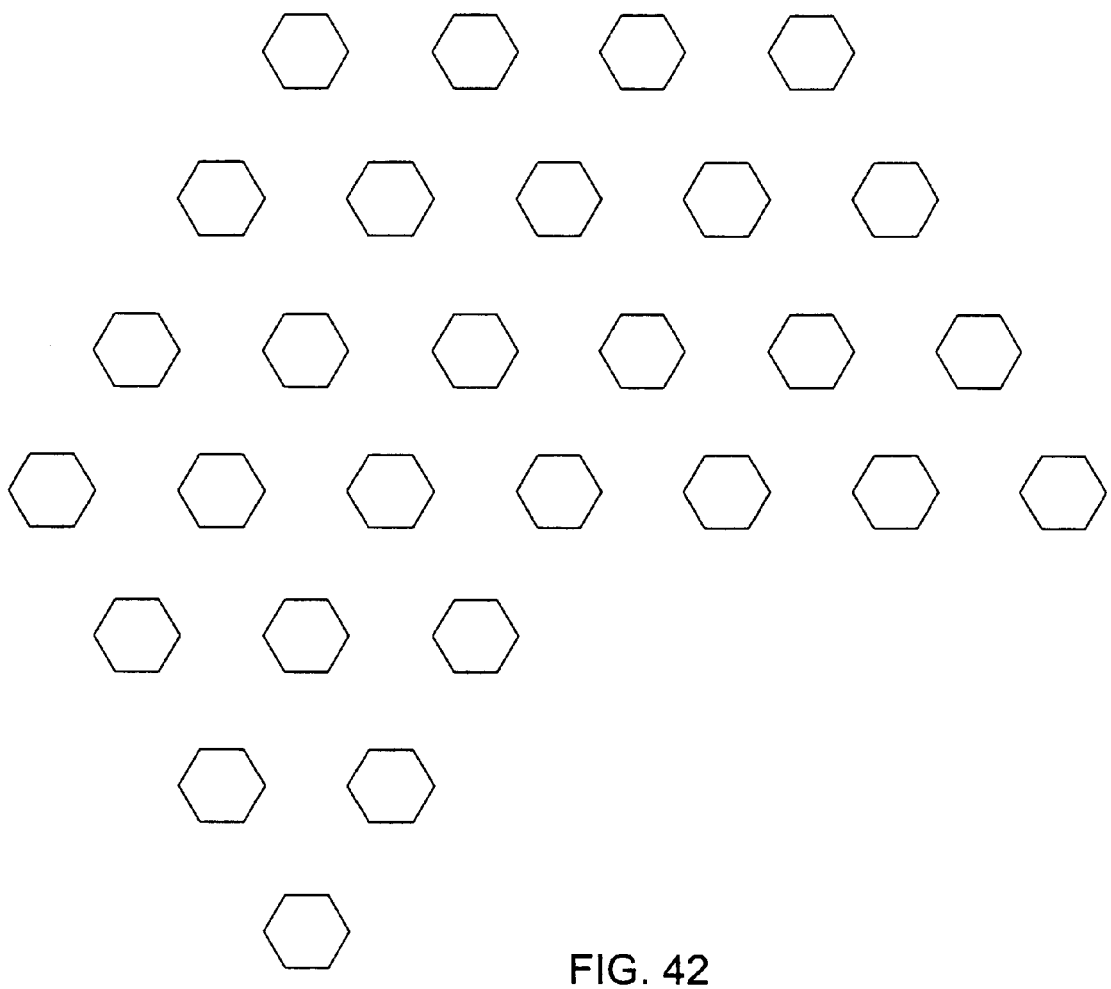
FIGS. 42-49 illustrate a tree building process when a group of nodes joins a network and a tree spanning the nodes is built.
Figure 43:
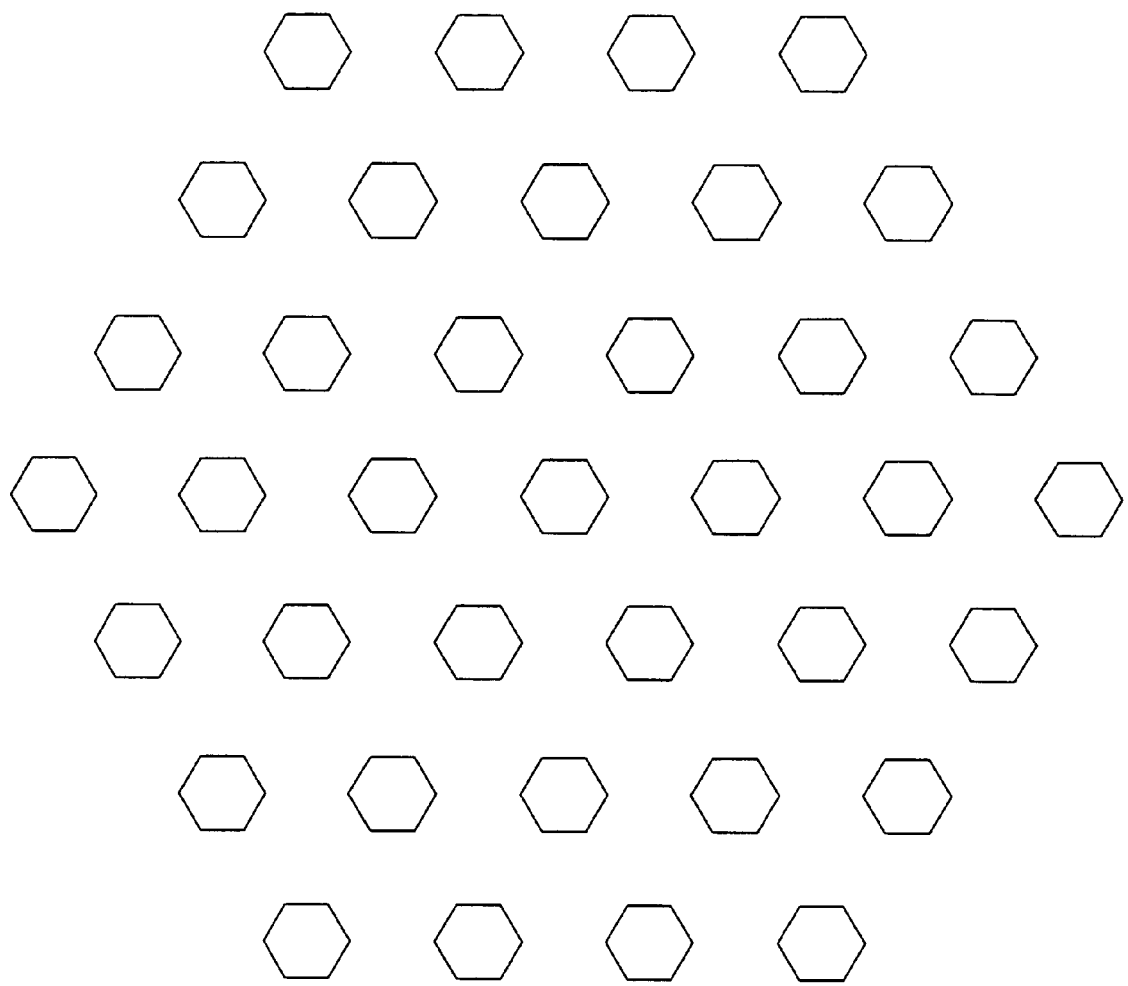
Figure 44:
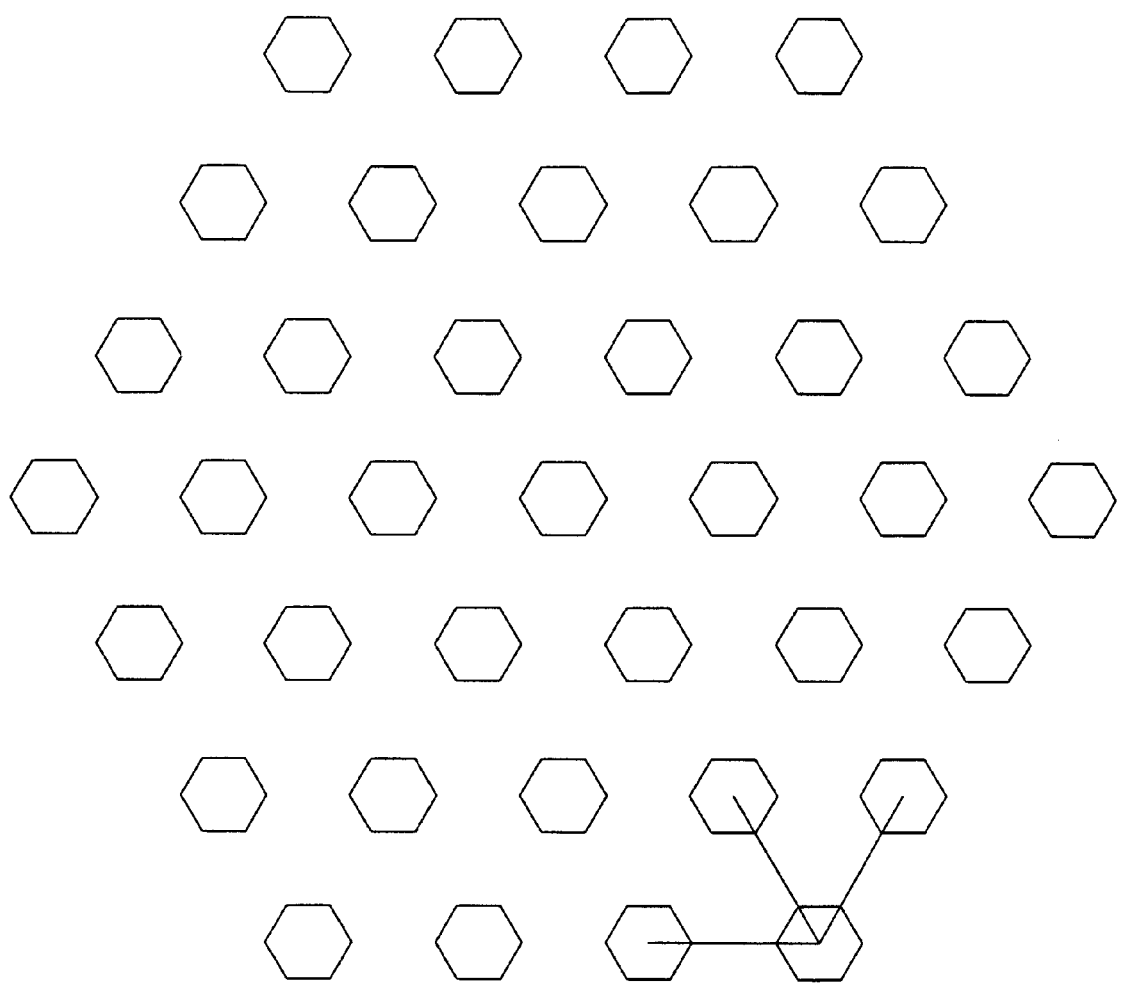
Figure 45:
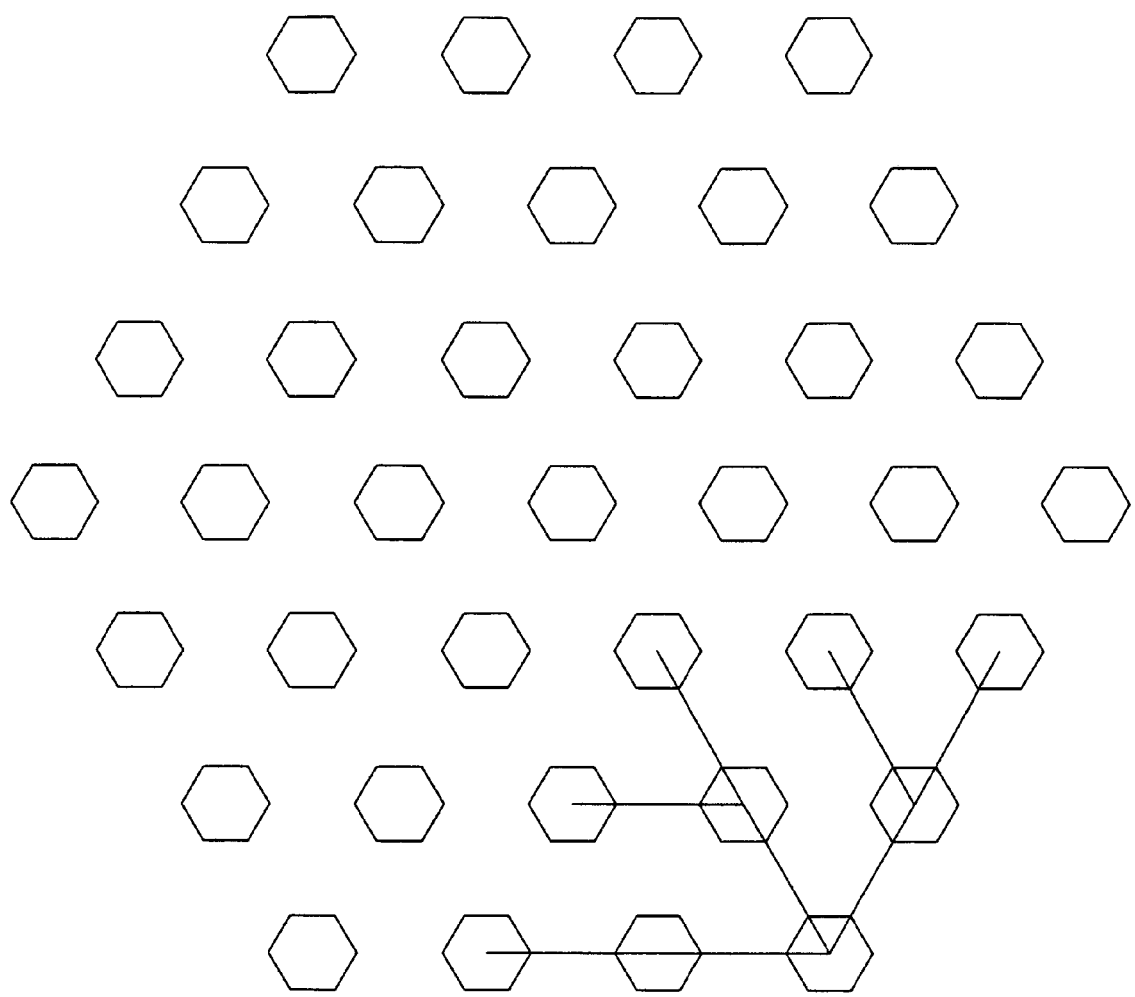
Figure 46:
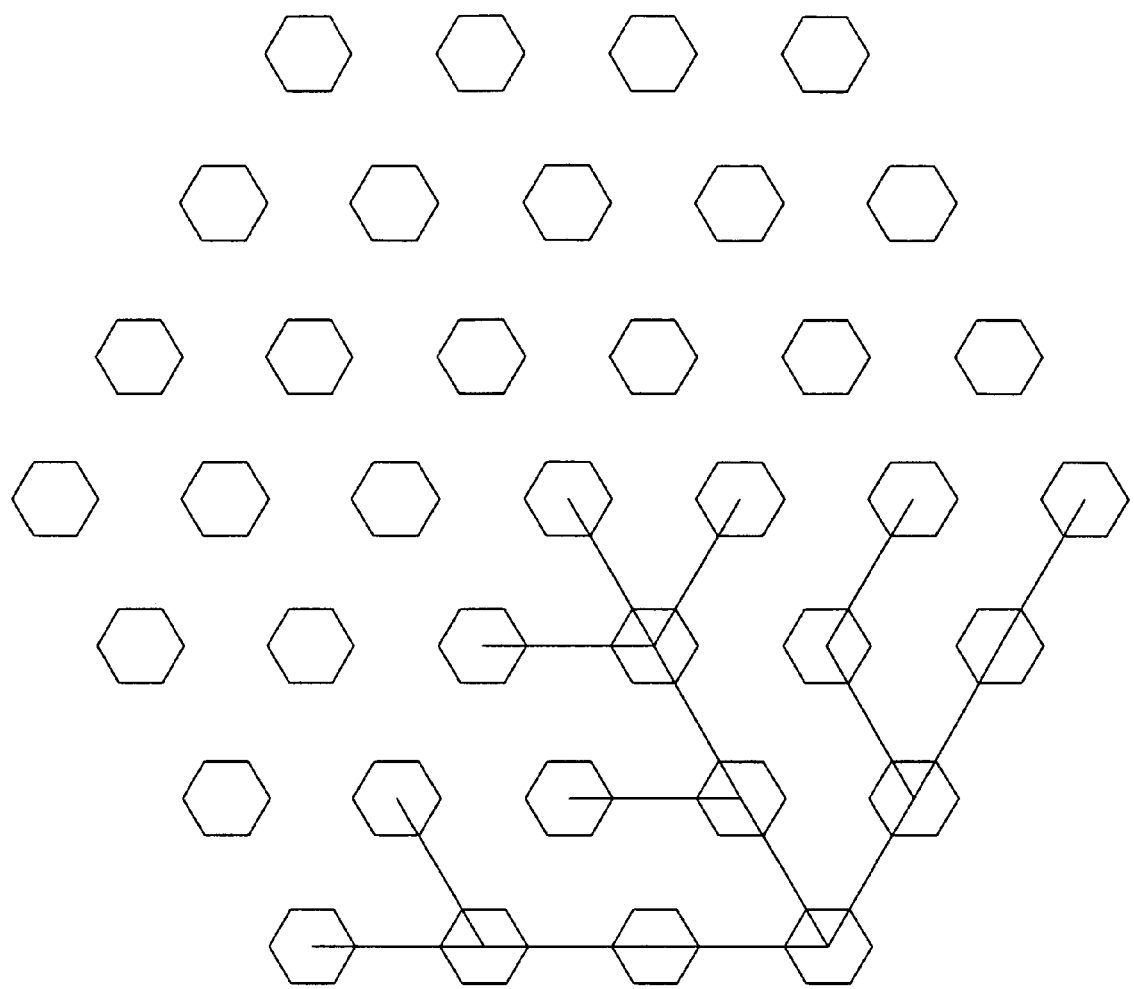
Figure 47:
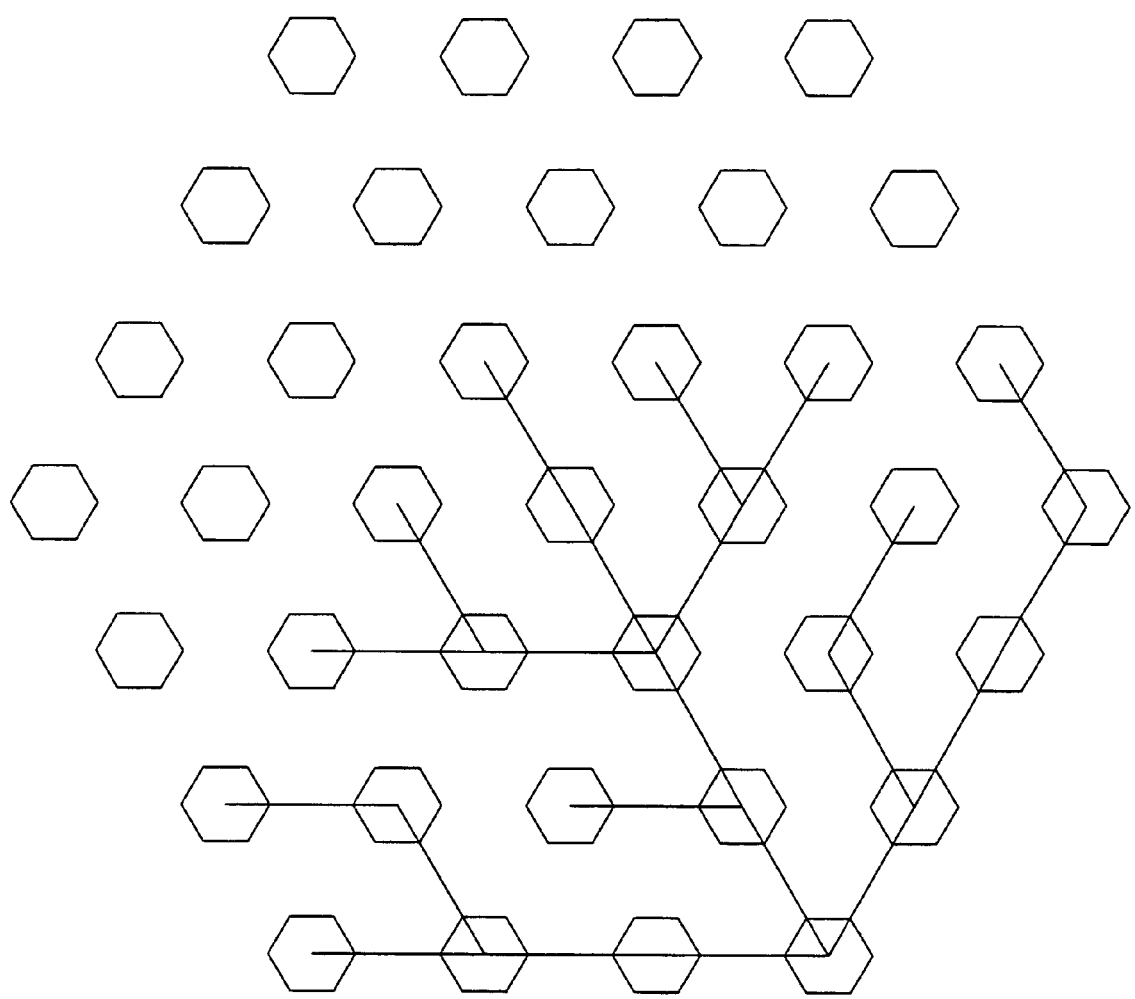
Figure 48:
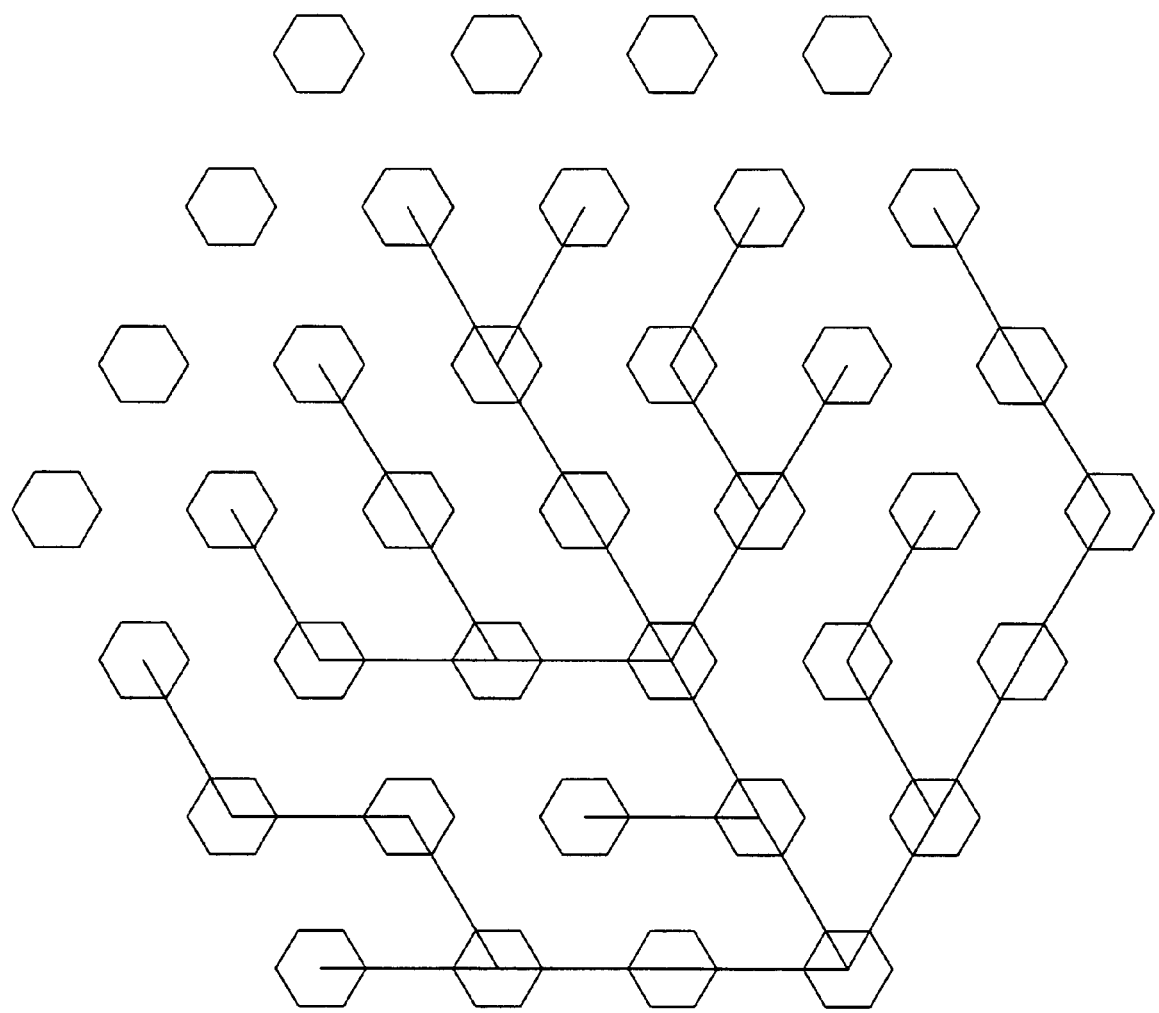
Figure 49:
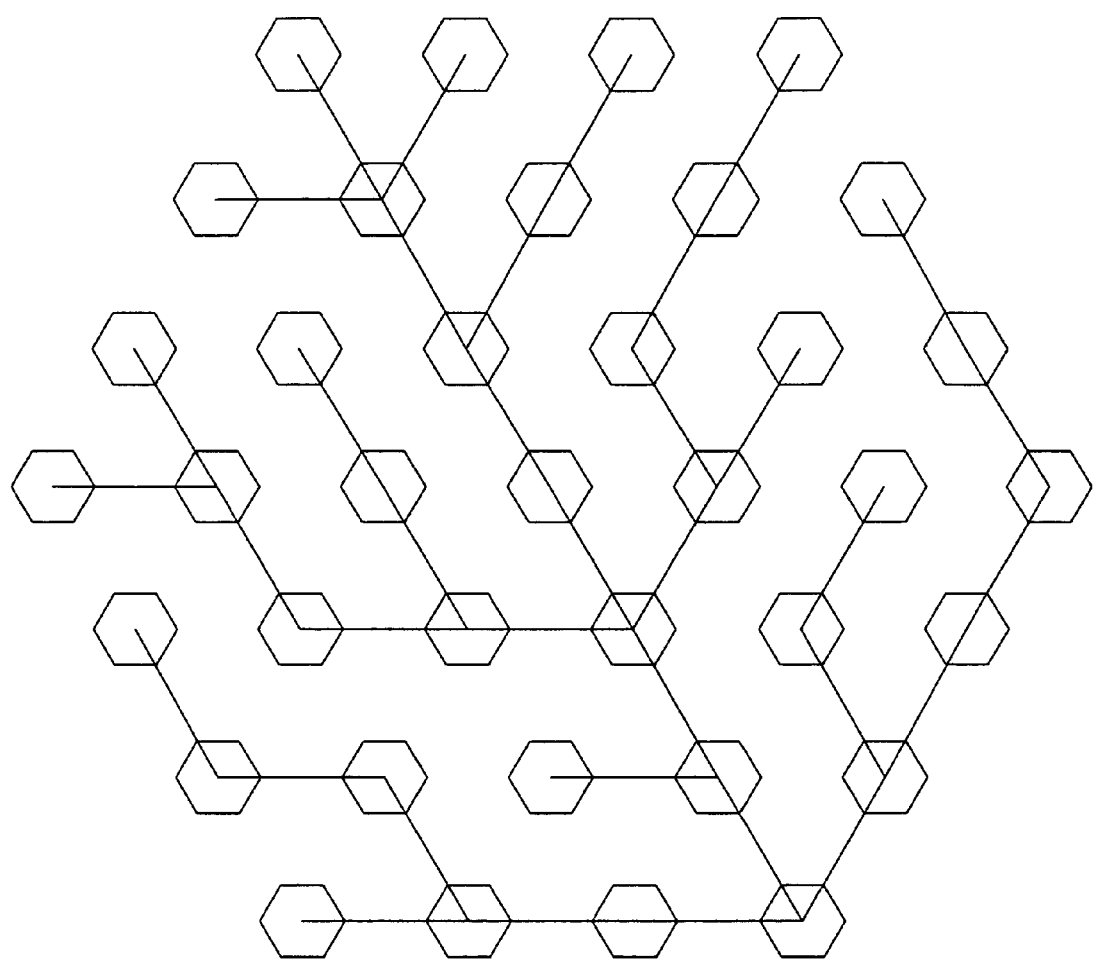
Figure 50:
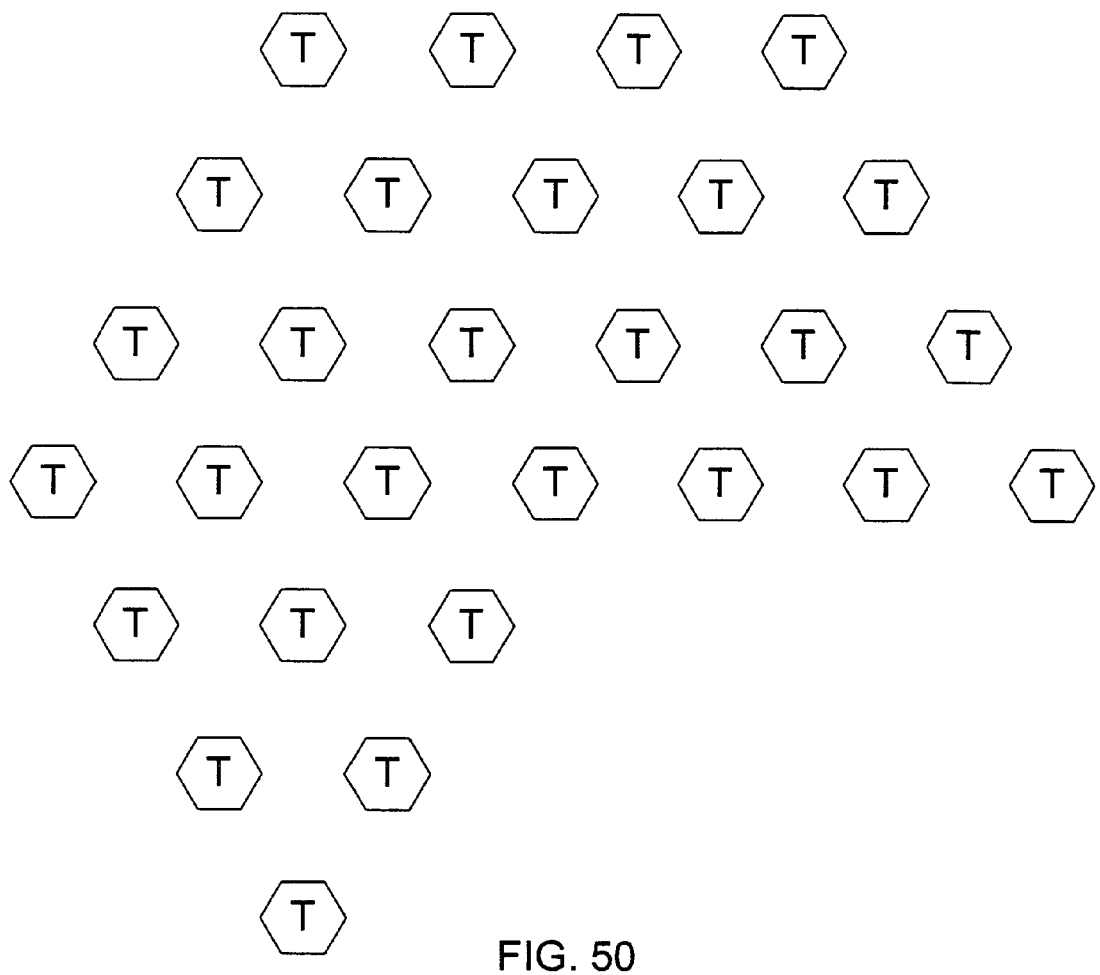
FIGS. 50-71 illustrate a process of a group of nodes obtained tree information from neighboring nodes and getting on the trees.
Figure 51:
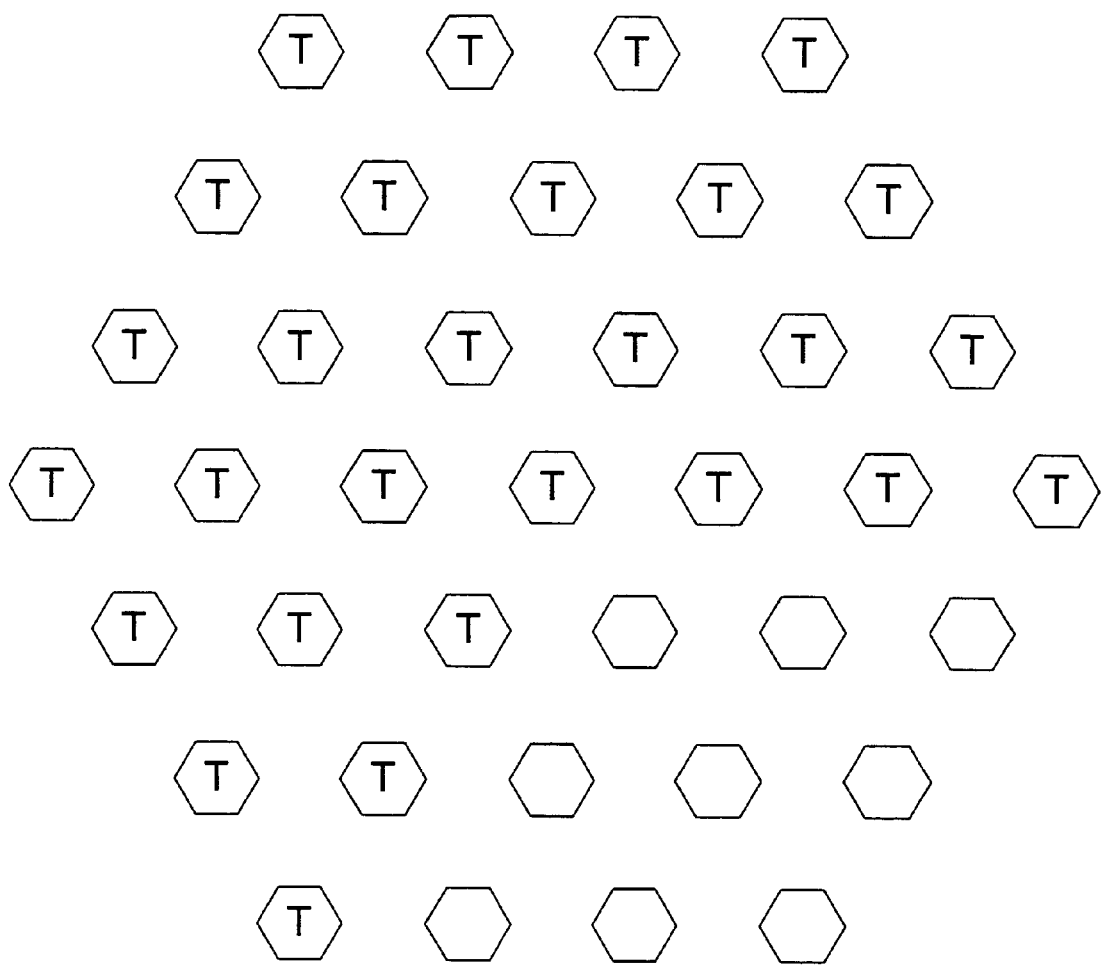
Figure 52:
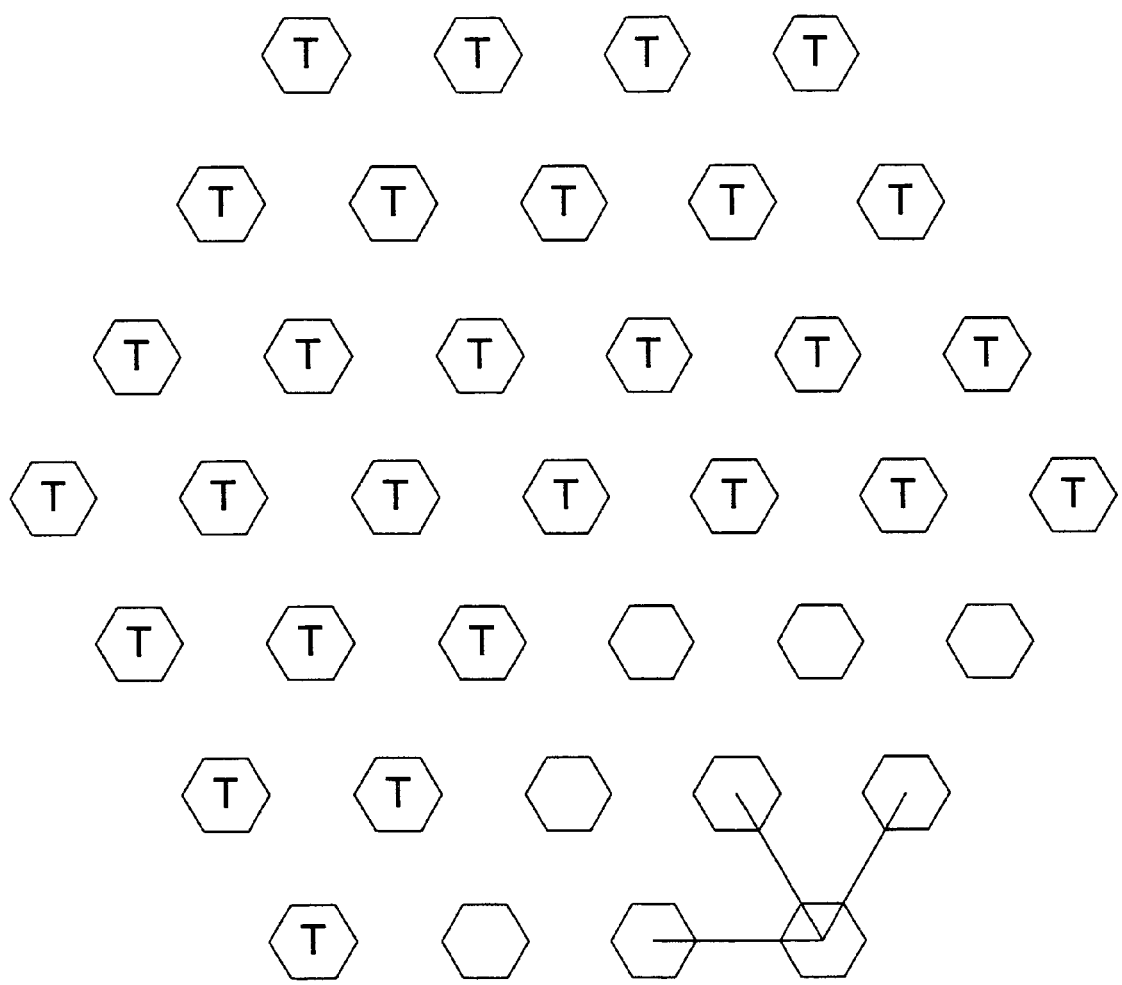
Figure 53:
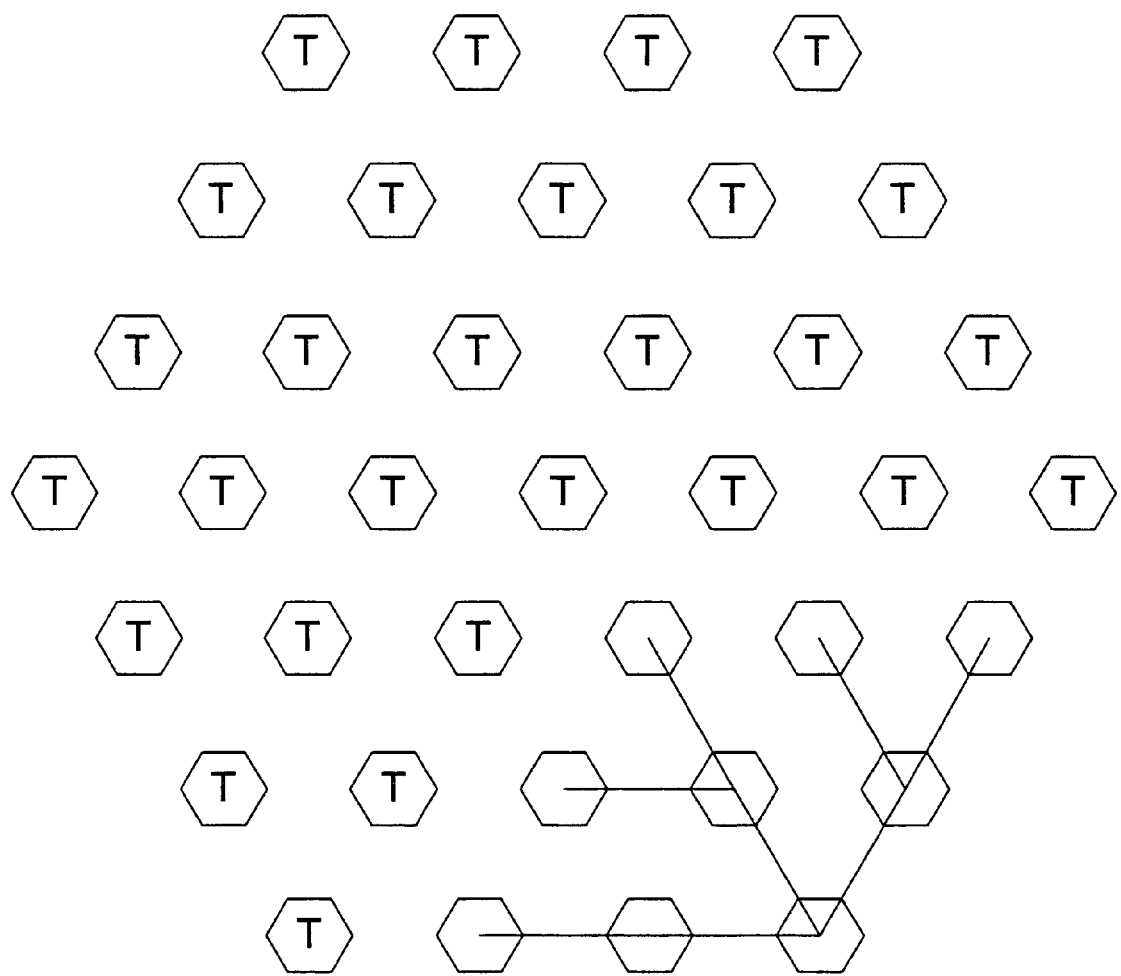
Figure 54:
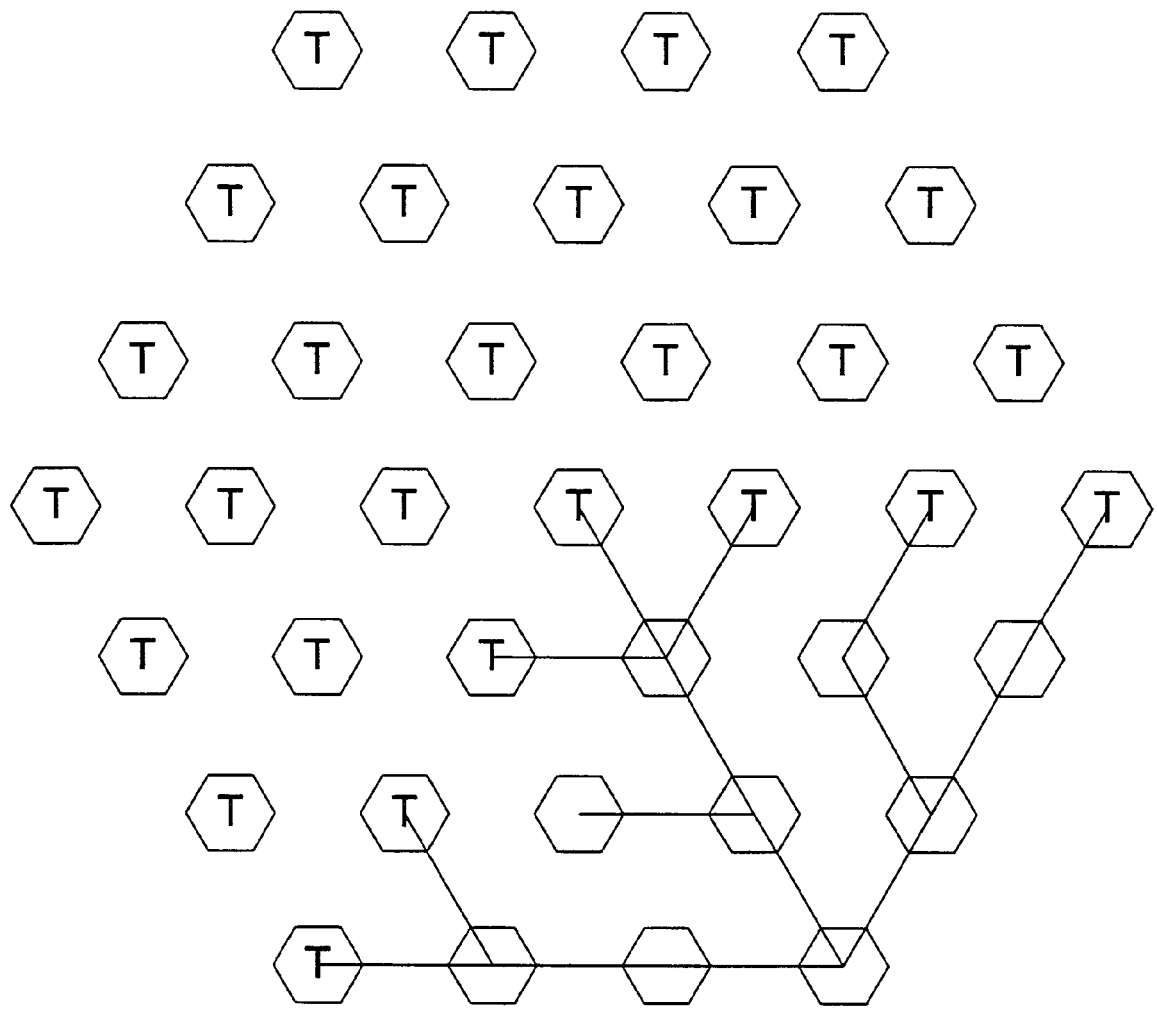
Figure 55:
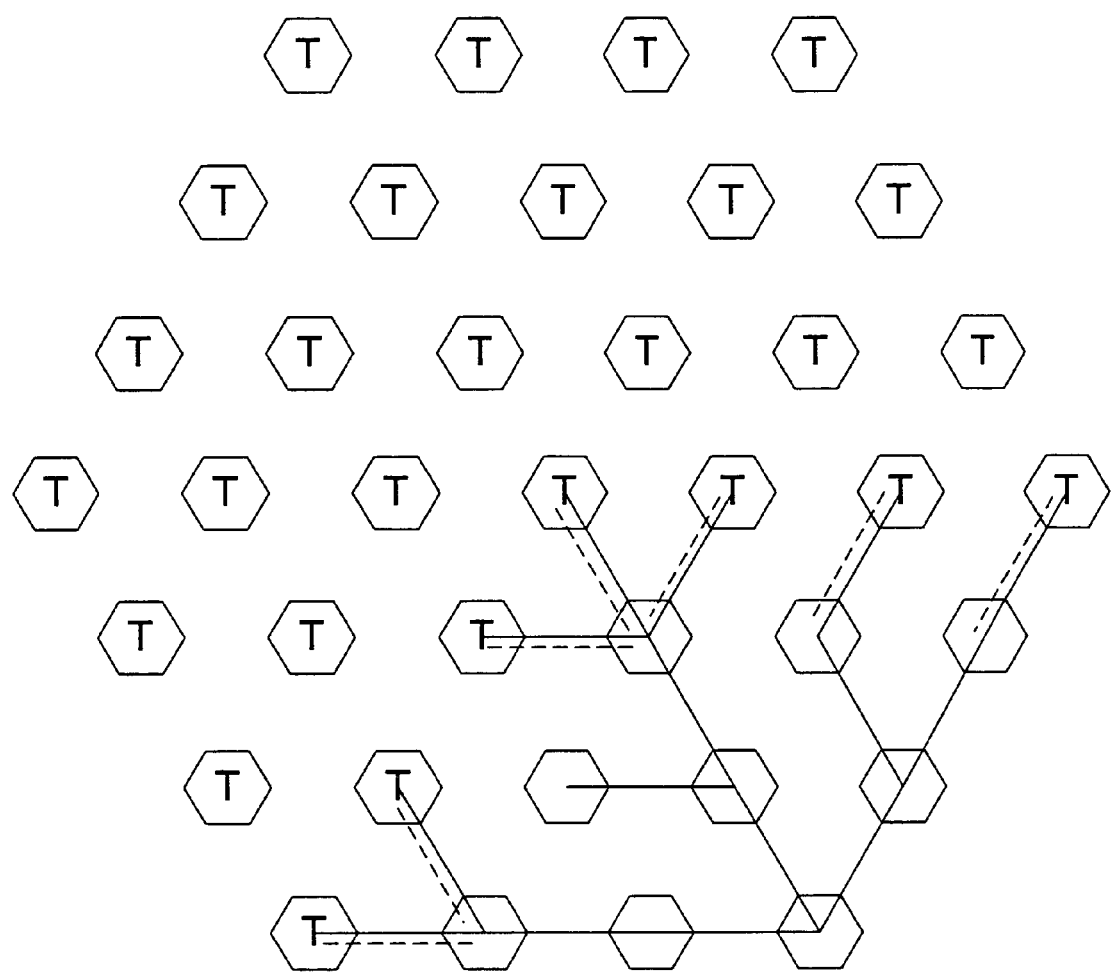
Figure 56:
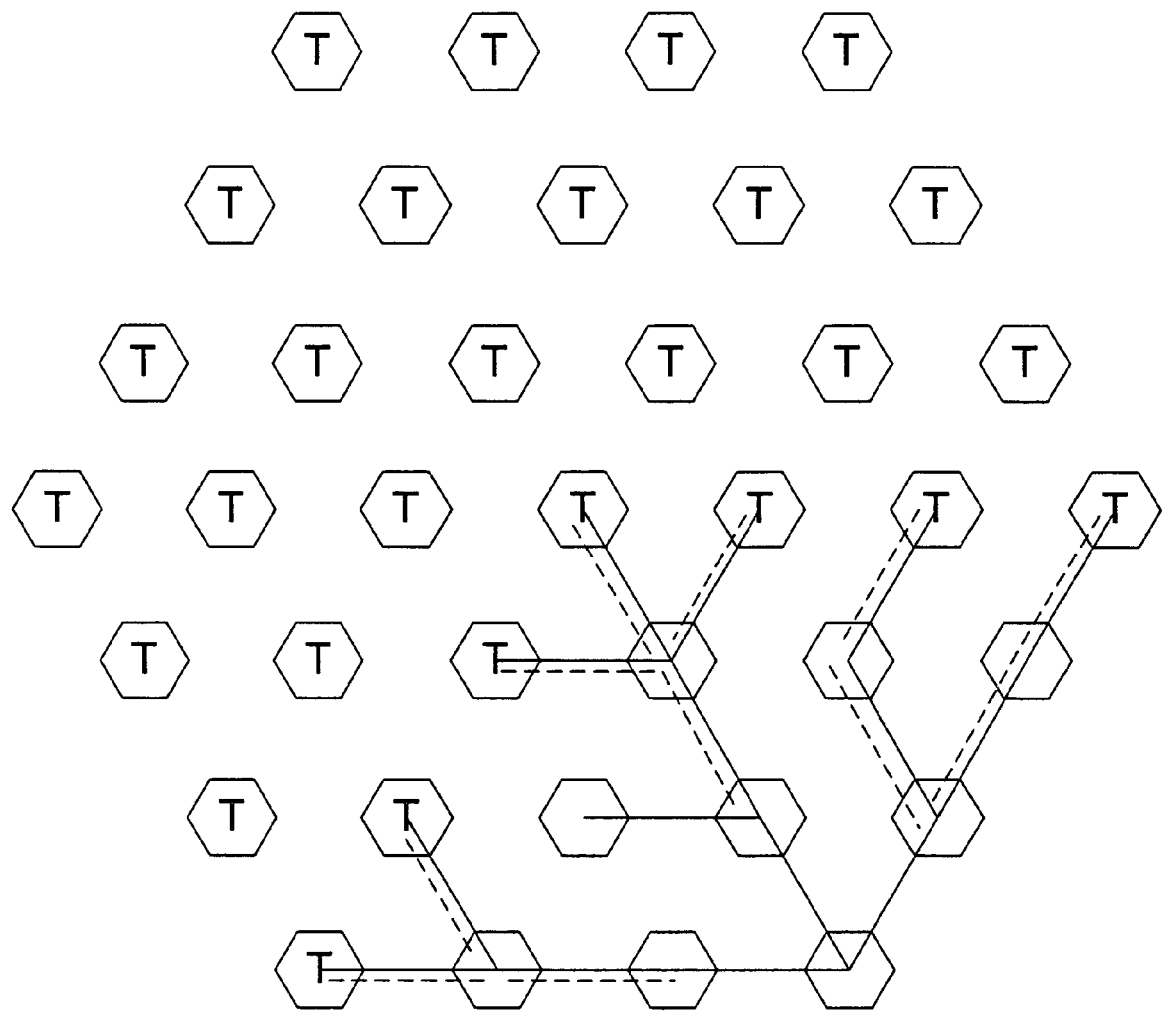
Figure 57:
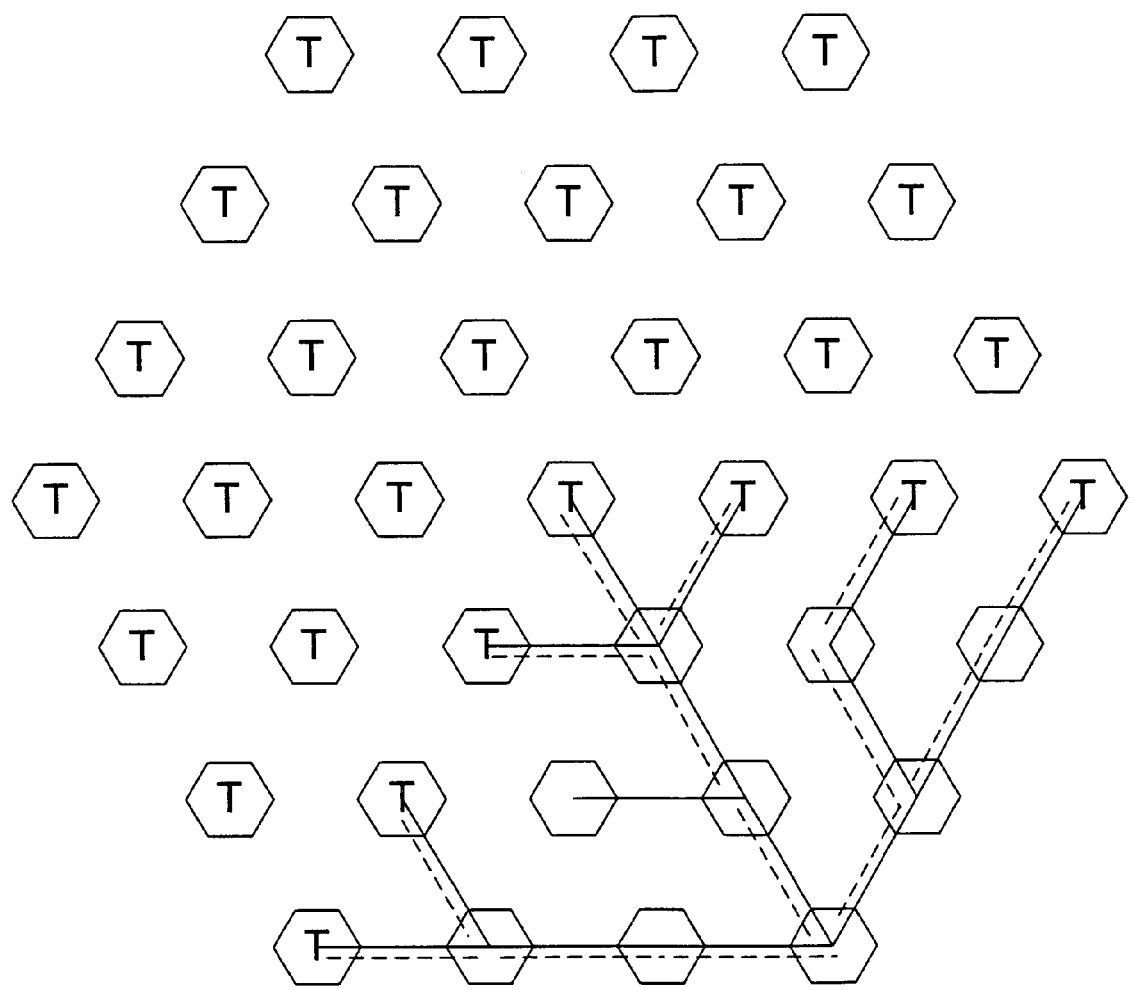
Figure 58:
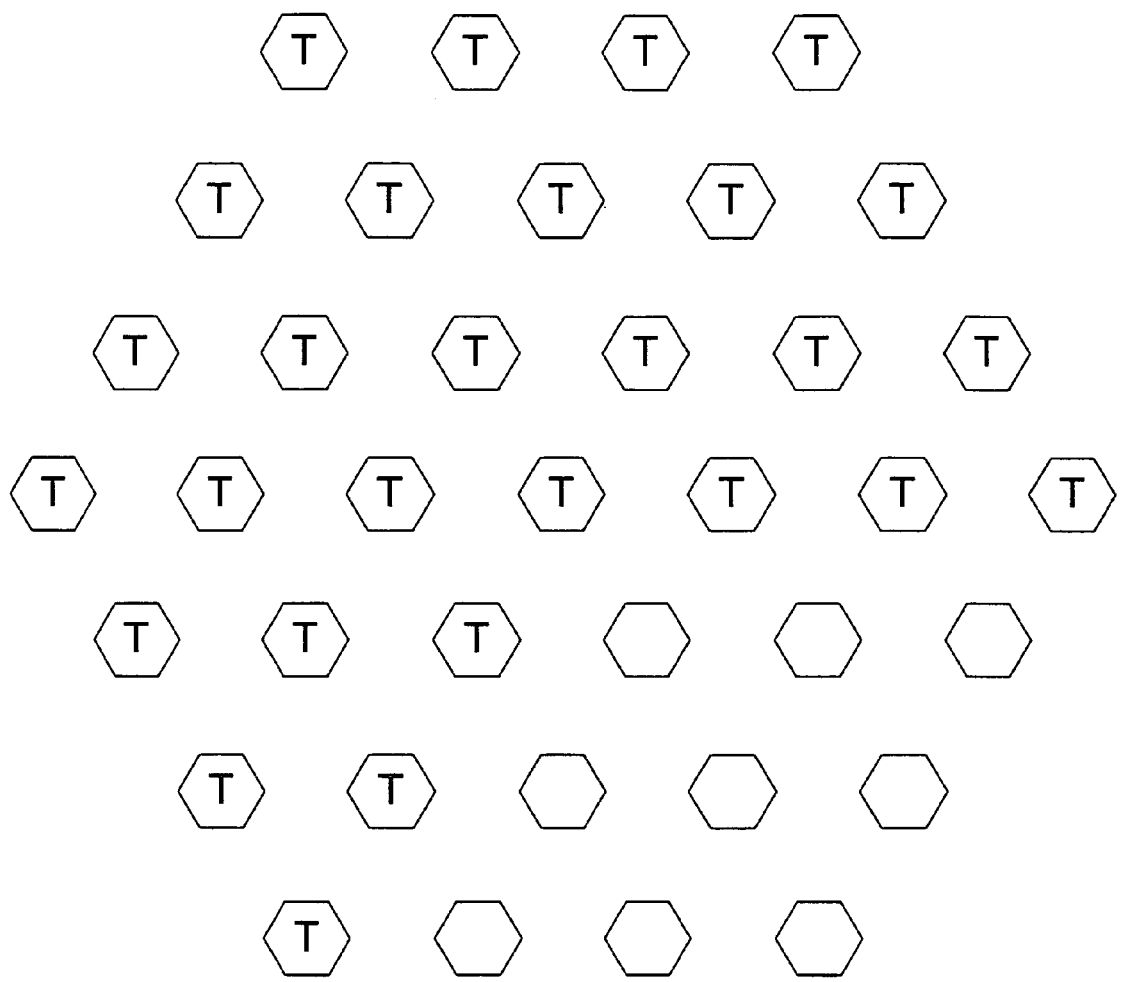
Figure 59:
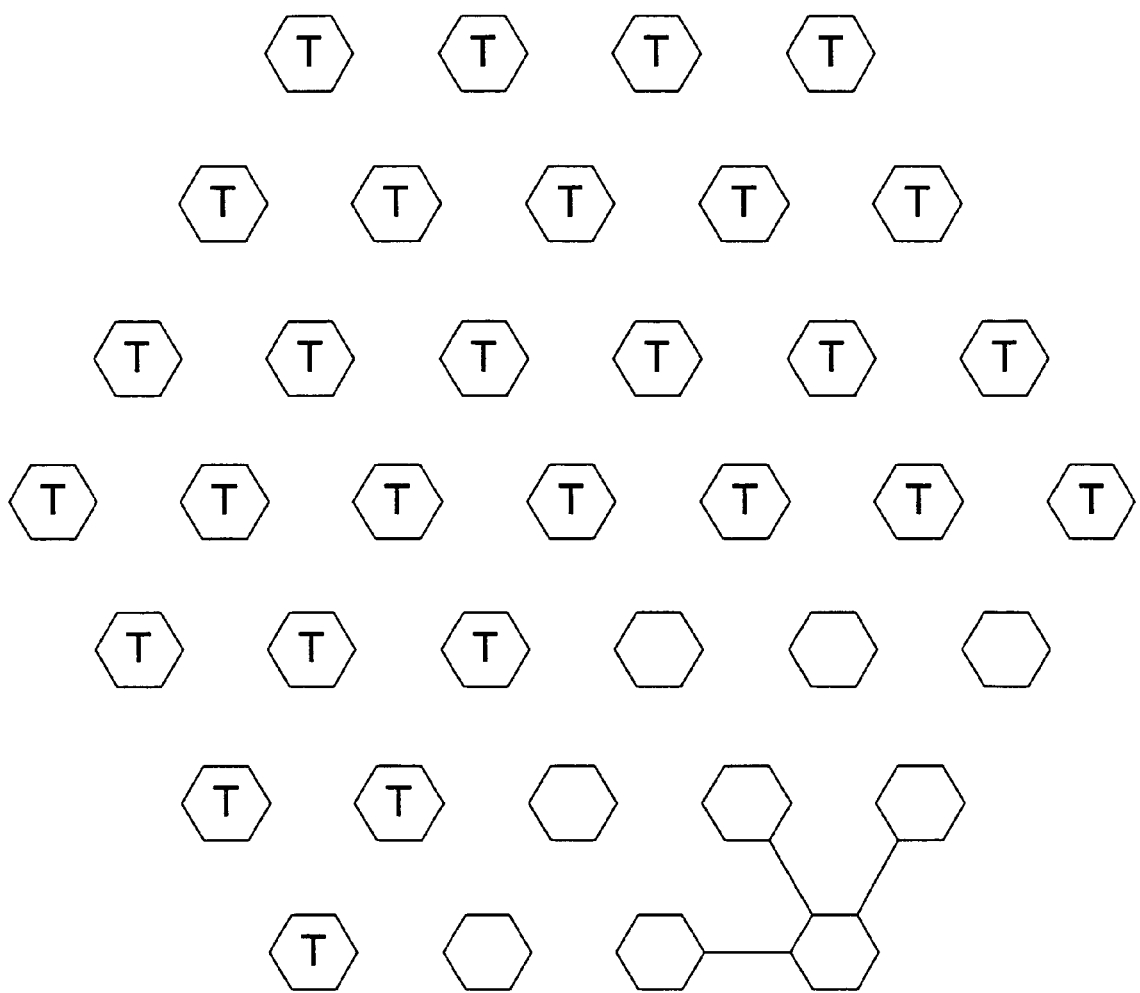
Figure 60:
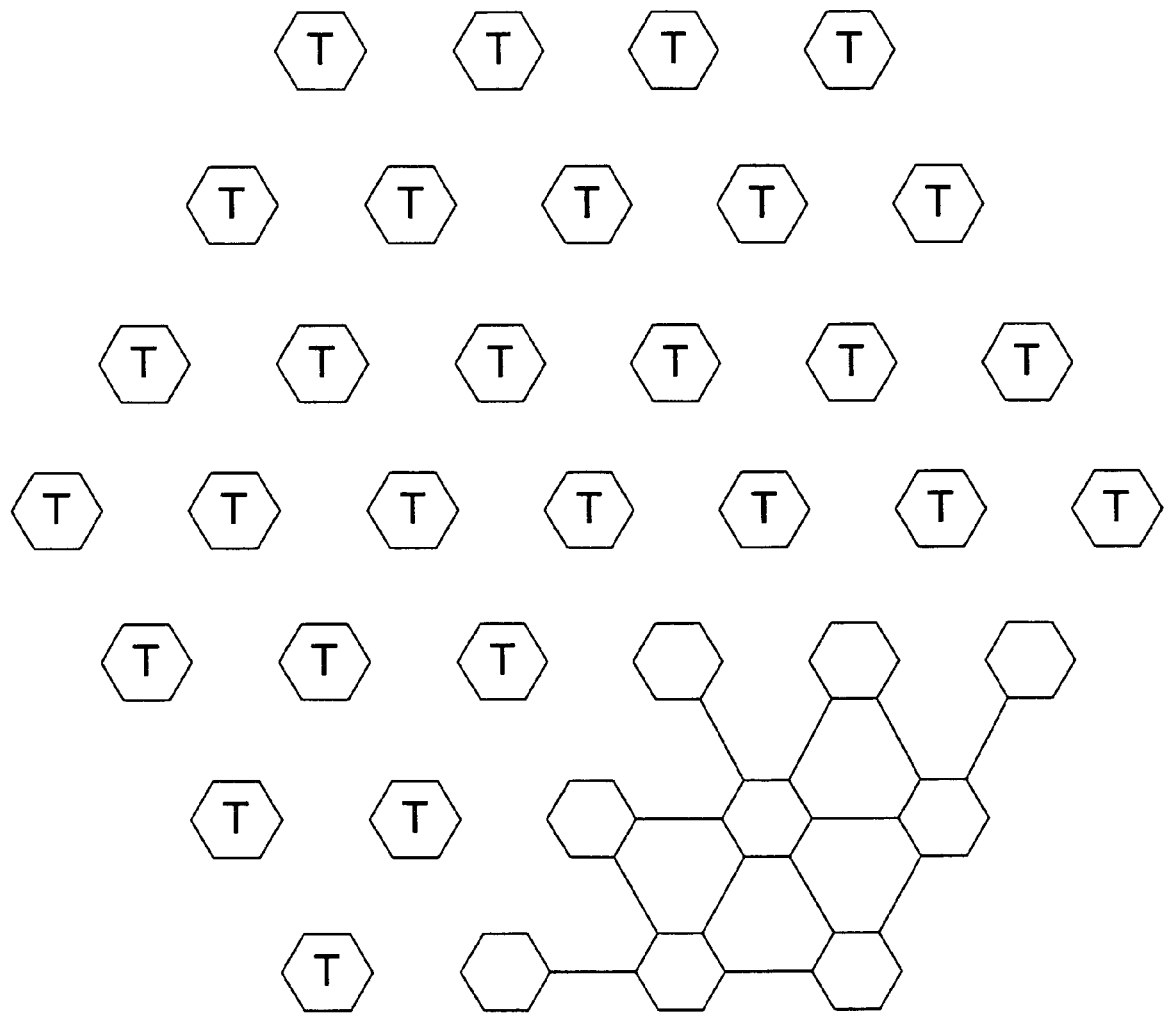
Figure 61:
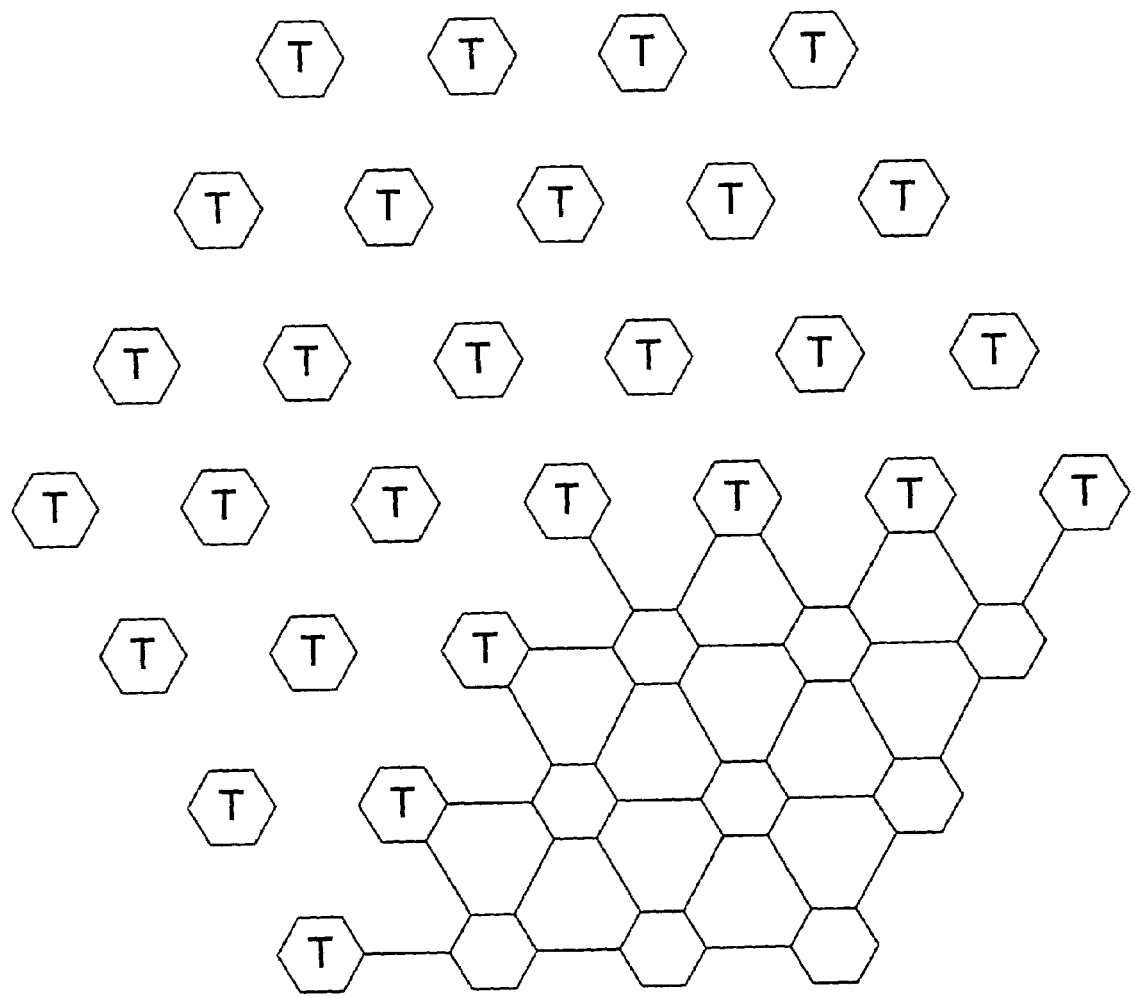
Figure 62:
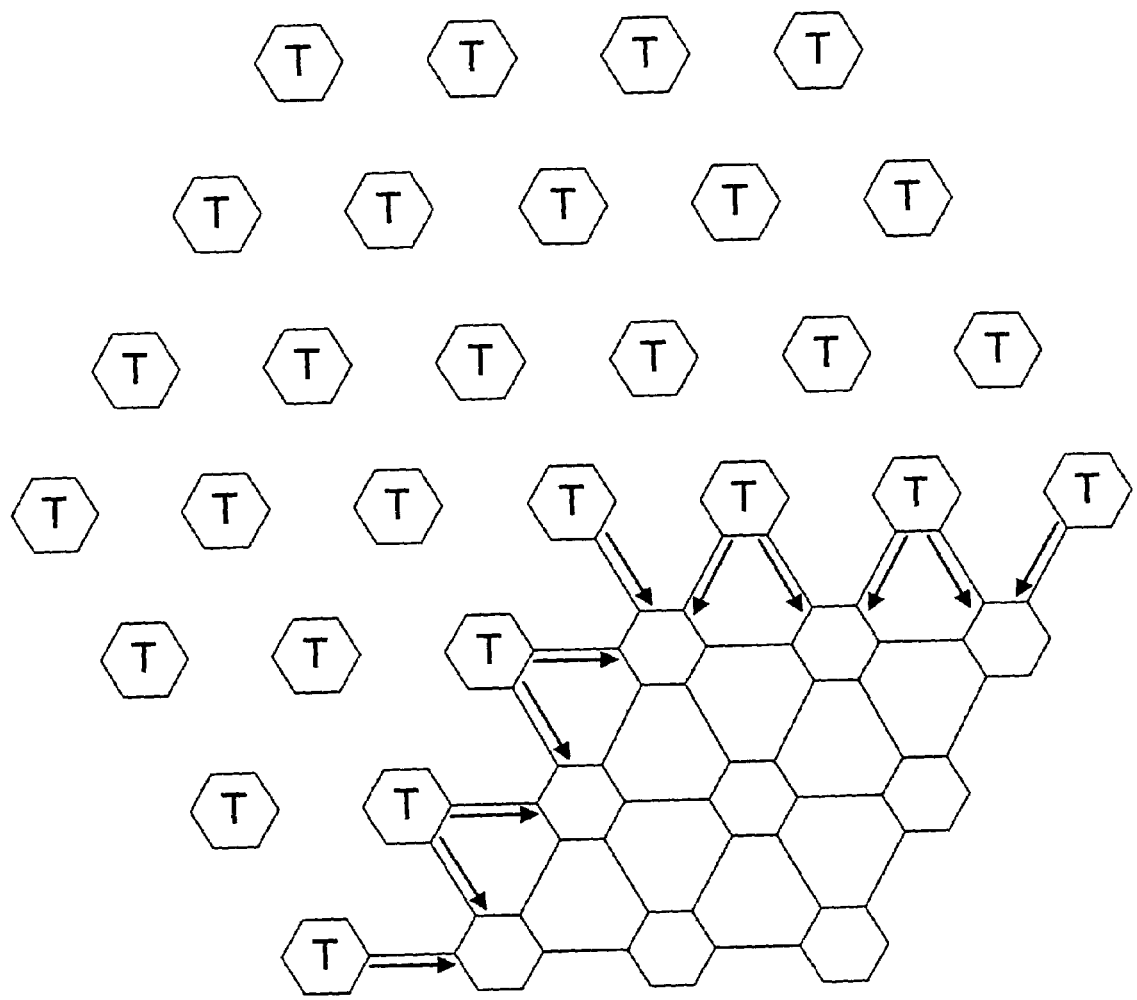
Figure 63:
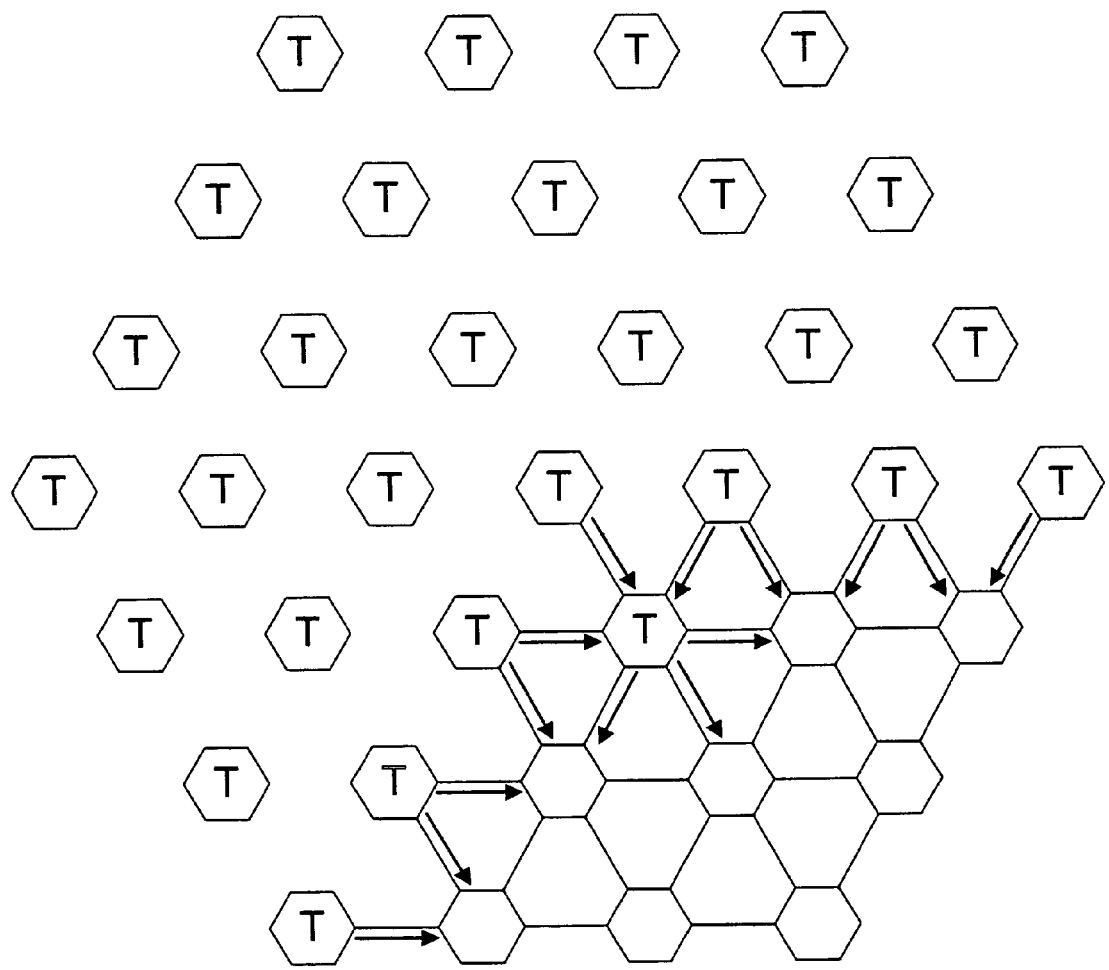
Figure 64:
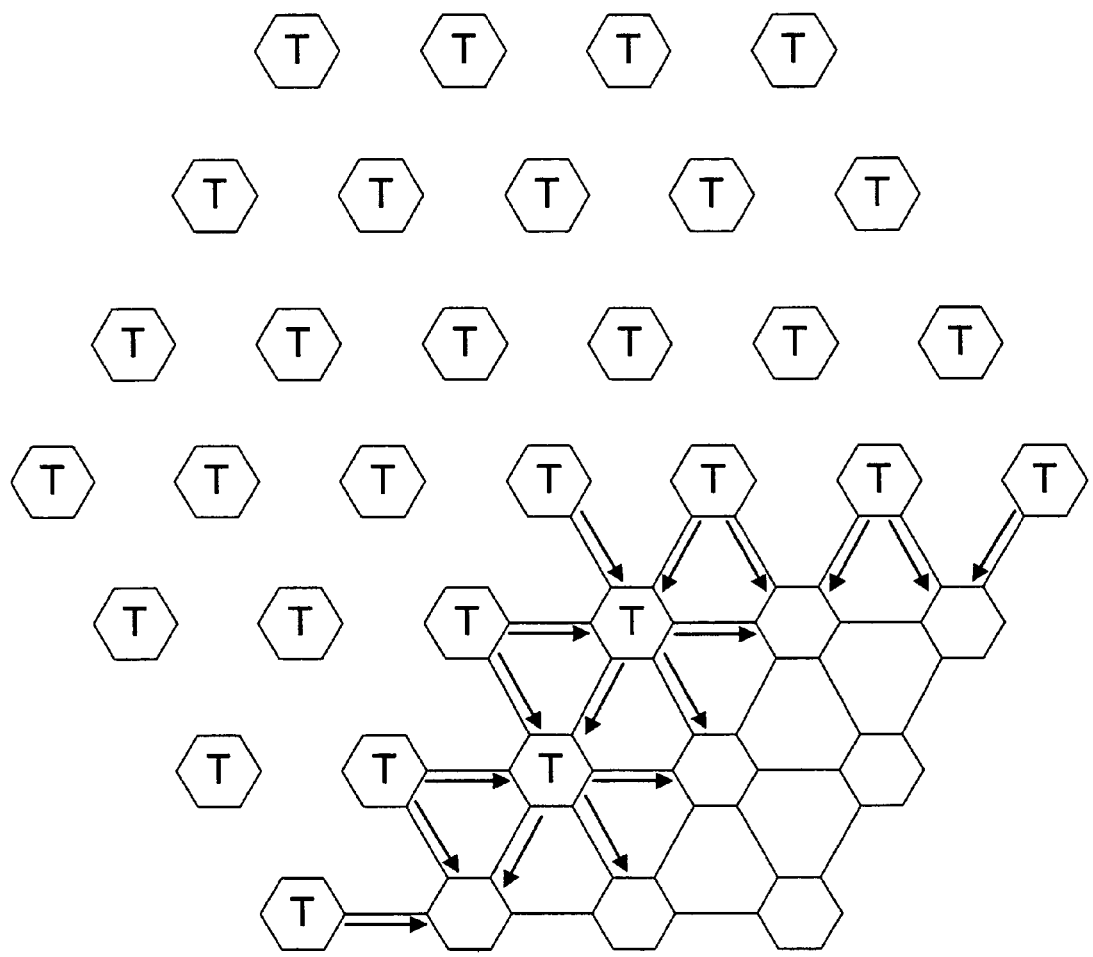
Figure 65:
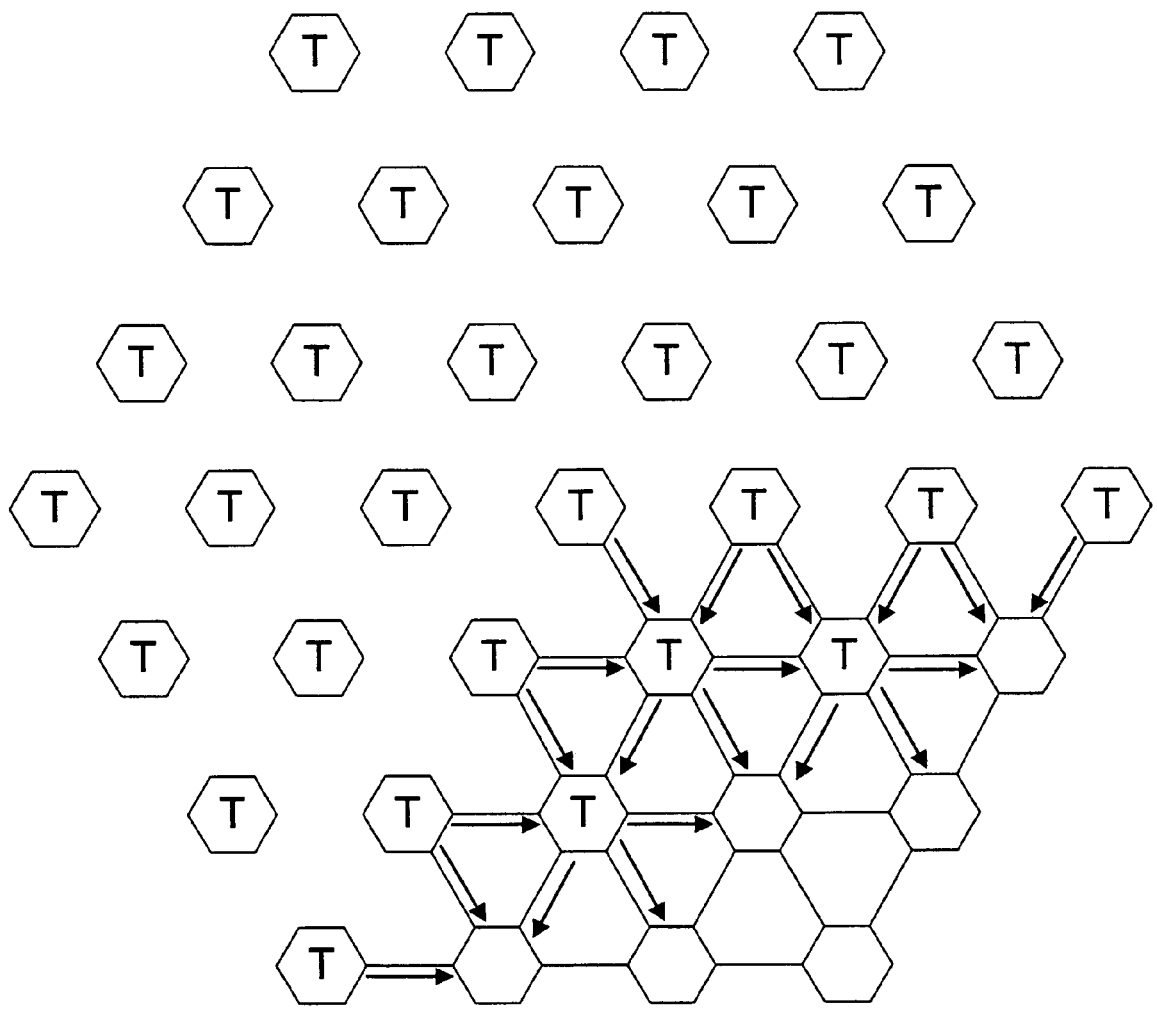
Figure 66:
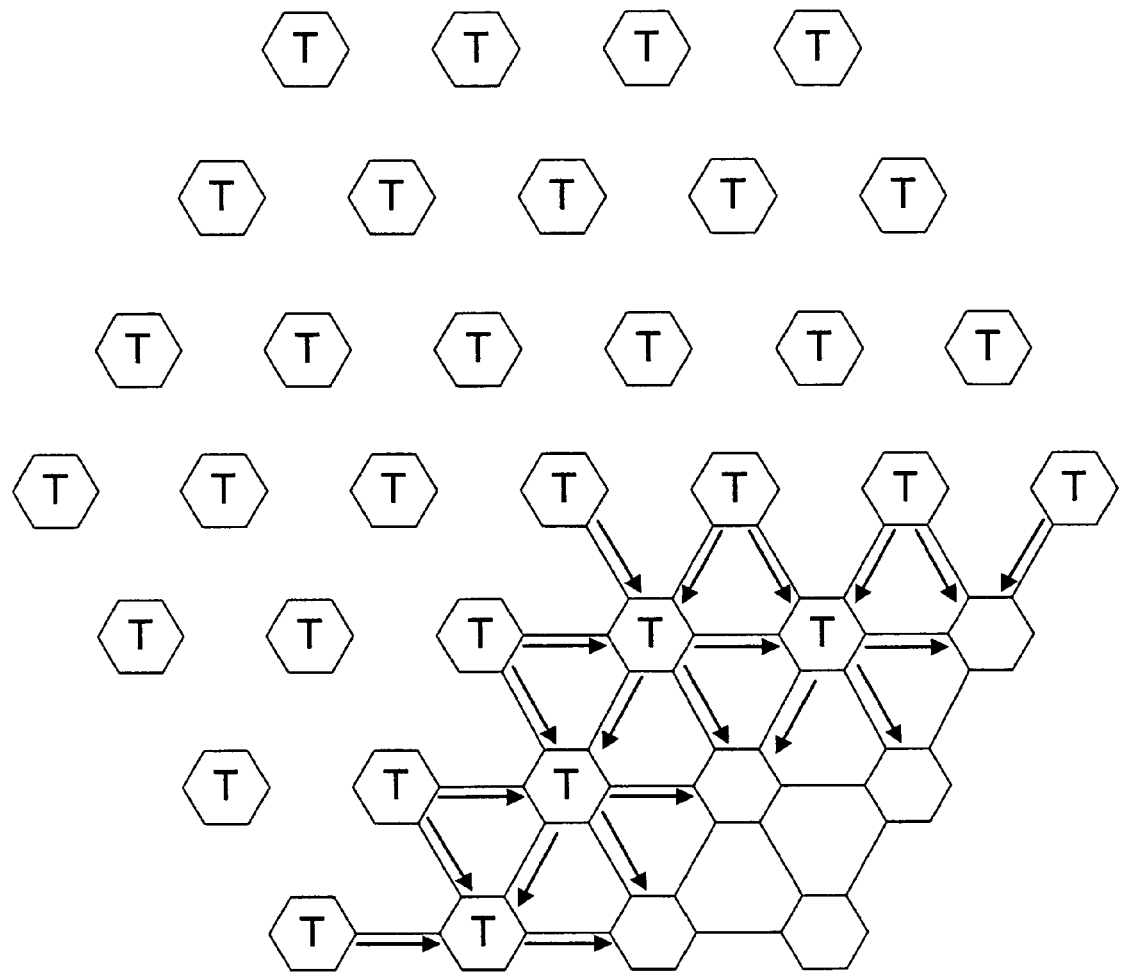
Figure 67:
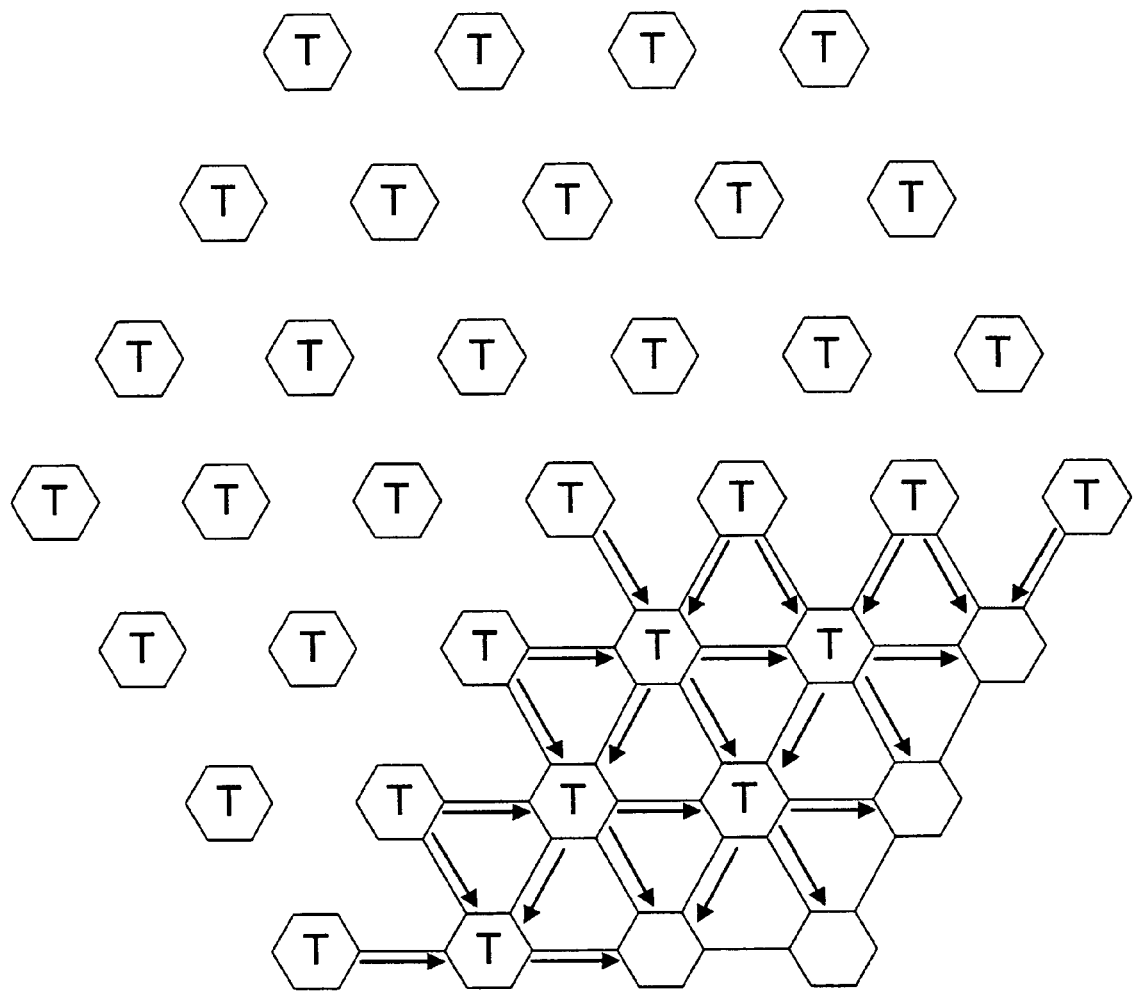
Figure 68:
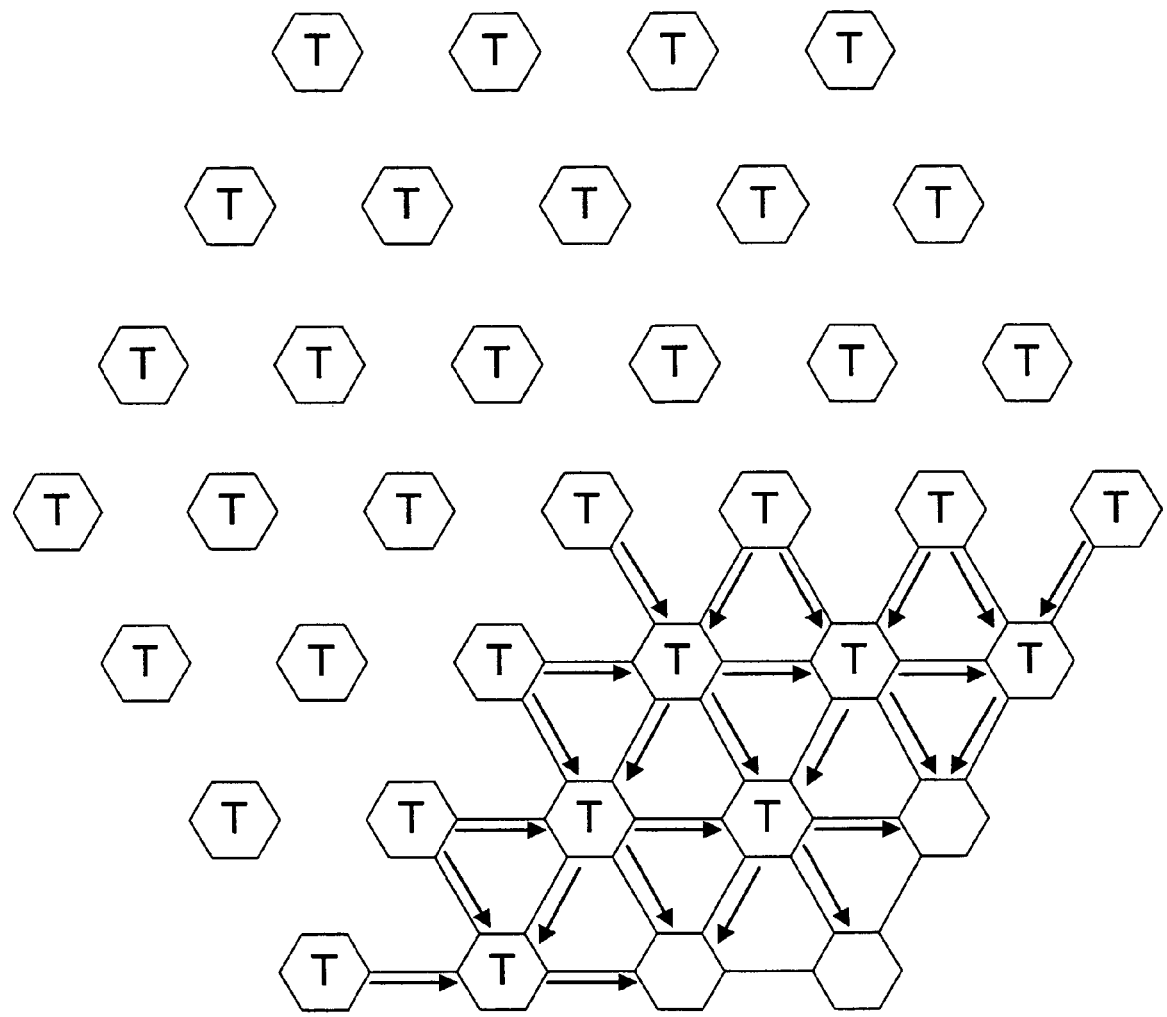
Figure 69:
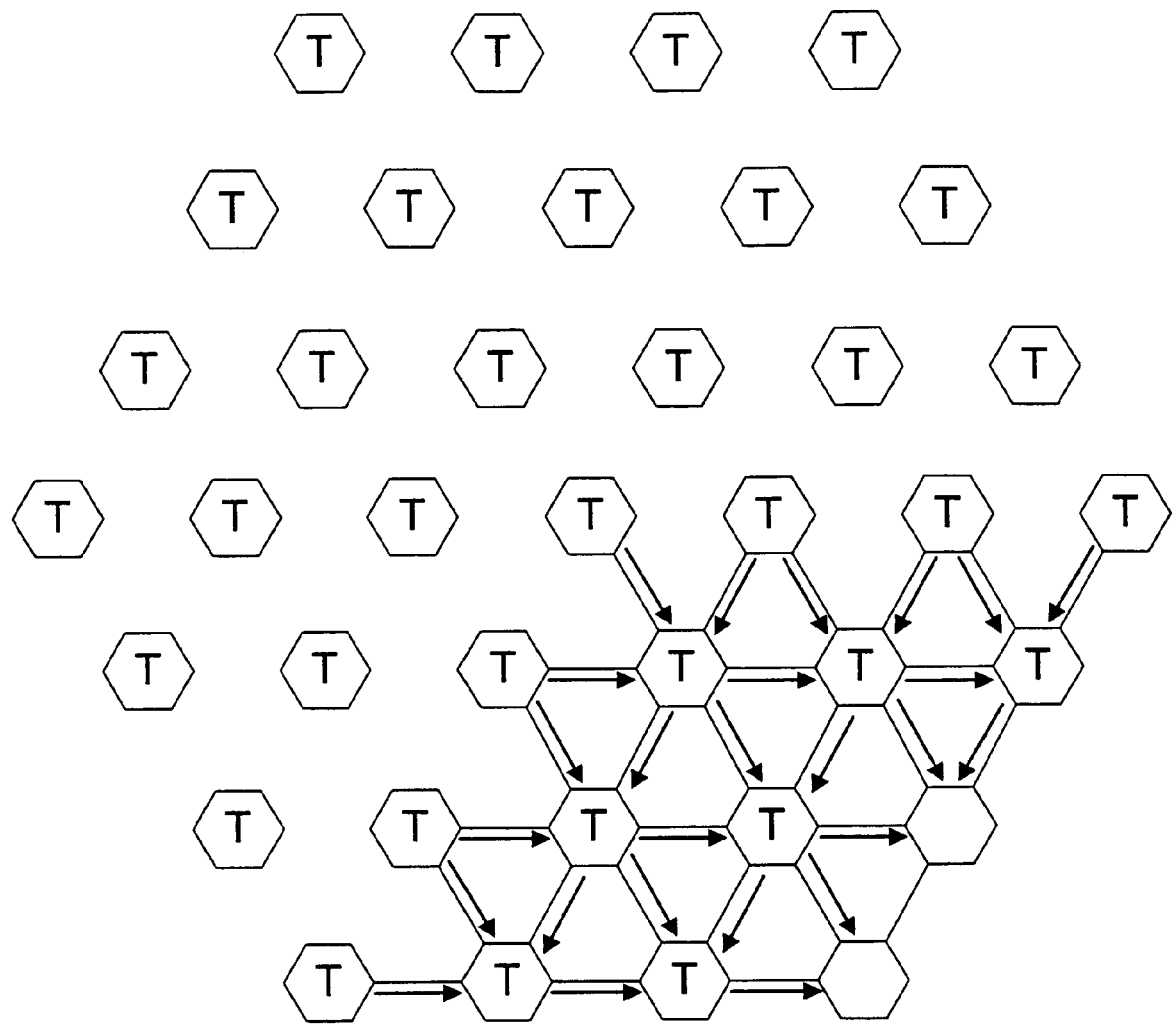
Figure 70:
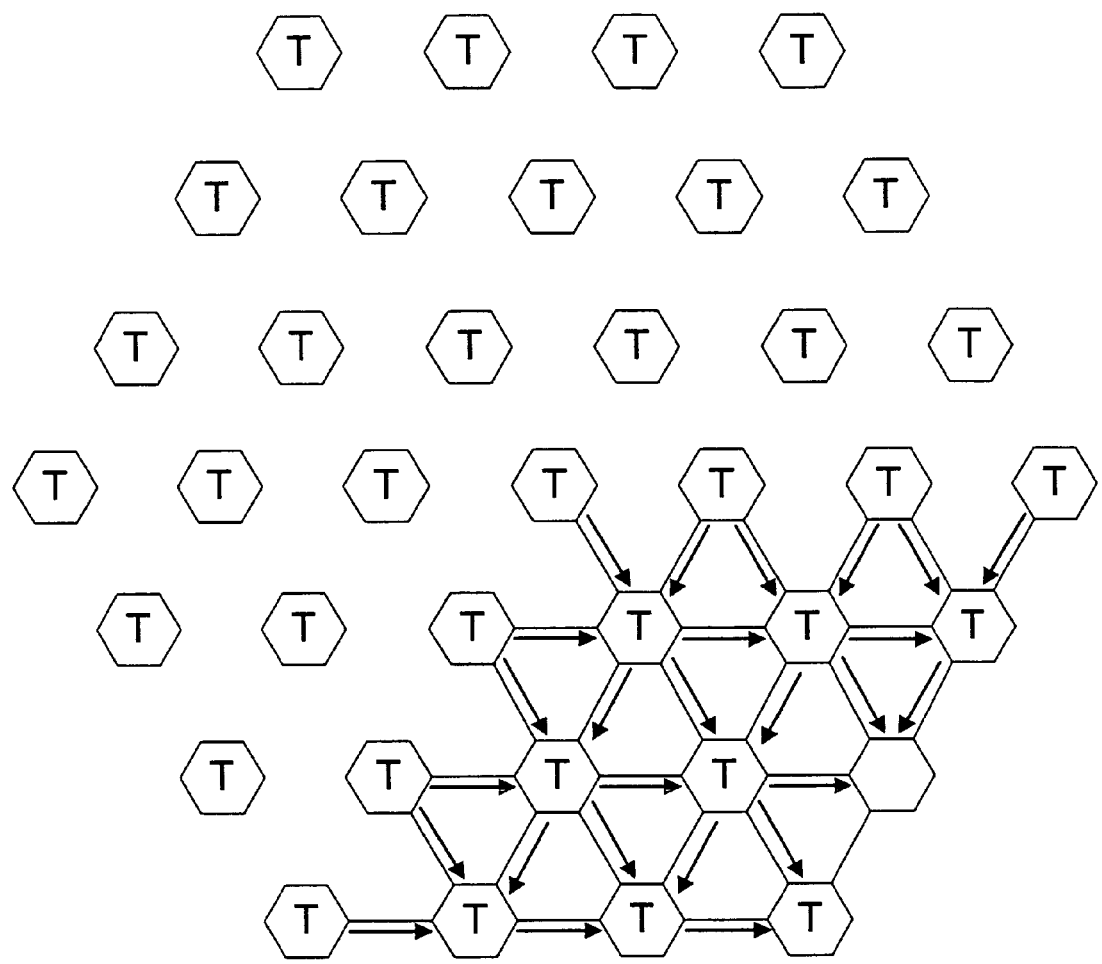
Figure 71:
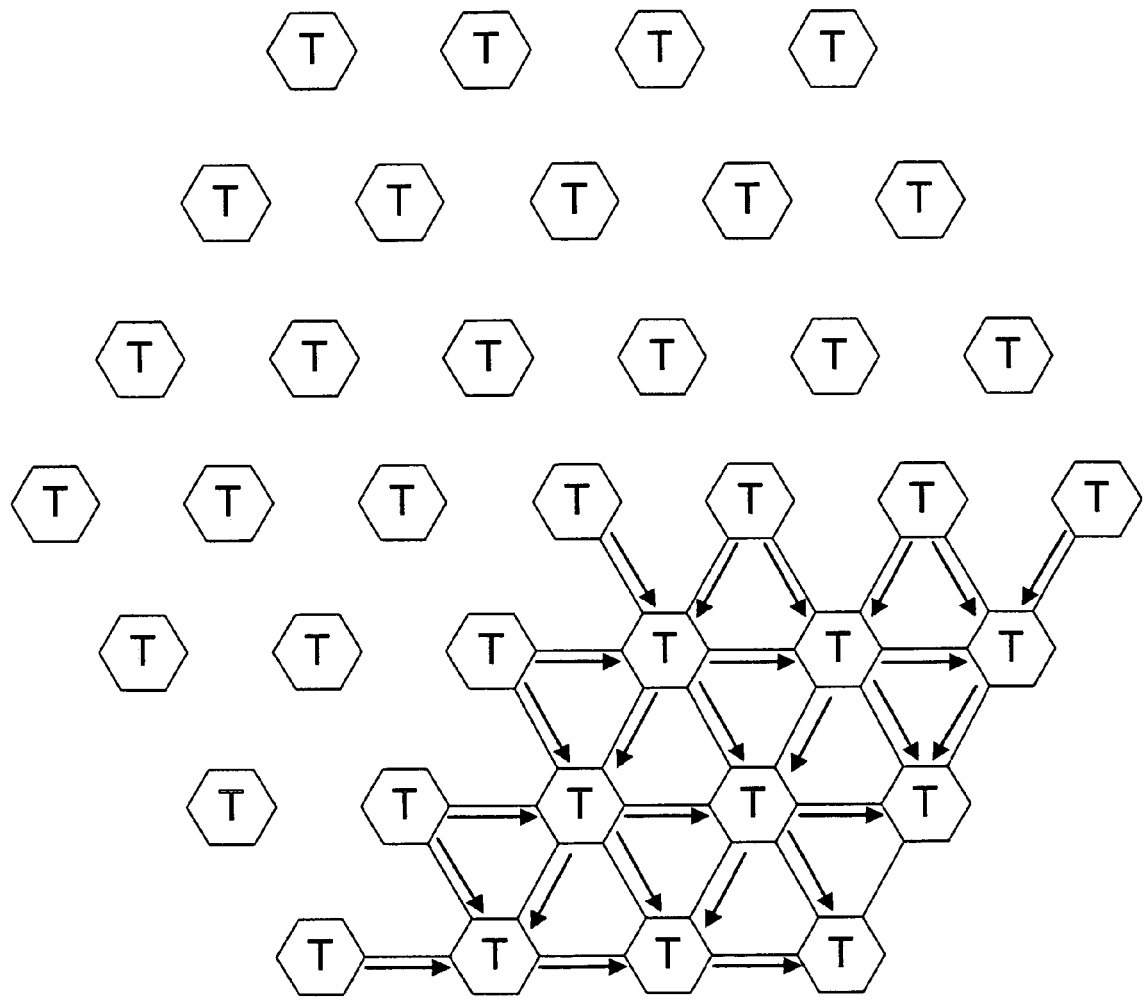

FIG. 41 illustrates a state machine showing state changes for the fully built status. As shown, when a new node joins the network and gets on all trees (all fully built trees), each of the trees and all its roles are marked as fully built. Also, once a recovery operation completes for building routes to a particular role, the role is marked as fully built. FIG. 41 also illustrates that when a link fails, all roles that have routes over the failed link (and the trees with which the roles are associated) are marked as not fully built. Also, in some situations when breaking routes or reversing routes, roles may be marked as not fully built.

Broadcast Operations

In one embodiment, broadcast operations may be performed at various times during the tree building process. Several types of broadcast operations may be performed, including a broadcast on all links, a broadcast on a given tree, or a broadcast on all role routes.

For the broadcast on all links operation, an initial node may send a message on each of its links, identifying the message with a unique message ID. Each receiving node may then recursively send the message on each of its links. In one embodiment, each receiving node may be allowed to modify the message. Receiving nodes may maintain a hashmap keyed by message ID so that messages can be dropped to eliminate cycles. The message is thus effectively sent to all nodes in a tree fashion. One exemplary use of the broadcast on all links operation is to send a "Got trees?" message, i.e., a message sent during the process of a node getting on all trees at node startup time.

The broadcast on tree operation may be performed similarly to the broadcast on all links operation, except a specific tree is specified. Each time a node forwards the message, the specified tree is used, provided that the tree is fully built for that node. If the tree is not fully built for that node, then the message may be sent on all of the node's links. Cycles may be eliminated similarly as for the broadcast on all links operation.

The broadcast on role routes operation may be performed similarly to the broadcast on all links operation, except a specific role on a specific tree is specified. Each receiving node may forward the message on all the links that correspond to routes to the specified role, provided that the role is fully built for that node. If the role is not fully built for that node, then the message may be sent on all of the node's links. Cycles may be eliminated similarly as for the broadcast on all links operation. One exemplary use of the broadcast on role routes operation is to recover routes to the role.

Getting on All Trees

When a node joins a network, the network may already have trees unless the network is new. In one embodiment, the following process may be performed for a node to get on all trees. First, the node may broadcast a "Got trees?" message using the broadcast on all links operation described above. If no response is received within a given timeout interval, then the process may be done (since there are no trees). FIGS. 42-49 illustrate a tree building process when a group of nodes joins a network, and a tree spanning the nodes is built.

If it is determined that there are trees and the node is not on all trees, then the node may request all trees from each neighbor. If not on all trees, each neighbor may in turn request all trees from its neighbors in a recursive manner. Cycles may occur, but only one request to each neighbor is performed. Once a node is on all trees, the node may supply all the trees to each requesting neighbor. A receiver of trees may receive some trees from each neighbor to avoid getting all trees over one link. FIGS. 50-57 and 58-71 illustrate this process.

Hop Timing

In one embodiment, hop timing may be used to compute timeouts during the tree building process. A local hop time may be computed as a running weighted average of local ping times. In one embodiment, each ping affects 10% of the next computed local hop time and the previous local hop time affects 90% of the next computed local hop time. The ping rate may be configurable. In one embodiment, pings may be performed once per minute. The local hop time may be piggybacked on every builder message.

A global hop time may be computed based on the local hop times. In one embodiment, the piggybacked local hop time affects 10% of the next computed global hop time, and the previous global hop time affects 90% of the next computed global hop time.

Timeouts for the tree building process may be computed as a function of the maximum number of expected total remaining hops and the global hop time.

Routing

As described above, in one embodiment of the T&R layer, a message routing engine 134 may manage the routing of messages. The message routing engine on a particular node may be invoked by a client application using an application programming interface (API) or may be invoked in response to receiving a message via a link.

Client applications which receive a message from a sender may reply to the message with one or more responses. The response(s) may be routed back to the sender over the same route that was used to send the message. The API for sending a response may include parameters specifying the ID of the message being responded to, the response (e.g., an array of bytes and size of the array), as well as parameters specifying various options.

Figure 72:
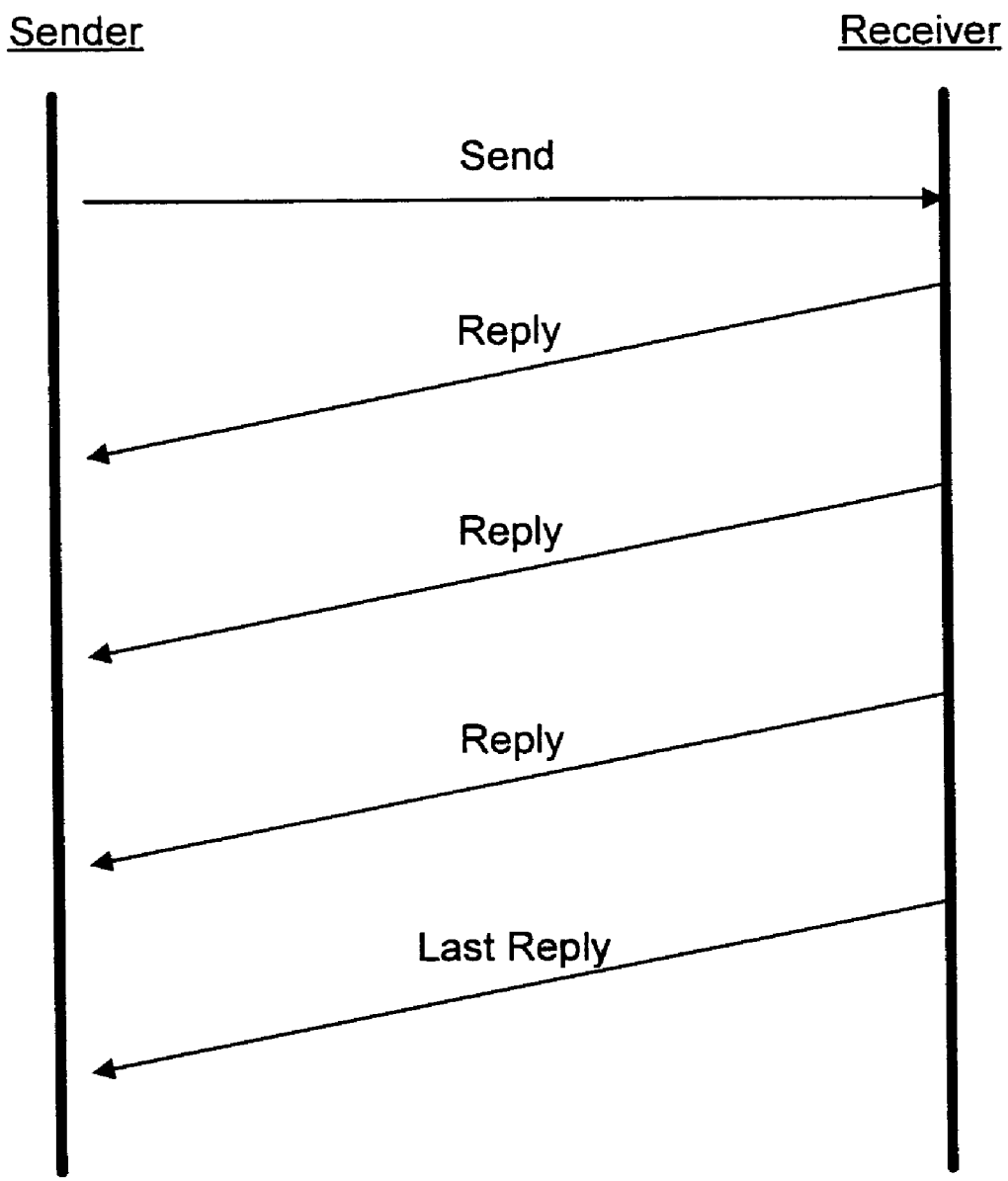
FIG. 72 illustrates an exemplary session.

In one embodiment, the concept of a session may be utilized to allow a message sender to receive multiple responses to a message. A "last reply" Boolean value (e.g., a value included in the response header or a parameter passed when sending a response) may be set to True when the last response to the message is sent. FIG. 72 illustrates an exemplary session. As shown, a sender sends a message to a receiver. The receiver sends four response messages back to the sender. In the fourth response message, "last reply" is indicated.

The message routing API may also allow a sender to send a message to only one role instance. The send process may be complete once a first role instance receives the message. (The session may continue until the last reply from that instance.)

In one embodiment, the T&R layer may support aggregate responses such that the sender receives a single response message which includes all responses from all receivers. The client application listener on the sender may not be invoked until all responses have been received. Thus, the client application may synchronize with multiple responses.

In another embodiment, the sender may receive each response as a separate response message. In one embodiment, the T&R layer may support one-way messaging so that responses by receivers of a message are not allowed. In one embodiment, each message may be handled using the messaging technique desired by the sender, e.g., aggregated responses, separate responses, or no responses.

Figure 73:
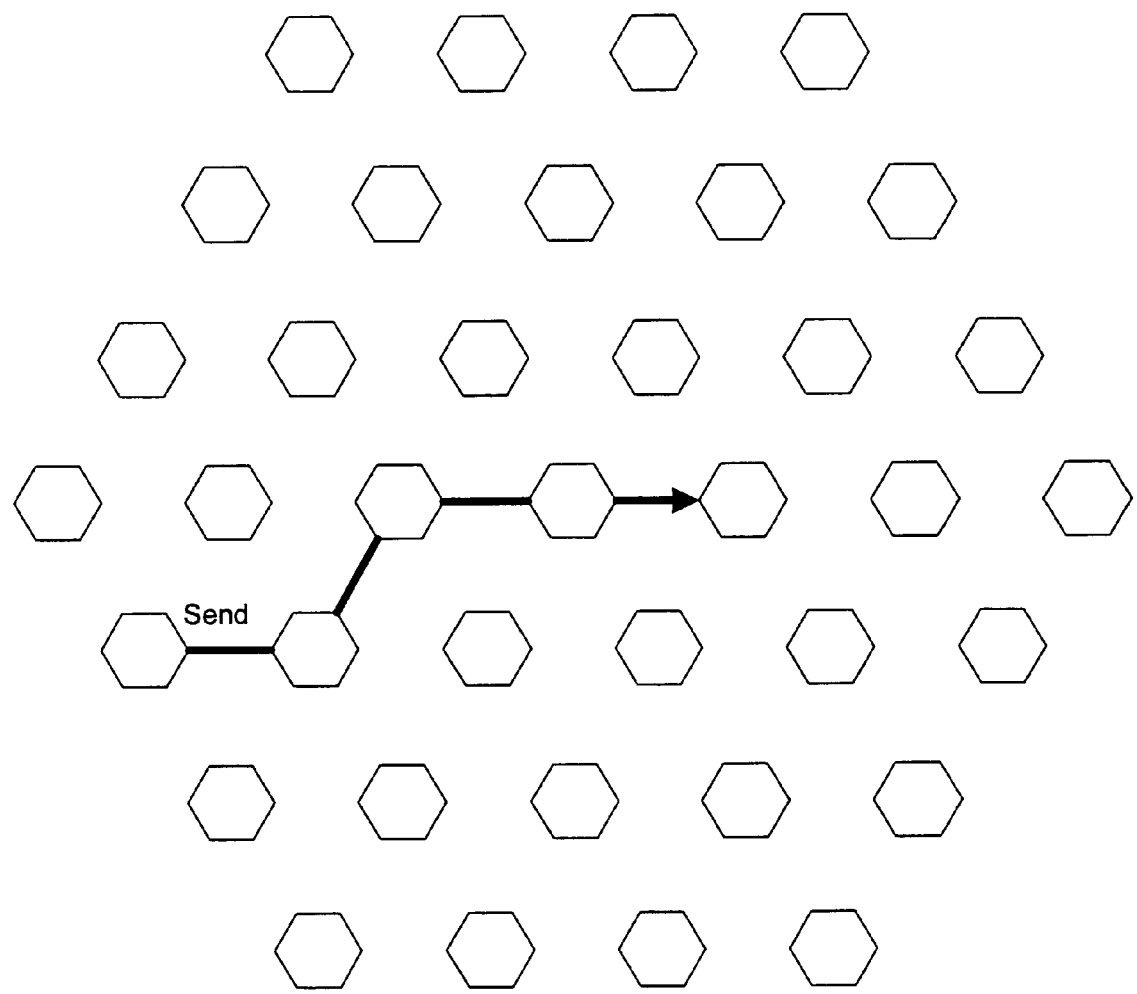
FIG. 73 illustrates an exemplary network in which a message is sent from a sender node to a receiver node.
Figure 74:
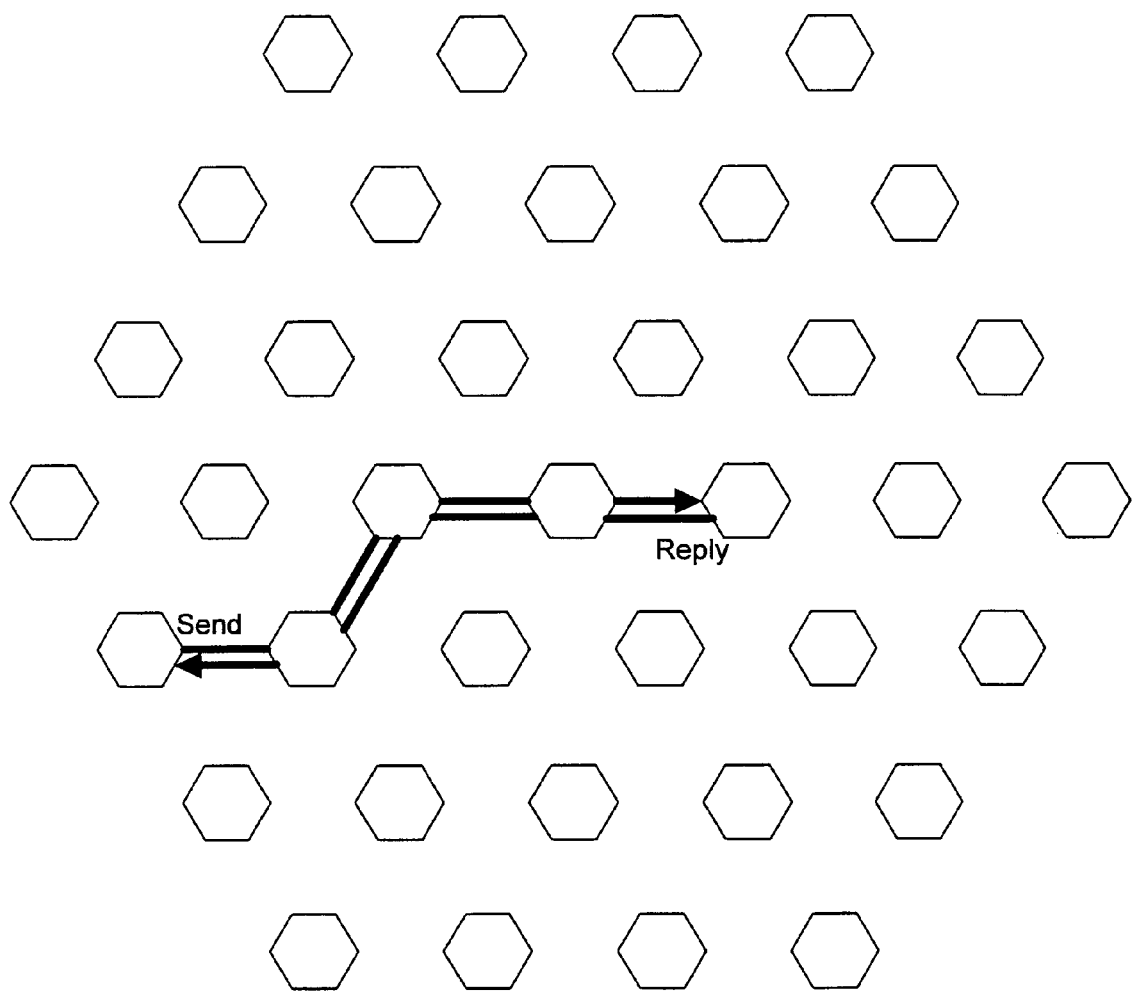
FIG. 74 illustrates a reply being sent by the receiver node over the same path by which the message arrived.

In one embodiment, responses may flow back to the message sender over the original path by which the message was received. FIG. 73 illustrates an exemplary network in which a message is sent from a sender node 320 to a receiver node 321. For example, the message may be addressed to a role on the receiver node 321. The path of the message is illustrated. As shown in FIG. 74, a reply sent by the receiver node 321 is sent over the same path.

Figure 75:
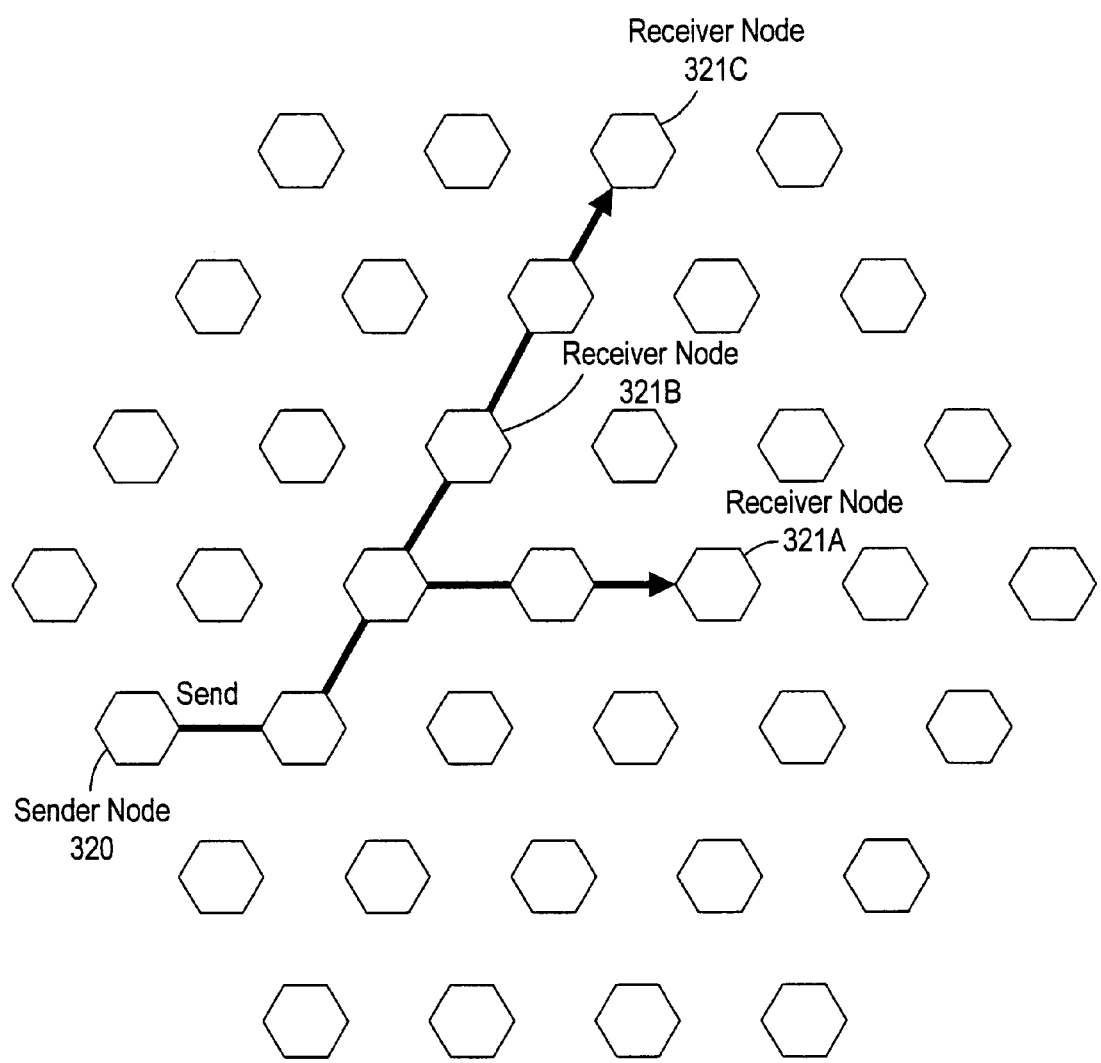
FIG. 75 illustrates an example in which a message is sent from a sender node to multiple receiver nodes.
Figure 76:
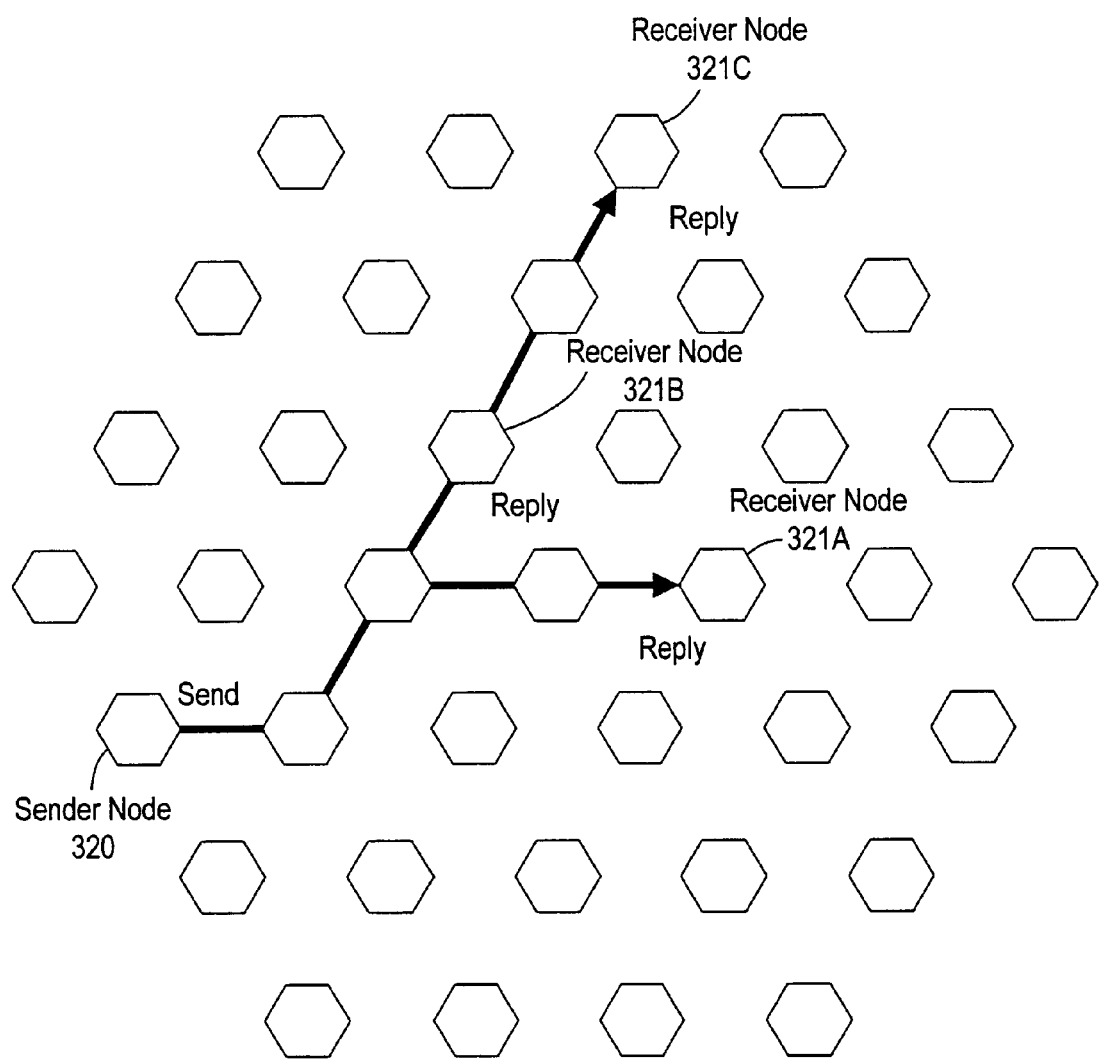
FIG. 76 illustrates each of the receiver nodes replying to the message received.
Figure 77:
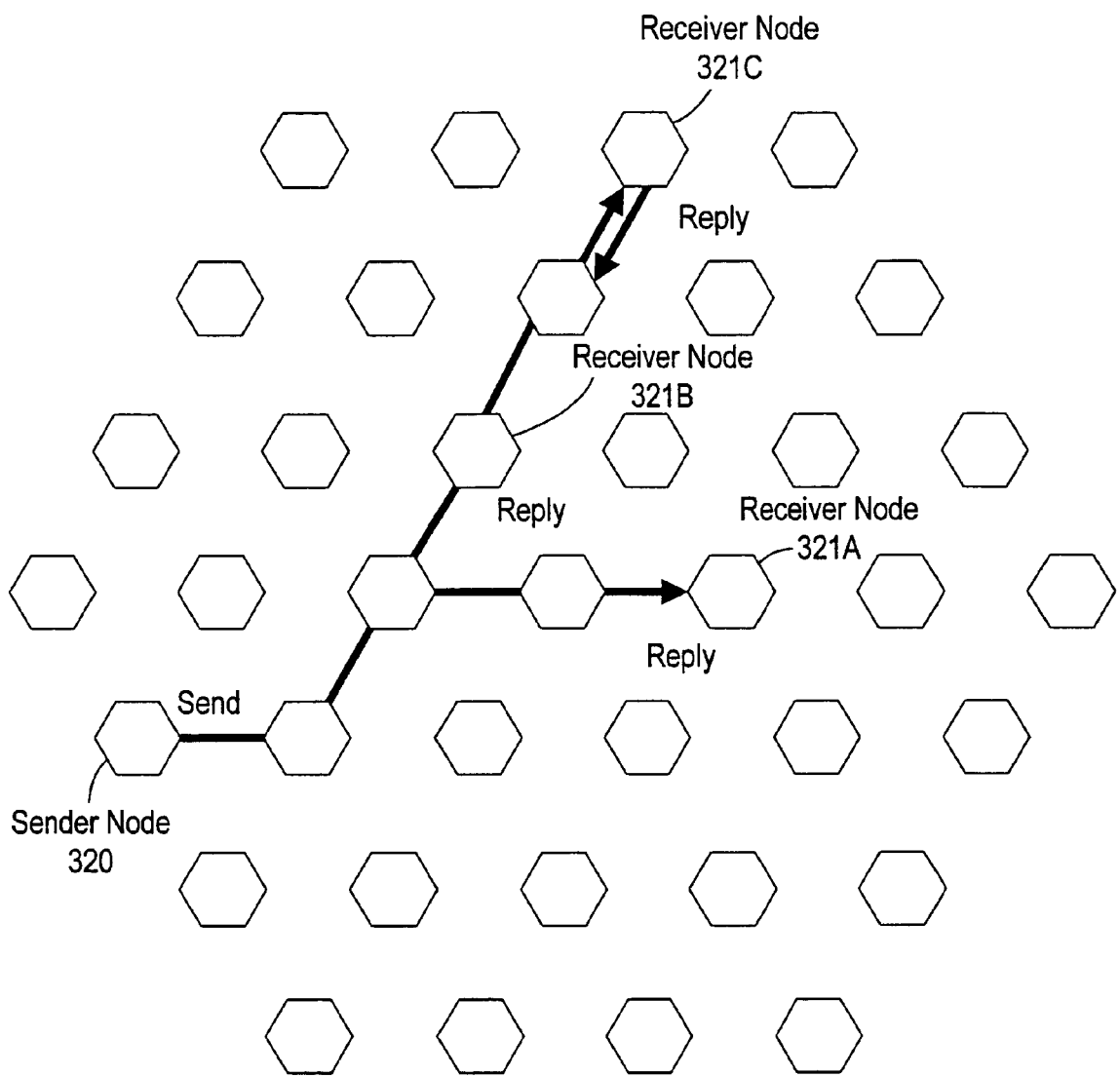
FIGS. 77-83 illustrate a technique for sending aggregated responses from the receiver nodes back to the sender node.
Figure 78:
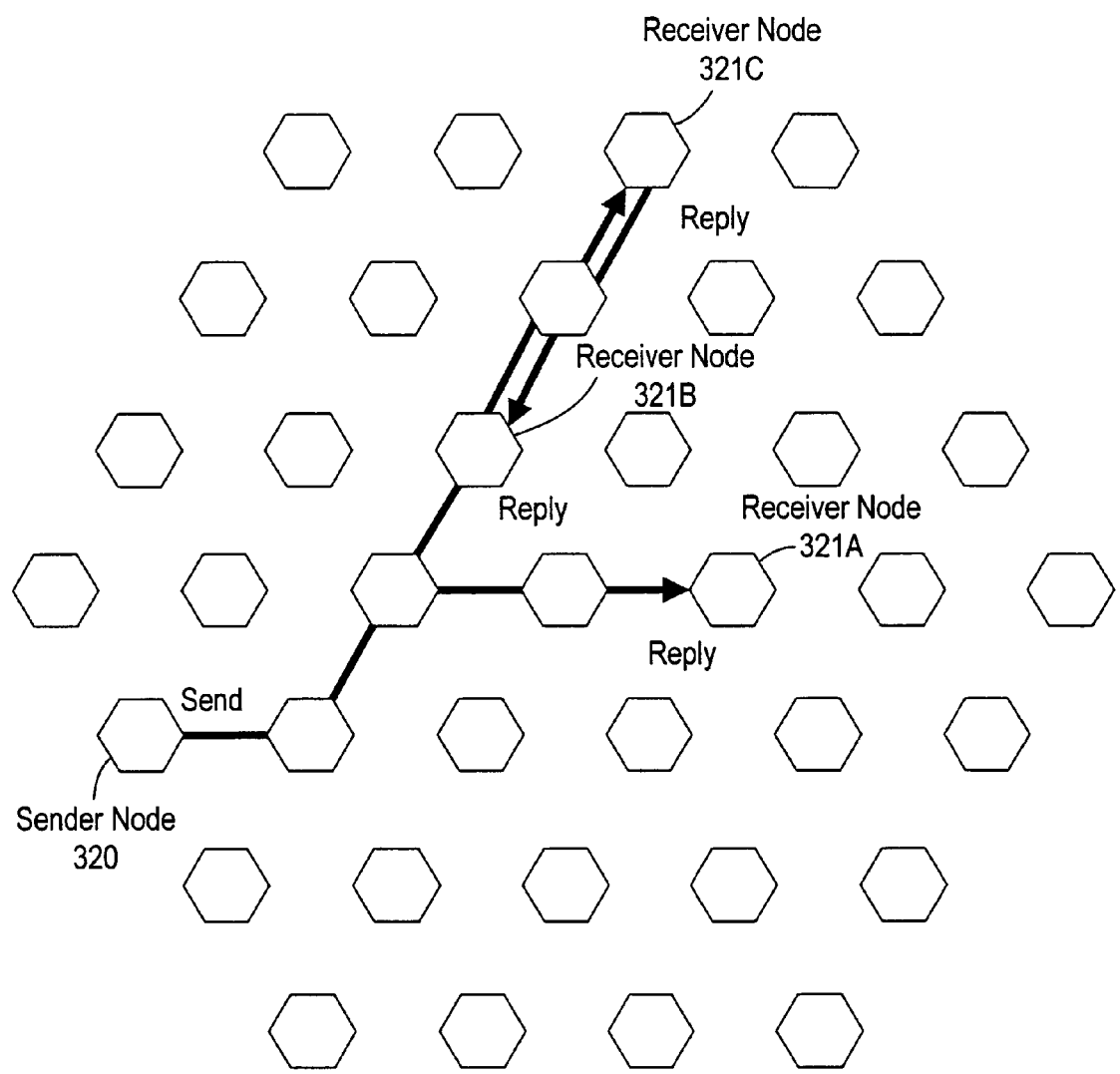
Figure 79:
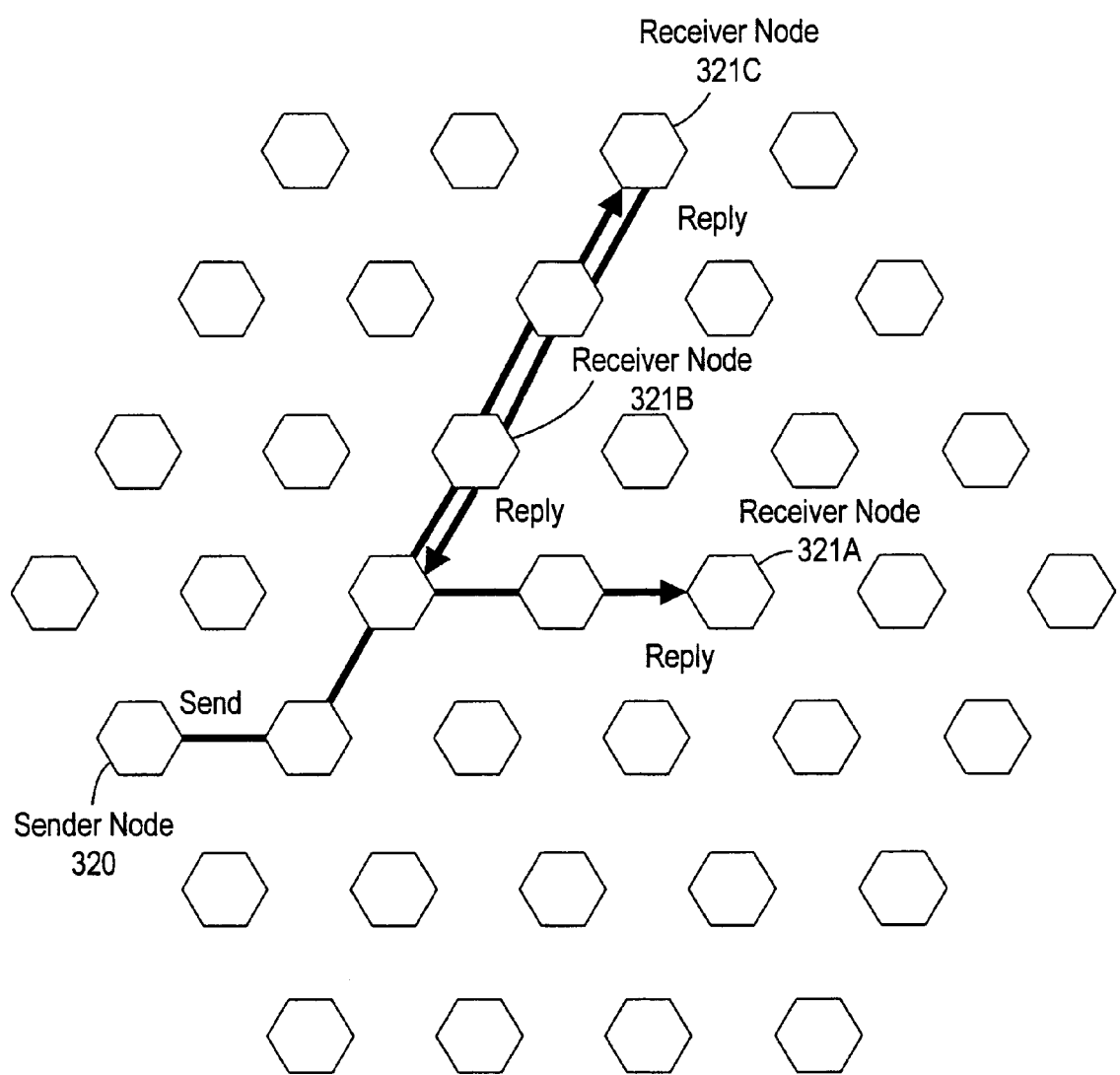
Figure 80:
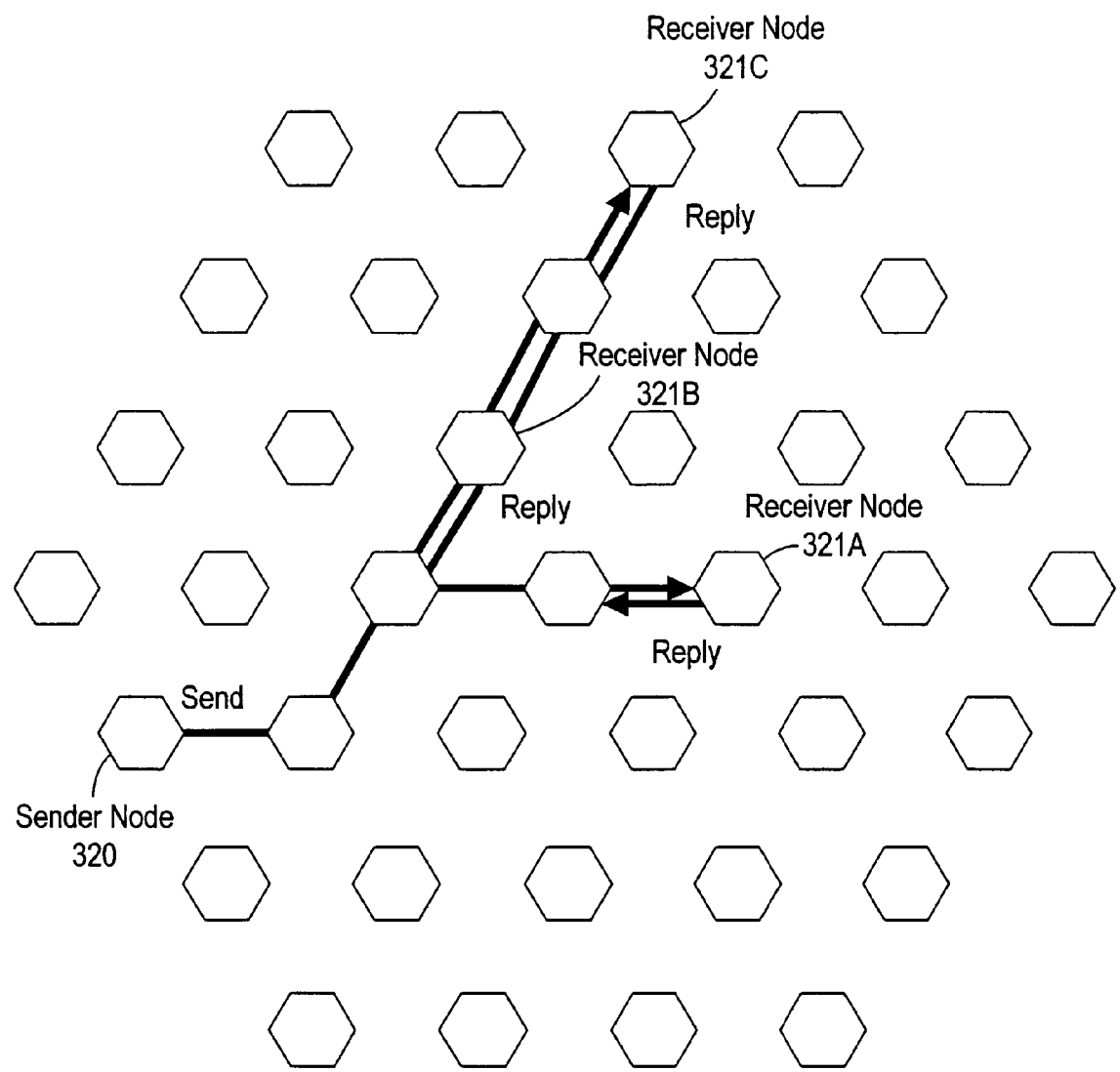
Figure 81:
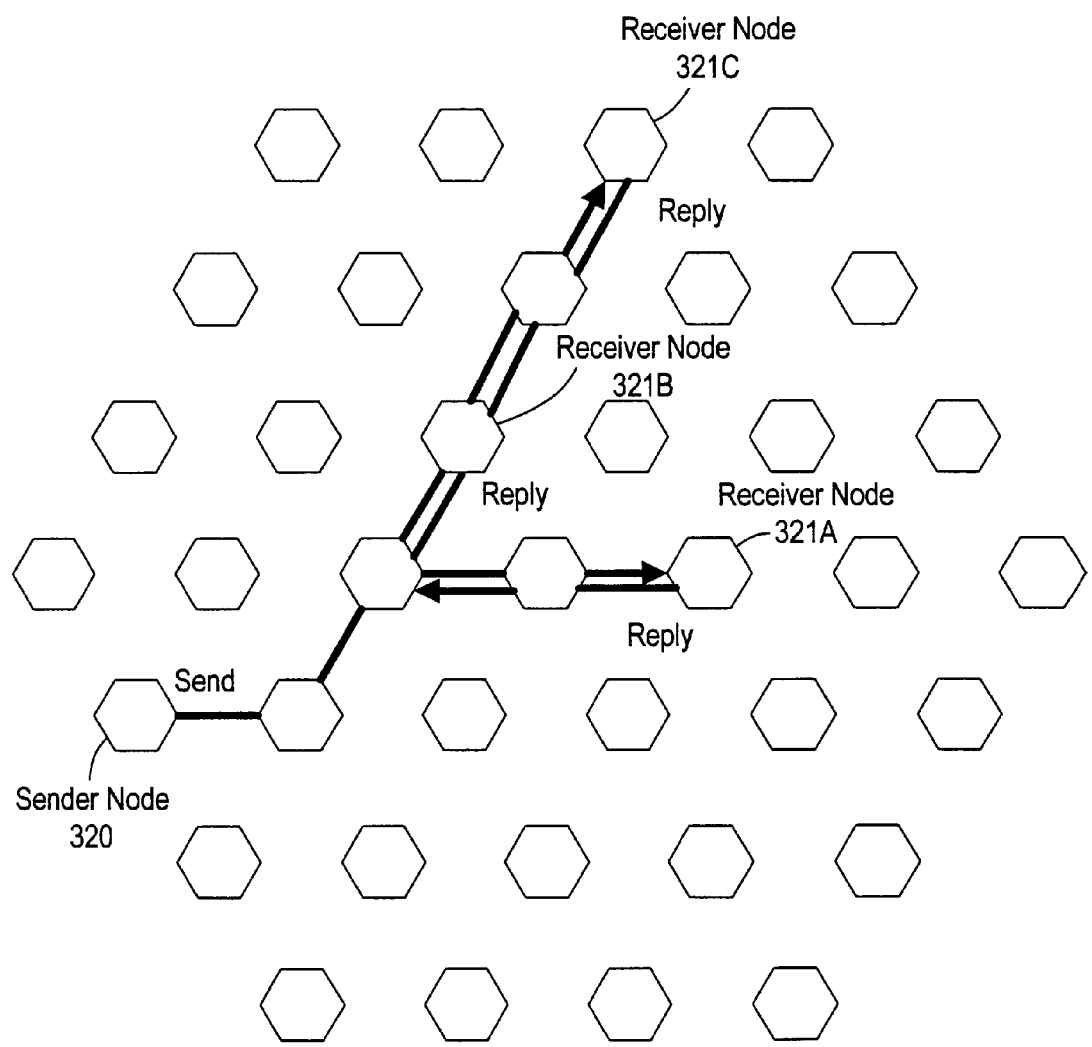
Figure 82:
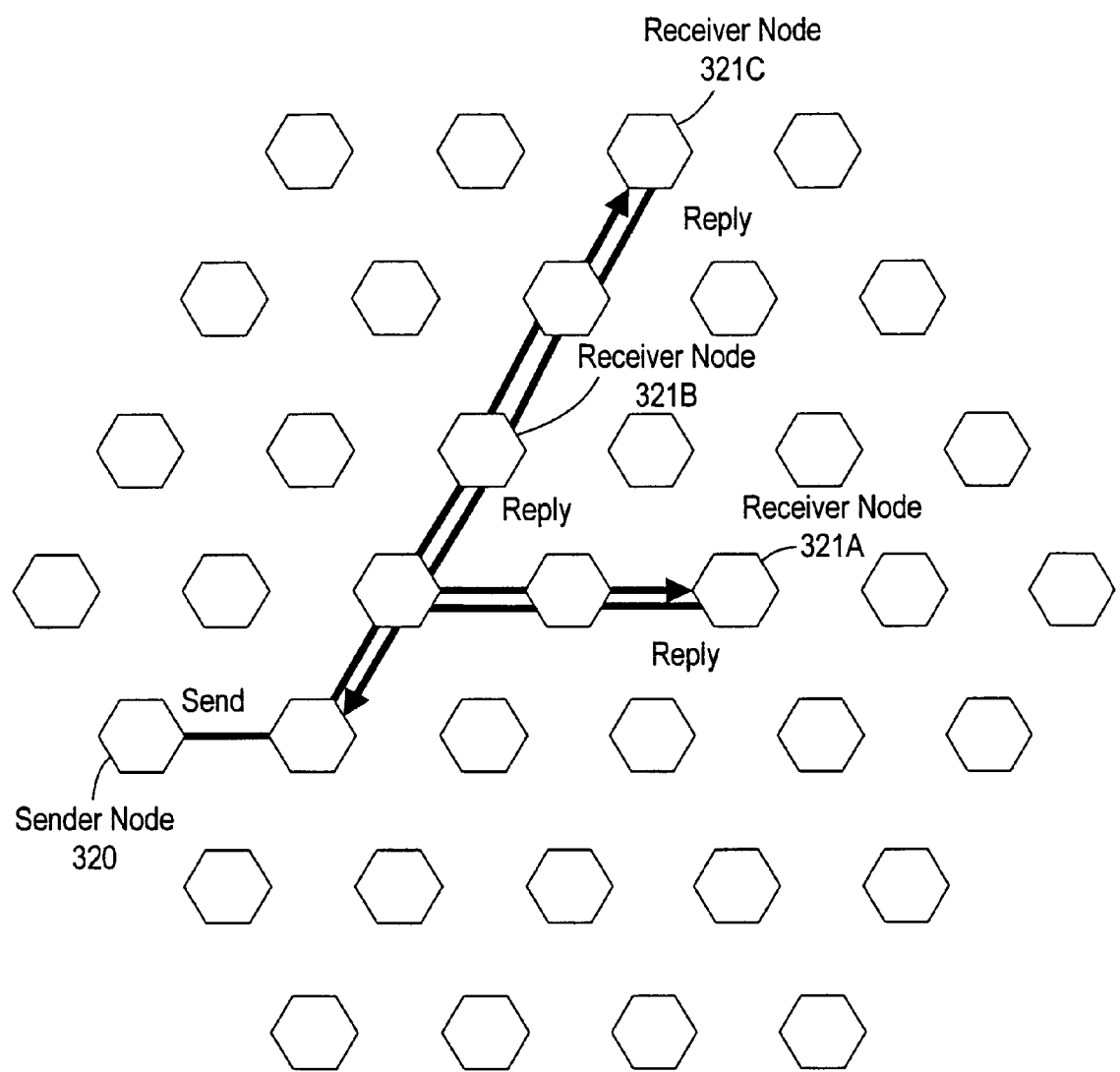
Figure 83:
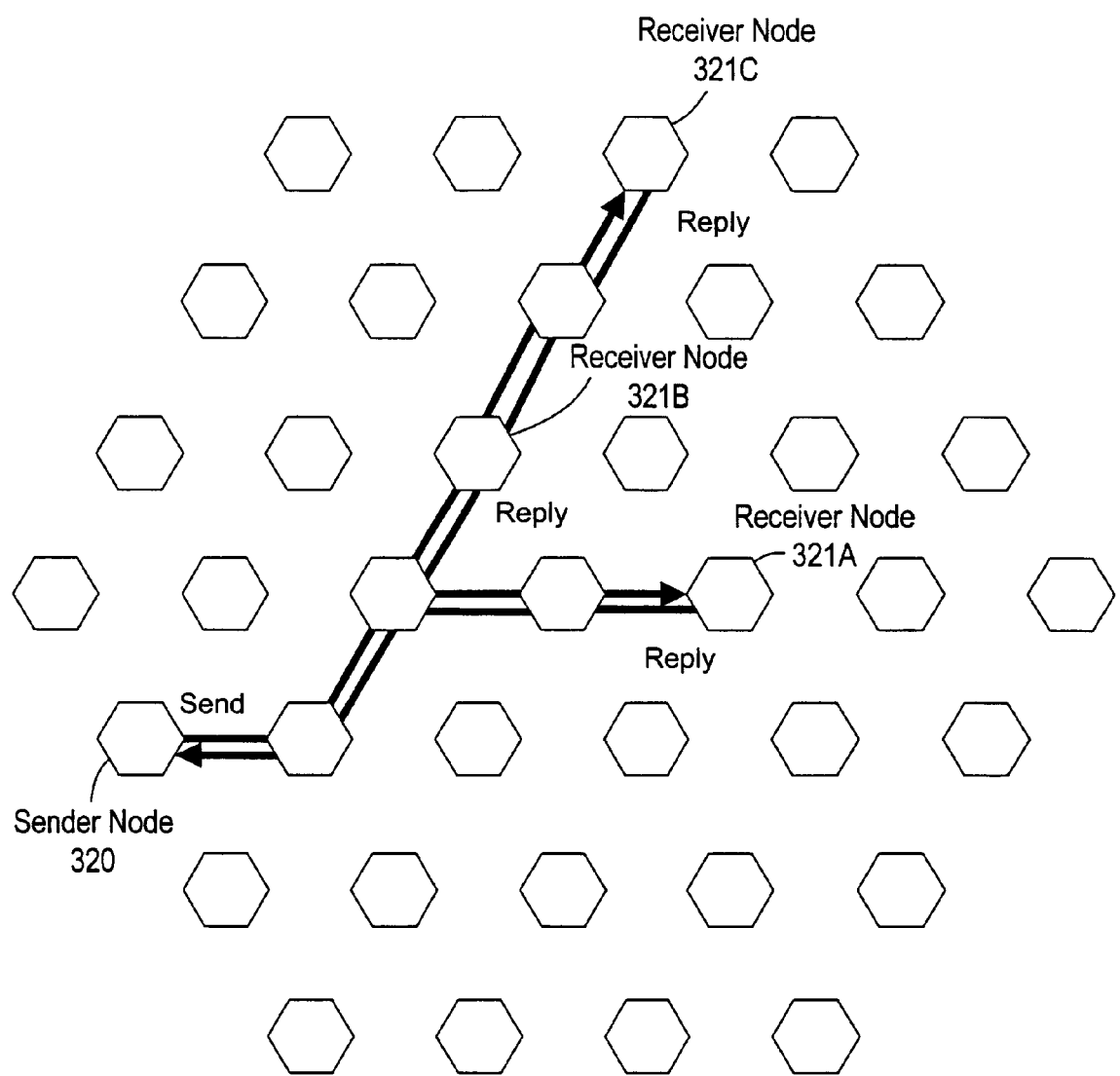

FIG. 75 illustrates an example in which a message is sent from a sender node 320 to multiple receiver nodes 321A, 321B, and 321C. For example, each receiver node may have an instance of a particular role to which the message is addressed. As indicated in FIG. 76, each receiver node may reply to the message received. FIGS. 77-83 illustrate a technique according to one embodiment for sending the responses from the receiver nodes back to the sender node 321. As illustrated in this example, the responses are aggregated as described above so that the sender node 321 receives all responses in a single response message. In another embodiment the sender node 321 may receive three separate response messages (or more than three if one or more of the receiver nodes sends multiple responses). However, aggregating the responses may help to conserve network bandwidth.

Figure 84:
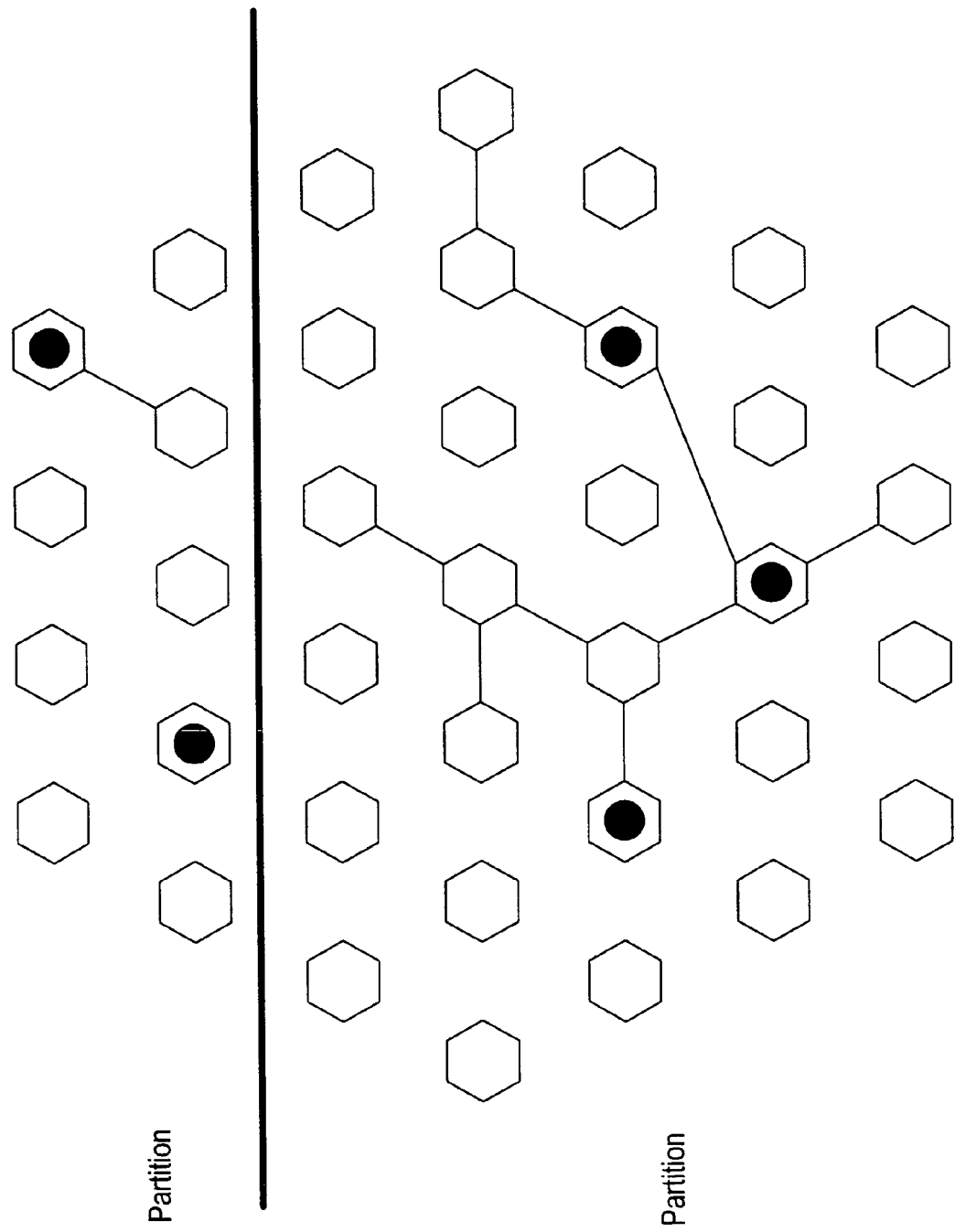
FIG. 84 illustrates a network in which nodes are grouped into two partitions and multiple nodes share a role.

FIG. 84 illustrates a network in which nodes are grouped into two partitions. Each node which has an instance of a particular role is indicated with a colored circle.

As noted above, the API for sending a response may include parameters specifying various options or other information related to the response. For example, the receiver of the message may send the response with a parameter to give up a role and/or grant a role to the sender, e.g., in response to a request for the role sent by the sender. Valid combinations may include:

- Grant role=True; Give up role=False (Grants permission for the sender to create an instance of the role. The receiver retains an instance of the role also so that the role is shared.)
- Grant role=True; Give up role=True (Grants permission for the sender to create an instance of the role. The receiver's instance of the role is removed so that the sender has an exclusive instance of the role. Thus, the role effectively moves from the receiver to the sender.)
- Grant role=False; Give up role=False (Receiver retains the role and the sender is not allowed to create an instance of the role.)

As another example, the response may be sent with a "last reply" parameter indicating that the response is the last reply to the message, as described above. Any given recipient of the original message may set the "last reply" parameter to True only once.

In one embodiment the T&R layer may change the "last reply" parameter in some situations. For example, if "last reply" is set to True, a node forwarding the response along the route may change "last reply" to False if the node has an outstanding link on which it has not yet received a response with "last reply" set to True or if the node has not yet received a response from a local client (a client application on that node which received the original message from the sender) with "last reply" set to True. This ensures that the sender receives only one response with the "last reply" parameter set to True, even though multiple responses may originally be sent from receivers of the message with the "last reply" parameter set to True. In another embodiment, the sender may always receive response messages having the original "last reply" parameter values set by the respective recipients, and the sender may keep track of which recipients it has received a last reply from and which it has not.

As noted above, when a recipient node with a role instance issues a reply with a "give up role" parameter set to True, the role instance may move to the sender node. In one embodiment, this may be accomplished by performing an un-publish operation to remove the role instance from the recipient node, followed by a publish operation to add the role instance to the sender node. However, in another embodiment a more efficient technique of moving the role instance to the sender node may be utilized. The more efficient technique is based on the observation that only routes maintained by nodes along the path of reply (which is the same as the path over which the original message was sent) need to change. Thus, each time after the reply with the "give up role"=True parameter is forwarded by a node, the route on that node may be re-pointed to point in the direction in which the reply was forwarded. Thus, the next time that node receives a message addressed to the role, the message may be routed in the direction of the node which now has the exclusive instance of the role (i.e., in the direction of the original sender node which requested the role).

Figure 85:
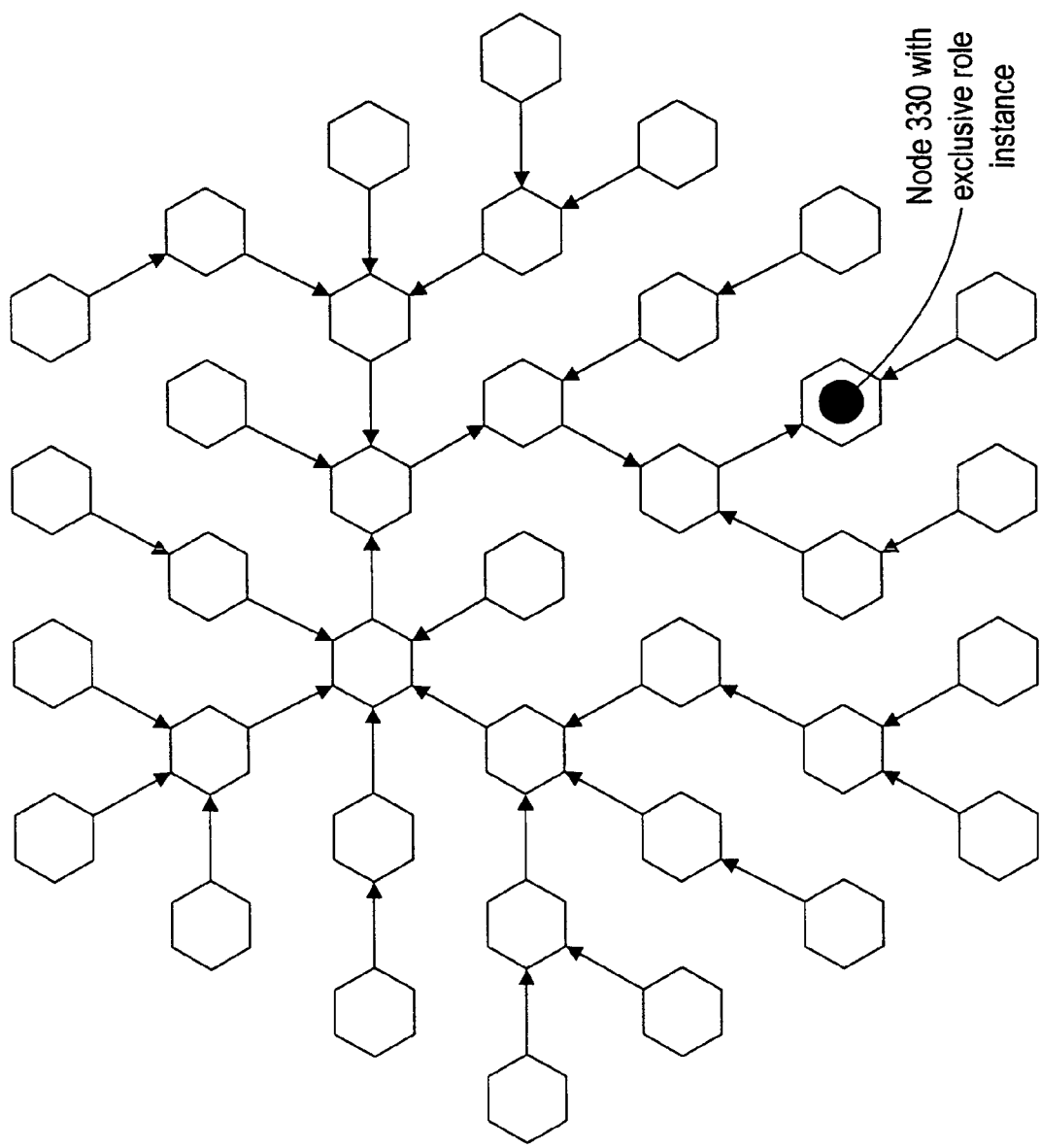
FIG. 85 illustrates a network including a node with an exclusive instance of a role.
Figure 86:
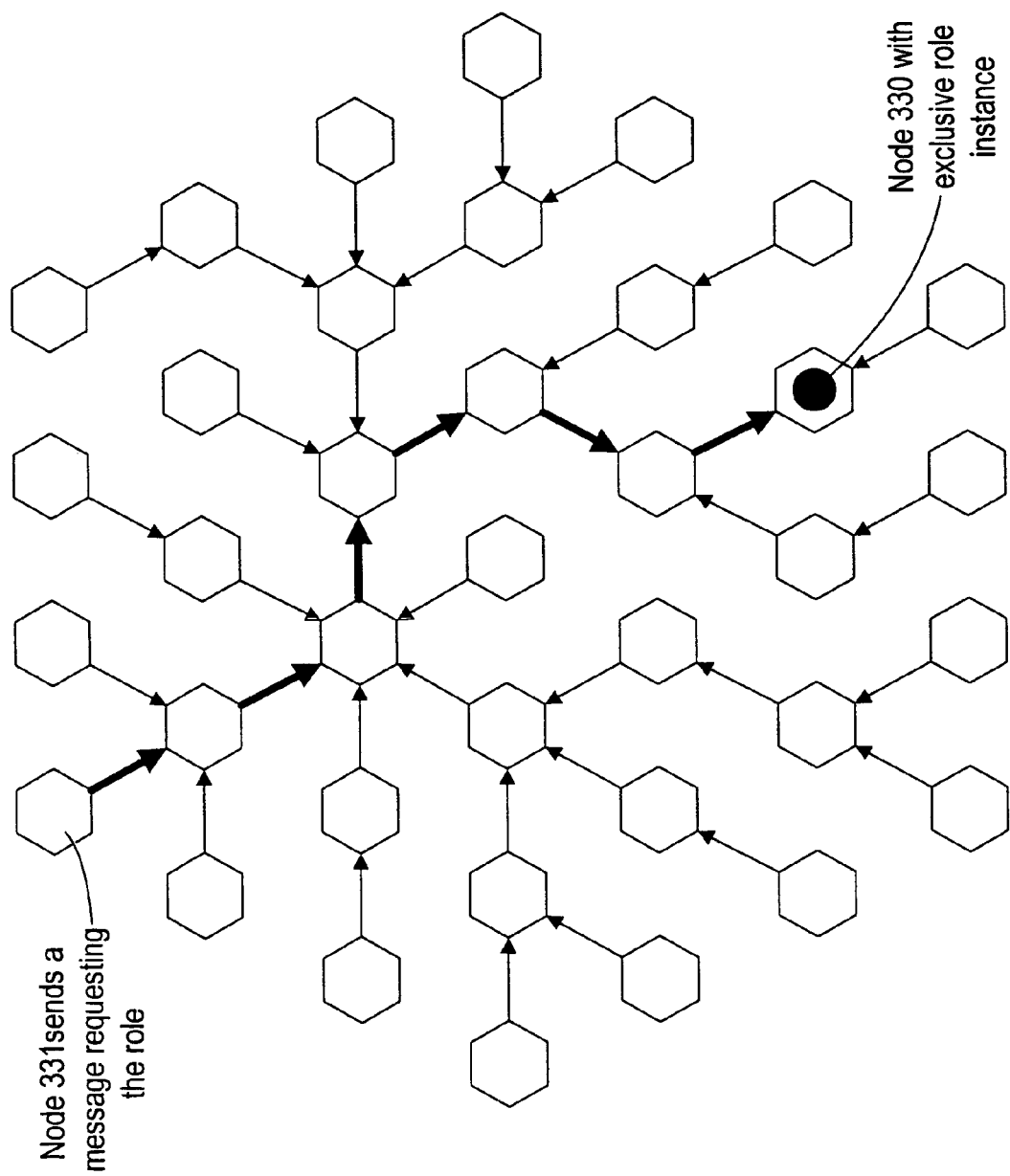
FIG. 86 illustrates the route of a message sent from a node 331 to a node 330, where the node 331 requests to add an instance of the role assigned to node 330.
Figure 87:
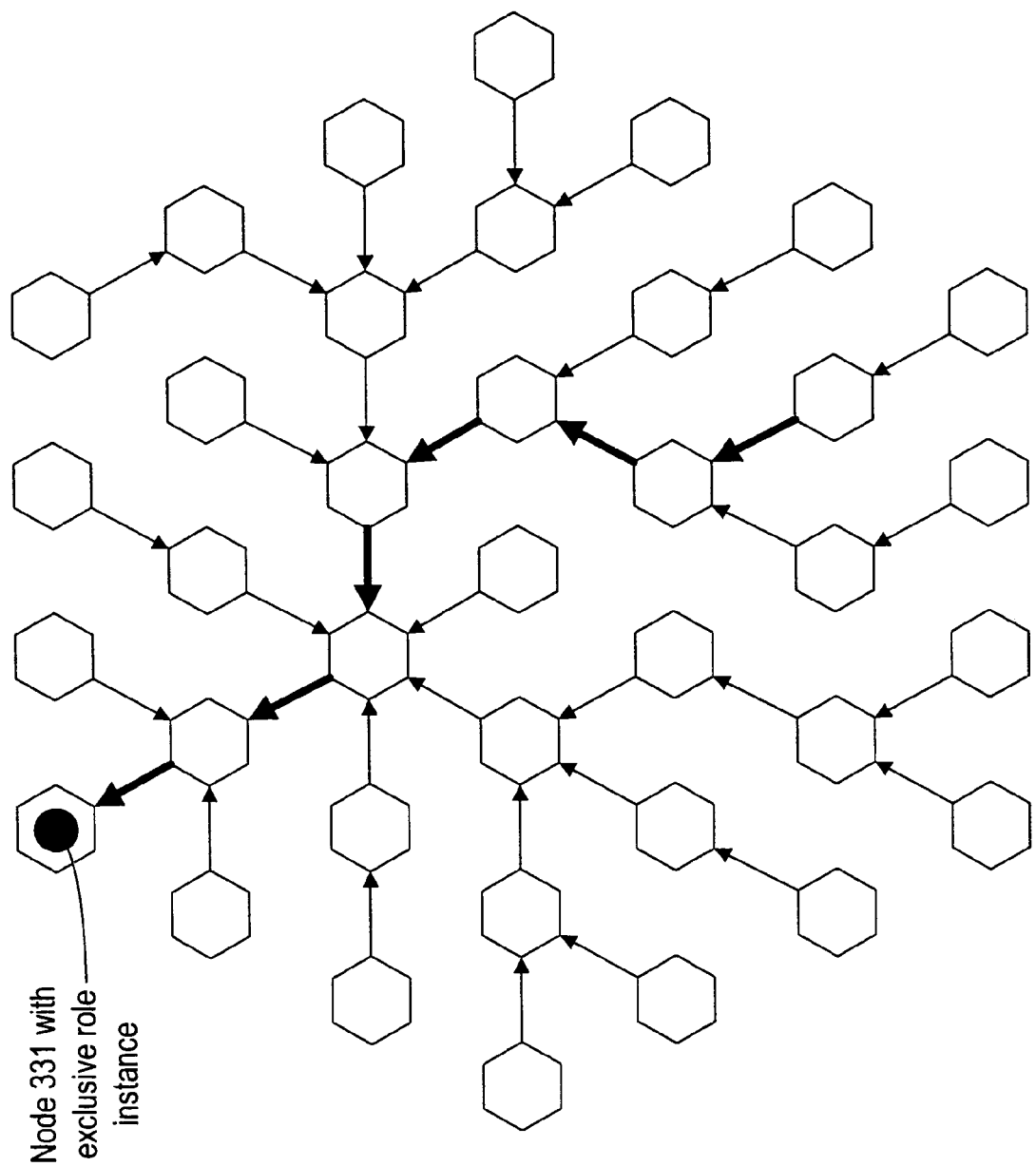
FIG. 87 illustrates route changes and a new owner for an exclusive role instance.

FIG. 85 illustrates a network including a node 330 with an exclusive instance of a role. Routes to the role instance are illustrated by the arrows. FIG. 86 illustrates the route of a message sent from a node 331 to the node 330 (route indicated by bold arrows), where the node 331 requests to add an instance of the role. The node 330 may send a response message back to the node 331 with the "give up role" parameter set to True. As described above, nodes along the path of reply may change their routes to point in the direction in which the response message is forwarded. FIG. 87 illustrates the route changes (illustrated by the bold arrows) and the new owner of the exclusive role instance.

Events

In various embodiments, any of various kinds events may be generated by the T&R layer in response to certain situations. Client applications may be notified of particular events through application listener ports. The following describes some exemplary events which the T&R layer may utilize.

Tree Built event—indicates that a tree has been constructed or a tree object has been instantiated. The Tree Built event may include information identifying the protocol (e.g., client of the T&R layer) that caused the tree to be created. Thus, applications may learn about new trees by receiving Tree Built events. As described below, in one embodiment an application may create a snooper in response to a Tree Built event.

Role Not Found event—indicates that a message was not delivered to any instance of the role to which it was addressed.

Snooping

As shown in FIG. 38, in one embodiment the T&R layer may allow client software to act as a snooper. A snooper may intercept messages sent from a sender to a receiver and may intercept any responses sent from the receiver to the sender. The snooper client may be located on any node between (and including) the sender node and receiver node. In various embodiments, the snooper may be able to take any of various actions in response to intercepting a message or response message. For example, the snooper may simply allow the message or response to continue on its way unaffected. The snooper may also alter the contents of the message or response if desired, or may replace the message or response with a completely different message or response. Response messages may be appended or replaced. The snooper may also consume or suspend the message or response if desired. The snooper may resume suspended messages or responses at a later time. The snooper may also store the message or response data before allowing the message or response to continue or may perform any of various other actions on the message or response data.

The snooper may also be able to get information regarding the message or response message. For example, in one embodiment the message or response message may have an associated message information object having methods such as:

IsSuspended( )—indicates whether the message is suspended

IsReplySuspended( )—indicates whether a reply to the message is suspended isLocalReplyPending( )—indicates whether a local reply to the message is pending areRemoteRepliesPending( )—indicates whether any remote replies to the message are pending getTreeID( )—gets the ID of the tree to which the message is addressed getID( )—gets the message ID getRole( )—gets the role to which the message is addressed getData( )—gets the message data Each receiver of a message, e.g., the intended client recipient or a snooper, may receive information regarding where the message currently is in the message path. For example, in one embodiment each receiver may receive an Endpoint Boolean and a HasRole Boolean. An Endpoint value of True indicates that the local node is an endpoint for the message (no more roles to reach). An Endpoint value of False indicates that the local node is somewhere in the middle of the delivery chain. In this case, the receiver may be a snooper. The HasRole Boolean indicates to the receiver whether the local node has an instance of the role to which the message is addressed.

Tracking Message Status

The T&R layer may track or record various types of information related to sending messages. For example, the message routing engine may track or record information indicating:

- messages seen (received via a link)
- messages sent (sent via a link)
- messages waiting for a recovery operation to be performed for a tree
- messages waiting for replies
- suspended messages and replies A message record may be created when a message is sent or when a message is received. The message record may be used to track the incoming link for the message and/or the outgoing links for the message. The message record may also be used to track outstanding replies for the message. In one embodiment, the T&R layer may be operable to perform a sweeping operation to clean up or discard old message records. The time period at which sweeping operations are performed may be configurable.

Figure 88:
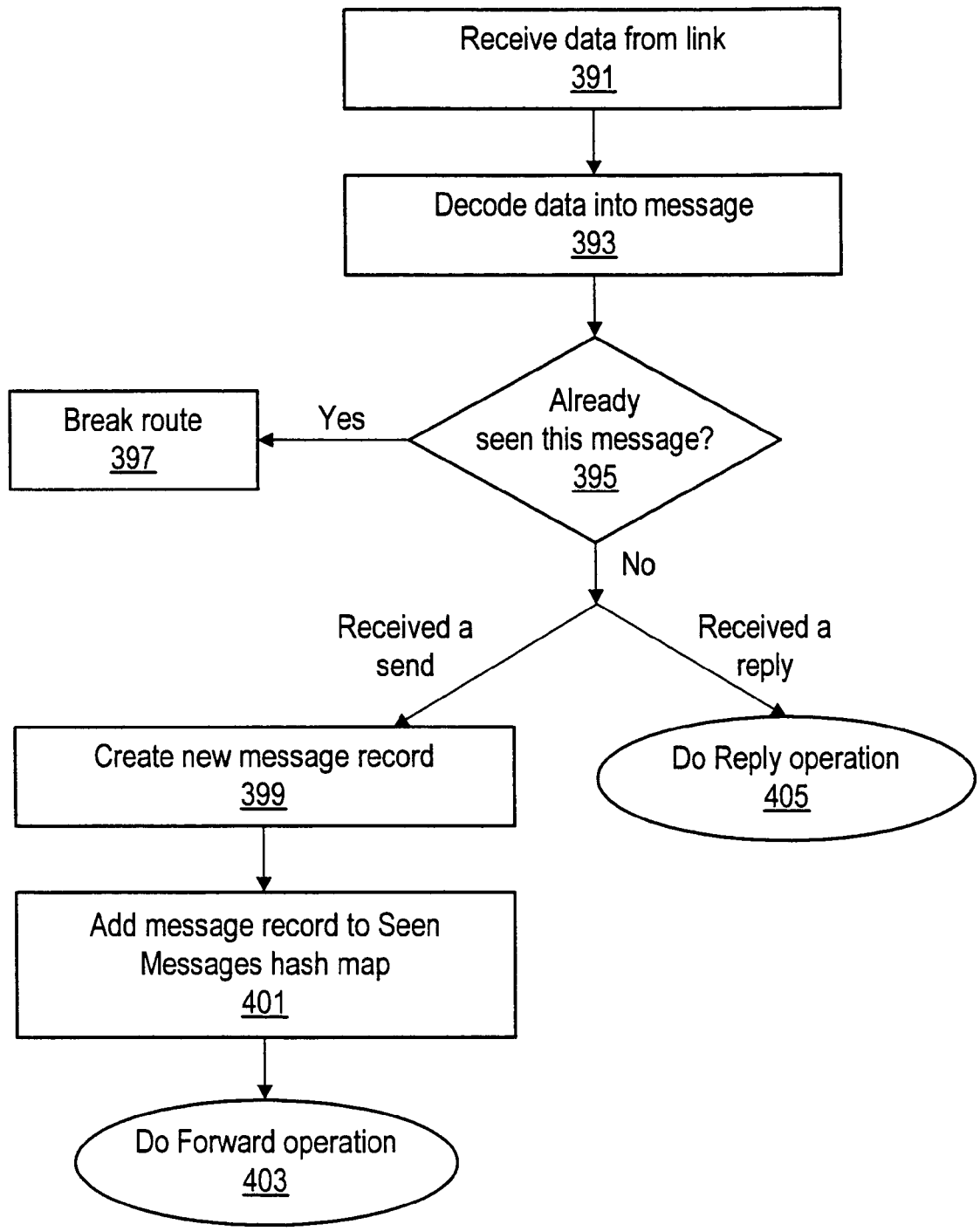
FIG. 88 illustrates a process performed by the T&R layer when a message is received from another node.
Figure 89:
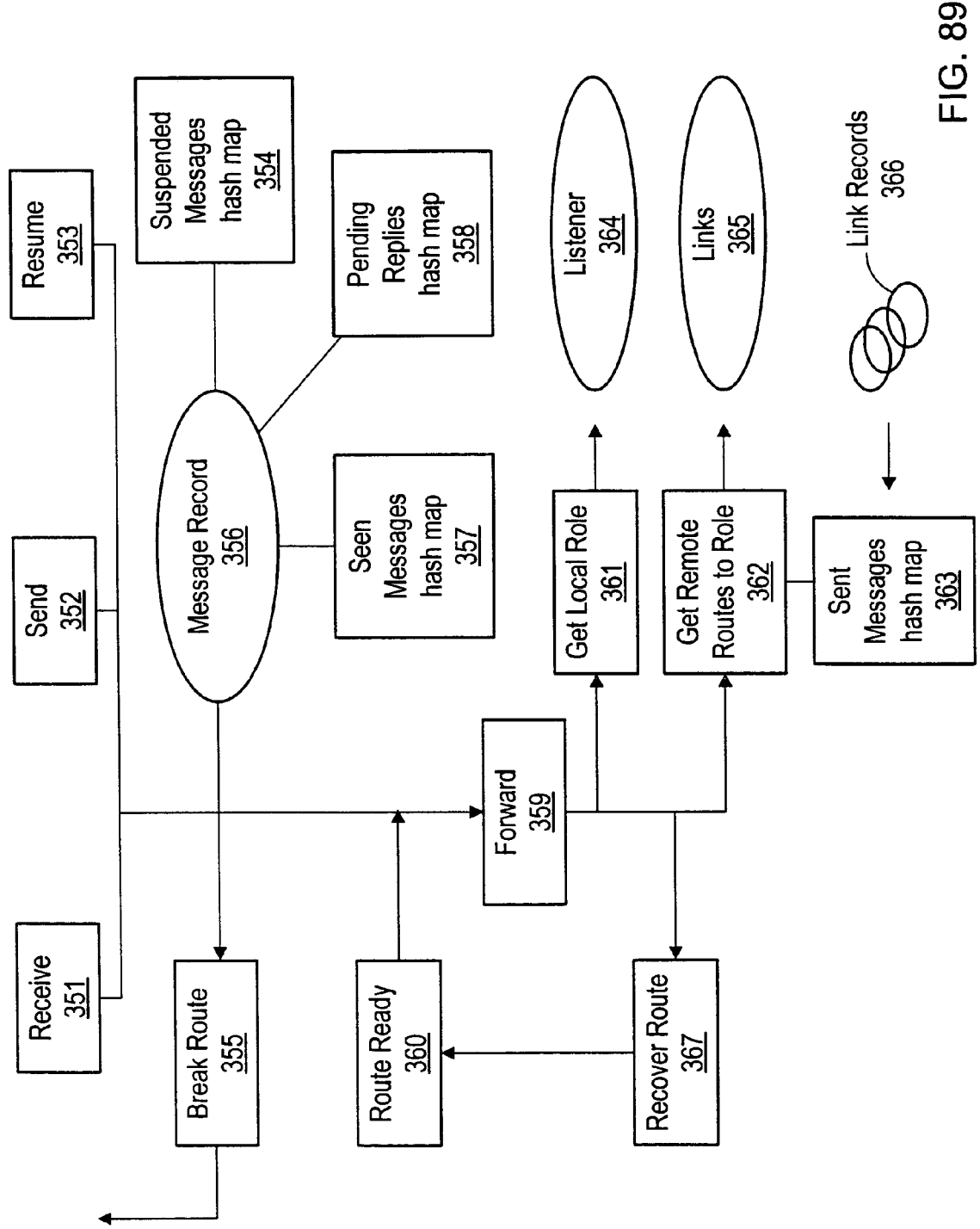
FIG. 89 illustrates a process performed by the T&R layer to perform a send operation.
Figure 90:
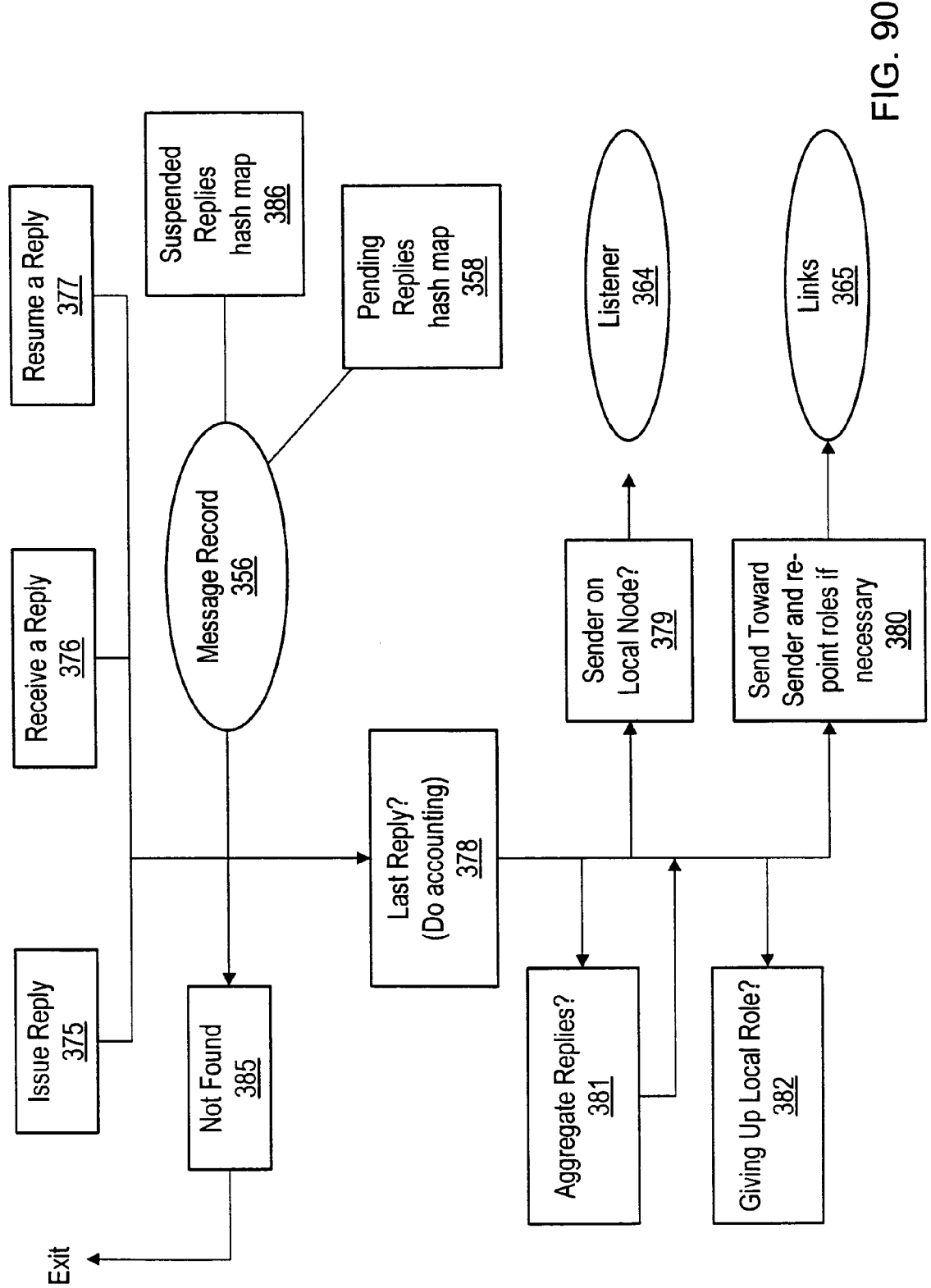
FIG. 90 illustrates a process performed by the T&R layer to perform a reply operation.

FIG. 88 illustrates the process performed by the T&R software when a message is received from another node, according to one embodiment. FIG. 89 illustrates the process performed by the T&R software to perform a send operation according to one embodiment. FIG. 90 illustrates the process performed by the T&R software to perform a reply operation according to one embodiment.

Failure and Recovery Operations

The T&R layer may be operable to perform recovery operations in response to a link failure, e.g., a condition in which messages cannot be sent over a link in the link mesh. For example, routes that use the failed link may be recovered so that messages can be sent to their destinations using different links. This section describes recovery operations which may be performed according to one embodiment.

In one embodiment, trees may not be immediately rebuilt at link failure time. To process the link failure, the following may be performed:

For every edge mapped to the failed link do the following:
  For every role instance on the edge do the following:
    1. Invalidate the role instance
    2. Mark the role as not fully built
    3. Mark the role's tree as not fully built For all send operations over the failed link, the T&R layer may return a null reply which indicates the link failure to the sender. This may be performed when the router has forwarded a send request over the failing link and the last reply over that link has not yet been received.

Figure 91:
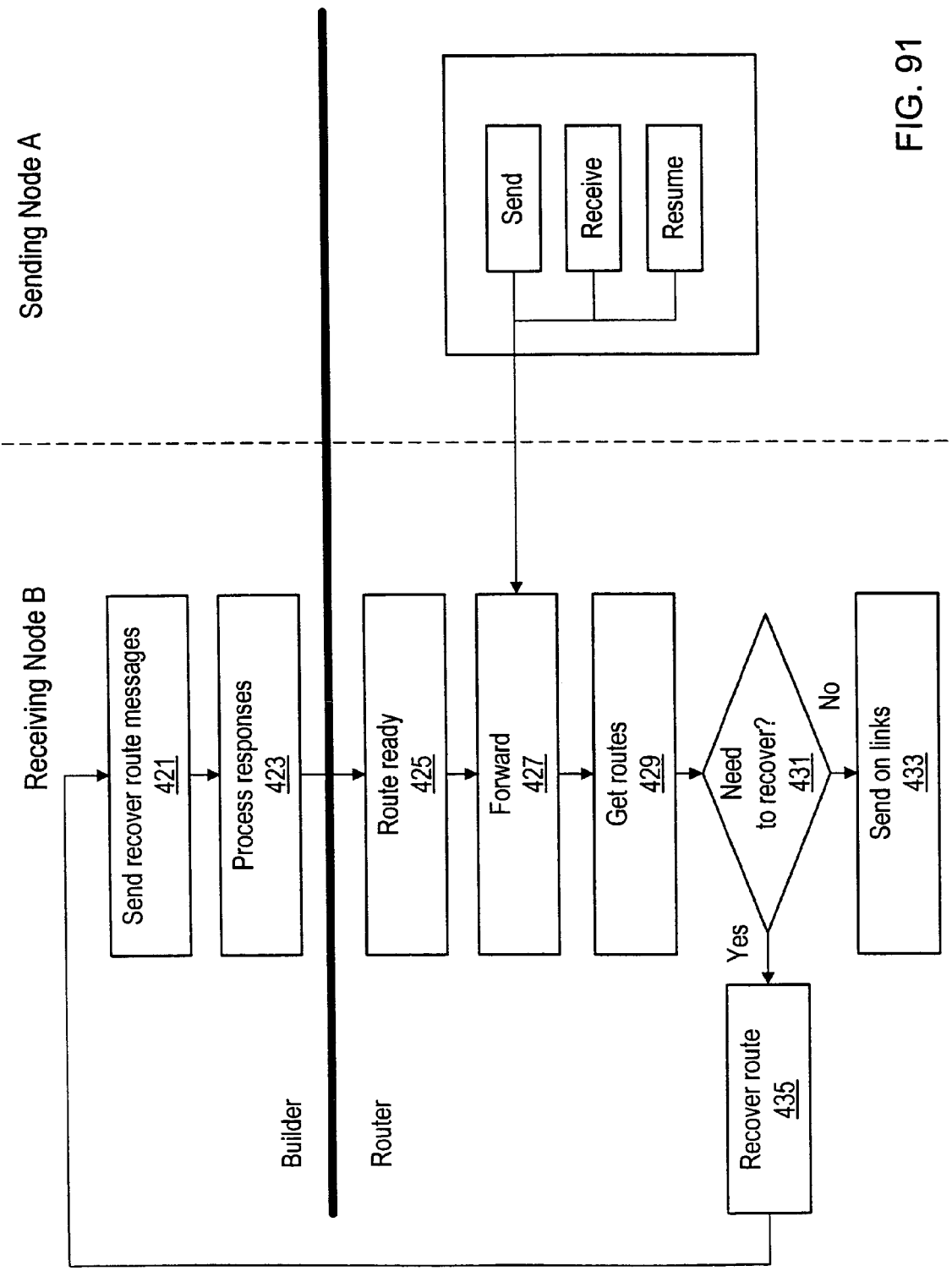
FIG. 91 illustrates a process to perform route recovery.

The actual recovery of a route which utilized the failed link may be performed later when required by a send operation. At any node along the message delivery chain, the role to which the message is addressed may not be fully built. If so, the message routing engine may call a method, e.g., recoverRoute( ), to rebuild routes to the role. The ID of the message being sent may be passed to the recoverRoute( ) method. After the routes have been recovered (rebuilt) a method, e.g., routeReady( ), may be called to notify the message routing engine. The ID of the message may be passed to the routeReady( ) method to indicate that the message routing engine may resume routing the message using the recovered routes. This process is illustrated in FIG. 91.

Recovery Algorithm

In various embodiments, any desired algorithm may be employed to recover or rebuild routes to role instances. This algorithm may be performed in response to the message routing engine requesting the routes to be recovered, e.g., by calling a recoverRoute( ) method as described above.

According to one embodiment of the route recovery algorithm, the following may be performed. The node at which the recovery process is begun may begin by broadcasting a recovery request using the broadcast on role routes type of broadcast, as described above. As described above, since the role may not be fully built on this node, the recovery request may initially be sent over all links corresponding to the tree. Each node which receives the recovery request may forward the recovery request on all the links used in routes to instances of the role, provided that the role is fully built for that node. If the role is not fully built for that node, then the recovery request may be forwarded as in broadcast on tree or broadcast on all links (if the tree is not fully built) operation.

Thus, the recovery requests may be forwarded through the node network until they arrive at nodes that have instances of the role. When a recovery request arrives at a node that has an instance of the role, the node may return a recovery response. The recovery response may be returned in the direction from which the recovery request came, i.e., using the link by which the recovery request arrived. If a node that receives a recovery response does not already have a route to the role instance that generated the recovery response, the node may update its routing table to indicate a route to the role instance that points in the direction from which the recovery response came.

The node may also propagate the recovery response back via a link by which the node received a recovery request, so that each recovery response from each role instance continues to be propagated back until reaching the original node that initiated the recovery request broadcast. (If a node receives multiple recovery responses that originate from a single role instance, the node may ignore the duplicate recovery responses so that only a single recovery response associated with that role instance is propagated back by the node.)

Thus, for each role instance, routes may effectively be built backwards from the node that has the role instance to the original node that initiated the recovery request broadcast. Once the routes have been built, this original node may forward the message being sent over the routes, as described above.

In one embodiment, a recovery request may not be forwarded further after reaching a node that has an instance of the role being recovered. As described above, in one embodiment it is not necessary that each node have routing information for all instances of a role.

Figure 92:
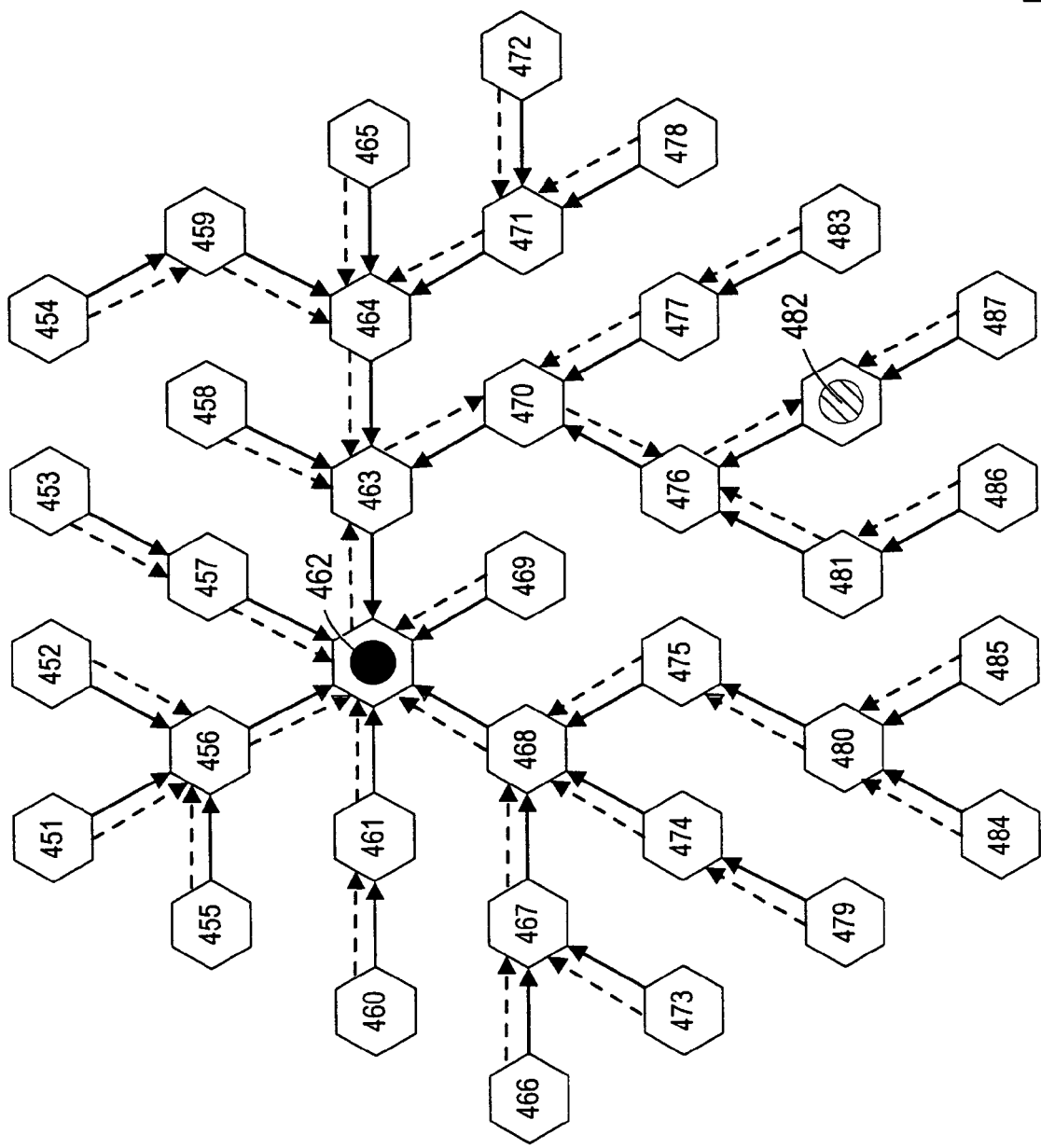
FIG. 92 illustrates an exemplary network and illustrates routes to two instances of a role.
Figure 93:
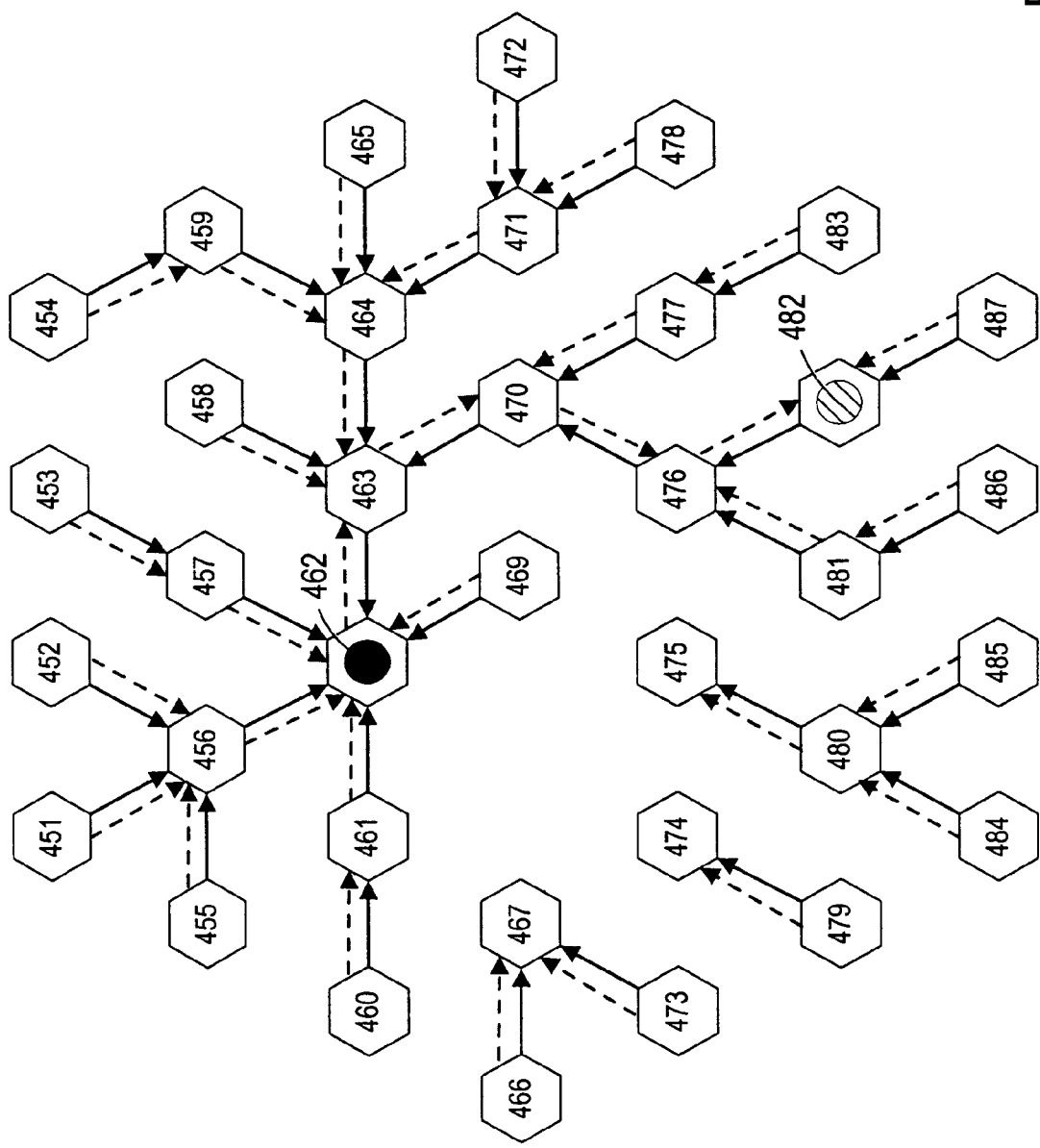
FIG. 93 illustrates the network of FIG. 96 after a node has failed.

FIG. 92 illustrates an exemplary node network and illustrates routes to two instances of a role, one of which is on node 462 and the other on node 482. Routes to the node 462 instance of the role are denoted by solid arrows, and routes to the node 482 instance of the role are denoted by dashed arrows. FIG. 93 illustrates the node network after node 468 has failed (and thus all links to node 468 have failed).

Figure 94:
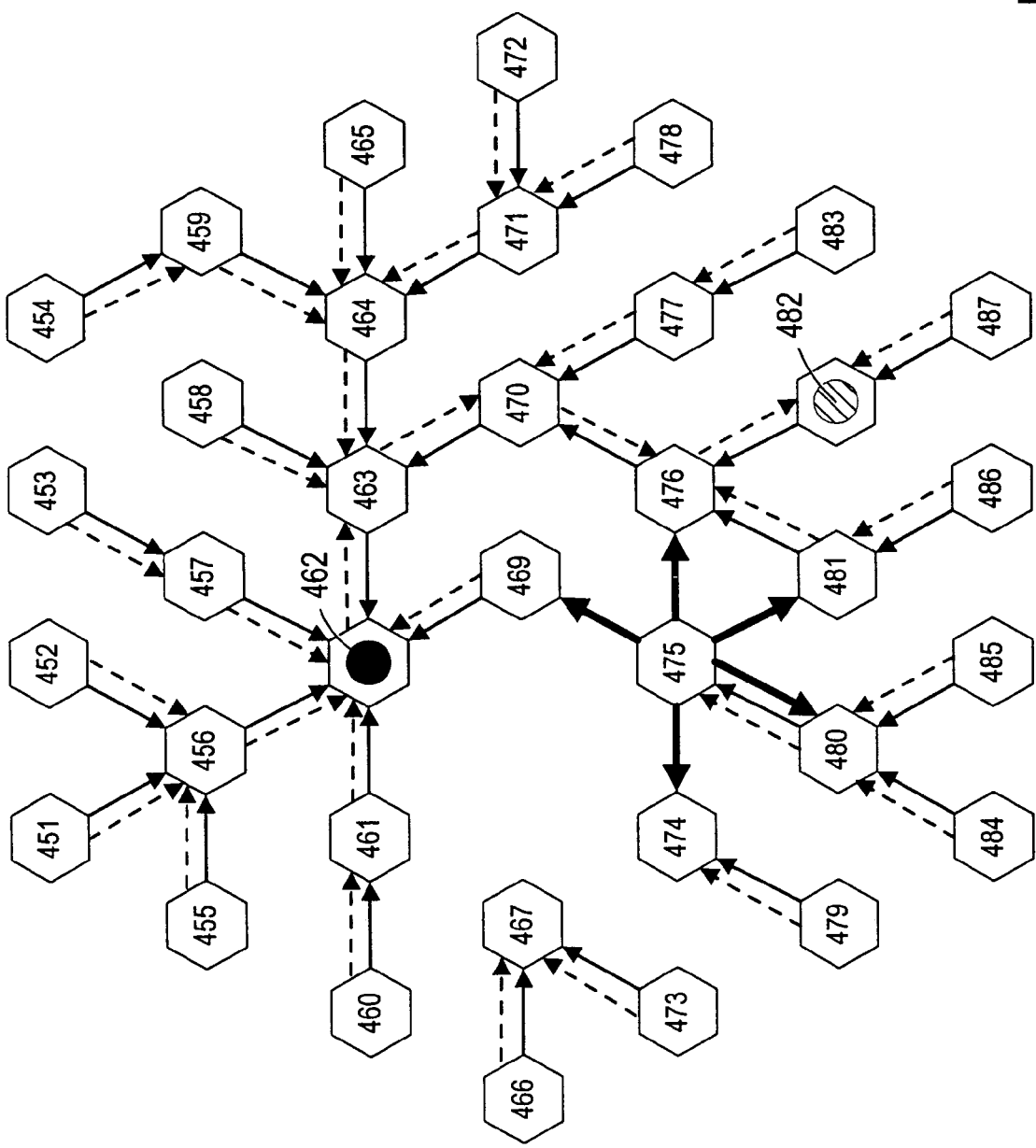
FIGS. 94-98 illustrate an exemplary route recovery.

Suppose that node 480 attempts to send a message to each instance of the role. Thus, the message may be routed to node 475, as indicated by the route arrows from node 480. However, the role is not fully built at node 475. As described above, the role may have been marked as not fully built in response to the failed links. Thus, the route recovery algorithm may be initiated. As shown in FIG. 94 and described above, node 475 may broadcast a recovery request on all links. The broadcast on each link is denoted by the wide arrows.

Figure 95:
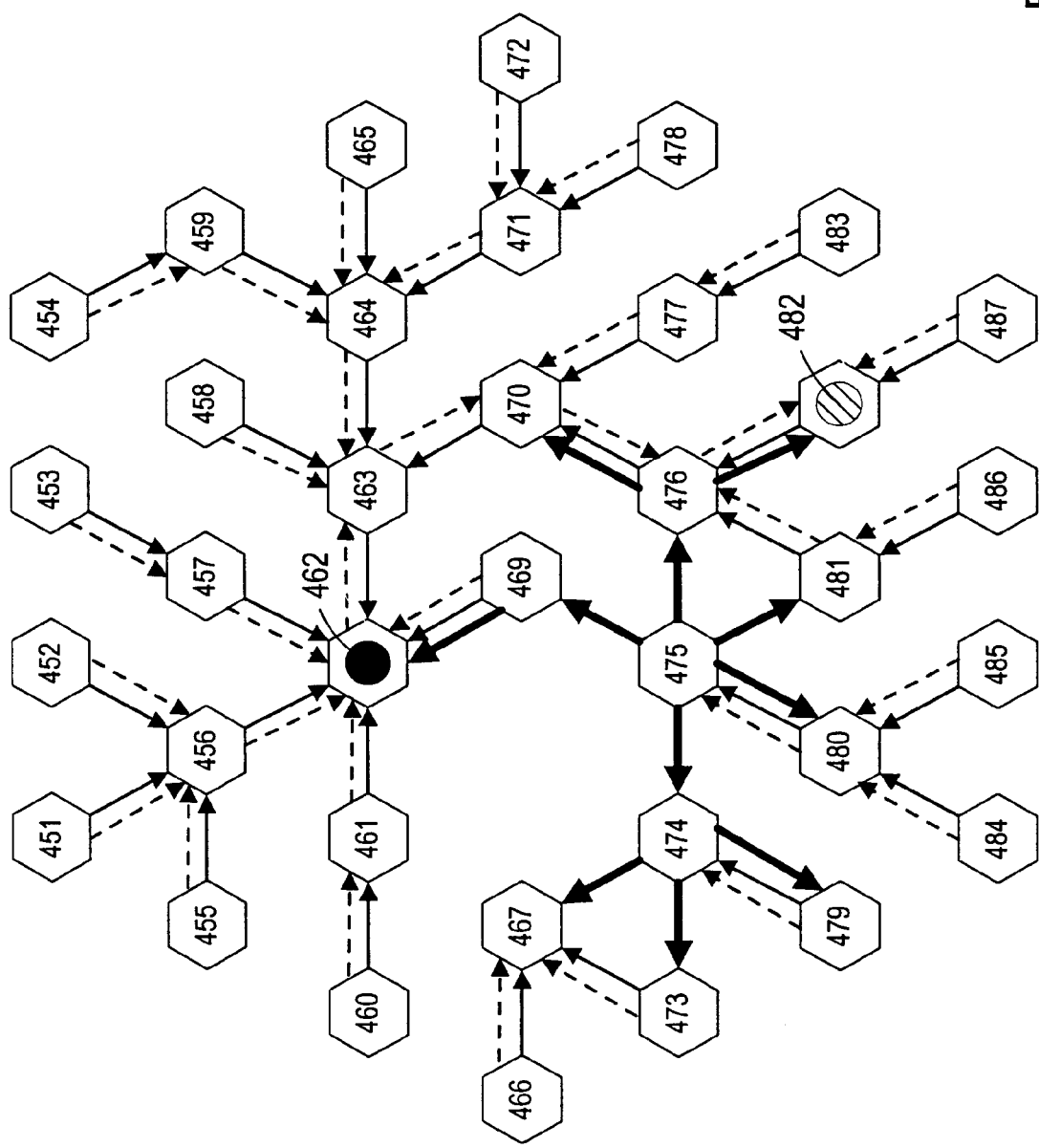

As shown in FIG. 95, nodes that receive the recovery requests from node 475 may forward the recovery requests. (To simplify the diagram, not all forwarded recovery requests are illustrated.) As shown, node 474 may forward the recovery request over all of its links (except the link from which it received the recovery request) because the role is not fully built at node 474. However, the role is fully built at node 469 and 476. Thus, nodes 469 and 476 may forward the recovery request only over links used in routes to instances of the role.

Figure 96:
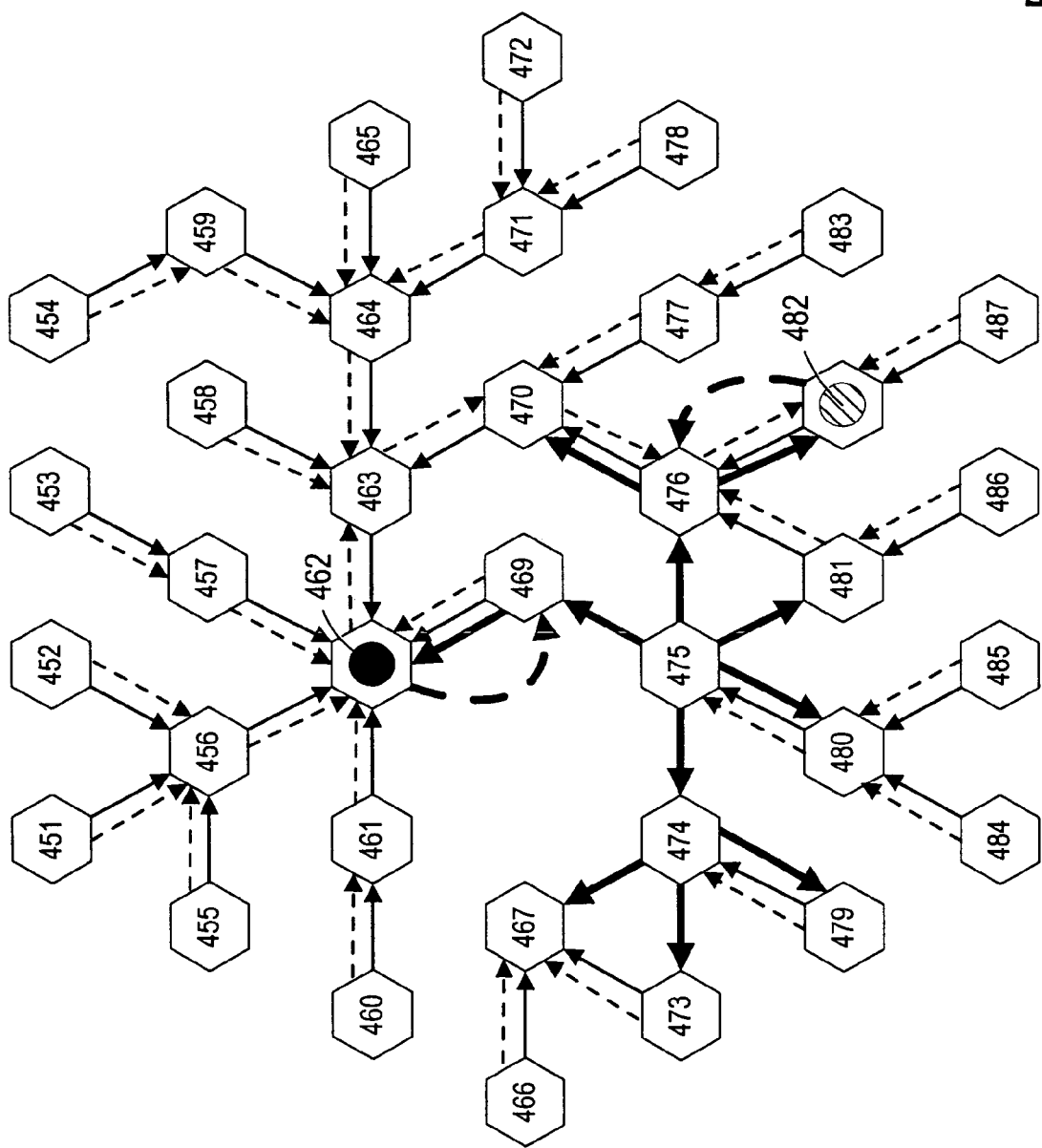
Figure 97:
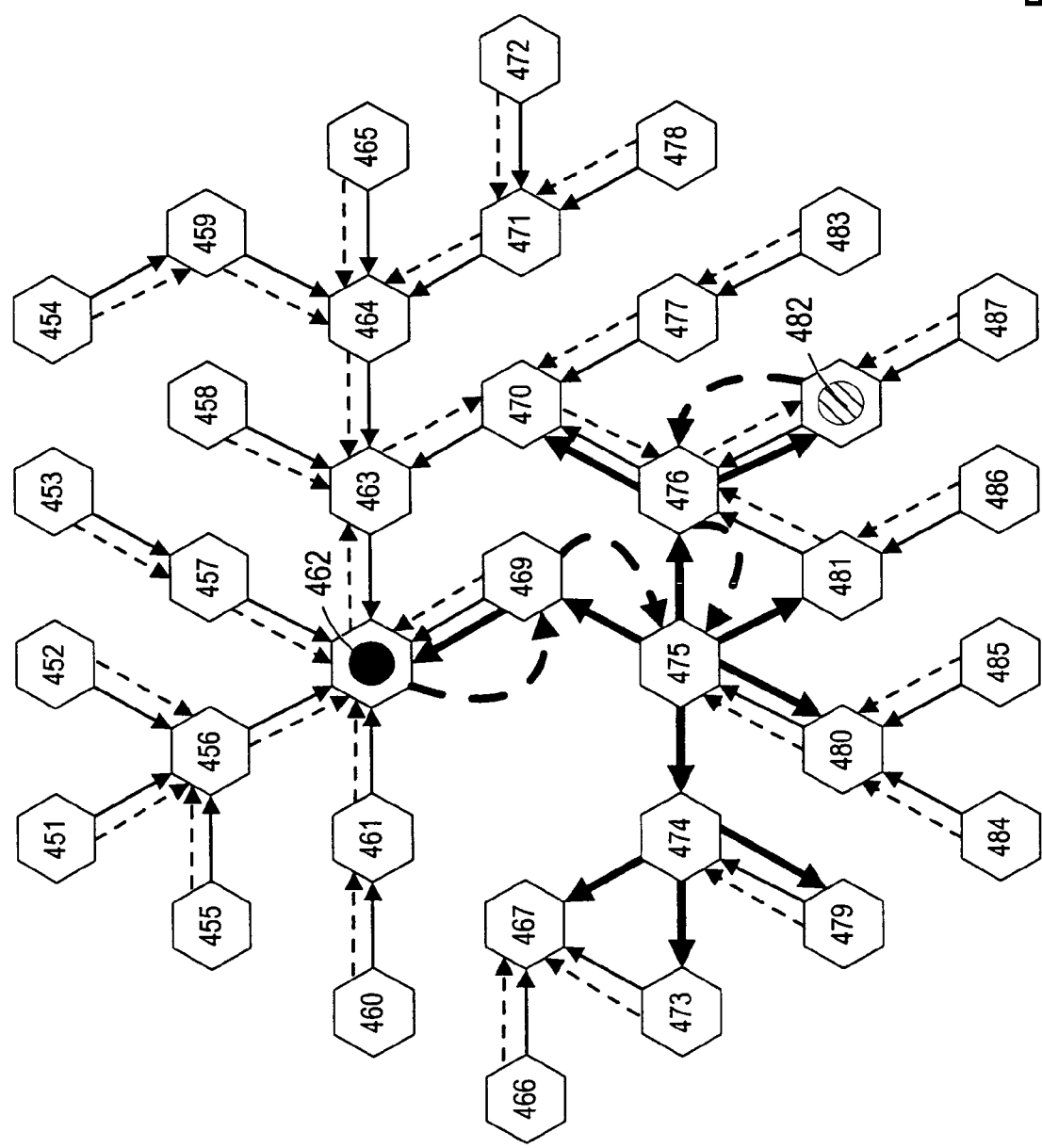

When node 462 (which has an instance of the role) receives the recovery request from node 469, node 462 may respond by returning a recovery response to node 469, as described above. The recovery response is indicated in FIG. 96 by the curved arrow from node 462 to node 469. Similarly, node 482 (which also has an instance of the role) may return a recovery response to node 476, indicated by the curved arrow from node 482 to node 476. As shown in FIG. 97, nodes 469 and 476 may forward the recovery responses originating from the respective role instances to node 475, since nodes 469 and 476 received their recovery requests from node 475.

Figure 98:
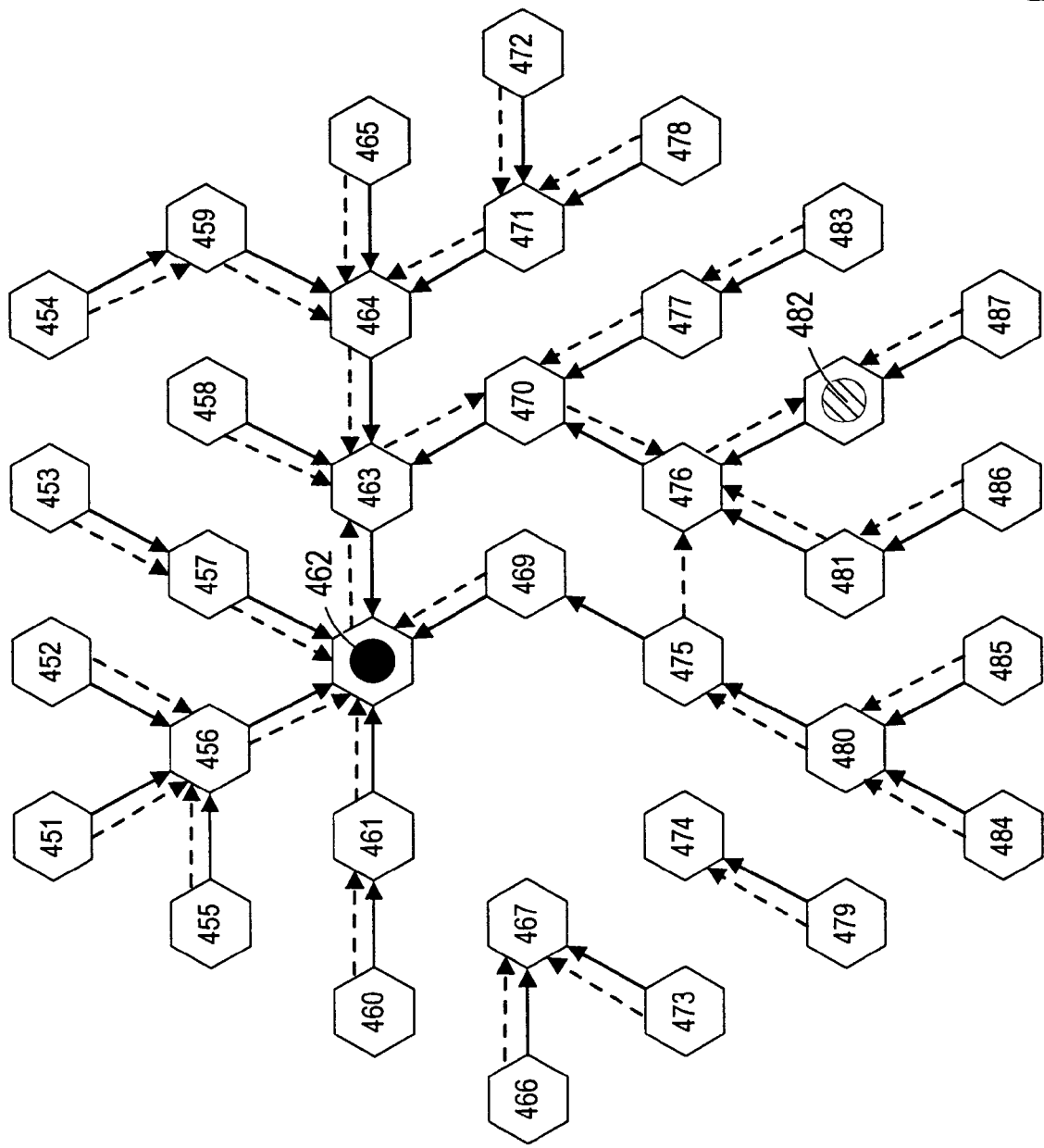

As described above, node 475 may update its routing table to indicate a route to the role instance at node 462 which points to node 469. Similarly, node 475 may update its routing table to indicate a route to the role instance at node 482 which points to node 476. FIG. 98 illustrates the resulting recovered routes to the respective role instances. Once the routes have been recovered, node 475 may forward the message received from node 480 using the recovered routes.

In one embodiment, a recovery request such as described above may include the following information:
  tree ID—a unique ID identifying the tree on which routes are being recovered
  role name—a string specifying the name of the role to which routes are being recovered
  exclude list—a list of role instance IDs identifying role instances to which routes already exist
Routes to role instances in the exclude list do not need to be recovered. Thus, if a node having an instance of the role is on the exclude list, then the node may not return a recovery response when the node receives a recovery request.

In one embodiment, a recovery response such as described above may include the following information:
  tree ID—a unique ID identifying the tree on which routes are being recovered
  role name—a string specifying the name of the role to which routes are being recovered
  role instance ID—a unique ID identifying the role instance which generated the recovery response
  exclusive—a Boolean value indicating whether the role instance is exclusive
  protocol ID—an ID identifying the protocol (e.g., client of the T&R layer) that caused the tree to be created It is possible that a link may fail while the recovery algorithm described above is being performed. A node having an instance of the role receives the recovery request via a path over which the recovery response will be sent back. If any link on this path fails, then the recovery response may not be received. Thus, when a link fails on a node, the node may return a link failure response for any pending recovery request. When the node that initiated the recovery request receives the link failure response, the node may re-issue the recovery request.

Detecting and Breaking Cycles

As noted above, in one embodiment routes created according to the methods described above may result in a cycle when a message is propagated. In one embodiment, cycles may be detected, and routes may be changed to avoid or break the cycles. It may be more efficient to detect and break cycles than to avoid the creation of routes with cycles.

Figure 99:
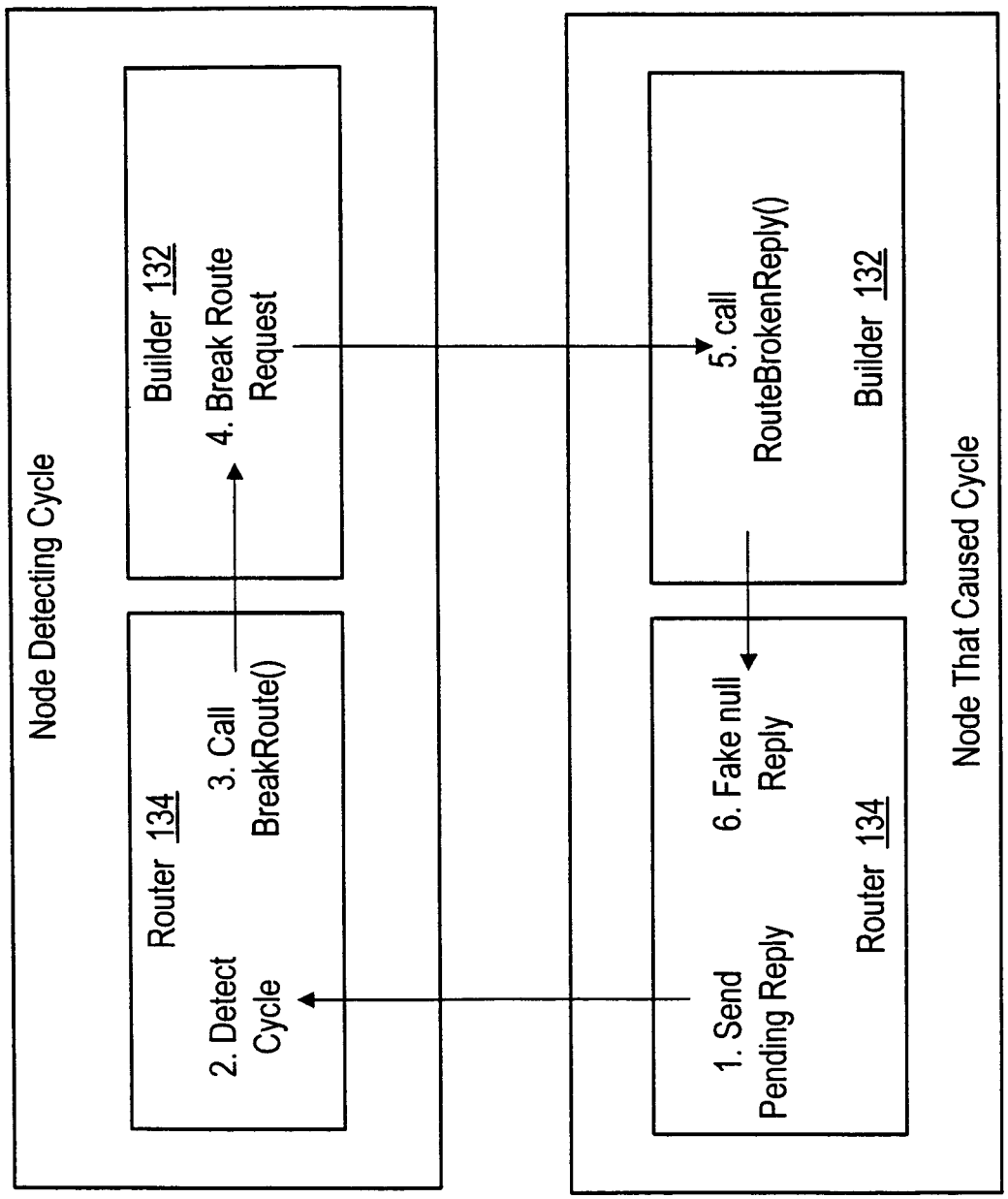
FIG. 99 illustrates an exemplary method for breaking a cycle.

FIG. 99 illustrates one embodiment of a method for detecting and breaking cycles. A node to which a message is sent may detect a cycle. For example, the node may recognize that it has already received the message. For example, the router 134 of the node may store message IDs of messages already seen and compare the message IDs with those of incoming messages. In response, the router 134 may call a BreakRoute( ) method of the builder 132. The builder 132 may initiate a break route process to break the cycle. In calling the BreakRoute( ) method, the router 134 may pass parameters specifying the tree ID, the name of the role to which the message is addressed, the link by which the cycling message was received, and the message ID of the cycling message. One embodiment of an algorithm performed by the BreakRoute( ) method for breaking the cycle is described below. The message which caused the cycle may be dropped, and a fake null reply may be sent so that the message is accounted for.

Figure 100:
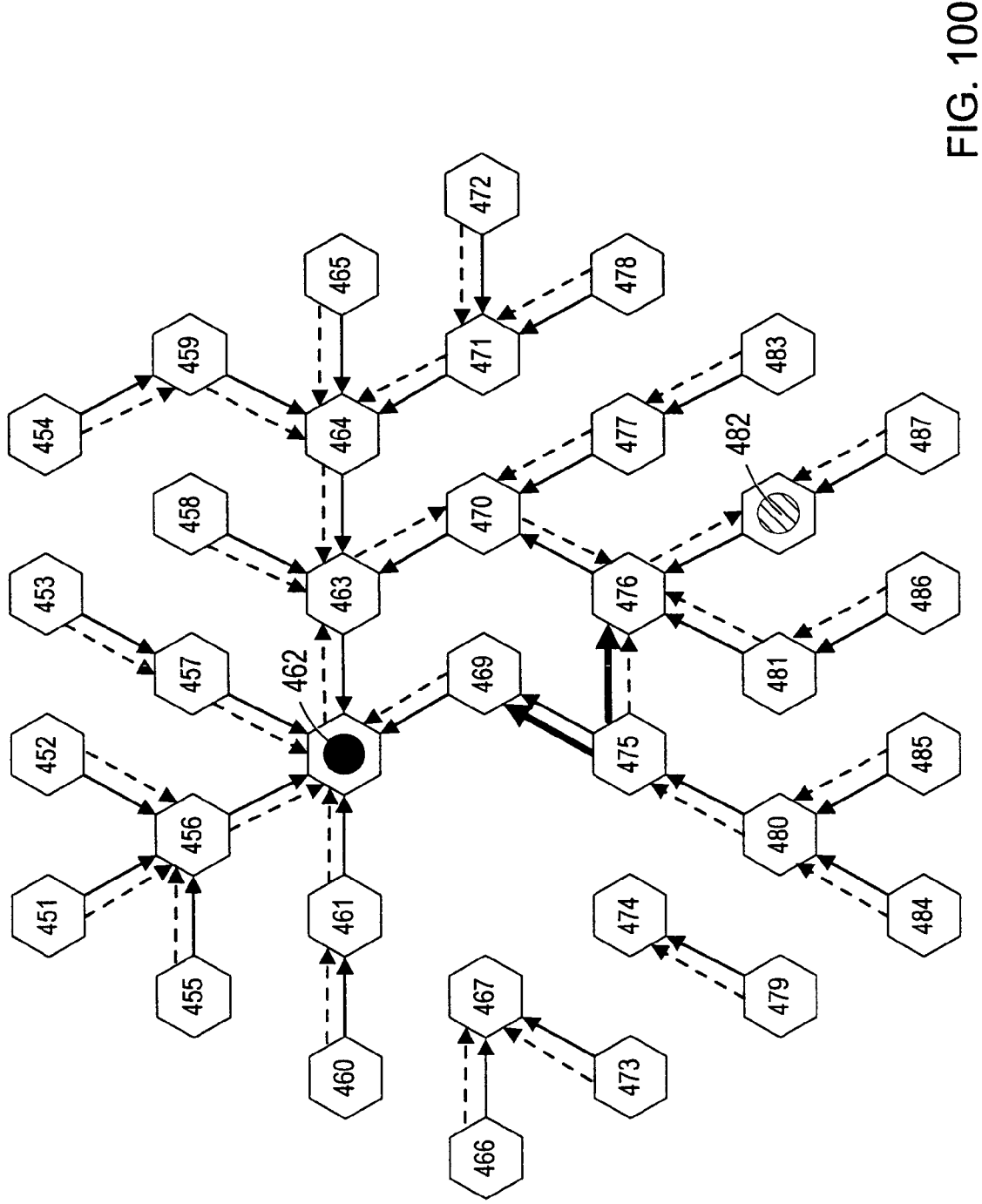
FIGS. 100-103 illustrate an exemplary network in which a cycle is detected and broken.
Figure 101:
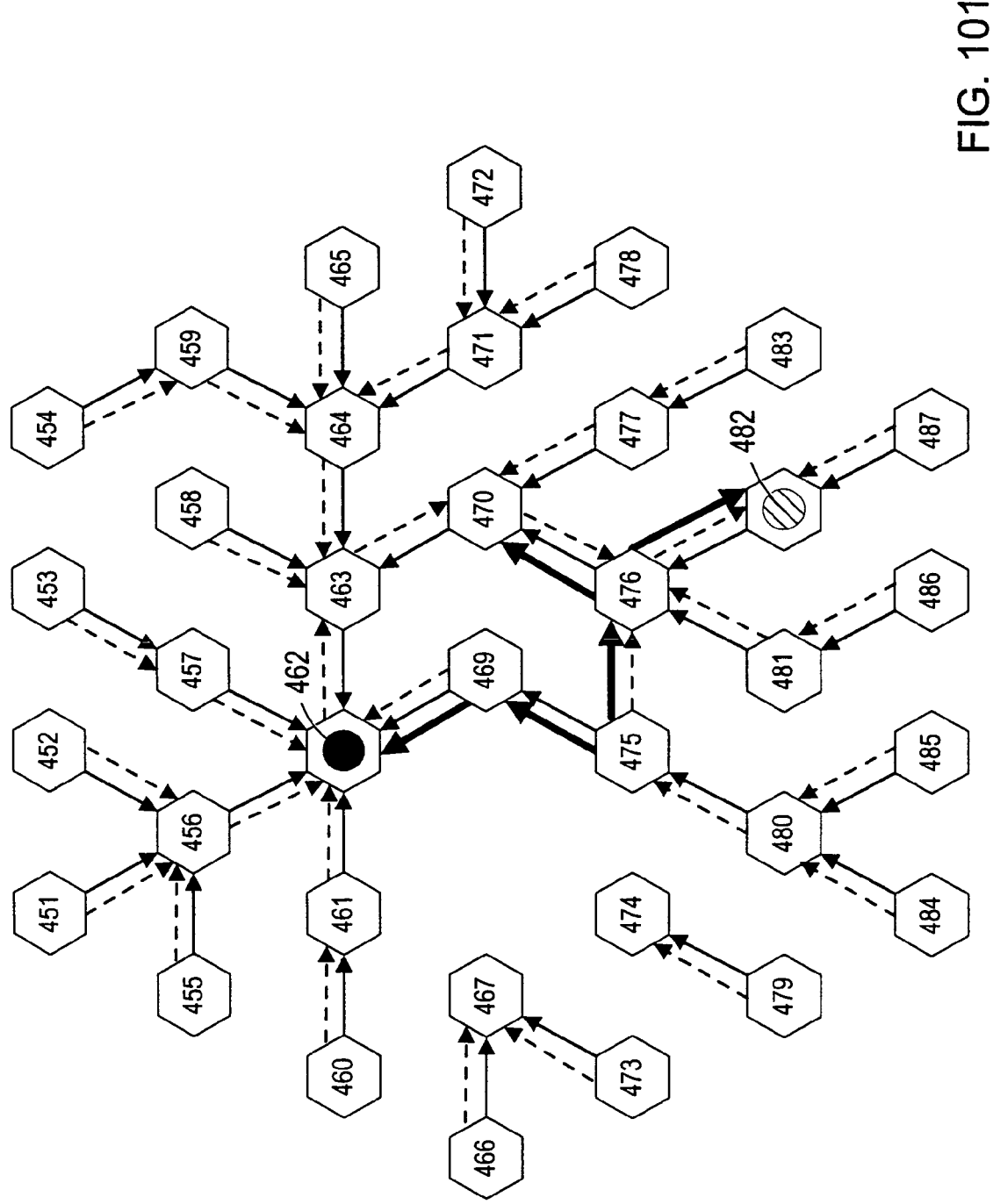
Figure 102:
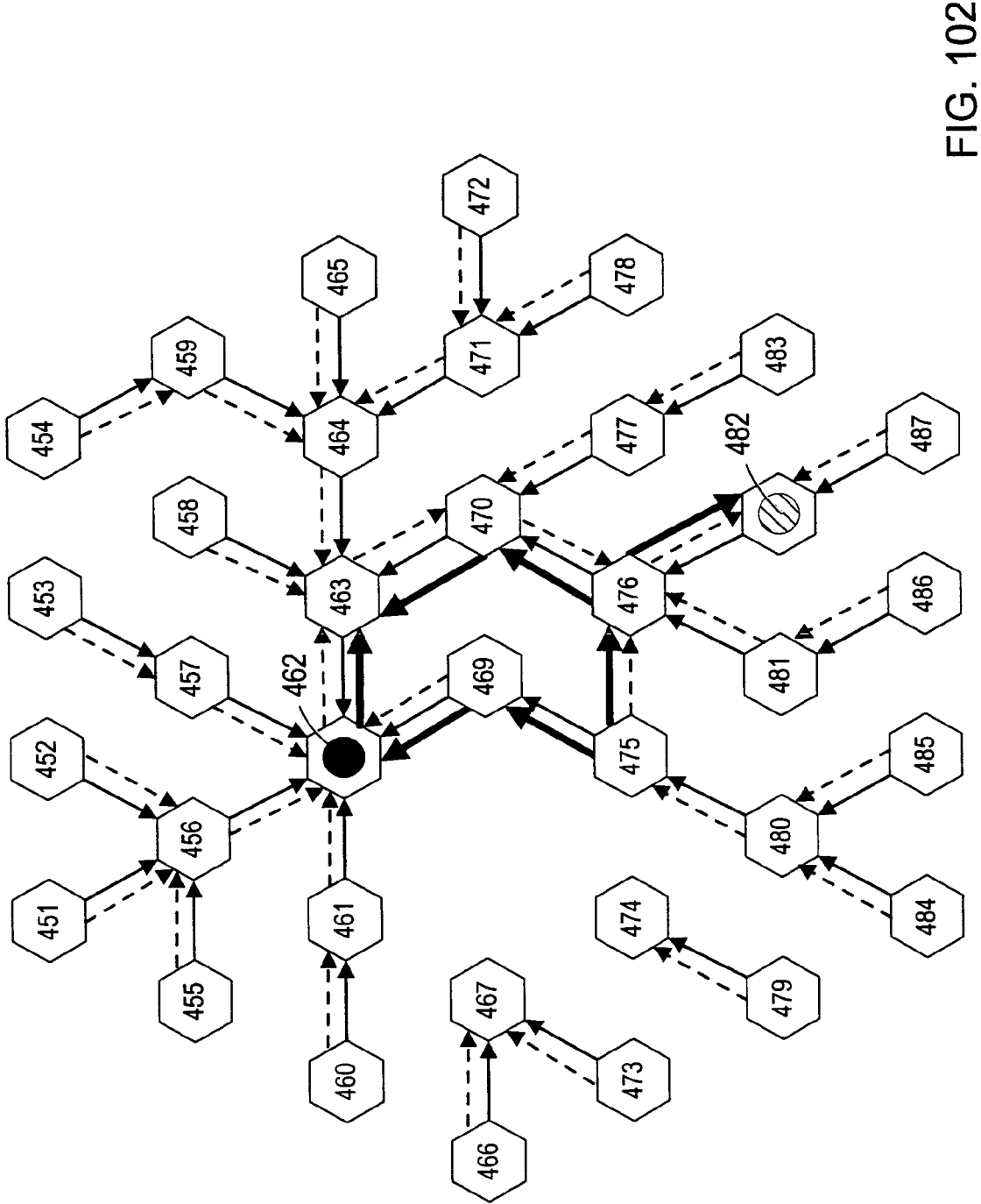
Figure 103:
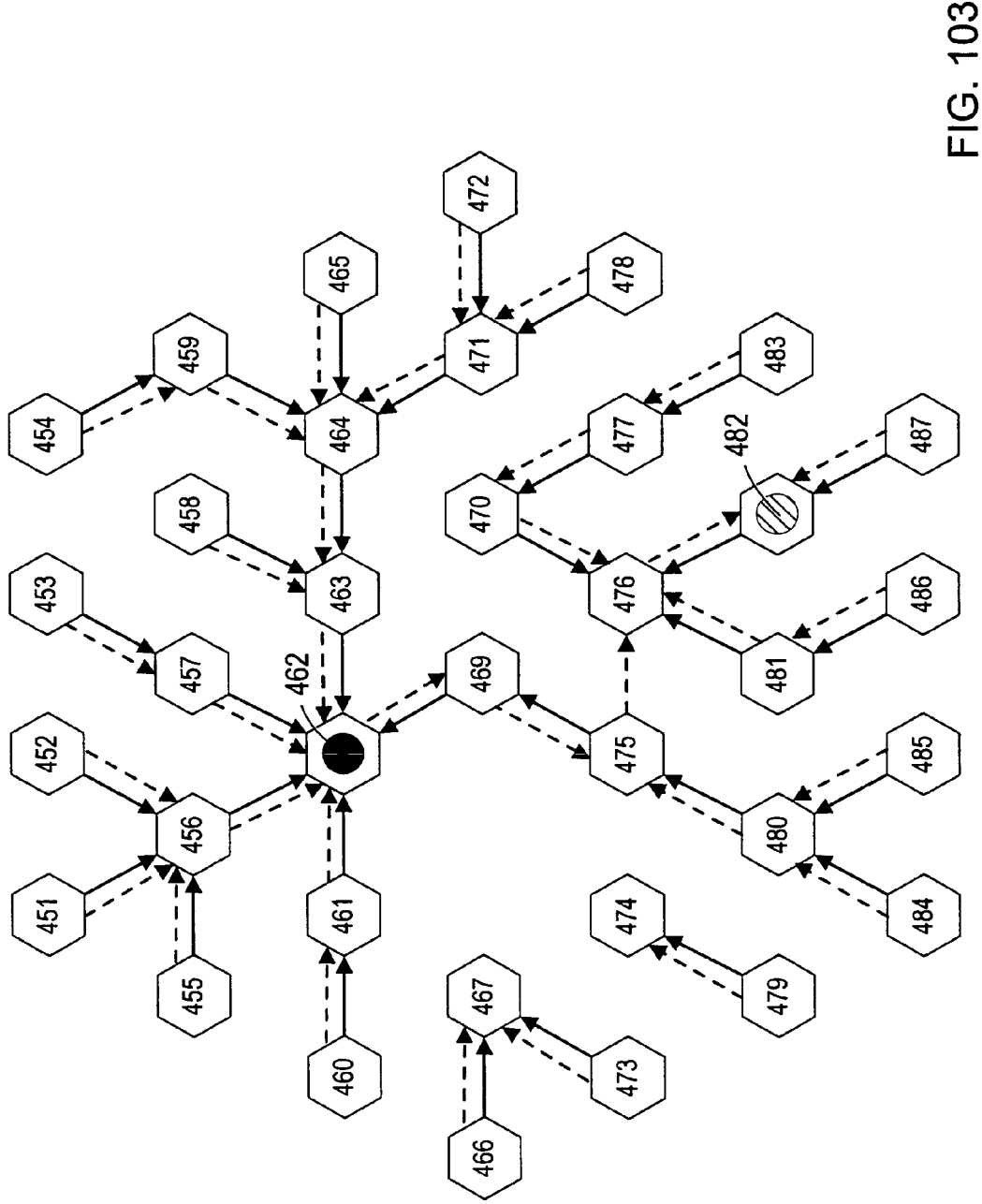

FIGS. 100-103 illustrate an example in which a cycle is detected and broken. As shown in FIG. 100, node 475 may send a message to the role associated with nodes 462 and 482. The message may be sent along the links from node 475 to nodes 469 and 476. FIG. 101 illustrates the propagation of the message from node 469 to 462 and from node 476 to nodes 470 and 482. FIG. 102 illustrates one further step of propagation, where a cycle is detected at node 463. In response to detecting the cycle, edges between node 463 and node 470 may be broken, and routes may be reversed as shown in FIG. 103 and described below.

Routes for each role instance on the edge to be broken may be reversed. Routes for other roles may be invalidated or marked not fully built but not reversed. The routes may be reversed by pointing them in the direction of the incoming link by which the message was received. The reversal process may be continued in a backward manner at the node which sent the message via the incoming link. Once arriving at a node that has other routes on other edges for instances of the same role, the role may be invalidated (marked not fully built) at that node, and the algorithm may be terminated. Also, if the incoming link is null at a node (e.g., the original sender of the message) then the role may be invalidated at the node, and the algorithm may be terminated.

Exemplary APIs

This section describes exemplary application programming interfaces (APIs) which client application software may utilize to interface with the T&R layer software. It is noted that these APIs are exemplary only and the method details given relate to one particular embodiment. Although the APIs and associated data types are presented as implemented in the Java programming language, various other language bindings are contemplated.

Messaging:
 Send—Transfers a message to one or more recipients on the tree
 Reply (send back a response)—Responds to a received message Message Listening Functions:
 Create Listener Port
 Get Listener Port
 Remove Listener Port
 Open Listener Port
 Close Listener Port Message Listening Callbacks:
 Message Received (from a send operation)
 Response Received (from a reply operation)
 Role Not Found (from a send operation)

Role Management Functions:
 Check Role
 Add Role
 Remove Role

Message Snooping Functions:
 Suspend message
 Resume message
 Consume message

Reply (Response) Snooping Functions:
 Suspend reply
 Resume reply
 Consume reply Messaging
 Send—This function passes an array of bytes from sender to all nodes holding the specified role. Inputs to this function include:
 TreeID (A 128-bit UUID): This identifier may have been obtained from a name service, or could be hard-coded as a well-known ID. This ID may be used to find the respective tree information using a hashmap. If the tree is unknown, the tree is added to the list of trees in one or more routing tables (e.g., a primary and/or secondary routing table).
 Role (java.lang.String): This identifier names an abstract address on the tree. The address may map to a single instance, or to multiple instances. A role with exactly one instance is known as an exclusive role. A role that may have more than one instance is called a shared role.
 Protocol ID (int): An optional parameter identifying a client application protocol to which to deliver the message.
 One Instance Flag (boolean): Indicates that the message should only be delivered to a single instance of a role. The message will be delivered to the first instance only.
 One Response Flag (boolean): Indicates that all responses to this message be aggregated into a single reply. Reply operations copy responses from receiver back to original sender. By default, each reply contains one response and each reply is delivered as it arrives to the sender.
 One Way Flag (boolean): Indicates that the per-node bookkeeping used to route responses back to the sender should not be done. In effect, this prevents the use of reply on this message.
 Body of Message (byte[ ]): A variable length array of bytes to be copied from sender to all receivers (role instances).

Reply—This function sends a response back to the original sender. Inputs to this function include:
 MessageID (128-bit UUID): The ID is a large number that uniquely identifies a message. The message ID is created during the sending process.
 Body of Response (byte[ ]): A variable length array of bytes to be copied from receiver of message identified by message ID.
 Grant Role Flag (boolean): Indicates that the receiver is granting its role to the sender.
 Giving Up Role Flag (boolean): Indicates that the receiver is giving up its role. That is the replying node will no longer hold the role.
 Last Reply Flag (boolean): Indicates that this reply is the last one from this node. Any subsequent replies are not allowed. A last reply signals that per-node bookkeeping to route responses back to a sender is no longer needed (at the local node).

The following combinations of grant role and give up role flags are valid: T/T, T/F, F/x. The T/T combination grants the role to the sender and also gives up its own local role. This combination is used to move an exclusive role. The T/F combination grants the role, but does not give the role up. This combination is used to distribute shared roles. The F/x combination is used to indicate that a request role was denied. In this case, the give up Boolean is ignored.

Message Listening

Listening for messages from a tree is accomplished by creating a port, binding the port to a tree, and then registering a listener callback to be called when each message arrives at the port.

CreateListenerPort—This function creates a new port in the closed state. Each listening port is associated with a protocol ID that names the type of port. Inputs to this function include:
 ProtocolID (int): The ID number uniquely identifies a listening port. The protocol ID space is not monitored by the T&R layer. Applications divide up the range of available IDs.

GetListenerPort—This function returns the listening port that is associated with a specific protocol ID. Inputs to this function include:
 ProtocolID (int): The ID number uniquely identifies a listening port. The protocol ID space is not monitored by the T&R layer. Applications divide up the range of available IDs.

GetListenerPort—This function returns the listening port that is bound to a specific tree ID. Inputs to this function include:
- TreeID (128-bit UUID): A tree may be bound to exactly one listening port. This ID names the bound tree.

RemoveListenerPort—This function closes and deactivates the listening port associated with a specific protocol ID. Inputs to this function include:
- ProtocolID (int): The ID number uniquely identifies a listening port. The protocol ID space is not monitored by the T&R layer. Applications divide up the range of available IDs.

OpenPort—This function activates the listening port associated with a specific protocol ID.

ClosePort—This function deactivates the listening port associated with a specific protocol ID.

AddTree—This function binds the listening port to the specified tree. Inputs to this function include:
- TreeID (128-bit UUID): This identifier may have been obtained from a name service, or could be hard-coded as a well-known ID.

RemoveTree—This function unbinds the listening port from the specified tree. Inputs to this function include:
- TreeID. (128-bit UUID): This identifier may have been obtained from a name service, or could be hard-coded as a well-known ID.

AddListener—This function registers the message callback interface. Inputs to this function include:
- Listener (public interface Listener)—This interface contains a list of methods called when messages arrive at the port.

RemoveListener—This function unregisters the message callback interface with the T&R layer. Inputs to this function include:
- Listener (public interface Listener)—This interface contains a list of methods called when messages arrive at the port.

Message Listening Callbacks

The following callback functions are registered with the listening port.

MessageReceived—This function is invoked by the T&R layer when a message arrives at the listening port. Inputs to this function include:
- TreeID (A 128-bit UUID): The identifier of the tree bound to the port.
- Role (java.lang.String): This identifier names an abstract address on the tree to which the message was sent.
- MessageID (128-bit UUID): The message ID is a large number that uniquely identifies a message. The message ID is created during the sending process.
- Body of Message (byte[ ]): A variable length array of bytes to be copied from sender to all receivers (role instances).
- Has Role Flag (boolean): If true, indicates that the receiver is a receiver and not a snooper.
- End Point (boolean): If true, Indicates that the local node is the last receiver.

MessageReplied—This function is invoked by the T&R layer when a response to a sent message arrives at the listening port. Inputs to this function include:
- TreeID. (A 128-bit UUID): The identifier of the tree bound to the port.
- MessageID (128-bit UUID): The message ID is a large number that uniquely identifies a message. The message ID is created during the sending process.
- Response (class DlspReplyMessage): This object contains:
  - Role Name (java.lang.String)
  - Role Instance ID (128-bit UUID) Unique ID for an instance (receiver) of a role
  - Granted (Boolean): If true, role was granted to sender
  - Gave Up (Boolean): If true, role was given away by receiver to sender
  - Exclusive (Boolean): If true, role is exclusive, not shared
  - Last Reply (Boolean): If true, this response is the last from this replying receiver
  - Has Role Flag (boolean): If true, indicates that the receiver is a receiver and not a snooper.
  - End Point (boolean): If true, Indicates that the local node is the last receiver.

RoleNotFound—This function is invoked by the T&R layer when a message could not be delivered to any role instance. Inputs to this function include:
- TreeID. (A 128-bit UUID): The identifier of the tree bound to the port.
- Role (java.lang.String): This identifier names an abstract address on the tree to which the message was sent.

TreeBuilt—This function is invoked by the T&R layer when a new tree is routed through the local node. Inputs to this function include:
- TreeID. (A 128-bit UUID): The identifier of the new tree. Note that this tree is not bound to any port yet. (See AddTree)

Data Storage Application

In various embodiments, the system described above may be utilized to perform any of various kinds of applications. As one example, the system may be utilized to perform distributed data storage such that data is distributed across various nodes 110 in the peer-to-peer network 100. However, in various embodiments any of various kinds of client application software 128 may utilize the T&R layer software 130 to send and receive messages for any desired purpose according to the methods described above.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   storing routing information on each of a plurality of nodes, wherein the routing information on each node specifies one or more links over which to send messages addressed to a first address, wherein two or more of the nodes each host an instance of the first address;
   sending a message addressed to the first address from a first node of the plurality of nodes;

a second node of the plurality of nodes receiving the message from more than one of the plurality of nodes, wherein the second node receiving the message from more than one of the plurality of nodes comprises the second node receiving the message from a third node, wherein the third node forwards the message to the second node in response to receiving the message from a fourth node; and the second node initiating an operation to change the routing information stored on one or more of the plurality of nodes in response to receiving the message from more than one of the plurality of nodes, wherein changing the routing information stored on one or more of the plurality of nodes comprises changing the routing information stored on the third node to specify that messages addressed to the first address should be sent over a first link to the fourth node in response to determining that the third node received the message from the fourth node via the first link.

2. The method of claim 1,
wherein said changing the routing information stored on one or more of the nodes comprises changing the routing information stored on one or more of the nodes such that upon sending an additional message addressed to the first address from the first node, the second node does not receive the additional message from more than one of the plurality of nodes.

3. The method of claim 1,
wherein the second node receiving the message from more than one of the plurality of nodes comprises the second node receiving the message from the third node in response to the third node routing the message toward a first instance of the first address and receiving the message from a fifth node in response to the fifth node routing the message toward a second instance of the first address.

4. The method of claim 1,
wherein before the routing information stored on the third node is changed, the routing information stored on the third node specifies that messages addressed to the first address should be sent over a second link;
wherein said changing the routing information stored on the third node comprises changing the routing information stored on the third node such that after said changing, the routing information stored on the third node specifies that messages addressed to the first address should be sent over the first link and does not specify that messages addressed to the first address should be sent over the second link.

5. The method of claim 1,
wherein the second node is coupled by a second link to the third node and is coupled by a third link to a fifth node;
wherein before the routing information on the third node is changed, the routing information on the third node specifies that messages addressed to the first address should be sent over the second link to the second node;
wherein the routing information on the fifth node specifies that messages addressed to the first address should be sent over the third link to the second node;
wherein the second node receiving the message from more then one of the plurality of nodes comprises the second node receiving the message from the third node via the second link and receiving the message from the fifth node via the third link.

6. The method of claim 1,
wherein the fourth node forwards the message to the third node in response to receiving the message from a fifth node;
wherein said changing the routing information stored on one or more of the plurality of nodes further comprises changing the routing information stored on the fourth node to specify that messages addressed to the first address should be sent over a second link to the fifth node in response to determining that the fourth node received the message from the fifth node via the second link.

7. A computer-readable memory medium storing program instructions executable to implement a method comprising:
storing routing information on each of a plurality of nodes, wherein the routing information on each node specifies one or more links over which to send messages addressed to a first address, wherein two or more of the nodes each host an instance of the first address;
sending a message addressed to the first address from a first node of the plurality of nodes;
a second node of the plurality of nodes receiving the message from more than one of the plurality of nodes, wherein the second node receiving the message from more than one of the plurality of nodes comprises the second node receiving the message from a third node, wherein the third node forwards the message to the second node in response to receiving the message from a fourth node; and the second node initiating an operation to change the routing information stored on one or more of the plurality of nodes in response to receiving the message from more than one of the plurality of nodes, wherein changing the routing information stored on one or more of the plurality of nodes comprises changing the routing information stored on the third node to specify that messages addressed to the first address should be sent over a first link to the fourth node in response to determining that the third node received the message from the fourth node via the first link.

8. The computer-readable memory medium of claim 7,
wherein said changing the routing information stored on one or more of the nodes comprises changing the routing information stored on one or more of the nodes such that upon sending an additional message addressed to the first address from the first node, the second node does not receive the additional message from more than one of the plurality of nodes.

9. The computer-readable memory medium of claim 7,
wherein the second node receiving the message from more than one of the plurality of nodes comprises the second node receiving the message from the third node in response to the third node routing the message toward a first instance of the first address and receiving the message from a fifth node in response to the fifth node routing the message toward a second instance of the first address.

10. The computer-readable memory medium of claim 7,
wherein before the routing information stored on the third node is changed the routing information stored on the third node specifies that messages addressed to the first address should be sent over a second link;
wherein said changing the routing information stored on the third node comprises changing the routing information stored on the third node such that after said changing, the routing information stored on the third node specifies that messages addressed to the first address should be sent over the first link and does not specify that messages addressed to the first address should be sent over the second link.

11. The computer-readable memory medium of claim 7,
wherein the second node is coupled by a second link to the third node and is coupled by a third link to a fifth node;
wherein before the routing information on the third node is changed, the routing information on the third node specifies that messages addressed to the first address should be sent over the second link to the second node;
wherein the routing information on the fifth node specifies that messages addressed to the first address should be sent over the third link to the second node;
wherein the second node receiving the message from more then one of the plurality of nodes comprises the second node receiving the message from the third node via the second link and receiving the message from the fifth node via the third link.

12. The computer-readable memory medium of claim 7,
wherein the fourth node forwards the message to the third node in response to receiving the message from a fifth node;
wherein said changing the routing information stored on one or more of the plurality of nodes further comprises changing the routing information stored on the fourth node to specify that messages addressed to the first address should be sent over a second link to the fifth node in response to determining that the fourth node received the message from the fifth node via the second link.

13. A system comprising:
a plurality of nodes;
wherein the nodes include memory that stores program instructions executable to implement:
storing routing information on each of the plurality of nodes, wherein the routing information on each node specifies one or more links over which to send messages addressed to a first address, wherein two or more of the nodes each host an instance of the first address;
sending a message addressed to the first address from a first node of the plurality of nodes;
a second node of the plurality of nodes receiving the message from more than one of the plurality of nodes, wherein the second node receiving the message from more than one of the plurality of nodes comprises the second node receiving the message from a third node, wherein the third node forwards the message to the second node in response to receiving the message from a fourth node; and
the second node initiating an operation to change the routing information stored on one or more of the plurality of nodes in response to receiving the message from more than one of the plurality of nodes, wherein changing the routing information stored on one or more of the plurality of nodes comprises changing the routing information stored on the third node to specify that messages addressed to the first address should be sent over a first link to the fourth node in response to determining that the third node received the message from the fourth node via the first link.

14. The system of claim 13,
wherein said changing the routing information stored on one or more of the nodes comprises changing the routing information stored on one or more of the nodes such that upon sending an additional message addressed to the first address from the first node, the second node does not receive the additional message from more than one of the plurality of nodes.

15. The system of claim 13,
wherein the second node receiving the message from more than one of the plurality of nodes comprises the second node receiving the message from the third node in response to the third node routing the message toward a first instance of the first address and receiving the message from a fifth node in response to the fifth node routing the message toward a second instance of the first address.

16. The system of claim 13,
wherein before the routing information stored on the third node is changed, the routing information stored on the third node specifies that messages addressed to the first address should be sent over a second link;
wherein said changing the routing information stored on the third node comprises changing the routing information stored on the third node such that after said changing, the routing information stored on the third node specifies that messages addressed to the first address should be sent over the first link and does not specify that messages addressed to the first address should be sent over the second link.

17. The system of claim 13,
wherein the fourth node is operable to forward the message to the third node in response to receiving the message from a fifth node;
wherein said changing the routing information stored on one or more of the plurality of nodes further comprises changing the routing information stored on the fourth node to specify that messages addressed to the first address should be sent over a second link to the fifth node in response to determining that the fourth node received the message from the fifth node via the second link.

* * * * *